US012441996B2

(12) United States Patent
Gupta et al.

(10) Patent No.: US 12,441,996 B2
(45) Date of Patent: Oct. 14, 2025

(54) USE OF DNA ORIGAMI NANOSTRUCTURES FOR MOLECULAR INFORMATION BASED DATA STORAGE SYSTEMS

(71) Applicant: BATTELLE MEMORIAL INSTITUTE, Columbus, OH (US)

(72) Inventors: Cherry Gupta, Columbus, OH (US); Craig M. Bartling, Powell, OH (US); Rachel R. Spurbeck, Columbus, OH (US); Anthony D. Duong, Columbus, OH (US); James Ha, Columbus, OH (US); Miguel D. Pedrozo, Columbus, OH (US); Nickolas R. Andrioff, Columbus, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 0 days.

(21) Appl. No.: 18/972,564

(22) Filed: Dec. 6, 2024

(65) Prior Publication Data

US 2025/0188449 A1 Jun. 12, 2025

Related U.S. Application Data

(60) Provisional application No. 63/607,741, filed on Dec. 8, 2023.

(51) Int. Cl.
*C12N 15/10* (2006.01)
*C12Q 1/6869* (2018.01)

(52) U.S. Cl.
CPC ....... *C12N 15/1093* (2013.01); *C12Q 1/6869* (2013.01)

(58) Field of Classification Search
None
See application file for complete search history.

(56) References Cited

U.S. PATENT DOCUMENTS

| | | |
|---|---|---|
| 3,562,806 A | 2/1971 | Grant |
| 3,678,098 A | 7/1972 | Lewis |
| 3,691,123 A | 9/1972 | Clarke |
| 3,706,564 A | 12/1972 | Hollister |
| 3,706,565 A | 12/1972 | Ericson |
| 3,739,042 A | 6/1973 | Chu |
| 3,744,969 A | 7/1973 | Alps |
| 3,829,564 A | 8/1974 | Merry |
| 3,847,857 A | 11/1974 | Haag |
| 4,036,766 A | 7/1977 | Yamamoto |
| 4,056,559 A | 11/1977 | Lewis |
| 4,219,616 A | 8/1980 | Pope |
| 4,237,253 A | 12/1980 | Jacquet |
| 4,377,481 A | 3/1983 | Jakabhazy |
| 4,434,268 A | 2/1984 | Doroszkowsky |
| 4,544,621 A | 10/1985 | Roth |
| 4,557,997 A | 12/1985 | Iwasaki |
| 4,559,293 A | 12/1985 | Moriya |
| 4,592,816 A | 6/1986 | Emmons |
| 4,595,722 A | 6/1986 | Such |
| 4,656,027 A | 4/1987 | Sjoovist |
| 4,735,887 A | 4/1988 | Foss |
| 4,755,563 A | 7/1988 | West |
| 4,775,721 A | 10/1988 | Horikawa |
| 4,834,799 A | 5/1989 | Song |
| 4,855,207 A | 8/1989 | Tsubuko |
| 4,925,764 A | 5/1990 | Madeleine |
| 4,985,160 A | 1/1991 | Henry |
| 5,085,698 A | 2/1992 | Ma |
| 5,124,381 A | 6/1992 | Ward |
| 5,141,556 A | 8/1992 | Matrick |
| 5,180,425 A | 1/1993 | Matrick |
| 5,205,861 A | 4/1993 | Matrick |
| 5,271,765 A | 12/1993 | Ma |
| 5,310,595 A | 5/1994 | Ali |
| 5,310,778 A | 5/1994 | Shor |
| 5,418,277 A | 5/1995 | Ma |
| 5,428,383 A | 6/1995 | Shields |
| 5,432,035 A | 7/1995 | Katagiri |
| 5,512,418 A | 4/1996 | Ma |
| 5,518,534 A | 5/1996 | Pearlstine |
| 5,519,081 A | 5/1996 | Ashton |
| 5,519,085 A | 5/1996 | Ma |

(Continued)

FOREIGN PATENT DOCUMENTS

| | | |
|---|---|---|
| CN | 1323840 A | 11/2001 |
| CN | 1328106 A | 12/2001 |

(Continued)

OTHER PUBLICATIONS

Ahmed et al., "The effect of polymer architecture, composition, and molecular weight on the properties of glycopolymer-based non-viral gene delivery systems", Biomaterials, Elsevier, Amsterdam, NL, vol. 32, No. 22, Mar. 30, 2011 (Mar. 30, 2011), pp. 5279-5290, XP028214661, ISSN: 0142-9612, DOI: 10.1016/J.BIOMATERIALS. 2011.03.082.

Alidedeoglu et al., "Bioconjugation of D-glucuronic acid sodium salt to well-defined primary amine-containing homopolymers and block copolymers", Journal of Polymer Science Part A: Polymer Chemistry, vol. 48, No. 14, Jun. 14, 2010 (Jun. 14, 2010), pp. 3052-3061, XP055185110, ISSN: 0887-624x, DOI: 10.1002/pola. 24083.

Anonymous, "The Protein Man's Blog | A Discussion of Protein Research—High Efficiency & Stability Protein CrossLinking with EDC & NHS", G-Biosciences, (Sep. 26, 2017), G-Biosciences, URL: https://info.gbiosciences.com/blog/2-step-protein-coupling-edc-nhs, (Jan. 9, 2024), XP093117356.

(Continued)

*Primary Examiner* — Kaijiang Zhang
(74) *Attorney, Agent, or Firm* — Barnes & Thornburg

(57) ABSTRACT

The present disclosure is directed to compositions and methods that use the principles of DNA origami to package and archive data stored in multiple indexed DNA oligonucleotides. These structures allow for selective physical data access and retrieval from a molecular pool of DNA origami (DNAO) nanostructures comprising the data bearing oligonucleotides.

20 Claims, 4 Drawing Sheets

Specification includes a Sequence Listing.

(56) References Cited

U.S. PATENT DOCUMENTS

| | | |
|---|---|---|
| 5,525,450 A | 6/1996 | Spiewak |
| 5,620,883 A | 4/1997 | Shao |
| 5,698,016 A | 12/1997 | Adams |
| 5,709,714 A | 1/1998 | Natoli |
| 5,750,594 A | 5/1998 | Page |
| 5,969,046 A | 10/1999 | Schindler |
| 5,985,573 A | 11/1999 | Hennink |
| 6,004,582 A | 12/1999 | Faour |
| 6,004,712 A | 12/1999 | Barbetta |
| 6,022,533 A | 2/2000 | Goto |
| 6,022,908 A | 2/2000 | Ma |
| 6,040,358 A | 3/2000 | Page |
| 6,077,635 A | 6/2000 | Okado |
| 6,132,917 A | 10/2000 | Hoffend |
| 6,139,856 A | 10/2000 | Kaminska |
| 6,197,290 B1 | 3/2001 | Goto |
| 6,207,631 B1 | 3/2001 | Kasturi |
| 6,221,402 B1 | 4/2001 | Itoh |
| 6,245,421 B1 | 6/2001 | Aurenty |
| 6,247,808 B1 | 6/2001 | Ma |
| 6,251,554 B1 | 6/2001 | Hoffend |
| 6,276,273 B1 | 8/2001 | Aurenty |
| 6,309,666 B1 | 10/2001 | Hatano |
| 6,315,854 B1 | 11/2001 | Anhauser |
| 6,372,708 B1 | 4/2002 | Kasturi |
| 6,413,306 B1 | 7/2002 | Kraiter |
| 6,471,349 B1 | 10/2002 | Aurenty |
| 6,532,871 B1 | 3/2003 | Aurenty |
| 6,624,210 B1 | 9/2003 | Petereit |
| 6,692,769 B1 | 2/2004 | Ishibashi |
| 6,720,387 B1 | 4/2004 | Stark |
| 6,794,367 B1 | 9/2004 | Tanida |
| 6,827,795 B1 | 12/2004 | Scheper |
| 6,903,064 B1 | 6/2005 | Kasturi |
| 7,256,020 B2 | 8/2007 | Lyamichev |
| 7,737,108 B1 | 6/2010 | Hoffman |
| 8,501,923 B2 | 8/2013 | Rothemund |
| 8,758,860 B1 | 6/2014 | Pyles |
| 9,085,618 B2 | 7/2015 | Ramasubramanyan |
| 9,447,220 B2 | 9/2016 | Cho |
| 9,714,940 B2 | 7/2017 | Lowery, Jr. |
| 9,970,040 B2 | 5/2018 | Elbaz |
| 10,201,503 B1 | 2/2019 | Li |
| 10,695,443 B2 | 6/2020 | Lötvall |
| 11,419,932 B2 | 8/2022 | Bathe |
| 12,031,128 B2 | 7/2024 | Duong |
| 12,109,223 B2 | 10/2024 | Duong |
| 2002/0028410 A1 | 3/2002 | Choi |
| 2002/0187311 A1 | 12/2002 | Golub |
| 2003/0049311 A1 | 3/2003 | McAllister |
| 2003/0064036 A1 | 4/2003 | Petereit |
| 2003/0071883 A1 | 4/2003 | Suzuki |
| 2003/0106160 A1 | 6/2003 | Sun |
| 2003/0124074 A1 | 7/2003 | Mougin |
| 2003/0130160 A1 | 7/2003 | Eason |
| 2003/0152856 A1 | 8/2003 | Mizoe |
| 2003/0199419 A1 | 10/2003 | Rodrigues |
| 2004/0091538 A1 | 5/2004 | Pollock-Dove |
| 2004/0096490 A1 | 5/2004 | Bracht |
| 2004/0104501 A1 | 6/2004 | Petereit |
| 2004/0109869 A1 | 6/2004 | Glenn |
| 2004/0198838 A1 | 10/2004 | Alles |
| 2004/0208925 A1 | 10/2004 | Oner |
| 2004/0219211 A1 | 11/2004 | Criere |
| 2004/0249035 A1 | 12/2004 | Petereit |
| 2005/0020779 A1 | 1/2005 | Mougin |
| 2005/0026803 A1 | 2/2005 | Sivik |
| 2005/0048112 A1 | 3/2005 | Breitenbach |
| 2005/0053566 A1 | 3/2005 | Nguyen-Kim |
| 2005/0070486 A1 | 3/2005 | Wieland-Berghausen |
| 2005/0084529 A1 | 4/2005 | Rosenberg |
| 2005/0090599 A1 | 4/2005 | Spinelli |
| 2005/0208133 A1 | 9/2005 | Tsutsumi |
| 2005/0281871 A1 | 12/2005 | Petereit |
| 2006/0051412 A1 | 3/2006 | Petereit |
| 2006/0089425 A1 | 4/2006 | Chopra |
| 2006/0110433 A1 | 5/2006 | Terahara |
| 2006/0257484 A1 | 11/2006 | Hwang |
| 2006/0280798 A1 | 12/2006 | Ensoli |
| 2007/0027213 A1 | 2/2007 | Oberegger |
| 2007/0072996 A1 | 3/2007 | Kedar |
| 2007/0088118 A1 | 4/2007 | Dungworth |
| 2007/0141013 A1 | 6/2007 | Nguyen-Kim |
| 2007/0178059 A1 | 8/2007 | Moser |
| 2007/0203245 A1 | 8/2007 | Koltun |
| 2007/0231397 A1 | 10/2007 | Petereit |
| 2007/0259028 A1 | 11/2007 | Ito |
| 2007/0275060 A1 | 11/2007 | Befumo |
| 2007/0275071 A1 | 11/2007 | Ensoli |
| 2008/0050432 A1 | 2/2008 | Jun |
| 2008/0050450 A1 | 2/2008 | Arnold |
| 2008/0075689 A1 | 3/2008 | Pierobon |
| 2008/0089853 A1 | 4/2008 | Nguyen-Kim |
| 2008/0153982 A1 | 6/2008 | Lai |
| 2008/0181948 A1 | 7/2008 | Berndl |
| 2008/0193405 A1 | 8/2008 | Mukherjee |
| 2008/0193544 A1 | 8/2008 | Bruck-Scheffler |
| 2008/0226731 A1 | 9/2008 | Vasanthavada |
| 2008/0233177 A1 | 9/2008 | Meconi |
| 2008/0280999 A1 | 11/2008 | Lakshman |
| 2008/0286221 A1 | 11/2008 | Kim |
| 2008/0299391 A1 | 12/2008 | White |
| 2008/0306233 A1 | 12/2008 | Muhrer |
| 2009/0023754 A1 | 1/2009 | Lee |
| 2009/0053315 A1 | 2/2009 | Brough |
| 2009/0099075 A1 | 4/2009 | Barg |
| 2009/0108241 A1 | 4/2009 | Ogura |
| 2009/0118399 A1 | 5/2009 | Benbakoura |
| 2009/0148522 A1 | 6/2009 | Kowalski |
| 2009/0161058 A1 | 6/2009 | Sherman |
| 2009/0175952 A1 | 7/2009 | Woo |
| 2009/0220596 A1 | 9/2009 | Rosenberg |
| 2009/0221621 A1 | 9/2009 | Sathyan |
| 2009/0280183 A1 | 11/2009 | Lizio |
| 2009/0285891 A1 | 11/2009 | Jung |
| 2009/0302493 A1 | 12/2009 | Kessler |
| 2009/0311320 A1 | 12/2009 | Oury |
| 2009/0318847 A1 | 12/2009 | Sebree |
| 2009/0321945 A1 | 12/2009 | Besling |
| 2010/0038816 A1 | 2/2010 | Ghogh |
| 2010/0048737 A1 | 2/2010 | Wendel |
| 2010/0074951 A1 | 3/2010 | Kim |
| 2010/0087544 A1 | 4/2010 | Kim |
| 2010/0120970 A1 | 5/2010 | Biggs |
| 2010/0143459 A1 | 6/2010 | Liepold |
| 2010/0143470 A1 | 6/2010 | Kim |
| 2010/0143590 A1 | 6/2010 | Held |
| 2010/0152299 A1 | 6/2010 | Vasanthavada |
| 2010/0160183 A1 | 6/2010 | Xu |
| 2010/0174040 A1 | 7/2010 | Kim |
| 2010/0209480 A1 | 8/2010 | Altenburger |
| 2010/0209520 A1 | 8/2010 | Kubo |
| 2010/0233350 A1 | 9/2010 | Herrmann |
| 2010/0233447 A1 | 9/2010 | Campbell |
| 2010/0247635 A1 | 9/2010 | Rosenberg |
| 2010/0266859 A1 | 10/2010 | Abe |
| 2010/0272797 A1 | 10/2010 | Kim |
| 2010/0278899 A1 | 11/2010 | Sugiura |
| 2010/0286288 A1 | 11/2010 | Langguth |
| 2010/0291311 A1 | 11/2010 | Trouve |
| 2010/0310644 A1 | 12/2010 | Liebmann |
| 2010/0323090 A1 | 12/2010 | Ishizaki |
| 2011/0002988 A1 | 1/2011 | Ishizaki |
| 2011/0005773 A1 | 1/2011 | Dusterhoft |
| 2011/0032303 A1 | 2/2011 | Li |
| 2011/0052683 A1 | 3/2011 | Kim |
| 2011/0052699 A1 | 3/2011 | Funke |
| 2011/0091563 A1 | 4/2011 | Kurasawa |
| 2011/0111021 A1 | 5/2011 | Kim |
| 2011/0111022 A1 | 5/2011 | Kim |
| 2011/0117194 A1 | 5/2011 | Kim |
| 2011/0123636 A1 | 5/2011 | Stayton |
| 2011/0143435 A1 | 6/2011 | Stayton |
| 2011/0144260 A1 | 6/2011 | Tanabe |

(56) References Cited

U.S. PATENT DOCUMENTS

| | | |
|---|---|---|
| 2011/0201759 A1 | 8/2011 | Takahashi |
| 2011/0242154 A1 | 10/2011 | Roberts |
| 2011/0257289 A1 | 10/2011 | Biggs |
| 2011/0263470 A1 | 10/2011 | Qin |
| 2011/0269913 A1 | 11/2011 | Balk |
| 2011/0274893 A1 | 11/2011 | Kaeser |
| 2011/0275775 A1 | 11/2011 | Goto |
| 2011/0287100 A1 | 11/2011 | Desset-Brethes |
| 2011/0305660 A1 | 12/2011 | Stayton |
| 2011/0306632 A1 | 12/2011 | Miller |
| 2011/0312973 A1 | 12/2011 | Liepold |
| 2012/0009223 A1 | 1/2012 | Wenguang |
| 2012/0053248 A1 | 3/2012 | Kolter |
| 2012/0093982 A1 | 4/2012 | Tsukioka |
| 2012/0143039 A1 | 6/2012 | Hartwig |
| 2012/0172574 A1 | 7/2012 | Helou |
| 2012/0183769 A1 | 7/2012 | Nasu |
| 2012/0190724 A1 | 7/2012 | Na |
| 2012/0213827 A1 | 8/2012 | Chatterji |
| 2012/0220550 A1 | 8/2012 | Bae |
| 2012/0232117 A1 | 9/2012 | Bae |
| 2012/0258909 A1 | 10/2012 | Liepold |
| 2012/0282303 A1 | 11/2012 | Ito |
| 2012/0282310 A1 | 11/2012 | Lucet-Levannier |
| 2012/0283670 A1 | 11/2012 | Ito |
| 2012/0323190 A1 | 12/2012 | Ito |
| 2012/0328891 A1 | 12/2012 | Suwa |
| 2013/0005874 A1 | 1/2013 | Nakajima |
| 2013/0011362 A1 | 1/2013 | Monahan |
| 2013/0017245 A1 | 1/2013 | Takano |
| 2013/0034599 A1 | 2/2013 | Thaxton |
| 2013/0040236 A1 | 2/2013 | Fukushima |
| 2013/0085233 A1 | 4/2013 | Niitani |
| 2013/0090480 A1 | 4/2013 | Park Choo |
| 2013/0095168 A1 | 4/2013 | Choi |
| 2013/0129869 A1 | 5/2013 | Hafezi |
| 2013/0171646 A1 | 7/2013 | Park |
| 2013/0172239 A1 | 7/2013 | Gao |
| 2013/0224859 A1 | 8/2013 | Bachelet |
| 2013/0236551 A1 | 9/2013 | Cavazza |
| 2013/0239339 A1 | 9/2013 | Bown |
| 2013/0243873 A1 | 9/2013 | Aversa |
| 2013/0261019 A1 | 10/2013 | Lin |
| 2013/0274297 A1 | 10/2013 | Gatti |
| 2013/0317096 A1 | 11/2013 | Yap |
| 2014/0018404 A1 | 1/2014 | Chen |
| 2014/0080868 A1 | 3/2014 | Ng |
| 2014/0080869 A1 | 3/2014 | Krishnan |
| 2014/0080886 A1 | 3/2014 | Pilot-Matias |
| 2014/0088152 A1 | 3/2014 | Bae |
| 2014/0128418 A1 | 5/2014 | Bae |
| 2014/0128827 A1 | 5/2014 | Song |
| 2014/0155388 A1 | 6/2014 | Brzeczko |
| 2014/0161893 A1 | 6/2014 | Shen |
| 2014/0206742 A1 | 7/2014 | Lomuscio |
| 2014/0235790 A1 | 8/2014 | Stayton |
| 2014/0248350 A1 | 9/2014 | Reyes |
| 2014/0271857 A1 | 9/2014 | Nelson |
| 2014/0303334 A1 | 10/2014 | Goto |
| 2015/0045353 A1 | 2/2015 | Comer |
| 2015/0086624 A1 | 3/2015 | Cho |
| 2015/0104408 A1 | 4/2015 | Wakefield |
| 2015/0118294 A1 | 4/2015 | Song |
| 2015/0132479 A1 | 5/2015 | Arfsten |
| 2015/0164816 A1 | 6/2015 | Jaklenec |
| 2015/0174250 A1 | 6/2015 | Griffiths |
| 2015/0191132 A1 | 7/2015 | Muramoto |
| 2015/0218125 A1 | 8/2015 | Bae |
| 2015/0232729 A1 | 8/2015 | Zhao |
| 2015/0258093 A1 | 9/2015 | Miller |
| 2015/0283254 A1 | 10/2015 | Duvall |
| 2015/0297526 A1 | 10/2015 | Puniya |
| 2015/0374634 A1 | 12/2015 | Koo |
| 2016/0045446 A1 | 2/2016 | Shibata |
| 2016/0187323 A1 | 6/2016 | Farokhzad |
| 2016/0193246 A1 | 7/2016 | Grandfils |
| 2016/0194368 A1 | 7/2016 | Hoge |
| 2016/0194625 A1 | 7/2016 | Hoge |
| 2016/0220472 A1 | 8/2016 | Wang |
| 2016/0243221 A1 | 8/2016 | Hoge |
| 2016/0243274 A1 | 8/2016 | Chisholm |
| 2016/0244501 A1 | 8/2016 | Ellsworth |
| 2016/0244502 A1 | 8/2016 | Bolen |
| 2016/0250170 A1 | 9/2016 | Hsu |
| 2016/0279251 A1 | 9/2016 | Stayton |
| 2016/0279289 A1 | 9/2016 | Chisholm |
| 2016/0313566 A1 | 10/2016 | Le |
| 2016/0317445 A1 | 11/2016 | Saly |
| 2016/0317647 A1 | 11/2016 | Ciaramella |
| 2016/0375017 A1 | 12/2016 | Asmus |
| 2016/0375143 A1 | 12/2016 | Gunatillake |
| 2016/0376333 A1 | 12/2016 | Procko |
| 2017/0002060 A1 | 1/2017 | Bolen |
| 2017/0079932 A1 | 3/2017 | Emgenbroich |
| 2017/0087174 A1 | 3/2017 | Beumont |
| 2017/0105945 A1 | 4/2017 | Emgenbroich |
| 2017/0119690 A1 | 5/2017 | Hansen |
| 2017/0128380 A1 | 5/2017 | Wang |
| 2017/0173128 A1 | 6/2017 | Hoge |
| 2017/0211023 A1 | 7/2017 | Zhang |
| 2017/0231989 A1 | 8/2017 | Hayashi |
| 2017/0240765 A1 | 8/2017 | Nabuurs |
| 2017/0247381 A1 | 8/2017 | Mao |
| 2017/0296484 A1 | 10/2017 | Kottayil |
| 2017/0304213 A1 | 10/2017 | Shi |
| 2017/0327463 A1 | 11/2017 | Fung |
| 2018/0031971 A1 | 2/2018 | Hustad |
| 2018/0031972 A1 | 2/2018 | Hustad |
| 2018/0200190 A1 | 7/2018 | Dharmadhikari |
| 2018/0221295 A1 | 8/2018 | Hansen |
| 2018/0221300 A1 | 8/2018 | Emgenbroich |
| 2018/0221402 A1 | 8/2018 | Prieve |
| 2018/0230489 A1 | 8/2018 | Kotin |
| 2018/0237800 A1 | 8/2018 | Murthy |
| 2018/0318365 A1 | 11/2018 | Yeung |
| 2018/0333683 A1 | 11/2018 | Liu |
| 2018/0346797 A1 | 12/2018 | Kalgaonkar |
| 2019/0000765 A1 | 1/2019 | Hattori |
| 2019/0054069 A1 | 2/2019 | Chen |
| 2019/0060425 A1 | 2/2019 | Scheel |
| 2019/0070143 A1 | 3/2019 | Boulas |
| 2019/0070233 A1 | 3/2019 | Yeung |
| 2019/0077923 A1 | 3/2019 | Beaume |
| 2019/0091339 A1 | 3/2019 | Miller |
| 2019/0099381 A1 | 4/2019 | Gong |
| 2019/0125663 A1 | 5/2019 | Herry |
| 2019/0153471 A1 | 5/2019 | Paul |
| 2019/0192691 A1 | 6/2019 | Barrett |
| 2019/0194376 A1 | 6/2019 | Maejima |
| 2019/0203030 A1 | 7/2019 | Cheong |
| 2019/0224339 A1 | 7/2019 | Paul |
| 2019/0231712 A1 | 8/2019 | Matsumoto |
| 2019/0247350 A1 | 8/2019 | Mizugaki |
| 2019/0254966 A1 | 8/2019 | Bellinger |
| 2019/0270991 A1 | 9/2019 | Foot |
| 2019/0274346 A1 | 9/2019 | Gore |
| 2019/0358341 A1 | 11/2019 | Adams |
| 2019/0365773 A1 | 12/2019 | Yokoyama |
| 2019/0382837 A1 | 12/2019 | Spurbeck |
| 2020/0016092 A1 | 1/2020 | Bernardo |
| 2020/0038390 A1 | 2/2020 | Park |
| 2020/0051813 A1 | 2/2020 | Osaki |
| 2020/0069696 A1 | 3/2020 | Liu |
| 2020/0078463 A1 | 3/2020 | Park |
| 2020/0086616 A1 | 3/2020 | Meise |
| 2020/0123391 A1 | 4/2020 | Habets |
| 2020/0129440 A1 | 4/2020 | Baek |
| 2020/0138072 A1 | 5/2020 | Yucel |
| 2020/0163962 A1 | 5/2020 | Jahagirdar |
| 2020/0165630 A1 | 5/2020 | Paul |
| 2020/0171169 A1 | 6/2020 | Duvall |
| 2020/0188290 A1 | 6/2020 | Herrmann |
| 2020/0197289 A1 | 6/2020 | Wang |
| 2020/0206133 A1 | 7/2020 | Alsenz |

(56) References Cited

U.S. PATENT DOCUMENTS

| | | |
|---|---|---|
| 2020/0224022 A1 | 7/2020 | Gigmes |
| 2020/0261426 A1 | 8/2020 | Park |
| 2020/0308331 A1 | 10/2020 | Kang |
| 2020/0390752 A1 | 12/2020 | Moon |
| 2021/0069111 A1 | 3/2021 | Reineke |
| 2021/0128479 A1 | 5/2021 | Cheng |
| 2021/0163933 A1 | 6/2021 | Budnik |
| 2021/0163985 A1 | 6/2021 | Sah |
| 2021/0196682 A1 | 7/2021 | Chen |
| 2021/0213002 A1 | 7/2021 | Natori |
| 2021/0330599 A1 | 10/2021 | Benoit |
| 2021/0347950 A1 | 11/2021 | Kou |
| 2021/0355454 A1 | 11/2021 | Cardinal |
| 2021/0371470 A1 | 12/2021 | Murlidharan |
| 2021/0373002 A1 | 12/2021 | Gopinath |
| 2021/0387156 A1 | 12/2021 | Oschmann |
| 2021/0387946 A1 | 12/2021 | Lindemann |
| 2022/0008346 A1 | 1/2022 | Wilson |
| 2022/0016098 A1 | 1/2022 | Cho |
| 2022/0016271 A1 | 1/2022 | Farokhzad |
| 2022/0031607 A1 | 2/2022 | Cho |
| 2022/0143062 A1 | 5/2022 | Kahvejian |
| 2022/0227778 A1 | 7/2022 | Wang |
| 2022/0233514 A1 | 7/2022 | Choi |
| 2022/0233580 A1 | 7/2022 | Takeshita |
| 2022/0243225 A1 | 8/2022 | Mathur |
| 2022/0291432 A1 | 9/2022 | O'Keeffe |
| 2022/0396789 A1 | 12/2022 | Banal |
| 2023/0059080 A1 | 2/2023 | Lee |
| 2023/0067461 A1 | 3/2023 | Lee |
| 2023/0092431 A1 | 3/2023 | Isabella |
| 2023/0218536 A1 | 7/2023 | Solomun |
| 2023/0227687 A1 | 7/2023 | Li |
| 2023/0310621 A1 | 10/2023 | Grandfils |
| 2024/0067960 A1 | 2/2024 | Gupta |
| 2024/0074981 A1 | 3/2024 | Gupta |

FOREIGN PATENT DOCUMENTS

| | | |
|---|---|---|
| CN | 1806901 A | 7/2006 |
| CN | 1813683 A | 8/2006 |
| CN | 1896112 A | 1/2007 |
| CN | 101444513 A | 6/2009 |
| CN | 101643412 A | 2/2010 |
| CN | 101735383 A | 6/2010 |
| CN | 102030871 A | 4/2011 |
| CN | 102250278 A | 11/2011 |
| CN | 102949342 A | 3/2013 |
| CN | 103113509 A | 5/2013 |
| CN | 103255174 A | 8/2013 |
| CN | 103319668 A | 9/2013 |
| CN | 103333283 A | 10/2013 |
| CN | 103536972 A | 1/2014 |
| CN | 103755870 A | 4/2014 |
| CN | 103976972 A | 8/2014 |
| CN | 104479064 A | 4/2015 |
| CN | 104772051 A | 7/2015 |
| CN | 104784155 A | 7/2015 |
| CN | 104922078 A | 9/2015 |
| CN | 104971073 A | 10/2015 |
| CN | 105504923 A | 4/2016 |
| CN | 105833272 A | 8/2016 |
| CN | 105833287 A | 8/2016 |
| CN | 105949365 A | 9/2016 |
| CN | 106117580 A | 11/2016 |
| CN | 106236785 A | 12/2016 |
| CN | 106478904 A | 3/2017 |
| CN | 106811998 A | 6/2017 |
| CN | 107173546 A | 9/2017 |
| CN | 107596368 A | 1/2018 |
| CN | 109422960 A | 3/2019 |
| CN | 115714187 A | 2/2023 |
| DE | 2446449 A1 | 4/1975 |
| EP | 0217137 A2 | 4/1987 |
| EP | 0587333 A2 | 3/1994 |
| EP | 0597577 A1 | 5/1994 |
| EP | 0945148 A1 | 9/1999 |
| EP | 1008634 A1 | 6/2000 |
| GB | 1284489 A | 8/1972 |
| GB | 1314285 A | 4/1973 |
| GB | 1324087 A | 7/1973 |
| IN | 2012 | 1/2014 |
| IN | 2014 | 5/2016 |
| IN | 201611026597 A | 3/2018 |
| IN | 201921005566 A | 8/2020 |
| JP | S5156886 A | 5/1976 |
| JP | S51100129 A | 9/1976 |
| JP | H01229014 A | 9/1989 |
| JP | 2003345095 A | 12/2003 |
| JP | 2008274217 A | 11/2008 |
| JP | 2008274218 A | 11/2008 |
| JP | 2008274219 A | 11/2008 |
| JP | 2009016258 A | 1/2009 |
| JP | 2010111781 A | 5/2010 |
| JP | 2011074250 A | 4/2011 |
| JP | 2011207963 A | 10/2011 |
| JP | 2013029832 A | 2/2013 |
| JP | 2013114184 A | 6/2013 |
| JP | 2013237821 A | 11/2013 |
| JP | 2016065115 A | 4/2016 |
| JP | 2016126154 A | 7/2016 |
| JP | 2017058405 A | 3/2017 |
| JP | 2018154752 A | 10/2018 |
| JP | 2018174919 A | 11/2018 |
| JP | 2018203987 A | 12/2018 |
| JP | 2019127444 A | 8/2019 |
| JP | 2020074704 A | 5/2020 |
| JP | 2022057447 A | 4/2022 |
| JP | 2022076360 A | 5/2022 |
| JP | 2022117407 A | 8/2022 |
| KR | 830000972 A | 4/1983 |
| KR | 20020016069 A | 3/2002 |
| KR | 20030078118 A | 10/2003 |
| KR | 20050023239 A | 3/2005 |
| KR | 20080002313 A | 1/2008 |
| KR | 20080008769 A | 1/2008 |
| KR | 100867639 B1 | 11/2008 |
| KR | 20080097787 A | 11/2008 |
| KR | 20090114190 A | 11/2009 |
| KR | 100994148 B1 | 11/2010 |
| KR | 20110043347 A | 4/2011 |
| KR | 20110117758 A | 10/2011 |
| KR | 20110119542 A | 11/2011 |
| KR | 20110135018 A | 12/2011 |
| KR | 20120047345 A | 5/2012 |
| KR | 20120134329 A | 12/2012 |
| KR | 20120134605 A | 12/2012 |
| KR | 20130010708 A | 1/2013 |
| KR | 20130013157 A | 2/2013 |
| KR | 20130027822 A | 3/2013 |
| KR | 20130030907 A | 3/2013 |
| KR | 101312286 B1 | 9/2013 |
| KR | 20140095767 A | 8/2014 |
| KR | 20140105941 A | 9/2014 |
| KR | 101458468 B1 | 11/2014 |
| KR | 20140130579 A | 11/2014 |
| KR | 20150105043 A | 9/2015 |
| KR | 20170076494 A | 7/2017 |
| KR | 101827744 B1 | 2/2018 |
| KR | 20180029147 A | 3/2018 |
| KR | 101850629 B1 | 4/2018 |
| KR | 20180099263 A | 9/2018 |
| KR | 101923028 B1 | 11/2018 |
| KR | 101943270 B1 | 1/2019 |
| KR | 20190111448 A | 10/2019 |
| KR | 102107332 B1 | 5/2020 |
| KR | 102157964 B1 | 9/2020 |
| KR | 20200123022 A | 10/2020 |
| KR | 102207353 B1 | 1/2021 |
| KR | 102207354 B1 | 1/2021 |
| KR | 102212503 B1 | 2/2021 |
| KR | 102212504 B1 | 2/2021 |
| KR | 102212505 B1 | 2/2021 |
| KR | 20210122720 A | 10/2021 |

(56) References Cited

FOREIGN PATENT DOCUMENTS

| | | |
|---|---|---|
| PL | 440443 A1 | 8/2023 |
| RU | 2582704 C1 | 4/2016 |
| TW | 201404805 A | 2/2014 |
| WO | 1991013145 A1 | 9/1991 |
| WO | 1998051749 A1 | 11/1998 |
| WO | 2003090780 A1 | 11/2003 |
| WO | 2004090004 A1 | 10/2004 |
| WO | 2004096422 A1 | 11/2004 |
| WO | 2007060462 A1 | 5/2007 |
| WO | 2007078765 A2 | 7/2007 |
| WO | 2008005543 A2 | 1/2008 |
| WO | 2007078765 A3 | 4/2008 |
| WO | 2008050987 A1 | 5/2008 |
| WO | 2009038340 A1 | 3/2009 |
| WO | 2009088220 A2 | 7/2009 |
| WO | 2009103735 A1 | 8/2009 |
| WO | 2009125987 A2 | 10/2009 |
| WO | 2009127922 A2 | 10/2009 |
| WO | 2009134053 A2 | 11/2009 |
| WO | 2009134076 A2 | 11/2009 |
| WO | 2009141159 A1 | 11/2009 |
| WO | 2009142421 A1 | 11/2009 |
| WO | 2009151295 A2 | 12/2009 |
| WO | 2010008203 A2 | 1/2010 |
| WO | 2010008244 A2 | 1/2010 |
| WO | 2011025167 A2 | 3/2011 |
| WO | 2011025267 A2 | 3/2011 |
| WO | 2011025269 A2 | 3/2011 |
| WO | 2011025270 A2 | 3/2011 |
| WO | 2011025271 A2 | 3/2011 |
| WO | 2011110841 | 9/2011 |
| WO | 2011154331 A1 | 12/2011 |
| WO | 2012101235 A1 | 8/2012 |
| WO | 2012108631 A2 | 8/2012 |
| WO | 2012119997 A1 | 9/2012 |
| WO | 2012138013 A1 | 10/2012 |
| WO | 2012140415 A1 | 10/2012 |
| WO | 2012156058 A1 | 11/2012 |
| WO | 2012156059 A1 | 11/2012 |
| WO | 2012158610 A1 | 11/2012 |
| WO | 2013003887 A1 | 1/2013 |
| WO | 2013135853 A1 | 9/2013 |
| WO | 2014109308 A1 | 7/2014 |
| WO | 2015089419 A2 | 6/2015 |
| WO | 2015134787 A2 | 9/2015 |
| WO | 2016025747 A1 | 2/2016 |
| WO | 2016164762 A1 | 10/2016 |
| WO | 2016195153 A1 | 12/2016 |
| WO | 2017176040 A1 | 10/2017 |
| WO | 2017184768 A1 | 10/2017 |
| WO | 2017210666 A2 | 12/2017 |
| WO | 2018112555 A1 | 6/2018 |
| WO | 2018190355 A1 | 10/2018 |
| WO | 2019027767 A1 | 2/2019 |
| WO | 2019088662 A1 | 5/2019 |
| WO | 2019126627 A1 | 6/2019 |
| WO | 2019152957 A1 | 8/2019 |
| WO | 2019199133 A1 | 10/2019 |
| WO | 2019220088 A1 | 11/2019 |
| WO | 2020017808 A1 | 1/2020 |
| WO | 2020051507 A1 | 3/2020 |
| WO | 2020080875 A1 | 4/2020 |
| WO | 2020106916 A1 | 5/2020 |
| WO | 2020247382 A1 | 12/2020 |
| WO | 2021007382 A1 | 1/2021 |
| WO | 2021076977 A1 | 4/2021 |
| WO | 2021091188 A1 | 5/2021 |
| WO | 2021125797 A1 | 6/2021 |
| WO | 2021194253 A1 | 9/2021 |
| WO | 2021255262 A1 | 12/2021 |
| WO | 2022091971 A1 | 5/2022 |
| WO | 2022129097 A2 | 6/2022 |
| WO | 2022139687 A1 | 6/2022 |
| WO | WO-2022192591 A1 * | 9/2022 ......... B01J 19/0046 |
| WO | 2022245307 A1 | 11/2022 |
| WO | 2022266119 A1 | 12/2022 |
| WO | 2023023055 A1 | 2/2023 |
| WO | 2023107574 A2 | 6/2023 |
| WO | 2023193244 A1 | 10/2023 |
| WO | 2024036356 A1 | 2/2024 |

OTHER PUBLICATIONS

Cheng C, Convertine AJ, Stayton PS, Bryers JD. Multifunctional triblock copolymers for intracellular messenger RNA delivery. Biomaterials. Oct. 2012;33(28):6868-76. doi: 10.1016/j.biomaterials. 2012.06.020 Epub Jul. 9, 2012. PMID: 22784603; Pmcid: PMC3412061.

Conesa, Ana et al., "A survey of best practices for RNA-seq data analysis." Genome Biology, Jan. 26, 2016, vol. 17, No. 13; doi:10. 1186/s13059-016-0881-8.

Convertine et al. "Development of a novel endosomolytic diblock copolymer for siRNA delivery." Journal of controlled release : official journal of the Controlled Release Society vol. 133,3 (2009): 221-9. DOI: 10.1016/j.jconrel.2008.10.004.

Convertine et al. "pH-responsive polymeric micelle carriers for siRNA drugs." Biomacromolecules vol. 11,11 (2010): 2904-11. doi: 0.1021/bm100652w.

Counsell et al. 2017. Lentiviral vectors can be used for full-length dystrophin gene therapy. Scientific Reports 7[79]: epub (Year: 2017).

Cristillo, DNA with Talabostat, Biochem. Biophy. Res. Com. pp. 22-26 (Year: 2008).

Dahlman JE, Kauffman KJ, Xing Y, Shaw TE, Mir FF, Dlott CC, Langer R, Anderson DG, Wang ET. Barcoded nanoparticles for high throughput in vivo discovery of targeted therapeutics. Proc Natl Acad Sci U S A. Feb. 21, 2017;114(8):2060-2065. doi: 10.1073/ pnas. 1620874114. Epub Feb. 6, 2017. PMID: 28167778; PMCID: PMC5338412.

Dalal et al., "Polymer design via SHAP and Bayesian machine learning optimizes pDNA and CRISPR ribonucleoprotein delivery," Chem. Sci., 2024, 15, pp. 7219-7228.

European Search Report for EP Application No. 21901543.5 dated Nov. 27, 2024, 17 pages.

GenBank ON170268, Ralsonia phage Y0160_4, 2022, 1-9. Obtained online at: https// www.genome.jpdbget-binwww_bgetgenbank-phgON170268 on Nov. 11, 2024. (Year: 2022).

Geneimprint; *Homo sapiens* KCNK9; 2007, 1-20. Obtained online at: tpswww.geneimprint.comsitegenesHomo_sapiens_KCNK9on Nov. 11, 2024. (Year: 2007).

Grimme et al. "Polycation Architecture Affects Complexation and Delivery of Short Antisense Oligonucleotides: Micelleplexes Outperform Polyplexes." Biomacromolecules 2022, 23, 8, 3257-3271, loi:10.1021/acs.biomac.2c00338.

Haridharan et al. "Exploration of Novel Pyrene Labeled Amphiphilic Block Copolymers: Synthesis via ATRP, Characterization and Properties." Journal of Macromolecular Science, Part A, vol. 47, No. 9, Jul. 2010, pp. 918-926, doi: :10.1080/10601325.2010. 501681.

Institute Pasture, Allele Information, Leptospira locus/sequence definitions—LIC_RS02325: 95, 2017, 1-2. Obtained online at: https:/ /www.psbigsdb.pasteur.frcgibinbigsdbbigsdb.pldb=pubmlst_ leptospira_seqdef&page=alleleInfo&locus=LIC_RS02325&allele_ id=95 on Nov. 11, 2024. (Year: 2017).

International Search Report and Written Opinion for PCT/US2023/ 024960, dated Aug. 31, 2023.

International Search Report and Written Opinion for PCT/US2024/ 049148, mailed Jan. 28, 2025.

International Search Report and Written Opinion issued in App. No. PCT/US2024/048964 mailed Jan. 7, 2025, 13 pages.

International Search Report and Written Opinion issued in App. No. PCT/US2024/049026, dated Janury 2, 2025, 13 pages.

Ishihara et al.. Ishihara et al. (Polymers, 2020, 12:1762) (Year: 2020).

Kanth et al. "Recent advances in development of poly (dimethylaminoethyl methacrylate) antimicrobial polymers, European Polymer Journal." vol. 163, 2022, doi: 0.1016/j.eurpolymj. 2021.110930.

(56) References Cited

OTHER PUBLICATIONS

Lauber et al. "pH- and Thermoresponsive Self-Assembly of Cationic Triblock Copolymers with Controlled Dynamics." Macromolecules 2017, 50, 1, 416-423. doi: 10.1021/acs.macromol.6b02201.

Lucas, Christopher R et al. "DNA Origami Nanostructures Elicit Dose-Dependent Immunogenicity and Are Nontoxic up to High Doses In Vivo." Small (Weinheim an der Bergstrasse, Germany) vol. 18,26 (2022): e2108063. doi: 10.1002/smll.202108063.

Manganiello et al. "Diblock copolymers with tunable pH transitions for gene delivery." Biomaterials vol. 33,7 (2012): 2301-9. doi:10.1016/j.biomaterials.2011.11.019.

Muehlebach et al. "Synthesis of Well-Defined Macromonomers and Comb Copolymers from Polymers Made by Atom Transfer Radical Polymerization." J Polym Sci Part A: Polym Chem. vol. 41,21 (2003): 3425-3439, doi:10.1002/pola.10940.

Okondo et al., DPP8/9 inhibition induces pro-caspase-1-dependent monocyte and mae: rophage pyroptosis, Nature Chemical Biology, vol. 13, No. 1, pp. 46-53, Jan. 2017.

Okondo et al., Inhibition of Dpp8/9 Activates the Nlrp1 b Inflammasome, Cell Chemical Biology, vol. 25, pp. 262-267, Mar. 15, 2018.

PCT Search Report and Written Opinion for PCT/US2023/024961, mailed Oct. 6, 2023, 14 pages.

PCT Search Report for PCT/US2021/061846, mailed Mar. 30, 2022.

PCT Written Opinion for PCT/US2022/023902, mailed Sep. 9, 2022.

Pegg et al. "Solubilisation of oils in aqueous solutions of a random cationic copolymer." Journal of colloid and interface science vol. 502 (2017): 210-218. doi: 10.1016/j.jcis.2017.04.093.

Ponnuswamy, Oligolysine coating, Nature Comm. p. 1 May (Year: 2017).

Samanta et al., "Nanoparticles and DNA—a powerful and growing functional combination in bionanotechnology", Nanoscale, (20160000), vol. 8, No. 17, doi:10.1039/C5NR08465B, pp. 9037-9095, XP055448237.

Shimatani et al. 2019. Chapter 22 Targeted Base Editing with CRISPR-Deaminase in Tomato. pp. 297-307 in Qi, Y. [eds] Plant Genome Editing with CRISPR Systems. Methods in Molecular Biology, vol. 1917. Humana Press, New York, NY. (Year: 2019).

Sprouse et al. "Tuning Cationic Block Copolymer Micelle Size by pH and Ionic Strength." Biomacromolecules 2016, 17, 9, 2849-2859. DOI:10.1021/acs.biomac.6b00654.

Tapio et al. "The potential of DNA origami to build multifunctional materials." Multifunctional Materials, vol. 3, No. 3, DOI: 0.1088/2399-7532/ab80d5.

The Protein Man, Modifying Oligonucleolide 5'-Phosphates by EDC for Improved Coupling, The Protein Man's Blog—a Discussion of Protein Research, G-Biosciences, Aug. 29, 2017.

Walter et al., Characterization of a Bean (*Phaseolus vulgaris* L.) Malic-Enzyme Gene, European Journal of Biochemistry, 1994, 999-1009. (Year: 1994).

Williams et al., "Glycosylated Reversible Addition-Fragmentation Chain Transfer Polymers with Varying Polyethylene Glycol Linkers Produce Different Short Interfering RNA Uptake, Gene Silencing, and Toxicity Profiles", Biomacromolecules, vol. 18, No. 12, Dec. 11, 2017 (Dec. 11, 2017), pp. 4099-4112, XP055881054, ISSN: 1525-7797, DOI: 10.1021/acs.biomac.7b01168.

Wu Yaoying et al., "Glucose-Containing Diblock Polycations Exhibit Molecular Weight, Charge, and Cell-Type Dependence for pDNA Delivery", Biomacromolecules, vol. 15, No. 5, May 12, 2014 (May 12, 2014), pp. 1716-1726, XP093238175, ISSN: 1525-7797, DOI: 10.1021/bm5001229.

Yamada, Yoji, Nucleic Acid Drugs-Current Status, Issues and Expectations, Cancers, 2021, 13(19), 5002, 1-19. (Year: 2021).

Zhang, Huan et al. "DNA nanostructures coordinate gene silencing in mature plants." Proceedings of the National Academy of Sciences of the United States of America vol. 116, 1 15 (2019): 7543-7548. doi: 10.1073/pnas.1818290116.

\* cited by examiner

Absence of stabilizing modifications

Presence of stabilizing modifications

```
                        SEQUENCE LISTING

Sequence total quantity: 1003
SEQ ID NO: 1            moltype = DNA  length = 10
FEATURE                 Location/Qualifiers
source                  1..10
                        mol_type = other DNA
                        organism = synthetic construct
SEQUENCE: 1
gctacataat                                                                10

SEQ ID NO: 2            moltype = DNA  length = 10
FEATURE                 Location/Qualifiers
source                  1..10
                        mol_type = other DNA
                        organism = synthetic construct
SEQUENCE: 2
atgttacaca                                                                10

SEQ ID NO: 3            moltype = DNA  length = 10
FEATURE                 Location/Qualifiers
source                  1..10
                        mol_type = other DNA
                        organism = synthetic construct
SEQUENCE: 3
tggggcccaa                                                                10

SEQ ID NO: 4            moltype = DNA  length = 10
FEATURE                 Location/Qualifiers
source                  1..10
                        mol_type = other DNA
                        organism = synthetic construct
SEQUENCE: 4
tagtttatcc                                                                10

SEQ ID NO: 5            moltype = DNA  length = 10
FEATURE                 Location/Qualifiers
source                  1..10
                        mol_type = other DNA
                        organism = synthetic construct
SEQUENCE: 5
accccgtctt                                                                10

SEQ ID NO: 6            moltype = DNA  length = 10
FEATURE                 Location/Qualifiers
source                  1..10
                        mol_type = other DNA
                        organism = synthetic construct
SEQUENCE: 6
ccggccatca                                                                10

SEQ ID NO: 7            moltype = DNA  length = 10
FEATURE                 Location/Qualifiers
source                  1..10
                        mol_type = other DNA
                        organism = synthetic construct
SEQUENCE: 7
gagcttgctc                                                                10

SEQ ID NO: 8            moltype = DNA  length = 10
FEATURE                 Location/Qualifiers
source                  1..10
                        mol_type = other DNA
                        organism = synthetic construct
SEQUENCE: 8
acgttctata                                                                10
```

-continued

| | | |
|---|---|---|
| SEQ ID NO: 9<br>FEATURE<br>source | moltype = DNA   length = 10<br>Location/Qualifiers<br>1..10<br>mol_type = other DNA<br>organism = synthetic construct | |
| SEQUENCE: 9<br>tacagcaaaa | | 10 |
| SEQ ID NO: 10<br>FEATURE<br>source | moltype = DNA   length = 10<br>Location/Qualifiers<br>1..10<br>mol_type = other DNA<br>organism = synthetic construct | |
| SEQUENCE: 10<br>gttaggtggt | | 10 |
| SEQ ID NO: 11<br>FEATURE<br>source | moltype = DNA   length = 10<br>Location/Qualifiers<br>1..10<br>mol_type = other DNA<br>organism = synthetic construct | |
| SEQUENCE: 11<br>ggagaccgac | | 10 |
| SEQ ID NO: 12<br>FEATURE<br>source | moltype = DNA   length = 10<br>Location/Qualifiers<br>1..10<br>mol_type = other DNA<br>organism = synthetic construct | |
| SEQUENCE: 12<br>tggcccttg | | 10 |
| SEQ ID NO: 13<br>FEATURE<br>source | moltype = DNA   length = 10<br>Location/Qualifiers<br>1..10<br>mol_type = other DNA<br>organism = synthetic construct | |
| SEQUENCE: 13<br>tggccgtaag | | 10 |
| SEQ ID NO: 14<br>FEATURE<br>source | moltype = DNA   length = 10<br>Location/Qualifiers<br>1..10<br>mol_type = other DNA<br>organism = synthetic construct | |
| SEQUENCE: 14<br>cgttcgtcaa | | 10 |
| SEQ ID NO: 15<br>FEATURE<br>source | moltype = DNA   length = 10<br>Location/Qualifiers<br>1..10<br>mol_type = other DNA<br>organism = synthetic construct | |
| SEQUENCE: 15<br>cggacgtgga | | 10 |
| SEQ ID NO: 16<br>FEATURE<br>source | moltype = DNA   length = 10<br>Location/Qualifiers<br>1..10<br>mol_type = other DNA<br>organism = synthetic construct | |
| SEQUENCE: 16<br>agaggggca | | 10 |
| SEQ ID NO: 17<br>FEATURE<br>source | moltype = DNA   length = 10<br>Location/Qualifiers<br>1..10<br>mol_type = other DNA<br>organism = synthetic construct | |
| SEQUENCE: 17<br>gttcaggtcg | | 10 |
| SEQ ID NO: 18<br>FEATURE<br>source | moltype = DNA   length = 10<br>Location/Qualifiers<br>1..10<br>mol_type = other DNA<br>organism = synthetic construct | |
| SEQUENCE: 18<br>ctcgcaagag | | 10 |

```
SEQ ID NO: 19            moltype = DNA   length = 10
FEATURE                  Location/Qualifiers
source                   1..10
                         mol_type = other DNA
                         organism = synthetic construct
SEQUENCE: 19
gcaacgactt                                                                10

SEQ ID NO: 20            moltype = DNA   length = 10
FEATURE                  Location/Qualifiers
source                   1..10
                         mol_type = other DNA
                         organism = synthetic construct
SEQUENCE: 20
gccatccatc                                                                10

SEQ ID NO: 21            moltype = DNA   length = 10
FEATURE                  Location/Qualifiers
source                   1..10
                         mol_type = other DNA
                         organism = synthetic construct
SEQUENCE: 21
ttccgagcag                                                                10

SEQ ID NO: 22            moltype = DNA   length = 10
FEATURE                  Location/Qualifiers
source                   1..10
                         mol_type = other DNA
                         organism = synthetic construct
SEQUENCE: 22
cttctggaca                                                                10

SEQ ID NO: 23            moltype = DNA   length = 10
FEATURE                  Location/Qualifiers
source                   1..10
                         mol_type = other DNA
                         organism = synthetic construct
SEQUENCE: 23
aacattagac                                                                10

SEQ ID NO: 24            moltype = DNA   length = 10
FEATURE                  Location/Qualifiers
source                   1..10
                         mol_type = other DNA
                         organism = synthetic construct
SEQUENCE: 24
aagcaatagt                                                                10

SEQ ID NO: 25            moltype = DNA   length = 10
FEATURE                  Location/Qualifiers
source                   1..10
                         mol_type = other DNA
                         organism = synthetic construct
SEQUENCE: 25
agggtaagac                                                                10

SEQ ID NO: 26            moltype = DNA   length = 10
FEATURE                  Location/Qualifiers
source                   1..10
                         mol_type = other DNA
                         organism = synthetic construct
SEQUENCE: 26
cgttgtcttg                                                                10

SEQ ID NO: 27            moltype = DNA   length = 10
FEATURE                  Location/Qualifiers
source                   1..10
                         mol_type = other DNA
                         organism = synthetic construct
SEQUENCE: 27
tttccccgcc                                                                10

SEQ ID NO: 28            moltype = DNA   length = 10
FEATURE                  Location/Qualifiers
source                   1..10
                         mol_type = other DNA
                         organism = synthetic construct
SEQUENCE: 28
```

```
cgaatggatc                                                                      10

SEQ ID NO: 29           moltype = DNA   length = 10
FEATURE                 Location/Qualifiers
source                  1..10
                        mol_type = other DNA
                        organism = synthetic construct SEQUENCE: 29
catcacttgc                                                                      10

SEQ ID NO: 30           moltype = DNA   length = 10
FEATURE                 Location/Qualifiers
source                  1..10
                        mol_type = other DNA
                        organism = synthetic construct SEQUENCE: 30
ctctcgcact                                                                      10

SEQ ID NO: 31           moltype = DNA   length = 10
FEATURE                 Location/Qualifiers
source                  1..10
                        mol_type = other DNA
                        organism = synthetic construct SEQUENCE: 31
gttcacgtgc                                                                      10

SEQ ID NO: 32           moltype = DNA   length = 10
FEATURE                 Location/Qualifiers
source                  1..10
                        mol_type = other DNA
                        organism = synthetic construct SEQUENCE: 32
aataagcctg                                                                      10

SEQ ID NO: 33           moltype = DNA   length = 10
FEATURE                 Location/Qualifiers
source                  1..10
                        mol_type = other DNA
                        organism = synthetic construct SEQUENCE: 33
gttaacaatt                                                                      10

SEQ ID NO: 34           moltype = DNA   length = 10
FEATURE                 Location/Qualifiers
source                  1..10
                        mol_type = other DNA
                        organism = synthetic construct SEQUENCE: 34
attcagatcc                                                                      10

SEQ ID NO: 35           moltype = DNA   length = 10
FEATURE                 Location/Qualifiers
source                  1..10
                        mol_type = other DNA
                        organism = synthetic construct SEQUENCE: 35
cctgctgatt                                                                      10

SEQ ID NO: 36           moltype = DNA   length = 10
FEATURE                 Location/Qualifiers
source                  1..10
                        mol_type = other DNA
                        organism = synthetic construct SEQUENCE: 36
cttggtcata                                                                      10

SEQ ID NO: 37           moltype = DNA   length = 10
FEATURE                 Location/Qualifiers
source                  1..10
                        mol_type = other DNA
                        organism = synthetic construct SEQUENCE: 37
tcttcctgtt                                                                      10

SEQ ID NO: 38           moltype = DNA   length = 10
FEATURE                 Location/Qualifiers
source                  1..10
                        mol_type = other DNA
                        organism = synthetic construct
```

| | | |
|---|---|---|
| SEQUENCE: 38<br>actgccatgg | | 10 |
| SEQ ID NO: 39<br>FEATURE<br>source | moltype = DNA  length = 10<br>Location/Qualifiers<br>1..10<br>mol_type = other DNA<br>organism = synthetic construct | |
| SEQUENCE: 39<br>catgtatagt | | 10 |
| SEQ ID NO: 40<br>FEATURE<br>source | moltype = DNA  length = 10<br>Location/Qualifiers<br>1..10<br>mol_type = other DNA<br>organism = synthetic construct | |
| SEQUENCE: 40<br>ggtagcggca | | 10 |
| SEQ ID NO: 41<br>FEATURE<br>source | moltype = DNA  length = 10<br>Location/Qualifiers<br>1..10<br>mol_type = other DNA<br>organism = synthetic construct | |
| SEQUENCE: 41<br>tcactctaac | | 10 |
| SEQ ID NO: 42<br>FEATURE<br>source | moltype = DNA  length = 10<br>Location/Qualifiers<br>1..10<br>mol_type = other DNA<br>organism = synthetic construct | |
| SEQUENCE: 42<br>aaggtgcacc | | 10 |
| SEQ ID NO: 43<br>FEATURE<br>source | moltype = DNA  length = 10<br>Location/Qualifiers<br>1..10<br>mol_type = other DNA<br>organism = synthetic construct | |
| SEQUENCE: 43<br>aatgctcgtt | | 10 |
| SEQ ID NO: 44<br>FEATURE<br>source | moltype = DNA  length = 10<br>Location/Qualifiers<br>1..10<br>mol_type = other DNA<br>organism = synthetic construct | |
| SEQUENCE: 44<br>tgtctagaaa | | 10 |
| SEQ ID NO: 45<br>FEATURE<br>source | moltype = DNA  length = 10<br>Location/Qualifiers<br>1..10<br>mol_type = other DNA<br>organism = synthetic construct | |
| SEQUENCE: 45<br>ctgcctgcct | | 10 |
| SEQ ID NO: 46<br>FEATURE<br>source | moltype = DNA  length = 10<br>Location/Qualifiers<br>1..10<br>mol_type = other DNA<br>organism = synthetic construct | |
| SEQUENCE: 46<br>actataaaag | | 10 |
| SEQ ID NO: 47<br>FEATURE<br>source | moltype = DNA  length = 10<br>Location/Qualifiers<br>1..10<br>mol_type = other DNA<br>organism = synthetic construct | |
| SEQUENCE: 47<br>tagtatcgag | | 10 |
| SEQ ID NO: 48<br>FEATURE<br>source | moltype = DNA  length = 10<br>Location/Qualifiers<br>1..10<br>mol_type = other DNA | |

```
                                        -continued

SEQUENCE: 48
atcgcagtcc                                                              10

SEQ ID NO: 49           moltype = DNA  length = 10
FEATURE                 Location/Qualifiers
source                  1..10
                        mol_type = other DNA
                        organism = synthetic construct
SEQUENCE: 49
tcatcagaac                                                              10

SEQ ID NO: 50           moltype = DNA  length = 10
FEATURE                 Location/Qualifiers
source                  1..10
                        mol_type = other DNA
                        organism = synthetic construct
SEQUENCE: 50
tcctagacgc                                                              10

SEQ ID NO: 51           moltype = DNA  length = 10
FEATURE                 Location/Qualifiers
source                  1..10
                        mol_type = other DNA
                        organism = synthetic construct
SEQUENCE: 51
gccgggcggg                                                              10

SEQ ID NO: 52           moltype = DNA  length = 10
FEATURE                 Location/Qualifiers
source                  1..10
                        mol_type = other DNA
                        organism = synthetic construct
SEQUENCE: 52
gcccagaaga                                                              10

SEQ ID NO: 53           moltype = DNA  length = 10
FEATURE                 Location/Qualifiers
source                  1..10
                        mol_type = other DNA
                        organism = synthetic construct
SEQUENCE: 53
cttagagctg                                                              10

SEQ ID NO: 54           moltype = DNA  length = 10
FEATURE                 Location/Qualifiers
source                  1..10
                        mol_type = other DNA
                        organism = synthetic construct
SEQUENCE: 54
gtctgcgctt                                                              10

SEQ ID NO: 55           moltype = DNA  length = 10
FEATURE                 Location/Qualifiers
source                  1..10
                        mol_type = other DNA
                        organism = synthetic construct
SEQUENCE: 55
cgccgtcctt                                                              10

SEQ ID NO: 56           moltype = DNA  length = 10
FEATURE                 Location/Qualifiers
source                  1..10
                        mol_type = other DNA
                        organism = synthetic construct
SEQUENCE: 56
tttatctgct                                                              10

SEQ ID NO: 57           moltype = DNA  length = 10
FEATURE                 Location/Qualifiers
source                  1..10
                        mol_type = other DNA
                        organism = synthetic construct
SEQUENCE: 57
tgcttcggag                                                              10

SEQ ID NO: 58           moltype = DNA  length = 10
FEATURE                 Location/Qualifiers
source                  1..10
```

```
                        mol_type = other DNA
                        organism = synthetic construct
SEQUENCE: 58
ggggagaatg                                                                      10

SEQ ID NO: 59           moltype = DNA   length = 10
FEATURE                 Location/Qualifiers
source                  1..10
                        mol_type = other DNA
                        organism = synthetic construct
SEQUENCE: 59
gtggtaagtg                                                                      10

SEQ ID NO: 60           moltype = DNA   length = 10
FEATURE                 Location/Qualifiers
source                  1..10
                        mol_type = other DNA
                        organism = synthetic construct
SEQUENCE: 60
gaaattagta                                                                      10

SEQ ID NO: 61           moltype = DNA   length = 10
FEATURE                 Location/Qualifiers
source                  1..10
                        mol_type = other DNA
                        organism = synthetic construct
SEQUENCE: 61
gctatcctaa                                                                      10

SEQ ID NO: 62           moltype = DNA   length = 10
FEATURE                 Location/Qualifiers
source                  1..10
                        mol_type = other DNA
                        organism = synthetic construct
SEQUENCE: 62
atctgtacga                                                                      10

SEQ ID NO: 63           moltype = DNA   length = 10
FEATURE                 Location/Qualifiers
source                  1..10
                        mol_type = other DNA
                        organism = synthetic construct
SEQUENCE: 63
agttcggggc                                                                      10

SEQ ID NO: 64           moltype = DNA   length = 10
FEATURE                 Location/Qualifiers
source                  1..10
                        mol_type = other DNA
                        organism = synthetic construct
SEQUENCE: 64
cgagtctgtc                                                                      10

SEQ ID NO: 65           moltype = DNA   length = 10
FEATURE                 Location/Qualifiers
source                  1..10
                        mol_type = other DNA
                        organism = synthetic construct
SEQUENCE: 65
atcctacgca                                                                      10

SEQ ID NO: 66           moltype = DNA   length = 10
FEATURE                 Location/Qualifiers
source                  1..10
                        mol_type = other DNA
                        organism = synthetic construct
SEQUENCE: 66
atggtggata                                                                      10

SEQ ID NO: 67           moltype = DNA   length = 10
FEATURE                 Location/Qualifiers
source                  1..10
                        mol_type = other DNA
                        organism = synthetic construct
SEQUENCE: 67
cctctaacta                                                                      10

SEQ ID NO: 68           moltype = DNA   length = 10
FEATURE                 Location/Qualifiers
```

| | | |
|---|---|---|
| source | 1..10<br>mol_type = other DNA<br>organism = synthetic construct | |
| SEQUENCE: 68<br>atagctgcac | | 10 |
| SEQ ID NO: 69<br>FEATURE<br>source | moltype = DNA  length = 10<br>Location/Qualifiers<br>1..10<br>mol_type = other DNA<br>organism = synthetic construct | |
| SEQUENCE: 69<br>gacagaattt | | 10 |
| SEQ ID NO: 70<br>FEATURE<br>source | moltype = DNA  length = 10<br>Location/Qualifiers<br>1..10<br>mol_type = other DNA<br>organism = synthetic construct | |
| SEQUENCE: 70<br>caattggcat | | 10 |
| SEQ ID NO: 71<br>FEATURE<br>source | moltype = DNA  length = 10<br>Location/Qualifiers<br>1..10<br>mol_type = other DNA<br>organism = synthetic construct | |
| SEQUENCE: 71<br>tctagtagac | | 10 |
| SEQ ID NO: 72<br>FEATURE<br>source | moltype = DNA  length = 10<br>Location/Qualifiers<br>1..10<br>mol_type = other DNA<br>organism = synthetic construct | |
| SEQUENCE: 72<br>ttattcatgg | | 10 |
| SEQ ID NO: 73<br>FEATURE<br>source | moltype = DNA  length = 10<br>Location/Qualifiers<br>1..10<br>mol_type = other DNA<br>organism = synthetic construct | |
| SEQUENCE: 73<br>ttggcaaccg | | 10 |
| SEQ ID NO: 74<br>FEATURE<br>source | moltype = DNA  length = 10<br>Location/Qualifiers<br>1..10<br>mol_type = other DNA<br>organism = synthetic construct | |
| SEQUENCE: 74<br>cataatacat | | 10 |
| SEQ ID NO: 75<br>FEATURE<br>source | moltype = DNA  length = 10<br>Location/Qualifiers<br>1..10<br>mol_type = other DNA<br>organism = synthetic construct | |
| SEQUENCE: 75<br>acagactcac | | 10 |
| SEQ ID NO: 76<br>FEATURE<br>source | moltype = DNA  length = 10<br>Location/Qualifiers<br>1..10<br>mol_type = other DNA<br>organism = synthetic construct | |
| SEQUENCE: 76<br>gcgatgctgc | | 10 |
| SEQ ID NO: 77<br>FEATURE<br>source | moltype = DNA  length = 10<br>Location/Qualifiers<br>1..10<br>mol_type = other DNA<br>organism = synthetic construct | |
| SEQUENCE: 77<br>catctttgcc | | 10 |
| SEQ ID NO: 78 | moltype = DNA  length = 10 | |

| | | |
|---|---|---|
| FEATURE | Location/Qualifiers | |
| source | 1..10 | |
| | mol_type = other DNA | |
| | organism = synthetic construct | |
| SEQUENCE: 78 | | |
| gtgactccag | | 10 |
| | | |
| SEQ ID NO: 79 | moltype = DNA length = 10 | |
| FEATURE | Location/Qualifiers | |
| source | 1..10 | |
| | mol_type = other DNA | |
| | organism = synthetic construct | |
| SEQUENCE: 79 | | |
| ggacgagtct | | 10 |
| | | |
| SEQ ID NO: 80 | moltype = DNA length = 10 | |
| FEATURE | Location/Qualifiers | |
| source | 1..10 | |
| | mol_type = other DNA | |
| | organism = synthetic construct | |
| SEQUENCE: 80 | | |
| tagtggcgtg | | 10 |
| | | |
| SEQ ID NO: 81 | moltype = DNA length = 10 | |
| FEATURE | Location/Qualifiers | |
| source | 1..10 | |
| | mol_type = other DNA | |
| | organism = synthetic construct | |
| SEQUENCE: 81 | | |
| aacgcagctt | | 10 |
| | | |
| SEQ ID NO: 82 | moltype = DNA length = 10 | |
| FEATURE | Location/Qualifiers | |
| source | 1..10 | |
| | mol_type = other DNA | |
| | organism = synthetic construct | |
| SEQUENCE: 82 | | |
| agaacaggtg | | 10 |
| | | |
| SEQ ID NO: 83 | moltype = DNA length = 10 | |
| FEATURE | Location/Qualifiers | |
| source | 1..10 | |
| | mol_type = other DNA | |
| | organism = synthetic construct | |
| SEQUENCE: 83 | | |
| aggctatgtt | | 10 |
| | | |
| SEQ ID NO: 84 | moltype = DNA length = 10 | |
| FEATURE | Location/Qualifiers | |
| source | 1..10 | |
| | mol_type = other DNA | |
| | organism = synthetic construct | |
| SEQUENCE: 84 | | |
| cctggatctt | | 10 |
| | | |
| SEQ ID NO: 85 | moltype = DNA length = 10 | |
| FEATURE | Location/Qualifiers | |
| source | 1..10 | |
| | mol_type = other DNA | |
| | organism = synthetic construct | |
| SEQUENCE: 85 | | |
| ctagccggcc | | 10 |
| | | |
| SEQ ID NO: 86 | moltype = DNA length = 10 | |
| FEATURE | Location/Qualifiers | |
| source | 1..10 | |
| | mol_type = other DNA | |
| | organism = synthetic construct | |
| SEQUENCE: 86 | | |
| accagttatc | | 10 |
| | | |
| SEQ ID NO: 87 | moltype = DNA length = 10 | |
| FEATURE | Location/Qualifiers | |
| source | 1..10 | |
| | mol_type = other DNA | |
| | organism = synthetic construct | |
| SEQUENCE: 87 | | |
| acgttatagc | | 10 |

```
SEQ ID NO: 88           moltype = DNA   length = 10
FEATURE                 Location/Qualifiers
source                  1..10
                        mol_type = other DNA
                        organism = synthetic construct
SEQUENCE: 88
tcgagtttga                                                                 10

SEQ ID NO: 89           moltype = DNA   length = 10
FEATURE                 Location/Qualifiers
source                  1..10
                        mol_type = other DNA
                        organism = synthetic construct
SEQUENCE: 89
tgaagcgagc                                                                 10

SEQ ID NO: 90           moltype = DNA   length = 10
FEATURE                 Location/Qualifiers
source                  1..10
                        mol_type = other DNA
                        organism = synthetic construct
SEQUENCE: 90
gactggcgaa                                                                 10

SEQ ID NO: 91           moltype = DNA   length = 10
FEATURE                 Location/Qualifiers
source                  1..10
                        mol_type = other DNA
                        organism = synthetic construct
SEQUENCE: 91
gatggaccta                                                                 10

SEQ ID NO: 92           moltype = DNA   length = 10
FEATURE                 Location/Qualifiers
source                  1..10
                        mol_type = other DNA
                        organism = synthetic construct
SEQUENCE: 92
gtccacaacg                                                                 10

SEQ ID NO: 93           moltype = DNA   length = 10
FEATURE                 Location/Qualifiers
source                  1..10
                        mol_type = other DNA
                        organism = synthetic construct
SEQUENCE: 93
cctccccaga                                                                 10

SEQ ID NO: 94           moltype = DNA   length = 10
FEATURE                 Location/Qualifiers
source                  1..10
                        mol_type = other DNA
                        organism = synthetic construct
SEQUENCE: 94
ttatgacgcc                                                                 10

SEQ ID NO: 95           moltype = DNA   length = 10
FEATURE                 Location/Qualifiers
source                  1..10
                        mol_type = other DNA
                        organism = synthetic construct
SEQUENCE: 95
cttgatccgt                                                                 10

SEQ ID NO: 96           moltype = DNA   length = 10
FEATURE                 Location/Qualifiers
source                  1..10
                        mol_type = other DNA
                        organism = synthetic construct
SEQUENCE: 96
aatgcgcaat                                                                 10

SEQ ID NO: 97           moltype = DNA   length = 10
FEATURE                 Location/Qualifiers
source                  1..10
                        mol_type = other DNA
                        organism = synthetic construct
SEQUENCE: 97
gtaccccctca                                                                10
```

```
SEQ ID NO: 98          moltype = DNA   length = 10
FEATURE                Location/Qualifiers
source                 1..10
                       mol_type = other DNA
                       organism = synthetic construct
SEQUENCE: 98
cgacagctcg                                                                 10

SEQ ID NO: 99          moltype = DNA   length = 10
FEATURE                Location/Qualifiers
source                 1..10
                       mol_type = other DNA
                       organism = synthetic construct
SEQUENCE: 99
tgacctggct                                                                 10

SEQ ID NO: 100         moltype = DNA   length = 10
FEATURE                Location/Qualifiers
source                 1..10
                       mol_type = other DNA
                       organism = synthetic construct
SEQUENCE: 100
ttcatagccc                                                                 10

SEQ ID NO: 101         moltype = DNA   length = 10
FEATURE                Location/Qualifiers
source                 1..10
                       mol_type = other DNA
                       organism = synthetic construct
SEQUENCE: 101
cccaagagaa                                                                 10

SEQ ID NO: 102         moltype = DNA   length = 10
FEATURE                Location/Qualifiers
source                 1..10
                       mol_type = other DNA
                       organism = synthetic construct
SEQUENCE: 102
aaacgaagta                                                                 10

SEQ ID NO: 103         moltype = DNA   length = 10
FEATURE                Location/Qualifiers
source                 1..10
                       mol_type = other DNA
                       organism = synthetic construct
SEQUENCE: 103
gacgtttaca                                                                 10

SEQ ID NO: 104         moltype = DNA   length = 10
FEATURE                Location/Qualifiers
source                 1..10
                       mol_type = other DNA
                       organism = synthetic construct
SEQUENCE: 104
gatcgatttg                                                                 10

SEQ ID NO: 105         moltype = DNA   length = 10
FEATURE                Location/Qualifiers
source                 1..10
                       mol_type = other DNA
                       organism = synthetic construct
SEQUENCE: 105
cactgtcacc                                                                 10

SEQ ID NO: 106         moltype = DNA   length = 10
FEATURE                Location/Qualifiers
source                 1..10
                       mol_type = other DNA
                       organism = synthetic construct
SEQUENCE: 106
tgtgagagtt                                                                 10

SEQ ID NO: 107         moltype = DNA   length = 10
FEATURE                Location/Qualifiers
source                 1..10
                       mol_type = other DNA
                       organism = synthetic construct
SEQUENCE: 107
```
gacgtaacct                                                                                              10

SEQ ID NO: 108         moltype = DNA   length = 10
FEATURE                Location/Qualifiers
source                 1..10
                       mol_type = other DNA
                       organism = synthetic construct SEQUENCE: 108
cagactctgc                                                                                              10

SEQ ID NO: 109         moltype = DNA   length = 10
FEATURE                Location/Qualifiers
source                 1..10
                       mol_type = other DNA
                       organism = synthetic construct SEQUENCE: 109
tatgccaata                                                                                              10

SEQ ID NO: 110         moltype = DNA   length = 10
FEATURE                Location/Qualifiers
source                 1..10
                       mol_type = other DNA
                       organism = synthetic construct SEQUENCE: 110
acaggtgatg                                                                                              10

SEQ ID NO: 111         moltype = DNA   length = 10
FEATURE                Location/Qualifiers
source                 1..10
                       mol_type = other DNA
                       organism = synthetic construct SEQUENCE: 111
gtcatcgcgt                                                                                              10

SEQ ID NO: 112         moltype = DNA   length = 10
FEATURE                Location/Qualifiers
source                 1..10
                       mol_type = other DNA
                       organism = synthetic construct SEQUENCE: 112
tcttataaac                                                                                              10

SEQ ID NO: 113         moltype = DNA   length = 10
FEATURE                Location/Qualifiers
source                 1..10
                       mol_type = other DNA
                       organism = synthetic construct SEQUENCE: 113
gtgtagactg                                                                                              10

SEQ ID NO: 114         moltype = DNA   length = 10
FEATURE                Location/Qualifiers
source                 1..10
                       mol_type = other DNA
                       organism = synthetic construct SEQUENCE: 114
aaacaaccgg                                                                                              10

SEQ ID NO: 115         moltype = DNA   length = 10
FEATURE                Location/Qualifiers
source                 1..10
                       mol_type = other DNA
                       organism = synthetic construct SEQUENCE: 115
atcctgtacc                                                                                              10

SEQ ID NO: 116         moltype = DNA   length = 10
FEATURE                Location/Qualifiers
source                 1..10
                       mol_type = other DNA
                       organism = synthetic construct SEQUENCE: 116
ttataagaat                                                                                              10

SEQ ID NO: 117         moltype = DNA   length = 10
FEATURE                Location/Qualifiers
source                 1..10
                       mol_type = other DNA
                       organism = synthetic construct -continued

| | | |
|---|---|---|
| SEQUENCE: 117<br>ataagtaggc | | 10 |
| SEQ ID NO: 118<br>FEATURE<br>source | moltype = DNA length = 10<br>Location/Qualifiers<br>1..10<br>mol_type = other DNA<br>organism = synthetic construct | |
| SEQUENCE: 118<br>tctcgtaagg | | 10 |
| SEQ ID NO: 119<br>FEATURE<br>source | moltype = DNA length = 10<br>Location/Qualifiers<br>1..10<br>mol_type = other DNA<br>organism = synthetic construct | |
| SEQUENCE: 119<br>gatccgccgc | | 10 |
| SEQ ID NO: 120<br>FEATURE<br>source | moltype = DNA length = 10<br>Location/Qualifiers<br>1..10<br>mol_type = other DNA<br>organism = synthetic construct | |
| SEQUENCE: 120<br>tgtcaggttt | | 10 |
| SEQ ID NO: 121<br>FEATURE<br>source | moltype = DNA length = 10<br>Location/Qualifiers<br>1..10<br>mol_type = other DNA<br>organism = synthetic construct | |
| SEQUENCE: 121<br>tccgaagccc | | 10 |
| SEQ ID NO: 122<br>FEATURE<br>source | moltype = DNA length = 10<br>Location/Qualifiers<br>1..10<br>mol_type = other DNA<br>organism = synthetic construct | |
| SEQUENCE: 122<br>tccatgtcca | | 10 |
| SEQ ID NO: 123<br>FEATURE<br>source | moltype = DNA length = 10<br>Location/Qualifiers<br>1..10<br>mol_type = other DNA<br>organism = synthetic construct | |
| SEQUENCE: 123<br>gtgatggtac | | 10 |
| SEQ ID NO: 124<br>FEATURE<br>source | moltype = DNA length = 10<br>Location/Qualifiers<br>1..10<br>mol_type = other DNA<br>organism = synthetic construct | |
| SEQUENCE: 124<br>ctccacatac | | 10 |
| SEQ ID NO: 125<br>FEATURE<br>source | moltype = DNA length = 10<br>Location/Qualifiers<br>1..10<br>mol_type = other DNA<br>organism = synthetic construct | |
| SEQUENCE: 125<br>ttcggatgag | | 10 |
| SEQ ID NO: 126<br>FEATURE<br>source | moltype = DNA length = 10<br>Location/Qualifiers<br>1..10<br>mol_type = other DNA<br>organism = synthetic construct | |
| SEQUENCE: 126<br>acgacatcgc | | 10 |
| SEQ ID NO: 127<br>FEATURE<br>source | moltype = DNA length = 10<br>Location/Qualifiers<br>1..10<br>mol_type = other DNA | |

```
                        organism = synthetic construct
SEQUENCE: 127
gagatgcaca                                                                              10

SEQ ID NO: 128          moltype = DNA   length = 10
FEATURE                 Location/Qualifiers
source                  1..10
                        mol_type = other DNA
                        organism = synthetic construct
SEQUENCE: 128
tttgtatggc                                                                              10

SEQ ID NO: 129          moltype = DNA   length = 10
FEATURE                 Location/Qualifiers
source                  1..10
                        mol_type = other DNA
                        organism = synthetic construct
SEQUENCE: 129
cttttctaga                                                                              10

SEQ ID NO: 130          moltype = DNA   length = 10
FEATURE                 Location/Qualifiers
source                  1..10
                        mol_type = other DNA
                        organism = synthetic construct
SEQUENCE: 130
agtctaatca                                                                              10

SEQ ID NO: 131          moltype = DNA   length = 10
FEATURE                 Location/Qualifiers
source                  1..10
                        mol_type = other DNA
                        organism = synthetic construct
SEQUENCE: 131
gacttagcca                                                                              10

SEQ ID NO: 132          moltype = DNA   length = 10
FEATURE                 Location/Qualifiers
source                  1..10
                        mol_type = other DNA
                        organism = synthetic construct
SEQUENCE: 132
tatcacagta                                                                              10

SEQ ID NO: 133          moltype = DNA   length = 10
FEATURE                 Location/Qualifiers
source                  1..10
                        mol_type = other DNA
                        organism = synthetic construct
SEQUENCE: 133
aagctcgagt                                                                              10

SEQ ID NO: 134          moltype = DNA   length = 10
FEATURE                 Location/Qualifiers
source                  1..10
                        mol_type = other DNA
                        organism = synthetic construct
SEQUENCE: 134
tgttacgaca                                                                              10

SEQ ID NO: 135          moltype = DNA   length = 10
FEATURE                 Location/Qualifiers
source                  1..10
                        mol_type = other DNA
                        organism = synthetic construct
SEQUENCE: 135
aaggatagtc                                                                              10

SEQ ID NO: 136          moltype = DNA   length = 10
FEATURE                 Location/Qualifiers
source                  1..10
                        mol_type = other DNA
                        organism = synthetic construct
SEQUENCE: 136
gcacttagcc                                                                              10

SEQ ID NO: 137          moltype = DNA   length = 10
FEATURE                 Location/Qualifiers
source                  1..10
```

```
                            mol_type = other DNA
                            organism = synthetic construct
SEQUENCE: 137
gagggatccg                                                                    10

SEQ ID NO: 138              moltype = DNA   length = 10
FEATURE                     Location/Qualifiers
source                      1..10
                            mol_type = other DNA
                            organism = synthetic construct
SEQUENCE: 138
attctagaag                                                                    10

SEQ ID NO: 139              moltype = DNA   length = 10
FEATURE                     Location/Qualifiers
source                      1..10
                            mol_type = other DNA
                            organism = synthetic construct
SEQUENCE: 139
gataactgat                                                                    10

SEQ ID NO: 140              moltype = DNA   length = 10
FEATURE                     Location/Qualifiers
source                      1..10
                            mol_type = other DNA
                            organism = synthetic construct
SEQUENCE: 140
atctgactgt                                                                    10

SEQ ID NO: 141              moltype = DNA   length = 10
FEATURE                     Location/Qualifiers
source                      1..10
                            mol_type = other DNA
                            organism = synthetic construct
SEQUENCE: 141
caaagcgaac                                                                    10

SEQ ID NO: 142              moltype = DNA   length = 10
FEATURE                     Location/Qualifiers
source                      1..10
                            mol_type = other DNA
                            organism = synthetic construct
SEQUENCE: 142
gaaattgcga                                                                    10

SEQ ID NO: 143              moltype = DNA   length = 10
FEATURE                     Location/Qualifiers
source                      1..10
                            mol_type = other DNA
                            organism = synthetic construct
SEQUENCE: 143
gggtccagtc                                                                    10

SEQ ID NO: 144              moltype = DNA   length = 10
FEATURE                     Location/Qualifiers
source                      1..10
                            mol_type = other DNA
                            organism = synthetic construct
SEQUENCE: 144
atcaggtagc                                                                    10

SEQ ID NO: 145              moltype = DNA   length = 10
FEATURE                     Location/Qualifiers
source                      1..10
                            mol_type = other DNA
                            organism = synthetic construct
SEQUENCE: 145
gaaaggtcct                                                                    10

SEQ ID NO: 146              moltype = DNA   length = 10
FEATURE                     Location/Qualifiers
source                      1..10
                            mol_type = other DNA
                            organism = synthetic construct
SEQUENCE: 146
ggctaccaca                                                                    10

SEQ ID NO: 147              moltype = DNA   length = 10
FEATURE                     Location/Qualifiers
```

| | | |
|---|---|---|
| source | 1..10<br>mol_type = other DNA<br>organism = synthetic construct | |
| SEQUENCE: 147<br>ttattgctga | | 10 |
| SEQ ID NO: 148<br>FEATURE<br>source | moltype = DNA  length = 10<br>Location/Qualifiers<br>1..10<br>mol_type = other DNA<br>organism = synthetic construct | |
| SEQUENCE: 148<br>cgccgcgttt | | 10 |
| SEQ ID NO: 149<br>FEATURE<br>source | moltype = DNA  length = 10<br>Location/Qualifiers<br>1..10<br>mol_type = other DNA<br>organism = synthetic construct | |
| SEQUENCE: 149<br>ttttcaaaag | | 10 |
| SEQ ID NO: 150<br>FEATURE<br>source | moltype = DNA  length = 10<br>Location/Qualifiers<br>1..10<br>mol_type = other DNA<br>organism = synthetic construct | |
| SEQUENCE: 150<br>ctgggctaaa | | 10 |
| SEQ ID NO: 151<br>FEATURE<br>source | moltype = DNA  length = 10<br>Location/Qualifiers<br>1..10<br>mol_type = other DNA<br>organism = synthetic construct | |
| SEQUENCE: 151<br>cccgatgaga | | 10 |
| SEQ ID NO: 152<br>FEATURE<br>source | moltype = DNA  length = 10<br>Location/Qualifiers<br>1..10<br>mol_type = other DNA<br>organism = synthetic construct | |
| SEQUENCE: 152<br>tgggaaatat | | 10 |
| SEQ ID NO: 153<br>FEATURE<br>source | moltype = DNA  length = 10<br>Location/Qualifiers<br>1..10<br>mol_type = other DNA<br>organism = synthetic construct | |
| SEQUENCE: 153<br>gtacgagcgg | | 10 |
| SEQ ID NO: 154<br>FEATURE<br>source | moltype = DNA  length = 10<br>Location/Qualifiers<br>1..10<br>mol_type = other DNA<br>organism = synthetic construct | |
| SEQUENCE: 154<br>gcgtgcagct | | 10 |
| SEQ ID NO: 155<br>FEATURE<br>source | moltype = DNA  length = 10<br>Location/Qualifiers<br>1..10<br>mol_type = other DNA<br>organism = synthetic construct | |
| SEQUENCE: 155<br>agtctgcgga | | 10 |
| SEQ ID NO: 156<br>FEATURE<br>source | moltype = DNA  length = 10<br>Location/Qualifiers<br>1..10<br>mol_type = other DNA<br>organism = synthetic construct | |
| SEQUENCE: 156<br>taactattta | | 10 |
| SEQ ID NO: 157 | moltype = DNA  length = 10 | |

```
FEATURE                     Location/Qualifiers
source                      1..10
                            mol_type = other DNA
                            organism = synthetic construct
SEQUENCE: 157
gagttgccgg                                                                      10

SEQ ID NO: 158              moltype = DNA   length = 10
FEATURE                     Location/Qualifiers
source                      1..10
                            mol_type = other DNA
                            organism = synthetic construct
SEQUENCE: 158
cagcccggcg                                                                      10

SEQ ID NO: 159              moltype = DNA   length = 10
FEATURE                     Location/Qualifiers
source                      1..10
                            mol_type = other DNA
                            organism = synthetic construct
SEQUENCE: 159
tcacctacat                                                                      10

SEQ ID NO: 160              moltype = DNA   length = 10
FEATURE                     Location/Qualifiers
source                      1..10
                            mol_type = other DNA
                            organism = synthetic construct
SEQUENCE: 160
agtggctaac                                                                      10

SEQ ID NO: 161              moltype = DNA   length = 10
FEATURE                     Location/Qualifiers
source                      1..10
                            mol_type = other DNA
                            organism = synthetic construct
SEQUENCE: 161
agaatgtgag                                                                      10

SEQ ID NO: 162              moltype = DNA   length = 10
FEATURE                     Location/Qualifiers
source                      1..10
                            mol_type = other DNA
                            organism = synthetic construct
SEQUENCE: 162
tagtttcgca                                                                      10

SEQ ID NO: 163              moltype = DNA   length = 10
FEATURE                     Location/Qualifiers
source                      1..10
                            mol_type = other DNA
                            organism = synthetic construct
SEQUENCE: 163
cttcatttct                                                                      10

SEQ ID NO: 164              moltype = DNA   length = 10
FEATURE                     Location/Qualifiers
source                      1..10
                            mol_type = other DNA
                            organism = synthetic construct
SEQUENCE: 164
gccatgatat                                                                      10

SEQ ID NO: 165              moltype = DNA   length = 10
FEATURE                     Location/Qualifiers
source                      1..10
                            mol_type = other DNA
                            organism = synthetic construct
SEQUENCE: 165
acggcaaatc                                                                      10

SEQ ID NO: 166              moltype = DNA   length = 10
FEATURE                     Location/Qualifiers
source                      1..10
                            mol_type = other DNA
                            organism = synthetic construct
SEQUENCE: 166
atcgatagta                                                                      10
```

-continued

| | | |
|---|---|---|
| SEQ ID NO: 167<br>FEATURE<br>source | moltype = DNA  length = 10<br>Location/Qualifiers<br>1..10<br>mol_type = other DNA<br>organism = synthetic construct | |
| SEQUENCE: 167<br>cctaaaggca | | 10 |
| SEQ ID NO: 168<br>FEATURE<br>source | moltype = DNA  length = 10<br>Location/Qualifiers<br>1..10<br>mol_type = other DNA<br>organism = synthetic construct | |
| SEQUENCE: 168<br>tacgagcggt | | 10 |
| SEQ ID NO: 169<br>FEATURE<br>source | moltype = DNA  length = 10<br>Location/Qualifiers<br>1..10<br>mol_type = other DNA<br>organism = synthetic construct | |
| SEQUENCE: 169<br>tttgtcgtcg | | 10 |
| SEQ ID NO: 170<br>FEATURE<br>source | moltype = DNA  length = 10<br>Location/Qualifiers<br>1..10<br>mol_type = other DNA<br>organism = synthetic construct | |
| SEQUENCE: 170<br>tacaagcttg | | 10 |
| SEQ ID NO: 171<br>FEATURE<br>source | moltype = DNA  length = 10<br>Location/Qualifiers<br>1..10<br>mol_type = other DNA<br>organism = synthetic construct | |
| SEQUENCE: 171<br>gaccaacacg | | 10 |
| SEQ ID NO: 172<br>FEATURE<br>source | moltype = DNA  length = 10<br>Location/Qualifiers<br>1..10<br>mol_type = other DNA<br>organism = synthetic construct | |
| SEQUENCE: 172<br>gaacgacgaa | | 10 |
| SEQ ID NO: 173<br>FEATURE<br>source | moltype = DNA  length = 10<br>Location/Qualifiers<br>1..10<br>mol_type = other DNA<br>organism = synthetic construct | |
| SEQUENCE: 173<br>tcggaacgca | | 10 |
| SEQ ID NO: 174<br>FEATURE<br>source | moltype = DNA  length = 10<br>Location/Qualifiers<br>1..10<br>mol_type = other DNA<br>organism = synthetic construct | |
| SEQUENCE: 174<br>atccggtggt | | 10 |
| SEQ ID NO: 175<br>FEATURE<br>source | moltype = DNA  length = 10<br>Location/Qualifiers<br>1..10<br>mol_type = other DNA<br>organism = synthetic construct | |
| SEQUENCE: 175<br>taaaacgtag | | 10 |
| SEQ ID NO: 176<br>FEATURE<br>source | moltype = DNA  length = 10<br>Location/Qualifiers<br>1..10<br>mol_type = other DNA<br>organism = synthetic construct | |
| SEQUENCE: 176<br>tatgtgagcc | | 10 |

```
SEQ ID NO: 177           moltype = DNA   length = 10
FEATURE                  Location/Qualifiers
source                   1..10
                         mol_type = other DNA
                         organism = synthetic construct
SEQUENCE: 177
gaggcatcga                                                                10

SEQ ID NO: 178           moltype = DNA   length = 10
FEATURE                  Location/Qualifiers
source                   1..10
                         mol_type = other DNA
                         organism = synthetic construct
SEQUENCE: 178
gaatgggtgg                                                                10

SEQ ID NO: 179           moltype = DNA   length = 10
FEATURE                  Location/Qualifiers
source                   1..10
                         mol_type = other DNA
                         organism = synthetic construct
SEQUENCE: 179
aacgacacaa                                                                10

SEQ ID NO: 180           moltype = DNA   length = 10
FEATURE                  Location/Qualifiers
source                   1..10
                         mol_type = other DNA
                         organism = synthetic construct
SEQUENCE: 180
gtacgatgca                                                                10

SEQ ID NO: 181           moltype = DNA   length = 10
FEATURE                  Location/Qualifiers
source                   1..10
                         mol_type = other DNA
                         organism = synthetic construct
SEQUENCE: 181
agaaggcgcc                                                                10

SEQ ID NO: 182           moltype = DNA   length = 10
FEATURE                  Location/Qualifiers
source                   1..10
                         mol_type = other DNA
                         organism = synthetic construct
SEQUENCE: 182
ccgcaatgga                                                                10

SEQ ID NO: 183           moltype = DNA   length = 10
FEATURE                  Location/Qualifiers
source                   1..10
                         mol_type = other DNA
                         organism = synthetic construct
SEQUENCE: 183
tacggatttt                                                                10

SEQ ID NO: 184           moltype = DNA   length = 10
FEATURE                  Location/Qualifiers
source                   1..10
                         mol_type = other DNA
                         organism = synthetic construct
SEQUENCE: 184
gtcgttagct                                                                10

SEQ ID NO: 185           moltype = DNA   length = 10
FEATURE                  Location/Qualifiers
source                   1..10
                         mol_type = other DNA
                         organism = synthetic construct
SEQUENCE: 185
ggactagggc                                                                10

SEQ ID NO: 186           moltype = DNA   length = 10
FEATURE                  Location/Qualifiers
source                   1..10
                         mol_type = other DNA
                         organism = synthetic construct
SEQUENCE: 186
```
attggtattc                                                                          10

SEQ ID NO: 187          moltype = DNA   length = 10
FEATURE                 Location/Qualifiers
source                  1..10
                        mol_type = other DNA
                        organism = synthetic construct
SEQUENCE: 187
atcccagaga                                                                          10

SEQ ID NO: 188          moltype = DNA   length = 10
FEATURE                 Location/Qualifiers
source                  1..10
                        mol_type = other DNA
                        organism = synthetic construct
SEQUENCE: 188
gtcccagctc                                                                          10

SEQ ID NO: 189          moltype = DNA   length = 10
FEATURE                 Location/Qualifiers
source                  1..10
                        mol_type = other DNA
                        organism = synthetic construct
SEQUENCE: 189
cacgaggaat                                                                          10

SEQ ID NO: 190          moltype = DNA   length = 10
FEATURE                 Location/Qualifiers
source                  1..10
                        mol_type = other DNA
                        organism = synthetic construct
SEQUENCE: 190
tacaattgca                                                                          10

SEQ ID NO: 191          moltype = DNA   length = 10
FEATURE                 Location/Qualifiers
source                  1..10
                        mol_type = other DNA
                        organism = synthetic construct
SEQUENCE: 191
attcctgaat                                                                          10

SEQ ID NO: 192          moltype = DNA   length = 10
FEATURE                 Location/Qualifiers
source                  1..10
                        mol_type = other DNA
                        organism = synthetic construct
SEQUENCE: 192
tagcgaggcg                                                                          10

SEQ ID NO: 193          moltype = DNA   length = 10
FEATURE                 Location/Qualifiers
source                  1..10
                        mol_type = other DNA
                        organism = synthetic construct
SEQUENCE: 193
ctggatgggc                                                                          10

SEQ ID NO: 194          moltype = DNA   length = 10
FEATURE                 Location/Qualifiers
source                  1..10
                        mol_type = other DNA
                        organism = synthetic construct
SEQUENCE: 194
gcgacggcca                                                                          10

SEQ ID NO: 195          moltype = DNA   length = 10
FEATURE                 Location/Qualifiers
source                  1..10
                        mol_type = other DNA
                        organism = synthetic construct
SEQUENCE: 195
acctgcacaa                                                                          10

SEQ ID NO: 196          moltype = DNA   length = 10
FEATURE                 Location/Qualifiers
source                  1..10
                        mol_type = other DNA
                        organism = synthetic construct

| | | |
|---|---|---|
| SEQUENCE: 196 catgacagac | | 10 |
| SEQ ID NO: 197 FEATURE source | moltype = DNA  length = 10 Location/Qualifiers 1..10 mol_type = other DNA organism = synthetic construct | |
| SEQUENCE: 197 ttaccaacgt | | 10 |
| SEQ ID NO: 198 FEATURE source | moltype = DNA  length = 10 Location/Qualifiers 1..10 mol_type = other DNA organism = synthetic construct | |
| SEQUENCE: 198 caggtgtgtg | | 10 |
| SEQ ID NO: 199 FEATURE source | moltype = DNA  length = 10 Location/Qualifiers 1..10 mol_type = other DNA organism = synthetic construct | |
| SEQUENCE: 199 cgagggacgg | | 10 |
| SEQ ID NO: 200 FEATURE source | moltype = DNA  length = 10 Location/Qualifiers 1..10 mol_type = other DNA organism = synthetic construct | |
| SEQUENCE: 200 cgtctcggta | | 10 |
| SEQ ID NO: 201 FEATURE source | moltype = DNA  length = 10 Location/Qualifiers 1..10 mol_type = other DNA organism = synthetic construct | |
| SEQUENCE: 201 taagctatct | | 10 |
| SEQ ID NO: 202 FEATURE source | moltype = DNA  length = 10 Location/Qualifiers 1..10 mol_type = other DNA organism = synthetic construct | |
| SEQUENCE: 202 tactcccta | | 10 |
| SEQ ID NO: 203 FEATURE source | moltype = DNA  length = 10 Location/Qualifiers 1..10 mol_type = other DNA organism = synthetic construct | |
| SEQUENCE: 203 ttatattcat | | 10 |
| SEQ ID NO: 204 FEATURE source | moltype = DNA  length = 10 Location/Qualifiers 1..10 mol_type = other DNA organism = synthetic construct | |
| SEQUENCE: 204 agcgatctgc | | 10 |
| SEQ ID NO: 205 FEATURE source | moltype = DNA  length = 10 Location/Qualifiers 1..10 mol_type = other DNA organism = synthetic construct | |
| SEQUENCE: 205 tcttctgatc | | 10 |
| SEQ ID NO: 206 FEATURE source | moltype = DNA  length = 10 Location/Qualifiers 1..10 mol_type = other DNA | |

-continued

```
                            organism = synthetic construct
SEQUENCE: 206
atagttccca                                                               10

SEQ ID NO: 207          moltype = DNA  length = 10
FEATURE                 Location/Qualifiers
source                  1..10
                        mol_type = other DNA
                        organism = synthetic construct
SEQUENCE: 207
tttacgggtg                                                               10

SEQ ID NO: 208          moltype = DNA  length = 10
FEATURE                 Location/Qualifiers
source                  1..10
                        mol_type = other DNA
                        organism = synthetic construct
SEQUENCE: 208
gtgtcccctg                                                               10

SEQ ID NO: 209          moltype = DNA  length = 10
FEATURE                 Location/Qualifiers
source                  1..10
                        mol_type = other DNA
                        organism = synthetic construct
SEQUENCE: 209
gcggggtcg                                                                10

SEQ ID NO: 210          moltype = DNA  length = 10
FEATURE                 Location/Qualifiers
source                  1..10
                        mol_type = other DNA
                        organism = synthetic construct
SEQUENCE: 210
cattgatcta                                                               10

SEQ ID NO: 211          moltype = DNA  length = 10
FEATURE                 Location/Qualifiers
source                  1..10
                        mol_type = other DNA
                        organism = synthetic construct
SEQUENCE: 211
agggacggtg                                                               10

SEQ ID NO: 212          moltype = DNA  length = 10
FEATURE                 Location/Qualifiers
source                  1..10
                        mol_type = other DNA
                        organism = synthetic construct
SEQUENCE: 212
cagttacttt                                                               10

SEQ ID NO: 213          moltype = DNA  length = 10
FEATURE                 Location/Qualifiers
source                  1..10
                        mol_type = other DNA
                        organism = synthetic construct
SEQUENCE: 213
ccatacttcc                                                               10

SEQ ID NO: 214          moltype = DNA  length = 10
FEATURE                 Location/Qualifiers
source                  1..10
                        mol_type = other DNA
                        organism = synthetic construct
SEQUENCE: 214
atcagaatta                                                               10

SEQ ID NO: 215          moltype = DNA  length = 10
FEATURE                 Location/Qualifiers
source                  1..10
                        mol_type = other DNA
                        organism = synthetic construct
SEQUENCE: 215
aaactaggca                                                               10

SEQ ID NO: 216          moltype = DNA  length = 10
FEATURE                 Location/Qualifiers
source                  1..10
```

```
                        mol_type = other DNA
                        organism = synthetic construct
SEQUENCE: 216
aatgtcgttg                                                                      10

SEQ ID NO: 217          moltype = DNA   length = 10
FEATURE                 Location/Qualifiers
source                  1..10
                        mol_type = other DNA
                        organism = synthetic construct
SEQUENCE: 217
cacatgggtc                                                                      10

SEQ ID NO: 218          moltype = DNA   length = 10
FEATURE                 Location/Qualifiers
source                  1..10
                        mol_type = other DNA
                        organism = synthetic construct
SEQUENCE: 218
ggtcgctggt                                                                      10

SEQ ID NO: 219          moltype = DNA   length = 10
FEATURE                 Location/Qualifiers
source                  1..10
                        mol_type = other DNA
                        organism = synthetic construct
SEQUENCE: 219
actgtattac                                                                      10

SEQ ID NO: 220          moltype = DNA   length = 10
FEATURE                 Location/Qualifiers
source                  1..10
                        mol_type = other DNA
                        organism = synthetic construct
SEQUENCE: 220
ccgagacgcg                                                                      10

SEQ ID NO: 221          moltype = DNA   length = 10
FEATURE                 Location/Qualifiers
source                  1..10
                        mol_type = other DNA
                        organism = synthetic construct
SEQUENCE: 221
actccaaccc                                                                      10

SEQ ID NO: 222          moltype = DNA   length = 10
FEATURE                 Location/Qualifiers
source                  1..10
                        mol_type = other DNA
                        organism = synthetic construct
SEQUENCE: 222
atattacaag                                                                      10

SEQ ID NO: 223          moltype = DNA   length = 10
FEATURE                 Location/Qualifiers
source                  1..10
                        mol_type = other DNA
                        organism = synthetic construct
SEQUENCE: 223
ccatggatag                                                                      10

SEQ ID NO: 224          moltype = DNA   length = 10
FEATURE                 Location/Qualifiers
source                  1..10
                        mol_type = other DNA
                        organism = synthetic construct
SEQUENCE: 224
ccgtctcaat                                                                      10

SEQ ID NO: 225          moltype = DNA   length = 10
FEATURE                 Location/Qualifiers
source                  1..10
                        mol_type = other DNA
                        organism = synthetic construct
SEQUENCE: 225
gatcgtcggg                                                                      10

SEQ ID NO: 226          moltype = DNA   length = 10
FEATURE                 Location/Qualifiers
```

-continued

```
source                     1..10
                           mol_type = other DNA
                           organism = synthetic construct
SEQUENCE: 226
tcttgttttg                                                                   10

SEQ ID NO: 227             moltype = DNA   length = 10
FEATURE                    Location/Qualifiers
source                     1..10
                           mol_type = other DNA
                           organism = synthetic construct
SEQUENCE: 227
aatattgctc                                                                   10

SEQ ID NO: 228             moltype = DNA   length = 10
FEATURE                    Location/Qualifiers
source                     1..10
                           mol_type = other DNA
                           organism = synthetic construct
SEQUENCE: 228
aacgtcgtct                                                                   10

SEQ ID NO: 229             moltype = DNA   length = 10
FEATURE                    Location/Qualifiers
source                     1..10
                           mol_type = other DNA
                           organism = synthetic construct
SEQUENCE: 229
aatatttttg                                                                   10

SEQ ID NO: 230             moltype = DNA   length = 10
FEATURE                    Location/Qualifiers
source                     1..10
                           mol_type = other DNA
                           organism = synthetic construct
SEQUENCE: 230
cgtaacgtgc                                                                   10

SEQ ID NO: 231             moltype = DNA   length = 10
FEATURE                    Location/Qualifiers
source                     1..10
                           mol_type = other DNA
                           organism = synthetic construct
SEQUENCE: 231
gcgtggttat                                                                   10

SEQ ID NO: 232             moltype = DNA   length = 10
FEATURE                    Location/Qualifiers
source                     1..10
                           mol_type = other DNA
                           organism = synthetic construct
SEQUENCE: 232
caaaacatta                                                                   10

SEQ ID NO: 233             moltype = DNA   length = 10
FEATURE                    Location/Qualifiers
source                     1..10
                           mol_type = other DNA
                           organism = synthetic construct
SEQUENCE: 233
cgtatcctga                                                                   10

SEQ ID NO: 234             moltype = DNA   length = 10
FEATURE                    Location/Qualifiers
source                     1..10
                           mol_type = other DNA
                           organism = synthetic construct
SEQUENCE: 234
tcgcttacaa                                                                   10

SEQ ID NO: 235             moltype = DNA   length = 10
FEATURE                    Location/Qualifiers
source                     1..10
                           mol_type = other DNA
                           organism = synthetic construct
SEQUENCE: 235
tccattgtgt                                                                   10

SEQ ID NO: 236             moltype = DNA   length = 10
```

```
FEATURE               Location/Qualifiers
source                1..10
                      mol_type = other DNA
                      organism = synthetic construct
SEQUENCE: 236
gcccccattc                                                                      10

SEQ ID NO: 237        moltype = DNA   length = 10
FEATURE               Location/Qualifiers
source                1..10
                      mol_type = other DNA
                      organism = synthetic construct
SEQUENCE: 237
tgacgtctat                                                                      10

SEQ ID NO: 238        moltype = DNA   length = 10
FEATURE               Location/Qualifiers
source                1..10
                      mol_type = other DNA
                      organism = synthetic construct
SEQUENCE: 238
tgggccgagg                                                                      10

SEQ ID NO: 239        moltype = DNA   length = 10
FEATURE               Location/Qualifiers
source                1..10
                      mol_type = other DNA
                      organism = synthetic construct
SEQUENCE: 239
aagtgtcaag                                                                      10

SEQ ID NO: 240        moltype = DNA   length = 10
FEATURE               Location/Qualifiers
source                1..10
                      mol_type = other DNA
                      organism = synthetic construct
SEQUENCE: 240
gacagtagag                                                                      10

SEQ ID NO: 241        moltype = DNA   length = 10
FEATURE               Location/Qualifiers
source                1..10
                      mol_type = other DNA
                      organism = synthetic construct
SEQUENCE: 241
cgcagccatc                                                                      10

SEQ ID NO: 242        moltype = DNA   length = 10
FEATURE               Location/Qualifiers
source                1..10
                      mol_type = other DNA
                      organism = synthetic construct
SEQUENCE: 242
gaggcagaac                                                                      10

SEQ ID NO: 243        moltype = DNA   length = 10
FEATURE               Location/Qualifiers
source                1..10
                      mol_type = other DNA
                      organism = synthetic construct
SEQUENCE: 243
gttgaaattg                                                                      10

SEQ ID NO: 244        moltype = DNA   length = 10
FEATURE               Location/Qualifiers
source                1..10
                      mol_type = other DNA
                      organism = synthetic construct
SEQUENCE: 244
atctgataaa                                                                      10

SEQ ID NO: 245        moltype = DNA   length = 10
FEATURE               Location/Qualifiers
source                1..10
                      mol_type = other DNA
                      organism = synthetic construct
SEQUENCE: 245
agctgtctct                                                                      10
```

-continued

| | | |
|---|---|---|
| SEQ ID NO: 246<br>FEATURE<br>source | moltype = DNA   length = 10<br>Location/Qualifiers<br>1..10<br>mol_type = other DNA<br>organism = synthetic construct | |
| SEQUENCE: 246<br>ttttaggtta | | 10 |
| SEQ ID NO: 247<br>FEATURE<br>source | moltype = DNA   length = 10<br>Location/Qualifiers<br>1..10<br>mol_type = other DNA<br>organism = synthetic construct | |
| SEQUENCE: 247<br>tatctgtccg | | 10 |
| SEQ ID NO: 248<br>FEATURE<br>source | moltype = DNA   length = 10<br>Location/Qualifiers<br>1..10<br>mol_type = other DNA<br>organism = synthetic construct | |
| SEQUENCE: 248<br>aaaacatatg | | 10 |
| SEQ ID NO: 249<br>FEATURE<br>source | moltype = DNA   length = 10<br>Location/Qualifiers<br>1..10<br>mol_type = other DNA<br>organism = synthetic construct | |
| SEQUENCE: 249<br>gtaaagaaga | | 10 |
| SEQ ID NO: 250<br>FEATURE<br>source | moltype = DNA   length = 10<br>Location/Qualifiers<br>1..10<br>mol_type = other DNA<br>organism = synthetic construct | |
| SEQUENCE: 250<br>tcgacgtgca | | 10 |
| SEQ ID NO: 251<br>FEATURE<br>source | moltype = DNA   length = 10<br>Location/Qualifiers<br>1..10<br>mol_type = other DNA<br>organism = synthetic construct | |
| SEQUENCE: 251<br>tagatcttaa | | 10 |
| SEQ ID NO: 252<br>FEATURE<br>source | moltype = DNA   length = 10<br>Location/Qualifiers<br>1..10<br>mol_type = other DNA<br>organism = synthetic construct | |
| SEQUENCE: 252<br>cactggtcac | | 10 |
| SEQ ID NO: 253<br>FEATURE<br>source | moltype = DNA   length = 10<br>Location/Qualifiers<br>1..10<br>mol_type = other DNA<br>organism = synthetic construct | |
| SEQUENCE: 253<br>attctgatgt | | 10 |
| SEQ ID NO: 254<br>FEATURE<br>source | moltype = DNA   length = 10<br>Location/Qualifiers<br>1..10<br>mol_type = other DNA<br>organism = synthetic construct | |
| SEQUENCE: 254<br>atggccctga | | 10 |
| SEQ ID NO: 255<br>FEATURE<br>source | moltype = DNA   length = 10<br>Location/Qualifiers<br>1..10<br>mol_type = other DNA<br>organism = synthetic construct | |
| SEQUENCE: 255<br>ggtgatgaga | | 10 |

SEQ ID NO: 256          moltype = DNA   length = 10
FEATURE                 Location/Qualifiers
source                  1..10
                        mol_type = other DNA
                        organism = synthetic construct
SEQUENCE: 256
caccgtgggg                                                                 10

SEQ ID NO: 257          moltype = DNA   length = 10
FEATURE                 Location/Qualifiers
source                  1..10
                        mol_type = other DNA
                        organism = synthetic construct
SEQUENCE: 257
gcttgctcgg                                                                 10

SEQ ID NO: 258          moltype = DNA   length = 10
FEATURE                 Location/Qualifiers
source                  1..10
                        mol_type = other DNA
                        organism = synthetic construct
SEQUENCE: 258
ccagttgaac                                                                 10

SEQ ID NO: 259          moltype = DNA   length = 10
FEATURE                 Location/Qualifiers
source                  1..10
                        mol_type = other DNA
                        organism = synthetic construct
SEQUENCE: 259
cgtctgtacc                                                                 10

SEQ ID NO: 260          moltype = DNA   length = 10
FEATURE                 Location/Qualifiers
source                  1..10
                        mol_type = other DNA
                        organism = synthetic construct
SEQUENCE: 260
ccaacgcggc                                                                 10

SEQ ID NO: 261          moltype = DNA   length = 10
FEATURE                 Location/Qualifiers
source                  1..10
                        mol_type = other DNA
                        organism = synthetic construct
SEQUENCE: 261
acgtgatcga                                                                 10

SEQ ID NO: 262          moltype = DNA   length = 10
FEATURE                 Location/Qualifiers
source                  1..10
                        mol_type = other DNA
                        organism = synthetic construct
SEQUENCE: 262
ccatcgaatc                                                                 10

SEQ ID NO: 263          moltype = DNA   length = 10
FEATURE                 Location/Qualifiers
source                  1..10
                        mol_type = other DNA
                        organism = synthetic construct
SEQUENCE: 263
cggtgtctgc                                                                 10

SEQ ID NO: 264          moltype = DNA   length = 10
FEATURE                 Location/Qualifiers
source                  1..10
                        mol_type = other DNA
                        organism = synthetic construct
SEQUENCE: 264
aaaccacctc                                                                 10

SEQ ID NO: 265          moltype = DNA   length = 10
FEATURE                 Location/Qualifiers
source                  1..10
                        mol_type = other DNA
                        organism = synthetic construct
SEQUENCE: 265

```
tcaatgttcc                                                              10

SEQ ID NO: 266          moltype = DNA  length = 10
FEATURE                 Location/Qualifiers
source                  1..10
                        mol_type = other DNA
                        organism = synthetic construct
SEQUENCE: 266
ttcgacatgt                                                              10

SEQ ID NO: 267          moltype = DNA  length = 10
FEATURE                 Location/Qualifiers
source                  1..10
                        mol_type = other DNA
                        organism = synthetic construct
SEQUENCE: 267
aggcacgata                                                              10

SEQ ID NO: 268          moltype = DNA  length = 10
FEATURE                 Location/Qualifiers
source                  1..10
                        mol_type = other DNA
                        organism = synthetic construct
SEQUENCE: 268
cacgagatca                                                              10

SEQ ID NO: 269          moltype = DNA  length = 10
FEATURE                 Location/Qualifiers
source                  1..10
                        mol_type = other DNA
                        organism = synthetic construct
SEQUENCE: 269
catgctgggg                                                              10

SEQ ID NO: 270          moltype = DNA  length = 10
FEATURE                 Location/Qualifiers
source                  1..10
                        mol_type = other DNA
                        organism = synthetic construct
SEQUENCE: 270
taccatggtt                                                              10

SEQ ID NO: 271          moltype = DNA  length = 10
FEATURE                 Location/Qualifiers
source                  1..10
                        mol_type = other DNA
                        organism = synthetic construct
SEQUENCE: 271
ttgcccatat                                                              10

SEQ ID NO: 272          moltype = DNA  length = 10
FEATURE                 Location/Qualifiers
source                  1..10
                        mol_type = other DNA
                        organism = synthetic construct
SEQUENCE: 272
tgcacattcg                                                              10

SEQ ID NO: 273          moltype = DNA  length = 10
FEATURE                 Location/Qualifiers
source                  1..10
                        mol_type = other DNA
                        organism = synthetic construct
SEQUENCE: 273
gttatgttgg                                                              10

SEQ ID NO: 274          moltype = DNA  length = 10
FEATURE                 Location/Qualifiers
source                  1..10
                        mol_type = other DNA
                        organism = synthetic construct
SEQUENCE: 274
tgagttatga                                                              10

SEQ ID NO: 275          moltype = DNA  length = 10
FEATURE                 Location/Qualifiers
source                  1..10
                        mol_type = other DNA
                        organism = synthetic construct
```

```
SEQUENCE: 275
gatggccccc                                                                          10

SEQ ID NO: 276          moltype = DNA   length = 10
FEATURE                 Location/Qualifiers
source                  1..10
                        mol_type = other DNA
                        organism = synthetic construct
SEQUENCE: 276
gatgggttac                                                                          10

SEQ ID NO: 277          moltype = DNA   length = 10
FEATURE                 Location/Qualifiers
source                  1..10
                        mol_type = other DNA
                        organism = synthetic construct
SEQUENCE: 277
agctacgttg                                                                          10

SEQ ID NO: 278          moltype = DNA   length = 10
FEATURE                 Location/Qualifiers
source                  1..10
                        mol_type = other DNA
                        organism = synthetic construct
SEQUENCE: 278
accccatgca                                                                          10

SEQ ID NO: 279          moltype = DNA   length = 10
FEATURE                 Location/Qualifiers
source                  1..10
                        mol_type = other DNA
                        organism = synthetic construct
SEQUENCE: 279
tactaccgtt                                                                          10

SEQ ID NO: 280          moltype = DNA   length = 10
FEATURE                 Location/Qualifiers
source                  1..10
                        mol_type = other DNA
                        organism = synthetic construct
SEQUENCE: 280
tcgcttctac                                                                          10

SEQ ID NO: 281          moltype = DNA   length = 10
FEATURE                 Location/Qualifiers
source                  1..10
                        mol_type = other DNA
                        organism = synthetic construct
SEQUENCE: 281
ctggcagtgc                                                                          10

SEQ ID NO: 282          moltype = DNA   length = 10
FEATURE                 Location/Qualifiers
source                  1..10
                        mol_type = other DNA
                        organism = synthetic construct
SEQUENCE: 282
tctatatata                                                                          10

SEQ ID NO: 283          moltype = DNA   length = 10
FEATURE                 Location/Qualifiers
source                  1..10
                        mol_type = other DNA
                        organism = synthetic construct
SEQUENCE: 283
ggattagttc                                                                          10

SEQ ID NO: 284          moltype = DNA   length = 10
FEATURE                 Location/Qualifiers
source                  1..10
                        mol_type = other DNA
                        organism = synthetic construct
SEQUENCE: 284
gtgttacgct                                                                          10

SEQ ID NO: 285          moltype = DNA   length = 10
FEATURE                 Location/Qualifiers
source                  1..10
                        mol_type = other DNA
```

```
                                   -continued
SEQUENCE: 285
tcgactccgt                                                                        10

SEQ ID NO: 286          moltype = DNA  length = 10
FEATURE                 Location/Qualifiers
source                  1..10
                        mol_type = other DNA
                        organism = synthetic construct
SEQUENCE: 286
ggtagcaggc                                                                        10

SEQ ID NO: 287          moltype = DNA  length = 10
FEATURE                 Location/Qualifiers
source                  1..10
                        mol_type = other DNA
                        organism = synthetic construct
SEQUENCE: 287
tattggattc                                                                        10

SEQ ID NO: 288          moltype = DNA  length = 10
FEATURE                 Location/Qualifiers
source                  1..10
                        mol_type = other DNA
                        organism = synthetic construct
SEQUENCE: 288
gttcgatcga                                                                        10

SEQ ID NO: 289          moltype = DNA  length = 10
FEATURE                 Location/Qualifiers
source                  1..10
                        mol_type = other DNA
                        organism = synthetic construct
SEQUENCE: 289
atattaatat                                                                        10

SEQ ID NO: 290          moltype = DNA  length = 10
FEATURE                 Location/Qualifiers
source                  1..10
                        mol_type = other DNA
                        organism = synthetic construct
SEQUENCE: 290
agaacgattg                                                                        10

SEQ ID NO: 291          moltype = DNA  length = 10
FEATURE                 Location/Qualifiers
source                  1..10
                        mol_type = other DNA
                        organism = synthetic construct
SEQUENCE: 291
gtaaagtgta                                                                        10

SEQ ID NO: 292          moltype = DNA  length = 10
FEATURE                 Location/Qualifiers
source                  1..10
                        mol_type = other DNA
                        organism = synthetic construct
SEQUENCE: 292
cccatgtgcc                                                                        10

SEQ ID NO: 293          moltype = DNA  length = 10
FEATURE                 Location/Qualifiers
source                  1..10
                        mol_type = other DNA
                        organism = synthetic construct
SEQUENCE: 293
gtggcctcgc                                                                        10

SEQ ID NO: 294          moltype = DNA  length = 10
FEATURE                 Location/Qualifiers
source                  1..10
                        mol_type = other DNA
                        organism = synthetic construct
SEQUENCE: 294
gacactagga                                                                        10

SEQ ID NO: 295          moltype = DNA  length = 10
FEATURE                 Location/Qualifiers
source                  1..10
```

```
SEQUENCE: 295
atattctgac                                                              10

SEQ ID NO: 296         moltype = DNA   length = 10
FEATURE                Location/Qualifiers
source                 1..10
                       mol_type = other DNA
                       organism = synthetic construct
SEQUENCE: 296
taagtagacg                                                              10

SEQ ID NO: 297         moltype = DNA   length = 10
FEATURE                Location/Qualifiers
source                 1..10
                       mol_type = other DNA
                       organism = synthetic construct
SEQUENCE: 297
taacggtcta                                                              10

SEQ ID NO: 298         moltype = DNA   length = 10
FEATURE                Location/Qualifiers
source                 1..10
                       mol_type = other DNA
                       organism = synthetic construct
SEQUENCE: 298
tagtttcatt                                                              10

SEQ ID NO: 299         moltype = DNA   length = 10
FEATURE                Location/Qualifiers
source                 1..10
                       mol_type = other DNA
                       organism = synthetic construct
SEQUENCE: 299
ttggatccga                                                              10

SEQ ID NO: 300         moltype = DNA   length = 10
FEATURE                Location/Qualifiers
source                 1..10
                       mol_type = other DNA
                       organism = synthetic construct
SEQUENCE: 300
cgtgacaacc                                                              10

SEQ ID NO: 301         moltype = DNA   length = 10
FEATURE                Location/Qualifiers
source                 1..10
                       mol_type = other DNA
                       organism = synthetic construct
SEQUENCE: 301
cgcgctcaga                                                              10

SEQ ID NO: 302         moltype = DNA   length = 10
FEATURE                Location/Qualifiers
source                 1..10
                       mol_type = other DNA
                       organism = synthetic construct
SEQUENCE: 302
cgttcttaat                                                              10

SEQ ID NO: 303         moltype = DNA   length = 10
FEATURE                Location/Qualifiers
source                 1..10
                       mol_type = other DNA
                       organism = synthetic construct
SEQUENCE: 303
acaagagttt                                                              10

SEQ ID NO: 304         moltype = DNA   length = 10
FEATURE                Location/Qualifiers
source                 1..10
                       mol_type = other DNA
                       organism = synthetic construct
SEQUENCE: 304
agggttatag                                                              10

SEQ ID NO: 305         moltype = DNA   length = 10
FEATURE                Location/Qualifiers
```

```
source                      1..10
                            mol_type = other DNA
                            organism = synthetic construct
SEQUENCE: 305
accacgactc                                                                    10

SEQ ID NO: 306              moltype = DNA   length = 10
FEATURE                     Location/Qualifiers
source                      1..10
                            mol_type = other DNA
                            organism = synthetic construct
SEQUENCE: 306
gtactcgggg                                                                    10

SEQ ID NO: 307              moltype = DNA   length = 10
FEATURE                     Location/Qualifiers
source                      1..10
                            mol_type = other DNA
                            organism = synthetic construct
SEQUENCE: 307
acaaatatct                                                                    10

SEQ ID NO: 308              moltype = DNA   length = 10
FEATURE                     Location/Qualifiers
source                      1..10
                            mol_type = other DNA
                            organism = synthetic construct
SEQUENCE: 308
gatcggggtg                                                                    10

SEQ ID NO: 309              moltype = DNA   length = 10
FEATURE                     Location/Qualifiers
source                      1..10
                            mol_type = other DNA
                            organism = synthetic construct
SEQUENCE: 309
atgtaactcc                                                                    10

SEQ ID NO: 310              moltype = DNA   length = 10
FEATURE                     Location/Qualifiers
source                      1..10
                            mol_type = other DNA
                            organism = synthetic construct
SEQUENCE: 310
atgaagaagc                                                                    10

SEQ ID NO: 311              moltype = DNA   length = 10
FEATURE                     Location/Qualifiers
source                      1..10
                            mol_type = other DNA
                            organism = synthetic construct
SEQUENCE: 311
atgtattgtc                                                                    10

SEQ ID NO: 312              moltype = DNA   length = 10
FEATURE                     Location/Qualifiers
source                      1..10
                            mol_type = other DNA
                            organism = synthetic construct
SEQUENCE: 312
tgcattggaa                                                                    10

SEQ ID NO: 313              moltype = DNA   length = 10
FEATURE                     Location/Qualifiers
source                      1..10
                            mol_type = other DNA
                            organism = synthetic construct
SEQUENCE: 313
gcggacgatc                                                                    10

SEQ ID NO: 314              moltype = DNA   length = 10
FEATURE                     Location/Qualifiers
source                      1..10
                            mol_type = other DNA
                            organism = synthetic construct
SEQUENCE: 314
ccgtacttga                                                                    10

SEQ ID NO: 315              moltype = DNA   length = 10
```

-continued

```
FEATURE                 Location/Qualifiers
source                  1..10
                        mol_type = other DNA
                        organism = synthetic construct
SEQUENCE: 315
tttgcccccg                                                                      10

SEQ ID NO: 316          moltype = DNA   length = 10
FEATURE                 Location/Qualifiers
source                  1..10
                        mol_type = other DNA
                        organism = synthetic construct
SEQUENCE: 316
acctcacgcg                                                                      10

SEQ ID NO: 317          moltype = DNA   length = 10
FEATURE                 Location/Qualifiers
source                  1..10
                        mol_type = other DNA
                        organism = synthetic construct
SEQUENCE: 317
attaaggggc                                                                      10

SEQ ID NO: 318          moltype = DNA   length = 10
FEATURE                 Location/Qualifiers
source                  1..10
                        mol_type = other DNA
                        organism = synthetic construct
SEQUENCE: 318
cgtggacatg                                                                      10

SEQ ID NO: 319          moltype = DNA   length = 10
FEATURE                 Location/Qualifiers
source                  1..10
                        mol_type = other DNA
                        organism = synthetic construct
SEQUENCE: 319
ttagcccttc                                                                      10

SEQ ID NO: 320          moltype = DNA   length = 10
FEATURE                 Location/Qualifiers
source                  1..10
                        mol_type = other DNA
                        organism = synthetic construct
SEQUENCE: 320
cgagagtttg                                                                      10

SEQ ID NO: 321          moltype = DNA   length = 10
FEATURE                 Location/Qualifiers
source                  1..10
                        mol_type = other DNA
                        organism = synthetic construct
SEQUENCE: 321
tgcatcctct                                                                      10

SEQ ID NO: 322          moltype = DNA   length = 10
FEATURE                 Location/Qualifiers
source                  1..10
                        mol_type = other DNA
                        organism = synthetic construct
SEQUENCE: 322
tgcgattccg                                                                      10

SEQ ID NO: 323          moltype = DNA   length = 10
FEATURE                 Location/Qualifiers
source                  1..10
                        mol_type = other DNA
                        organism = synthetic construct
SEQUENCE: 323
ttattacgtt                                                                      10

SEQ ID NO: 324          moltype = DNA   length = 10
FEATURE                 Location/Qualifiers
source                  1..10
                        mol_type = other DNA
                        organism = synthetic construct
SEQUENCE: 324
tgatgtggtt                                                                      10
```

-continued

| | | |
|---|---|---|
| SEQ ID NO: 325<br>FEATURE<br>source | moltype = DNA length = 10<br>Location/Qualifiers<br>1..10<br>mol_type = other DNA<br>organism = synthetic construct | |
| SEQUENCE: 325<br>gggcgtcaat | | 10 |
| SEQ ID NO: 326<br>FEATURE<br>source | moltype = DNA length = 10<br>Location/Qualifiers<br>1..10<br>mol_type = other DNA<br>organism = synthetic construct | |
| SEQUENCE: 326<br>cccttgaaat | | 10 |
| SEQ ID NO: 327<br>FEATURE<br>source | moltype = DNA length = 10<br>Location/Qualifiers<br>1..10<br>mol_type = other DNA<br>organism = synthetic construct | |
| SEQUENCE: 327<br>tctttggggc | | 10 |
| SEQ ID NO: 328<br>FEATURE<br>source | moltype = DNA length = 10<br>Location/Qualifiers<br>1..10<br>mol_type = other DNA<br>organism = synthetic construct | |
| SEQUENCE: 328<br>accggcaggc | | 10 |
| SEQ ID NO: 329<br>FEATURE<br>source | moltype = DNA length = 10<br>Location/Qualifiers<br>1..10<br>mol_type = other DNA<br>organism = synthetic construct | |
| SEQUENCE: 329<br>gctaaaatct | | 10 |
| SEQ ID NO: 330<br>FEATURE<br>source | moltype = DNA length = 10<br>Location/Qualifiers<br>1..10<br>mol_type = other DNA<br>organism = synthetic construct | |
| SEQUENCE: 330<br>gccgttgacg | | 10 |
| SEQ ID NO: 331<br>FEATURE<br>source | moltype = DNA length = 10<br>Location/Qualifiers<br>1..10<br>mol_type = other DNA<br>organism = synthetic construct | |
| SEQUENCE: 331<br>ggagttgttg | | 10 |
| SEQ ID NO: 332<br>FEATURE<br>source | moltype = DNA length = 10<br>Location/Qualifiers<br>1..10<br>mol_type = other DNA<br>organism = synthetic construct | |
| SEQUENCE: 332<br>tacttgagaa | | 10 |
| SEQ ID NO: 333<br>FEATURE<br>source | moltype = DNA length = 10<br>Location/Qualifiers<br>1..10<br>mol_type = other DNA<br>organism = synthetic construct | |
| SEQUENCE: 333<br>cgggtgcgct | | 10 |
| SEQ ID NO: 334<br>FEATURE<br>source | moltype = DNA length = 10<br>Location/Qualifiers<br>1..10<br>mol_type = other DNA<br>organism = synthetic construct | |
| SEQUENCE: 334<br>aaaagcgtct | | 10 |

-continued

SEQ ID NO: 335　　moltype = DNA　length = 10
FEATURE　　　　　Location/Qualifiers
source　　　　　　1..10
　　　　　　　　　mol_type = other DNA
　　　　　　　　　organism = synthetic construct
SEQUENCE: 335
gtaaagatag　　　　　　　　　　　　　　　　　　　　　　　　　　　　　10

SEQ ID NO: 336　　moltype = DNA　length = 10
FEATURE　　　　　Location/Qualifiers
source　　　　　　1..10
　　　　　　　　　mol_type = other DNA
　　　　　　　　　organism = synthetic construct
SEQUENCE: 336
gcctggtcag　　　　　　　　　　　　　　　　　　　　　　　　　　　　　10

SEQ ID NO: 337　　moltype = DNA　length = 10
FEATURE　　　　　Location/Qualifiers
source　　　　　　1..10
　　　　　　　　　mol_type = other DNA
　　　　　　　　　organism = synthetic construct
SEQUENCE: 337
ggcaaaaagg　　　　　　　　　　　　　　　　　　　　　　　　　　　　　10

SEQ ID NO: 338　　moltype = DNA　length = 10
FEATURE　　　　　Location/Qualifiers
source　　　　　　1..10
　　　　　　　　　mol_type = other DNA
　　　　　　　　　organism = synthetic construct
SEQUENCE: 338
acccttctct　　　　　　　　　　　　　　　　　　　　　　　　　　　　　10

SEQ ID NO: 339　　moltype = DNA　length = 10
FEATURE　　　　　Location/Qualifiers
source　　　　　　1..10
　　　　　　　　　mol_type = other DNA
　　　　　　　　　organism = synthetic construct
SEQUENCE: 339
tcacatagtg　　　　　　　　　　　　　　　　　　　　　　　　　　　　　10

SEQ ID NO: 340　　moltype = DNA　length = 10
FEATURE　　　　　Location/Qualifiers
source　　　　　　1..10
　　　　　　　　　mol_type = other DNA
　　　　　　　　　organism = synthetic construct
SEQUENCE: 340
tcgtctgtgc　　　　　　　　　　　　　　　　　　　　　　　　　　　　　10

SEQ ID NO: 341　　moltype = DNA　length = 10
FEATURE　　　　　Location/Qualifiers
source　　　　　　1..10
　　　　　　　　　mol_type = other DNA
　　　　　　　　　organism = synthetic construct
SEQUENCE: 341
tgctcggatc　　　　　　　　　　　　　　　　　　　　　　　　　　　　　10

SEQ ID NO: 342　　moltype = DNA　length = 10
FEATURE　　　　　Location/Qualifiers
source　　　　　　1..10
　　　　　　　　　mol_type = other DNA
　　　　　　　　　organism = synthetic construct
SEQUENCE: 342
agcagtcccg　　　　　　　　　　　　　　　　　　　　　　　　　　　　　10

SEQ ID NO: 343　　moltype = DNA　length = 10
FEATURE　　　　　Location/Qualifiers
source　　　　　　1..10
　　　　　　　　　mol_type = other DNA
　　　　　　　　　organism = synthetic construct
SEQUENCE: 343
tttgggctgt　　　　　　　　　　　　　　　　　　　　　　　　　　　　　10

SEQ ID NO: 344　　moltype = DNA　length = 10
FEATURE　　　　　Location/Qualifiers
source　　　　　　1..10
　　　　　　　　　mol_type = other DNA
　　　　　　　　　organism = synthetic construct
SEQUENCE: 344

```
ctcacgatct                                                               10

SEQ ID NO: 345         moltype = DNA   length = 10
FEATURE                Location/Qualifiers
source                 1..10
                       mol_type = other DNA
                       organism = synthetic construct SEQUENCE: 345
tggcgcatac                                                               10

SEQ ID NO: 346         moltype = DNA   length = 10
FEATURE                Location/Qualifiers
source                 1..10
                       mol_type = other DNA
                       organism = synthetic construct SEQUENCE: 346
gcaattgaaa                                                               10

SEQ ID NO: 347         moltype = DNA   length = 10
FEATURE                Location/Qualifiers
source                 1..10
                       mol_type = other DNA
                       organism = synthetic construct SEQUENCE: 347
tcgggagacg                                                               10

SEQ ID NO: 348         moltype = DNA   length = 10
FEATURE                Location/Qualifiers
source                 1..10
                       mol_type = other DNA
                       organism = synthetic construct SEQUENCE: 348
cccggcgaaa                                                               10

SEQ ID NO: 349         moltype = DNA   length = 10
FEATURE                Location/Qualifiers
source                 1..10
                       mol_type = other DNA
                       organism = synthetic construct SEQUENCE: 349
tgatgcggaa                                                               10

SEQ ID NO: 350         moltype = DNA   length = 10
FEATURE                Location/Qualifiers
source                 1..10
                       mol_type = other DNA
                       organism = synthetic construct SEQUENCE: 350
aactgaggcg                                                               10

SEQ ID NO: 351         moltype = DNA   length = 10
FEATURE                Location/Qualifiers
source                 1..10
                       mol_type = other DNA
                       organism = synthetic construct SEQUENCE: 351
catattattt                                                               10

SEQ ID NO: 352         moltype = DNA   length = 10
FEATURE                Location/Qualifiers
source                 1..10
                       mol_type = other DNA
                       organism = synthetic construct SEQUENCE: 352
aaaagtcatt                                                               10

SEQ ID NO: 353         moltype = DNA   length = 10
FEATURE                Location/Qualifiers
source                 1..10
                       mol_type = other DNA
                       organism = synthetic construct SEQUENCE: 353
aagcggtgag                                                               10

SEQ ID NO: 354         moltype = DNA   length = 10
FEATURE                Location/Qualifiers
source                 1..10
                       mol_type = other DNA
                       organism = synthetic construct
```

| | | |
|---|---|---|
| SEQUENCE: 354 aaggtaatca | | 10 |
| SEQ ID NO: 355 FEATURE source | moltype = DNA  length = 10 Location/Qualifiers 1..10 mol_type = other DNA organism = synthetic construct | |
| SEQUENCE: 355 ctgacactta | | 10 |
| SEQ ID NO: 356 FEATURE source | moltype = DNA  length = 10 Location/Qualifiers 1..10 mol_type = other DNA organism = synthetic construct | |
| SEQUENCE: 356 ctgttttcta | | 10 |
| SEQ ID NO: 357 FEATURE source | moltype = DNA  length = 10 Location/Qualifiers 1..10 mol_type = other DNA organism = synthetic construct | |
| SEQUENCE: 357 cacatggcag | | 10 |
| SEQ ID NO: 358 FEATURE source | moltype = DNA  length = 10 Location/Qualifiers 1..10 mol_type = other DNA organism = synthetic construct | |
| SEQUENCE: 358 ttcaatccgg | | 10 |
| SEQ ID NO: 359 FEATURE source | moltype = DNA  length = 10 Location/Qualifiers 1..10 mol_type = other DNA organism = synthetic construct | |
| SEQUENCE: 359 tgtccggcat | | 10 |
| SEQ ID NO: 360 FEATURE source | moltype = DNA  length = 10 Location/Qualifiers 1..10 mol_type = other DNA organism = synthetic construct | |
| SEQUENCE: 360 tggtaccgtg | | 10 |
| SEQ ID NO: 361 FEATURE source | moltype = DNA  length = 10 Location/Qualifiers 1..10 mol_type = other DNA organism = synthetic construct | |
| SEQUENCE: 361 aagagatatt | | 10 |
| SEQ ID NO: 362 FEATURE source | moltype = DNA  length = 10 Location/Qualifiers 1..10 mol_type = other DNA organism = synthetic construct | |
| SEQUENCE: 362 gatgtactac | | 10 |
| SEQ ID NO: 363 FEATURE source | moltype = DNA  length = 10 Location/Qualifiers 1..10 mol_type = other DNA organism = synthetic construct | |
| SEQUENCE: 363 gaaatggaat | | 10 |
| SEQ ID NO: 364 FEATURE source | moltype = DNA  length = 10 Location/Qualifiers 1..10 mol_type = other DNA | |

-continued

```
SEQUENCE: 364
ttaaaatact                                                          10

SEQ ID NO: 365          moltype = DNA   length = 10
FEATURE                 Location/Qualifiers
source                  1..10
                        mol_type = other DNA
                        organism = synthetic construct
SEQUENCE: 365
tgaccggaac                                                          10

SEQ ID NO: 366          moltype = DNA   length = 10
FEATURE                 Location/Qualifiers
source                  1..10
                        mol_type = other DNA
                        organism = synthetic construct
SEQUENCE: 366
gtcgccgcaa                                                          10

SEQ ID NO: 367          moltype = DNA   length = 10
FEATURE                 Location/Qualifiers
source                  1..10
                        mol_type = other DNA
                        organism = synthetic construct
SEQUENCE: 367
taggataccg                                                          10

SEQ ID NO: 368          moltype = DNA   length = 10
FEATURE                 Location/Qualifiers
source                  1..10
                        mol_type = other DNA
                        organism = synthetic construct
SEQUENCE: 368
agtccaattg                                                          10

SEQ ID NO: 369          moltype = DNA   length = 10
FEATURE                 Location/Qualifiers
source                  1..10
                        mol_type = other DNA
                        organism = synthetic construct
SEQUENCE: 369
gggggctata                                                          10

SEQ ID NO: 370          moltype = DNA   length = 10
FEATURE                 Location/Qualifiers
source                  1..10
                        mol_type = other DNA
                        organism = synthetic construct
SEQUENCE: 370
accttcagtt                                                          10

SEQ ID NO: 371          moltype = DNA   length = 10
FEATURE                 Location/Qualifiers
source                  1..10
                        mol_type = other DNA
                        organism = synthetic construct
SEQUENCE: 371
atggcaagta                                                          10

SEQ ID NO: 372          moltype = DNA   length = 10
FEATURE                 Location/Qualifiers
source                  1..10
                        mol_type = other DNA
                        organism = synthetic construct
SEQUENCE: 372
agaatgtttt                                                          10

SEQ ID NO: 373          moltype = DNA   length = 10
FEATURE                 Location/Qualifiers
source                  1..10
                        mol_type = other DNA
                        organism = synthetic construct
SEQUENCE: 373
agttcgtttg                                                          10

SEQ ID NO: 374          moltype = DNA   length = 10
FEATURE                 Location/Qualifiers
source                  1..10
```

```
                        mol_type = other DNA
                        organism = synthetic construct
SEQUENCE: 374
cactactgac                                                                   10

SEQ ID NO: 375          moltype = DNA   length = 10
FEATURE                 Location/Qualifiers
source                  1..10
                        mol_type = other DNA
                        organism = synthetic construct
SEQUENCE: 375
gatcaagagc                                                                   10

SEQ ID NO: 376          moltype = DNA   length = 10
FEATURE                 Location/Qualifiers
source                  1..10
                        mol_type = other DNA
                        organism = synthetic construct
SEQUENCE: 376
attatcgag                                                                    10

SEQ ID NO: 377          moltype = DNA   length = 10
FEATURE                 Location/Qualifiers
source                  1..10
                        mol_type = other DNA
                        organism = synthetic construct
SEQUENCE: 377
cctttttcca                                                                   10

SEQ ID NO: 378          moltype = DNA   length = 10
FEATURE                 Location/Qualifiers
source                  1..10
                        mol_type = other DNA
                        organism = synthetic construct
SEQUENCE: 378
gcacagaggt                                                                   10

SEQ ID NO: 379          moltype = DNA   length = 10
FEATURE                 Location/Qualifiers
source                  1..10
                        mol_type = other DNA
                        organism = synthetic construct
SEQUENCE: 379
tgatctgaat                                                                   10

SEQ ID NO: 380          moltype = DNA   length = 10
FEATURE                 Location/Qualifiers
source                  1..10
                        mol_type = other DNA
                        organism = synthetic construct
SEQUENCE: 380
gttggaggga                                                                   10

SEQ ID NO: 381          moltype = DNA   length = 10
FEATURE                 Location/Qualifiers
source                  1..10
                        mol_type = other DNA
                        organism = synthetic construct
SEQUENCE: 381
ttttgaaggt                                                                   10

SEQ ID NO: 382          moltype = DNA   length = 10
FEATURE                 Location/Qualifiers
source                  1..10
                        mol_type = other DNA
                        organism = synthetic construct
SEQUENCE: 382
taagtcctaa                                                                   10

SEQ ID NO: 383          moltype = DNA   length = 10
FEATURE                 Location/Qualifiers
source                  1..10
                        mol_type = other DNA
                        organism = synthetic construct
SEQUENCE: 383
ggtgttaggg                                                                   10

SEQ ID NO: 384          moltype = DNA   length = 10
FEATURE                 Location/Qualifiers
```

```
source                  1..10
                        mol_type = other DNA
                        organism = synthetic construct
SEQUENCE: 384
tgtatgcacc                                                                      10

SEQ ID NO: 385          moltype = DNA   length = 10
FEATURE                 Location/Qualifiers
source                  1..10
                        mol_type = other DNA
                        organism = synthetic construct
SEQUENCE: 385
ccgtgccatt                                                                      10

SEQ ID NO: 386          moltype = DNA   length = 10
FEATURE                 Location/Qualifiers
source                  1..10
                        mol_type = other DNA
                        organism = synthetic construct
SEQUENCE: 386
gaaatcaccc                                                                      10

SEQ ID NO: 387          moltype = DNA   length = 10
FEATURE                 Location/Qualifiers
source                  1..10
                        mol_type = other DNA
                        organism = synthetic construct
SEQUENCE: 387
tttgcacgtg                                                                      10

SEQ ID NO: 388          moltype = DNA   length = 10
FEATURE                 Location/Qualifiers
source                  1..10
                        mol_type = other DNA
                        organism = synthetic construct
SEQUENCE: 388
cgtctgtttt                                                                      10

SEQ ID NO: 389          moltype = DNA   length = 10
FEATURE                 Location/Qualifiers
source                  1..10
                        mol_type = other DNA
                        organism = synthetic construct
SEQUENCE: 389
ctacaccaca                                                                      10

SEQ ID NO: 390          moltype = DNA   length = 10
FEATURE                 Location/Qualifiers
source                  1..10
                        mol_type = other DNA
                        organism = synthetic construct
SEQUENCE: 390
tgctacaggg                                                                      10

SEQ ID NO: 391          moltype = DNA   length = 10
FEATURE                 Location/Qualifiers
source                  1..10
                        mol_type = other DNA
                        organism = synthetic construct
SEQUENCE: 391
gggaatatat                                                                      10

SEQ ID NO: 392          moltype = DNA   length = 10
FEATURE                 Location/Qualifiers
source                  1..10
                        mol_type = other DNA
                        organism = synthetic construct
SEQUENCE: 392
tcatgtattt                                                                      10

SEQ ID NO: 393          moltype = DNA   length = 10
FEATURE                 Location/Qualifiers
source                  1..10
                        mol_type = other DNA
                        organism = synthetic construct
SEQUENCE: 393
tctccgttta                                                                      10

SEQ ID NO: 394          moltype = DNA   length = 10
```

```
FEATURE                 Location/Qualifiers
source                  1..10
                        mol_type = other DNA
                        organism = synthetic construct
SEQUENCE: 394
tacctctcgc                                                                      10

SEQ ID NO: 395          moltype = DNA   length = 10
FEATURE                 Location/Qualifiers
source                  1..10
                        mol_type = other DNA
                        organism = synthetic construct
SEQUENCE: 395
gcttcaaccg                                                                      10

SEQ ID NO: 396          moltype = DNA   length = 10
FEATURE                 Location/Qualifiers
source                  1..10
                        mol_type = other DNA
                        organism = synthetic construct
SEQUENCE: 396
atgaagctac                                                                      10

SEQ ID NO: 397          moltype = DNA   length = 10
FEATURE                 Location/Qualifiers
source                  1..10
                        mol_type = other DNA
                        organism = synthetic construct
SEQUENCE: 397
cggtacaact                                                                      10

SEQ ID NO: 398          moltype = DNA   length = 10
FEATURE                 Location/Qualifiers
source                  1..10
                        mol_type = other DNA
                        organism = synthetic construct
SEQUENCE: 398
gtgtggtcgt                                                                      10

SEQ ID NO: 399          moltype = DNA   length = 10
FEATURE                 Location/Qualifiers
source                  1..10
                        mol_type = other DNA
                        organism = synthetic construct
SEQUENCE: 399
ggggtcatgt                                                                      10

SEQ ID NO: 400          moltype = DNA   length = 10
FEATURE                 Location/Qualifiers
source                  1..10
                        mol_type = other DNA
                        organism = synthetic construct
SEQUENCE: 400
aggcagccca                                                                      10

SEQ ID NO: 401          moltype = DNA   length = 10
FEATURE                 Location/Qualifiers
source                  1..10
                        mol_type = other DNA
                        organism = synthetic construct
SEQUENCE: 401
caagcacgat                                                                      10

SEQ ID NO: 402          moltype = DNA   length = 10
FEATURE                 Location/Qualifiers
source                  1..10
                        mol_type = other DNA
                        organism = synthetic construct
SEQUENCE: 402
tcaaatggat                                                                      10

SEQ ID NO: 403          moltype = DNA   length = 10
FEATURE                 Location/Qualifiers
source                  1..10
                        mol_type = other DNA
                        organism = synthetic construct
SEQUENCE: 403
ggactgaata                                                                      10
```

```
SEQ ID NO: 404          moltype = DNA   length = 10
FEATURE                 Location/Qualifiers
source                  1..10
                        mol_type = other DNA
                        organism = synthetic construct
SEQUENCE: 404
ccgtagacgt                                                                 10

SEQ ID NO: 405          moltype = DNA   length = 10
FEATURE                 Location/Qualifiers
source                  1..10
                        mol_type = other DNA
                        organism = synthetic construct
SEQUENCE: 405
cggcgtaccg                                                                 10

SEQ ID NO: 406          moltype = DNA   length = 10
FEATURE                 Location/Qualifiers
source                  1..10
                        mol_type = other DNA
                        organism = synthetic construct
SEQUENCE: 406
ggcggcgccc                                                                 10

SEQ ID NO: 407          moltype = DNA   length = 10
FEATURE                 Location/Qualifiers
source                  1..10
                        mol_type = other DNA
                        organism = synthetic construct
SEQUENCE: 407
agacttgatc                                                                 10

SEQ ID NO: 408          moltype = DNA   length = 10
FEATURE                 Location/Qualifiers
source                  1..10
                        mol_type = other DNA
                        organism = synthetic construct
SEQUENCE: 408
accttgcaca                                                                 10

SEQ ID NO: 409          moltype = DNA   length = 10
FEATURE                 Location/Qualifiers
source                  1..10
                        mol_type = other DNA
                        organism = synthetic construct
SEQUENCE: 409
taaggtgagt                                                                 10

SEQ ID NO: 410          moltype = DNA   length = 10
FEATURE                 Location/Qualifiers
source                  1..10
                        mol_type = other DNA
                        organism = synthetic construct
SEQUENCE: 410
ttgttgtttc                                                                 10

SEQ ID NO: 411          moltype = DNA   length = 10
FEATURE                 Location/Qualifiers
source                  1..10
                        mol_type = other DNA
                        organism = synthetic construct
SEQUENCE: 411
gagggaatac                                                                 10

SEQ ID NO: 412          moltype = DNA   length = 10
FEATURE                 Location/Qualifiers
source                  1..10
                        mol_type = other DNA
                        organism = synthetic construct
SEQUENCE: 412
ctcgtacgcg                                                                 10

SEQ ID NO: 413          moltype = DNA   length = 10
FEATURE                 Location/Qualifiers
source                  1..10
                        mol_type = other DNA
                        organism = synthetic construct
SEQUENCE: 413
ccgcggttta                                                                 10
```

| | | |
|---|---|---|
| SEQ ID NO: 414<br>FEATURE<br>source | moltype = DNA   length = 10<br>Location/Qualifiers<br>1..10<br>mol_type = other DNA<br>organism = synthetic construct | |
| SEQUENCE: 414<br>ttaaagttaa | | 10 |
| SEQ ID NO: 415<br>FEATURE<br>source | moltype = DNA   length = 10<br>Location/Qualifiers<br>1..10<br>mol_type = other DNA<br>organism = synthetic construct | |
| SEQUENCE: 415<br>gcatatgggt | | 10 |
| SEQ ID NO: 416<br>FEATURE<br>source | moltype = DNA   length = 10<br>Location/Qualifiers<br>1..10<br>mol_type = other DNA<br>organism = synthetic construct | |
| SEQUENCE: 416<br>agtctgagcc | | 10 |
| SEQ ID NO: 417<br>FEATURE<br>source | moltype = DNA   length = 10<br>Location/Qualifiers<br>1..10<br>mol_type = other DNA<br>organism = synthetic construct | |
| SEQUENCE: 417<br>tgtcggttcg | | 10 |
| SEQ ID NO: 418<br>FEATURE<br>source | moltype = DNA   length = 10<br>Location/Qualifiers<br>1..10<br>mol_type = other DNA<br>organism = synthetic construct | |
| SEQUENCE: 418<br>ggtctcaacc | | 10 |
| SEQ ID NO: 419<br>FEATURE<br>source | moltype = DNA   length = 10<br>Location/Qualifiers<br>1..10<br>mol_type = other DNA<br>organism = synthetic construct | |
| SEQUENCE: 419<br>gtaacggcat | | 10 |
| SEQ ID NO: 420<br>FEATURE<br>source | moltype = DNA   length = 10<br>Location/Qualifiers<br>1..10<br>mol_type = other DNA<br>organism = synthetic construct | |
| SEQUENCE: 420<br>acactgagaa | | 10 |
| SEQ ID NO: 421<br>FEATURE<br>source | moltype = DNA   length = 10<br>Location/Qualifiers<br>1..10<br>mol_type = other DNA<br>organism = synthetic construct | |
| SEQUENCE: 421<br>cccaacgtcg | | 10 |
| SEQ ID NO: 422<br>FEATURE<br>source | moltype = DNA   length = 10<br>Location/Qualifiers<br>1..10<br>mol_type = other DNA<br>organism = synthetic construct | |
| SEQUENCE: 422<br>aagaaactgc | | 10 |
| SEQ ID NO: 423<br>FEATURE<br>source | moltype = DNA   length = 10<br>Location/Qualifiers<br>1..10<br>mol_type = other DNA<br>organism = synthetic construct | |
| SEQUENCE: 423 | | |

-continued

```
accagcccac                                                           10

SEQ ID NO: 424          moltype = DNA   length = 10
FEATURE                 Location/Qualifiers
source                  1..10
                        mol_type = other DNA
                        organism = synthetic construct SEQUENCE: 424
tgtagttact                                                           10

SEQ ID NO: 425          moltype = DNA   length = 10
FEATURE                 Location/Qualifiers
source                  1..10
                        mol_type = other DNA
                        organism = synthetic construct SEQUENCE: 425
ggctagaggc                                                           10

SEQ ID NO: 426          moltype = DNA   length = 10
FEATURE                 Location/Qualifiers
source                  1..10
                        mol_type = other DNA
                        organism = synthetic construct SEQUENCE: 426
gttcggcaga                                                           10

SEQ ID NO: 427          moltype = DNA   length = 10
FEATURE                 Location/Qualifiers
source                  1..10
                        mol_type = other DNA
                        organism = synthetic construct SEQUENCE: 427
ccaaaataga                                                           10

SEQ ID NO: 428          moltype = DNA   length = 10
FEATURE                 Location/Qualifiers
source                  1..10
                        mol_type = other DNA
                        organism = synthetic construct SEQUENCE: 428
cccatataac                                                           10

SEQ ID NO: 429          moltype = DNA   length = 10
FEATURE                 Location/Qualifiers
source                  1..10
                        mol_type = other DNA
                        organism = synthetic construct SEQUENCE: 429
gtcactaccg                                                           10

SEQ ID NO: 430          moltype = DNA   length = 10
FEATURE                 Location/Qualifiers
source                  1..10
                        mol_type = other DNA
                        organism = synthetic construct SEQUENCE: 430
gtagtgtggc                                                           10

SEQ ID NO: 431          moltype = DNA   length = 10
FEATURE                 Location/Qualifiers
source                  1..10
                        mol_type = other DNA
                        organism = synthetic construct SEQUENCE: 431
caatctcata                                                           10

SEQ ID NO: 432          moltype = DNA   length = 10
FEATURE                 Location/Qualifiers
source                  1..10
                        mol_type = other DNA
                        organism = synthetic construct SEQUENCE: 432
ccatgttata                                                           10

SEQ ID NO: 433          moltype = DNA   length = 10
FEATURE                 Location/Qualifiers
source                  1..10
                        mol_type = other DNA
                        organism = synthetic construct
```

```
SEQUENCE: 433
taagcagtgg                                                                      10

SEQ ID NO: 434         moltype = DNA  length = 10
FEATURE                Location/Qualifiers
source                 1..10
                       mol_type = other DNA
                       organism = synthetic construct
SEQUENCE: 434
tcggcggcta                                                                      10

SEQ ID NO: 435         moltype = DNA  length = 10
FEATURE                Location/Qualifiers
source                 1..10
                       mol_type = other DNA
                       organism = synthetic construct
SEQUENCE: 435
tattaaatgc                                                                      10

SEQ ID NO: 436         moltype = DNA  length = 10
FEATURE                Location/Qualifiers
source                 1..10
                       mol_type = other DNA
                       organism = synthetic construct
SEQUENCE: 436
gtcgccatta                                                                      10

SEQ ID NO: 437         moltype = DNA  length = 10
FEATURE                Location/Qualifiers
source                 1..10
                       mol_type = other DNA
                       organism = synthetic construct
SEQUENCE: 437
ggcgtcgttc                                                                      10

SEQ ID NO: 438         moltype = DNA  length = 10
FEATURE                Location/Qualifiers
source                 1..10
                       mol_type = other DNA
                       organism = synthetic construct
SEQUENCE: 438
ctagtagata                                                                      10

SEQ ID NO: 439         moltype = DNA  length = 10
FEATURE                Location/Qualifiers
source                 1..10
                       mol_type = other DNA
                       organism = synthetic construct
SEQUENCE: 439
tcgtcagtat                                                                      10

SEQ ID NO: 440         moltype = DNA  length = 10
FEATURE                Location/Qualifiers
source                 1..10
                       mol_type = other DNA
                       organism = synthetic construct
SEQUENCE: 440
ggggtatcgg                                                                      10

SEQ ID NO: 441         moltype = DNA  length = 10
FEATURE                Location/Qualifiers
source                 1..10
                       mol_type = other DNA
                       organism = synthetic construct
SEQUENCE: 441
tgctctgcca                                                                      10

SEQ ID NO: 442         moltype = DNA  length = 10
FEATURE                Location/Qualifiers
source                 1..10
                       mol_type = other DNA
                       organism = synthetic construct
SEQUENCE: 442
tgccgtaact                                                                      10

SEQ ID NO: 443         moltype = DNA  length = 10
FEATURE                Location/Qualifiers
source                 1..10
                       mol_type = other DNA
```

```
                                -continued

SEQUENCE: 443
cggtacaggc                                                              10

SEQ ID NO: 444          moltype = DNA   length = 10
FEATURE                 Location/Qualifiers
source                  1..10
                        mol_type = other DNA
                        organism = synthetic construct SEQUENCE: 444
tcctaatttg                                                              10

SEQ ID NO: 445          moltype = DNA   length = 10
FEATURE                 Location/Qualifiers
source                  1..10
                        mol_type = other DNA
                        organism = synthetic construct SEQUENCE: 445
tctttctgga                                                              10

SEQ ID NO: 446          moltype = DNA   length = 10
FEATURE                 Location/Qualifiers
source                  1..10
                        mol_type = other DNA
                        organism = synthetic construct SEQUENCE: 446
ccgcgacttg                                                              10

SEQ ID NO: 447          moltype = DNA   length = 10
FEATURE                 Location/Qualifiers
source                  1..10
                        mol_type = other DNA
                        organism = synthetic construct SEQUENCE: 447
acctatagcg                                                              10

SEQ ID NO: 448          moltype = DNA   length = 10
FEATURE                 Location/Qualifiers
source                  1..10
                        mol_type = other DNA
                        organism = synthetic construct SEQUENCE: 448
gccggcacct                                                              10

SEQ ID NO: 449          moltype = DNA   length = 10
FEATURE                 Location/Qualifiers
source                  1..10
                        mol_type = other DNA
                        organism = synthetic construct SEQUENCE: 449
tttgataggc                                                              10

SEQ ID NO: 450          moltype = DNA   length = 10
FEATURE                 Location/Qualifiers
source                  1..10
                        mol_type = other DNA
                        organism = synthetic construct SEQUENCE: 450
actgtgagct                                                              10

SEQ ID NO: 451          moltype = DNA   length = 10
FEATURE                 Location/Qualifiers
source                  1..10
                        mol_type = other DNA
                        organism = synthetic construct SEQUENCE: 451
ttatcgttca                                                              10

SEQ ID NO: 452          moltype = DNA   length = 10
FEATURE                 Location/Qualifiers
source                  1..10
                        mol_type = other DNA
                        organism = synthetic construct SEQUENCE: 452
actagtggcc                                                              10

SEQ ID NO: 453          moltype = DNA   length = 10
FEATURE                 Location/Qualifiers
source                  1..10
```

```
SEQUENCE: 453
cctccgtggt                                                                     10

SEQ ID NO: 454         moltype = DNA   length = 10
FEATURE                Location/Qualifiers
source                 1..10
                       mol_type = other DNA
                       organism = synthetic construct
SEQUENCE: 454
ttagggtatg                                                                     10

SEQ ID NO: 455         moltype = DNA   length = 10
FEATURE                Location/Qualifiers
source                 1..10
                       mol_type = other DNA
                       organism = synthetic construct
SEQUENCE: 455
gaatcaggcg                                                                     10

SEQ ID NO: 456         moltype = DNA   length = 10
FEATURE                Location/Qualifiers
source                 1..10
                       mol_type = other DNA
                       organism = synthetic construct
SEQUENCE: 456
ggctgaccaa                                                                     10

SEQ ID NO: 457         moltype = DNA   length = 10
FEATURE                Location/Qualifiers
source                 1..10
                       mol_type = other DNA
                       organism = synthetic construct
SEQUENCE: 457
tgccagaccg                                                                     10

SEQ ID NO: 458         moltype = DNA   length = 10
FEATURE                Location/Qualifiers
source                 1..10
                       mol_type = other DNA
                       organism = synthetic construct
SEQUENCE: 458
tccctacgcg                                                                     10

SEQ ID NO: 459         moltype = DNA   length = 10
FEATURE                Location/Qualifiers
source                 1..10
                       mol_type = other DNA
                       organism = synthetic construct
SEQUENCE: 459
tccgctggag                                                                     10

SEQ ID NO: 460         moltype = DNA   length = 10
FEATURE                Location/Qualifiers
source                 1..10
                       mol_type = other DNA
                       organism = synthetic construct
SEQUENCE: 460
ggatcaaaac                                                                     10

SEQ ID NO: 461         moltype = DNA   length = 10
FEATURE                Location/Qualifiers
source                 1..10
                       mol_type = other DNA
                       organism = synthetic construct
SEQUENCE: 461
ttcacctcac                                                                     10

SEQ ID NO: 462         moltype = DNA   length = 10
FEATURE                Location/Qualifiers
source                 1..10
                       mol_type = other DNA
                       organism = synthetic construct
SEQUENCE: 462
gacacacggc                                                                     10

SEQ ID NO: 463         moltype = DNA   length = 10
FEATURE                Location/Qualifiers
```

```
source                          1..10
                                mol_type = other DNA
                                organism = synthetic construct
SEQUENCE: 463
tgggcgatta                                                                      10

SEQ ID NO: 464                  moltype = DNA   length = 10
FEATURE                         Location/Qualifiers
source                          1..10
                                mol_type = other DNA
                                organism = synthetic construct
SEQUENCE: 464
taagatcttc                                                                      10

SEQ ID NO: 465                  moltype = DNA   length = 10
FEATURE                         Location/Qualifiers
source                          1..10
                                mol_type = other DNA
                                organism = synthetic construct
SEQUENCE: 465
ctccgactac                                                                      10

SEQ ID NO: 466                  moltype = DNA   length = 10
FEATURE                         Location/Qualifiers
source                          1..10
                                mol_type = other DNA
                                organism = synthetic construct
SEQUENCE: 466
gggccatcat                                                                      10

SEQ ID NO: 467                  moltype = DNA   length = 10
FEATURE                         Location/Qualifiers
source                          1..10
                                mol_type = other DNA
                                organism = synthetic construct
SEQUENCE: 467
tcaggccaga                                                                      10

SEQ ID NO: 468                  moltype = DNA   length = 10
FEATURE                         Location/Qualifiers
source                          1..10
                                mol_type = other DNA
                                organism = synthetic construct
SEQUENCE: 468
cttgtggggc                                                                      10

SEQ ID NO: 469                  moltype = DNA   length = 10
FEATURE                         Location/Qualifiers
source                          1..10
                                mol_type = other DNA
                                organism = synthetic construct
SEQUENCE: 469
agatagtctg                                                                      10

SEQ ID NO: 470                  moltype = DNA   length = 10
FEATURE                         Location/Qualifiers
source                          1..10
                                mol_type = other DNA
                                organism = synthetic construct
SEQUENCE: 470
gcgtcaaagt                                                                      10

SEQ ID NO: 471                  moltype = DNA   length = 10
FEATURE                         Location/Qualifiers
source                          1..10
                                mol_type = other DNA
                                organism = synthetic construct
SEQUENCE: 471
acgaaaattt                                                                      10

SEQ ID NO: 472                  moltype = DNA   length = 10
FEATURE                         Location/Qualifiers
source                          1..10
                                mol_type = other DNA
                                organism = synthetic construct
SEQUENCE: 472
gagtctggtg                                                                      10

SEQ ID NO: 473                  moltype = DNA   length = 10
```

```
FEATURE            Location/Qualifiers
source             1..10
                   mol_type = other DNA
                   organism = synthetic construct
SEQUENCE: 473
atcgagcgac                                                              10

SEQ ID NO: 474     moltype = DNA   length = 10
FEATURE            Location/Qualifiers
source             1..10
                   mol_type = other DNA
                   organism = synthetic construct
SEQUENCE: 474
ggtcctcaga                                                              10

SEQ ID NO: 475     moltype = DNA   length = 10
FEATURE            Location/Qualifiers
source             1..10
                   mol_type = other DNA
                   organism = synthetic construct
SEQUENCE: 475
tgattttgtc                                                              10

SEQ ID NO: 476     moltype = DNA   length = 10
FEATURE            Location/Qualifiers
source             1..10
                   mol_type = other DNA
                   organism = synthetic construct
SEQUENCE: 476
gcatttctca                                                              10

SEQ ID NO: 477     moltype = DNA   length = 10
FEATURE            Location/Qualifiers
source             1..10
                   mol_type = other DNA
                   organism = synthetic construct
SEQUENCE: 477
gcatgccagt                                                              10

SEQ ID NO: 478     moltype = DNA   length = 10
FEATURE            Location/Qualifiers
source             1..10
                   mol_type = other DNA
                   organism = synthetic construct
SEQUENCE: 478
attagacgac                                                              10

SEQ ID NO: 479     moltype = DNA   length = 10
FEATURE            Location/Qualifiers
source             1..10
                   mol_type = other DNA
                   organism = synthetic construct
SEQUENCE: 479
aaagcccata                                                              10

SEQ ID NO: 480     moltype = DNA   length = 10
FEATURE            Location/Qualifiers
source             1..10
                   mol_type = other DNA
                   organism = synthetic construct
SEQUENCE: 480
cactacattc                                                              10

SEQ ID NO: 481     moltype = DNA   length = 10
FEATURE            Location/Qualifiers
source             1..10
                   mol_type = other DNA
                   organism = synthetic construct
SEQUENCE: 481
cacggtttct                                                              10

SEQ ID NO: 482     moltype = DNA   length = 10
FEATURE            Location/Qualifiers
source             1..10
                   mol_type = other DNA
                   organism = synthetic construct
SEQUENCE: 482
cccaccagtg                                                              10
```

```
SEQ ID NO: 483         moltype = DNA   length = 10
FEATURE                Location/Qualifiers
source                 1..10
                       mol_type = other DNA
                       organism = synthetic construct
SEQUENCE: 483
ctcacttgtc                                                            10

SEQ ID NO: 484         moltype = DNA   length = 10
FEATURE                Location/Qualifiers
source                 1..10
                       mol_type = other DNA
                       organism = synthetic construct
SEQUENCE: 484
gatagactct                                                            10

SEQ ID NO: 485         moltype = DNA   length = 10
FEATURE                Location/Qualifiers
source                 1..10
                       mol_type = other DNA
                       organism = synthetic construct
SEQUENCE: 485
atttccattt                                                            10

SEQ ID NO: 486         moltype = DNA   length = 10
FEATURE                Location/Qualifiers
source                 1..10
                       mol_type = other DNA
                       organism = synthetic construct
SEQUENCE: 486
atatgtggcc                                                            10

SEQ ID NO: 487         moltype = DNA   length = 10
FEATURE                Location/Qualifiers
source                 1..10
                       mol_type = other DNA
                       organism = synthetic construct
SEQUENCE: 487
cgggacgaac                                                            10

SEQ ID NO: 488         moltype = DNA   length = 10
FEATURE                Location/Qualifiers
source                 1..10
                       mol_type = other DNA
                       organism = synthetic construct
SEQUENCE: 488
agaaccgtga                                                            10

SEQ ID NO: 489         moltype = DNA   length = 10
FEATURE                Location/Qualifiers
source                 1..10
                       mol_type = other DNA
                       organism = synthetic construct
SEQUENCE: 489
tagtgtactg                                                            10

SEQ ID NO: 490         moltype = DNA   length = 10
FEATURE                Location/Qualifiers
source                 1..10
                       mol_type = other DNA
                       organism = synthetic construct
SEQUENCE: 490
aactaatcga                                                            10

SEQ ID NO: 491         moltype = DNA   length = 10
FEATURE                Location/Qualifiers
source                 1..10
                       mol_type = other DNA
                       organism = synthetic construct
SEQUENCE: 491
cgaagtgacg                                                            10

SEQ ID NO: 492         moltype = DNA   length = 10
FEATURE                Location/Qualifiers
source                 1..10
                       mol_type = other DNA
                       organism = synthetic construct
SEQUENCE: 492
cggagcctcg                                                            10
```

SEQ ID NO: 493          moltype = DNA   length = 10
FEATURE                 Location/Qualifiers
source                  1..10
                        mol_type = other DNA
                        organism = synthetic construct
SEQUENCE: 493
atcacacgag                                                                  10

SEQ ID NO: 494          moltype = DNA   length = 10
FEATURE                 Location/Qualifiers
source                  1..10
                        mol_type = other DNA
                        organism = synthetic construct
SEQUENCE: 494
cgacgagttc                                                                  10

SEQ ID NO: 495          moltype = DNA   length = 10
FEATURE                 Location/Qualifiers
source                  1..10
                        mol_type = other DNA
                        organism = synthetic construct
SEQUENCE: 495
gcttcccgtg                                                                  10

SEQ ID NO: 496          moltype = DNA   length = 10
FEATURE                 Location/Qualifiers
source                  1..10
                        mol_type = other DNA
                        organism = synthetic construct
SEQUENCE: 496
gattcatacc                                                                  10

SEQ ID NO: 497          moltype = DNA   length = 10
FEATURE                 Location/Qualifiers
source                  1..10
                        mol_type = other DNA
                        organism = synthetic construct
SEQUENCE: 497
gagagaagcg                                                                  10

SEQ ID NO: 498          moltype = DNA   length = 10
FEATURE                 Location/Qualifiers
source                  1..10
                        mol_type = other DNA
                        organism = synthetic construct
SEQUENCE: 498
gaagtggcct                                                                  10

SEQ ID NO: 499          moltype = DNA   length = 10
FEATURE                 Location/Qualifiers
source                  1..10
                        mol_type = other DNA
                        organism = synthetic construct
SEQUENCE: 499
ggacgacgcc                                                                  10

SEQ ID NO: 500          moltype = DNA   length = 10
FEATURE                 Location/Qualifiers
source                  1..10
                        mol_type = other DNA
                        organism = synthetic construct
SEQUENCE: 500
tagggtctca                                                                  10

SEQ ID NO: 501          moltype = DNA   length = 10
FEATURE                 Location/Qualifiers
source                  1..10
                        mol_type = other DNA
                        organism = synthetic construct
SEQUENCE: 501
aactacaggt                                                                  10

SEQ ID NO: 502          moltype = DNA   length = 10
FEATURE                 Location/Qualifiers
source                  1..10
                        mol_type = other DNA
                        organism = synthetic construct
SEQUENCE: 502 gtggcctgtg                                                                              10

SEQ ID NO: 503        moltype = DNA  length = 10
FEATURE               Location/Qualifiers
source                1..10
                      mol_type = other DNA
                      organism = synthetic construct SEQUENCE: 503
ctttaccagc                                                                              10

SEQ ID NO: 504        moltype = DNA  length = 10
FEATURE               Location/Qualifiers
source                1..10
                      mol_type = other DNA
                      organism = synthetic construct SEQUENCE: 504
cgcgttactg                                                                              10

SEQ ID NO: 505        moltype = DNA  length = 10
FEATURE               Location/Qualifiers
source                1..10
                      mol_type = other DNA
                      organism = synthetic construct SEQUENCE: 505
ttgctcccgt                                                                              10

SEQ ID NO: 506        moltype = DNA  length = 10
FEATURE               Location/Qualifiers
source                1..10
                      mol_type = other DNA
                      organism = synthetic construct SEQUENCE: 506
catcaaacaa                                                                              10

SEQ ID NO: 507        moltype = DNA  length = 10
FEATURE               Location/Qualifiers
source                1..10
                      mol_type = other DNA
                      organism = synthetic construct SEQUENCE: 507
gctttatgat                                                                              10

SEQ ID NO: 508        moltype = DNA  length = 10
FEATURE               Location/Qualifiers
source                1..10
                      mol_type = other DNA
                      organism = synthetic construct SEQUENCE: 508
ctgcatactg                                                                              10

SEQ ID NO: 509        moltype = DNA  length = 10
FEATURE               Location/Qualifiers
source                1..10
                      mol_type = other DNA
                      organism = synthetic construct SEQUENCE: 509
ggtggctcag                                                                              10

SEQ ID NO: 510        moltype = DNA  length = 10
FEATURE               Location/Qualifiers
source                1..10
                      mol_type = other DNA
                      organism = synthetic construct SEQUENCE: 510
ggacgatcaa                                                                              10

SEQ ID NO: 511        moltype = DNA  length = 10
FEATURE               Location/Qualifiers
source                1..10
                      mol_type = other DNA
                      organism = synthetic construct SEQUENCE: 511
ccgactggtg                                                                              10

SEQ ID NO: 512        moltype = DNA  length = 10
FEATURE               Location/Qualifiers
source                1..10
                      mol_type = other DNA
                      organism = synthetic construct

```
SEQUENCE: 512
ggaacaaccg                                                                               10

SEQ ID NO: 513          moltype = DNA  length = 10
FEATURE                 Location/Qualifiers
source                  1..10
                        mol_type = other DNA
                        organism = synthetic construct SEQUENCE: 513
gaacgagacc                                                                               10

SEQ ID NO: 514          moltype = DNA  length = 10
FEATURE                 Location/Qualifiers
source                  1..10
                        mol_type = other DNA
                        organism = synthetic construct SEQUENCE: 514
caccaagaaa                                                                               10

SEQ ID NO: 515          moltype = DNA  length = 10
FEATURE                 Location/Qualifiers
source                  1..10
                        mol_type = other DNA
                        organism = synthetic construct SEQUENCE: 515
atgcattacc                                                                               10

SEQ ID NO: 516          moltype = DNA  length = 10
FEATURE                 Location/Qualifiers
source                  1..10
                        mol_type = other DNA
                        organism = synthetic construct SEQUENCE: 516
gtatcatgcc                                                                               10

SEQ ID NO: 517          moltype = DNA  length = 10
FEATURE                 Location/Qualifiers
source                  1..10
                        mol_type = other DNA
                        organism = synthetic construct SEQUENCE: 517
agtagatgtt                                                                               10

SEQ ID NO: 518          moltype = DNA  length = 10
FEATURE                 Location/Qualifiers
source                  1..10
                        mol_type = other DNA
                        organism = synthetic construct SEQUENCE: 518
ctctagatgt                                                                               10

SEQ ID NO: 519          moltype = DNA  length = 10
FEATURE                 Location/Qualifiers
source                  1..10
                        mol_type = other DNA
                        organism = synthetic construct SEQUENCE: 519
gctacttgtg                                                                               10

SEQ ID NO: 520          moltype = DNA  length = 10
FEATURE                 Location/Qualifiers
source                  1..10
                        mol_type = other DNA
                        organism = synthetic construct SEQUENCE: 520
tatgaaacgt                                                                               10

SEQ ID NO: 521          moltype = DNA  length = 10
FEATURE                 Location/Qualifiers
source                  1..10
                        mol_type = other DNA
                        organism = synthetic construct SEQUENCE: 521
cctcgttgat                                                                               10

SEQ ID NO: 522          moltype = DNA  length = 10
FEATURE                 Location/Qualifiers
source                  1..10
                        mol_type = other DNA
```

-continued

```
SEQUENCE: 522
ctagagccat                                                               10

SEQ ID NO: 523          moltype = DNA  length = 10
FEATURE                 Location/Qualifiers
source                  1..10
                        mol_type = other DNA
                        organism = synthetic construct
SEQUENCE: 523
tagagttata                                                               10

SEQ ID NO: 524          moltype = DNA  length = 10
FEATURE                 Location/Qualifiers
source                  1..10
                        mol_type = other DNA
                        organism = synthetic construct
SEQUENCE: 524
aacgagaggc                                                               10

SEQ ID NO: 525          moltype = DNA  length = 10
FEATURE                 Location/Qualifiers
source                  1..10
                        mol_type = other DNA
                        organism = synthetic construct
SEQUENCE: 525
ggtctaccgt                                                               10

SEQ ID NO: 526          moltype = DNA  length = 10
FEATURE                 Location/Qualifiers
source                  1..10
                        mol_type = other DNA
                        organism = synthetic construct
SEQUENCE: 526
gcccCCtcac                                                               10

SEQ ID NO: 527          moltype = DNA  length = 10
FEATURE                 Location/Qualifiers
source                  1..10
                        mol_type = other DNA
                        organism = synthetic construct
SEQUENCE: 527
cataggaatt                                                               10

SEQ ID NO: 528          moltype = DNA  length = 10
FEATURE                 Location/Qualifiers
source                  1..10
                        mol_type = other DNA
                        organism = synthetic construct
SEQUENCE: 528
tccggctcgt                                                               10

SEQ ID NO: 529          moltype = DNA  length = 10
FEATURE                 Location/Qualifiers
source                  1..10
                        mol_type = other DNA
                        organism = synthetic construct
SEQUENCE: 529
tgagagtcgg                                                               10

SEQ ID NO: 530          moltype = DNA  length = 10
FEATURE                 Location/Qualifiers
source                  1..10
                        mol_type = other DNA
                        organism = synthetic construct
SEQUENCE: 530
cgtagaaata                                                               10

SEQ ID NO: 531          moltype = DNA  length = 10
FEATURE                 Location/Qualifiers
source                  1..10
                        mol_type = other DNA
                        organism = synthetic construct
SEQUENCE: 531
ctttacatga                                                               10

SEQ ID NO: 532          moltype = DNA  length = 10
FEATURE                 Location/Qualifiers
source                  1..10
```

```
                        mol_type = other DNA
                        organism = synthetic construct
SEQUENCE: 532
gagcgccgtc                                                                    10

SEQ ID NO: 533          moltype = DNA   length = 10
FEATURE                 Location/Qualifiers
source                  1..10
                        mol_type = other DNA
                        organism = synthetic construct
SEQUENCE: 533
ggctctcggc                                                                    10

SEQ ID NO: 534          moltype = DNA   length = 10
FEATURE                 Location/Qualifiers
source                  1..10
                        mol_type = other DNA
                        organism = synthetic construct
SEQUENCE: 534
agagcttgtt                                                                    10

SEQ ID NO: 535          moltype = DNA   length = 10
FEATURE                 Location/Qualifiers
source                  1..10
                        mol_type = other DNA
                        organism = synthetic construct
SEQUENCE: 535
aatcagccac                                                                    10

SEQ ID NO: 536          moltype = DNA   length = 10
FEATURE                 Location/Qualifiers
source                  1..10
                        mol_type = other DNA
                        organism = synthetic construct
SEQUENCE: 536
agaagagcca                                                                    10

SEQ ID NO: 537          moltype = DNA   length = 10
FEATURE                 Location/Qualifiers
source                  1..10
                        mol_type = other DNA
                        organism = synthetic construct
SEQUENCE: 537
tcgtatgagt                                                                    10

SEQ ID NO: 538          moltype = DNA   length = 10
FEATURE                 Location/Qualifiers
source                  1..10
                        mol_type = other DNA
                        organism = synthetic construct
SEQUENCE: 538
ttcttcctcg                                                                    10

SEQ ID NO: 539          moltype = DNA   length = 10
FEATURE                 Location/Qualifiers
source                  1..10
                        mol_type = other DNA
                        organism = synthetic construct
SEQUENCE: 539
acacaaaagc                                                                    10

SEQ ID NO: 540          moltype = DNA   length = 10
FEATURE                 Location/Qualifiers
source                  1..10
                        mol_type = other DNA
                        organism = synthetic construct
SEQUENCE: 540
cgcgggaccc                                                                    10

SEQ ID NO: 541          moltype = DNA   length = 10
FEATURE                 Location/Qualifiers
source                  1..10
                        mol_type = other DNA
                        organism = synthetic construct
SEQUENCE: 541
gtcgcgacac                                                                    10

SEQ ID NO: 542          moltype = DNA   length = 10
FEATURE                 Location/Qualifiers
```

| | | |
|---|---|---|
| source | 1..10<br>mol_type = other DNA<br>organism = synthetic construct | |
| SEQUENCE: 542<br>ccggaggaaa | | 10 |
| SEQ ID NO: 543<br>FEATURE<br>source | moltype = DNA   length = 10<br>Location/Qualifiers<br>1..10<br>mol_type = other DNA<br>organism = synthetic construct | |
| SEQUENCE: 543<br>cggcgtatga | | 10 |
| SEQ ID NO: 544<br>FEATURE<br>source | moltype = DNA   length = 10<br>Location/Qualifiers<br>1..10<br>mol_type = other DNA<br>organism = synthetic construct | |
| SEQUENCE: 544<br>taggcattct | | 10 |
| SEQ ID NO: 545<br>FEATURE<br>source | moltype = DNA   length = 10<br>Location/Qualifiers<br>1..10<br>mol_type = other DNA<br>organism = synthetic construct | |
| SEQUENCE: 545<br>aaaggaggga | | 10 |
| SEQ ID NO: 546<br>FEATURE<br>source | moltype = DNA   length = 10<br>Location/Qualifiers<br>1..10<br>mol_type = other DNA<br>organism = synthetic construct | |
| SEQUENCE: 546<br>acctttacgg | | 10 |
| SEQ ID NO: 547<br>FEATURE<br>source | moltype = DNA   length = 10<br>Location/Qualifiers<br>1..10<br>mol_type = other DNA<br>organism = synthetic construct | |
| SEQUENCE: 547<br>ctaccgttaa | | 10 |
| SEQ ID NO: 548<br>FEATURE<br>source | moltype = DNA   length = 10<br>Location/Qualifiers<br>1..10<br>mol_type = other DNA<br>organism = synthetic construct | |
| SEQUENCE: 548<br>gagcttcgcc | | 10 |
| SEQ ID NO: 549<br>FEATURE<br>source | moltype = DNA   length = 10<br>Location/Qualifiers<br>1..10<br>mol_type = other DNA<br>organism = synthetic construct | |
| SEQUENCE: 549<br>gccatagaag | | 10 |
| SEQ ID NO: 550<br>FEATURE<br>source | moltype = DNA   length = 10<br>Location/Qualifiers<br>1..10<br>mol_type = other DNA<br>organism = synthetic construct | |
| SEQUENCE: 550<br>tttagcgtat | | 10 |
| SEQ ID NO: 551<br>FEATURE<br>source | moltype = DNA   length = 10<br>Location/Qualifiers<br>1..10<br>mol_type = other DNA<br>organism = synthetic construct | |
| SEQUENCE: 551<br>gcaaacagat | | 10 |
| SEQ ID NO: 552 | moltype = DNA   length = 10 | |

| | | |
|---|---|---|
| FEATURE | Location/Qualifiers | |
| source | 1..10<br>mol_type = other DNA<br>organism = synthetic construct | |
| SEQUENCE: 552<br>taggtcatgg | | 10 |
| SEQ ID NO: 553<br>FEATURE<br>source | moltype = DNA   length = 10<br>Location/Qualifiers<br>1..10<br>mol_type = other DNA<br>organism = synthetic construct | |
| SEQUENCE: 553<br>ctctaacaga | | 10 |
| SEQ ID NO: 554<br>FEATURE<br>source | moltype = DNA   length = 10<br>Location/Qualifiers<br>1..10<br>mol_type = other DNA<br>organism = synthetic construct | |
| SEQUENCE: 554<br>ggctcatgaa | | 10 |
| SEQ ID NO: 555<br>FEATURE<br>source | moltype = DNA   length = 10<br>Location/Qualifiers<br>1..10<br>mol_type = other DNA<br>organism = synthetic construct | |
| SEQUENCE: 555<br>caatgtctca | | 10 |
| SEQ ID NO: 556<br>FEATURE<br>source | moltype = DNA   length = 10<br>Location/Qualifiers<br>1..10<br>mol_type = other DNA<br>organism = synthetic construct | |
| SEQUENCE: 556<br>tgatcgtatt | | 10 |
| SEQ ID NO: 557<br>FEATURE<br>source | moltype = DNA   length = 10<br>Location/Qualifiers<br>1..10<br>mol_type = other DNA<br>organism = synthetic construct | |
| SEQUENCE: 557<br>gcgcttttca | | 10 |
| SEQ ID NO: 558<br>FEATURE<br>source | moltype = DNA   length = 10<br>Location/Qualifiers<br>1..10<br>mol_type = other DNA<br>organism = synthetic construct | |
| SEQUENCE: 558<br>aagattatat | | 10 |
| SEQ ID NO: 559<br>FEATURE<br>source | moltype = DNA   length = 10<br>Location/Qualifiers<br>1..10<br>mol_type = other DNA<br>organism = synthetic construct | |
| SEQUENCE: 559<br>actagctgac | | 10 |
| SEQ ID NO: 560<br>FEATURE<br>source | moltype = DNA   length = 10<br>Location/Qualifiers<br>1..10<br>mol_type = other DNA<br>organism = synthetic construct | |
| SEQUENCE: 560<br>ggtgagctca | | 10 |
| SEQ ID NO: 561<br>FEATURE<br>source | moltype = DNA   length = 10<br>Location/Qualifiers<br>1..10<br>mol_type = other DNA<br>organism = synthetic construct | |
| SEQUENCE: 561<br>cgctttcgct | | 10 |

| | | |
|---|---|---|
| SEQ ID NO: 562<br>FEATURE<br>source | moltype = DNA   length = 10<br>Location/Qualifiers<br>1..10<br>mol_type = other DNA<br>organism = synthetic construct | |
| SEQUENCE: 562<br>tgattcaaaa | | 10 |
| SEQ ID NO: 563<br>FEATURE<br>source | moltype = DNA   length = 10<br>Location/Qualifiers<br>1..10<br>mol_type = other DNA<br>organism = synthetic construct | |
| SEQUENCE: 563<br>actgaacagg | | 10 |
| SEQ ID NO: 564<br>FEATURE<br>source | moltype = DNA   length = 10<br>Location/Qualifiers<br>1..10<br>mol_type = other DNA<br>organism = synthetic construct | |
| SEQUENCE: 564<br>attcgagcta | | 10 |
| SEQ ID NO: 565<br>FEATURE<br>source | moltype = DNA   length = 10<br>Location/Qualifiers<br>1..10<br>mol_type = other DNA<br>organism = synthetic construct | |
| SEQUENCE: 565<br>tgtaggctaa | | 10 |
| SEQ ID NO: 566<br>FEATURE<br>source | moltype = DNA   length = 10<br>Location/Qualifiers<br>1..10<br>mol_type = other DNA<br>organism = synthetic construct | |
| SEQUENCE: 566<br>acaaagcttt | | 10 |
| SEQ ID NO: 567<br>FEATURE<br>source | moltype = DNA   length = 10<br>Location/Qualifiers<br>1..10<br>mol_type = other DNA<br>organism = synthetic construct | |
| SEQUENCE: 567<br>gcccgaggga | | 10 |
| SEQ ID NO: 568<br>FEATURE<br>source | moltype = DNA   length = 10<br>Location/Qualifiers<br>1..10<br>mol_type = other DNA<br>organism = synthetic construct | |
| SEQUENCE: 568<br>gcccgctggg | | 10 |
| SEQ ID NO: 569<br>FEATURE<br>source | moltype = DNA   length = 10<br>Location/Qualifiers<br>1..10<br>mol_type = other DNA<br>organism = synthetic construct | |
| SEQUENCE: 569<br>accccgctga | | 10 |
| SEQ ID NO: 570<br>FEATURE<br>source | moltype = DNA   length = 10<br>Location/Qualifiers<br>1..10<br>mol_type = other DNA<br>organism = synthetic construct | |
| SEQUENCE: 570<br>cttatgccct | | 10 |
| SEQ ID NO: 571<br>FEATURE<br>source | moltype = DNA   length = 10<br>Location/Qualifiers<br>1..10<br>mol_type = other DNA<br>organism = synthetic construct | |
| SEQUENCE: 571<br>ccgccatagc | | 10 |

```
SEQ ID NO: 572            moltype = DNA   length = 10
FEATURE                   Location/Qualifiers
source                    1..10
                          mol_type = other DNA
                          organism = synthetic construct SEQUENCE: 572
cttaatgatt                                                              10

SEQ ID NO: 573            moltype = DNA   length = 10
FEATURE                   Location/Qualifiers
source                    1..10
                          mol_type = other DNA
                          organism = synthetic construct SEQUENCE: 573
cagtccacaa                                                              10

SEQ ID NO: 574            moltype = DNA   length = 10
FEATURE                   Location/Qualifiers
source                    1..10
                          mol_type = other DNA
                          organism = synthetic construct SEQUENCE: 574
atggacggac                                                              10

SEQ ID NO: 575            moltype = DNA   length = 10
FEATURE                   Location/Qualifiers
source                    1..10
                          mol_type = other DNA
                          organism = synthetic construct SEQUENCE: 575
cggcctctcg                                                              10

SEQ ID NO: 576            moltype = DNA   length = 10
FEATURE                   Location/Qualifiers
source                    1..10
                          mol_type = other DNA
                          organism = synthetic construct SEQUENCE: 576
tagtcgccat                                                              10

SEQ ID NO: 577            moltype = DNA   length = 10
FEATURE                   Location/Qualifiers
source                    1..10
                          mol_type = other DNA
                          organism = synthetic construct SEQUENCE: 577
gttgatcttc                                                              10

SEQ ID NO: 578            moltype = DNA   length = 10
FEATURE                   Location/Qualifiers
source                    1..10
                          mol_type = other DNA
                          organism = synthetic construct SEQUENCE: 578
acttgccaag                                                              10

SEQ ID NO: 579            moltype = DNA   length = 10
FEATURE                   Location/Qualifiers
source                    1..10
                          mol_type = other DNA
                          organism = synthetic construct SEQUENCE: 579
atgactggtt                                                              10

SEQ ID NO: 580            moltype = DNA   length = 10
FEATURE                   Location/Qualifiers
source                    1..10
                          mol_type = other DNA
                          organism = synthetic construct SEQUENCE: 580
tgtcgtagga                                                              10

SEQ ID NO: 581            moltype = DNA   length = 10
FEATURE                   Location/Qualifiers
source                    1..10
                          mol_type = other DNA
                          organism = synthetic construct

SEQUENCE: 581
```
agcaaacacg 10

SEQ ID NO: 582          moltype = DNA   length = 10
FEATURE                 Location/Qualifiers
source                  1..10
                        mol_type = other DNA
                        organism = synthetic construct SEQUENCE: 582
tactgatgaa 10

SEQ ID NO: 583          moltype = DNA   length = 10
FEATURE                 Location/Qualifiers
source                  1..10
                        mol_type = other DNA
                        organism = synthetic construct SEQUENCE: 583
gtatcccata 10

SEQ ID NO: 584          moltype = DNA   length = 10
FEATURE                 Location/Qualifiers
source                  1..10
                        mol_type = other DNA
                        organism = synthetic construct SEQUENCE: 584
tagccaggtt 10

SEQ ID NO: 585          moltype = DNA   length = 10
FEATURE                 Location/Qualifiers
source                  1..10
                        mol_type = other DNA
                        organism = synthetic construct SEQUENCE: 585
cgtgtggcga 10

SEQ ID NO: 586          moltype = DNA   length = 10
FEATURE                 Location/Qualifiers
source                  1..10
                        mol_type = other DNA
                        organism = synthetic construct SEQUENCE: 586
atcgaattgc 10

SEQ ID NO: 587          moltype = DNA   length = 10
FEATURE                 Location/Qualifiers
source                  1..10
                        mol_type = other DNA
                        organism = synthetic construct SEQUENCE: 587
ccccaatatt 10

SEQ ID NO: 588          moltype = DNA   length = 10
FEATURE                 Location/Qualifiers
source                  1..10
                        mol_type = other DNA
                        organism = synthetic construct SEQUENCE: 588
cccgtttctc 10

SEQ ID NO: 589          moltype = DNA   length = 10
FEATURE                 Location/Qualifiers
source                  1..10
                        mol_type = other DNA
                        organism = synthetic construct SEQUENCE: 589
tccgcatcta 10

SEQ ID NO: 590          moltype = DNA   length = 10
FEATURE                 Location/Qualifiers
source                  1..10
                        mol_type = other DNA
                        organism = synthetic construct SEQUENCE: 590
caagcctcat 10

SEQ ID NO: 591          moltype = DNA   length = 10
FEATURE                 Location/Qualifiers
source                  1..10
                        mol_type = other DNA
                        organism = synthetic construct -continued

| | | |
|---|---|---|
| SEQUENCE: 591<br>tttcaatccc | | 10 |
| SEQ ID NO: 592<br>FEATURE<br>source | moltype = DNA  length = 10<br>Location/Qualifiers<br>1..10<br>mol_type = other DNA<br>organism = synthetic construct | |
| SEQUENCE: 592<br>ccttcccatc | | 10 |
| SEQ ID NO: 593<br>FEATURE<br>source | moltype = DNA  length = 10<br>Location/Qualifiers<br>1..10<br>mol_type = other DNA<br>organism = synthetic construct | |
| SEQUENCE: 593<br>aggtacaaga | | 10 |
| SEQ ID NO: 594<br>FEATURE<br>source | moltype = DNA  length = 10<br>Location/Qualifiers<br>1..10<br>mol_type = other DNA<br>organism = synthetic construct | |
| SEQUENCE: 594<br>gtgtaatgga | | 10 |
| SEQ ID NO: 595<br>FEATURE<br>source | moltype = DNA  length = 10<br>Location/Qualifiers<br>1..10<br>mol_type = other DNA<br>organism = synthetic construct | |
| SEQUENCE: 595<br>aaactgagct | | 10 |
| SEQ ID NO: 596<br>FEATURE<br>source | moltype = DNA  length = 10<br>Location/Qualifiers<br>1..10<br>mol_type = other DNA<br>organism = synthetic construct | |
| SEQUENCE: 596<br>atctctgccc | | 10 |
| SEQ ID NO: 597<br>FEATURE<br>source | moltype = DNA  length = 10<br>Location/Qualifiers<br>1..10<br>mol_type = other DNA<br>organism = synthetic construct | |
| SEQUENCE: 597<br>cgacatttgc | | 10 |
| SEQ ID NO: 598<br>FEATURE<br>source | moltype = DNA  length = 10<br>Location/Qualifiers<br>1..10<br>mol_type = other DNA<br>organism = synthetic construct | |
| SEQUENCE: 598<br>tgtgaacccg | | 10 |
| SEQ ID NO: 599<br>FEATURE<br>source | moltype = DNA  length = 10<br>Location/Qualifiers<br>1..10<br>mol_type = other DNA<br>organism = synthetic construct | |
| SEQUENCE: 599<br>tgacacccca | | 10 |
| SEQ ID NO: 600<br>FEATURE<br>source | moltype = DNA  length = 10<br>Location/Qualifiers<br>1..10<br>mol_type = other DNA<br>organism = synthetic construct | |
| SEQUENCE: 600<br>taggccaaag | | 10 |
| SEQ ID NO: 601<br>FEATURE<br>source | moltype = DNA  length = 10<br>Location/Qualifiers<br>1..10<br>mol_type = other DNA | |

```
                        organism = synthetic construct
SEQUENCE: 601
gaaattgtag                                                                          10

SEQ ID NO: 602          moltype = DNA  length = 10
FEATURE                 Location/Qualifiers
source                  1..10
                        mol_type = other DNA
                        organism = synthetic construct
SEQUENCE: 602
gcgtctgatt                                                                          10

SEQ ID NO: 603          moltype = DNA  length = 10
FEATURE                 Location/Qualifiers
source                  1..10
                        mol_type = other DNA
                        organism = synthetic construct
SEQUENCE: 603
tctcattgtt                                                                          10

SEQ ID NO: 604          moltype = DNA  length = 10
FEATURE                 Location/Qualifiers
source                  1..10
                        mol_type = other DNA
                        organism = synthetic construct
SEQUENCE: 604
ctgacatctc                                                                          10

SEQ ID NO: 605          moltype = DNA  length = 10
FEATURE                 Location/Qualifiers
source                  1..10
                        mol_type = other DNA
                        organism = synthetic construct
SEQUENCE: 605
gtatccagtg                                                                          10

SEQ ID NO: 606          moltype = DNA  length = 10
FEATURE                 Location/Qualifiers
source                  1..10
                        mol_type = other DNA
                        organism = synthetic construct
SEQUENCE: 606
gatggccgtt                                                                          10

SEQ ID NO: 607          moltype = DNA  length = 10
FEATURE                 Location/Qualifiers
source                  1..10
                        mol_type = other DNA
                        organism = synthetic construct
SEQUENCE: 607
tcacctctc                                                                           10

SEQ ID NO: 608          moltype = DNA  length = 10
FEATURE                 Location/Qualifiers
source                  1..10
                        mol_type = other DNA
                        organism = synthetic construct
SEQUENCE: 608
ggcactattc                                                                          10

SEQ ID NO: 609          moltype = DNA  length = 10
FEATURE                 Location/Qualifiers
source                  1..10
                        mol_type = other DNA
                        organism = synthetic construct
SEQUENCE: 609
aaataactgt                                                                          10

SEQ ID NO: 610          moltype = DNA  length = 10
FEATURE                 Location/Qualifiers
source                  1..10
                        mol_type = other DNA
                        organism = synthetic construct
SEQUENCE: 610
cagctccatt                                                                          10

SEQ ID NO: 611          moltype = DNA  length = 10
FEATURE                 Location/Qualifiers
source                  1..10
```

```
                            -continued
                            mol_type = other DNA
                            organism = synthetic construct
SEQUENCE: 611
ctcttgactc                                                               10

SEQ ID NO: 621              moltype = DNA   length = 10
FEATURE                     Location/Qualifiers
source                      1..10
                            mol_type = other DNA
                            organism = synthetic construct
SEQUENCE: 612
tttcctatac                                                               10

SEQ ID NO: 613              moltype = DNA   length = 10
FEATURE                     Location/Qualifiers
source                      1..10
                            mol_type = other DNA
                            organism = synthetic construct
SEQUENCE: 613
ccatacccga                                                               10

SEQ ID NO: 614              moltype = DNA   length = 10
FEATURE                     Location/Qualifiers
source                      1..10
                            mol_type = other DNA
                            organism = synthetic construct
SEQUENCE: 614
tcgccgagcg                                                               10

SEQ ID NO: 615              moltype = DNA   length = 10
FEATURE                     Location/Qualifiers
source                      1..10
                            mol_type = other DNA
                            organism = synthetic construct
SEQUENCE: 615
cgctgaagcc                                                               10

SEQ ID NO: 616              moltype = DNA   length = 10
FEATURE                     Location/Qualifiers
source                      1..10
                            mol_type = other DNA
                            organism = synthetic construct
SEQUENCE: 616
tctggcccca                                                               10

SEQ ID NO: 617              moltype = DNA   length = 10
FEATURE                     Location/Qualifiers
source                      1..10
                            mol_type = other DNA
                            organism = synthetic construct
SEQUENCE: 617
gctacattga                                                               10

SEQ ID NO: 618              moltype = DNA   length = 10
FEATURE                     Location/Qualifiers
source                      1..10
                            mol_type = other DNA
                            organism = synthetic construct
SEQUENCE: 618
cgcatcataa                                                               10

SEQ ID NO: 619              moltype = DNA   length = 10
FEATURE                     Location/Qualifiers
source                      1..10
                            mol_type = other DNA
                            organism = synthetic construct
SEQUENCE: 619
gcaaagggcc                                                               10

SEQ ID NO: 620              moltype = DNA   length = 10
FEATURE                     Location/Qualifiers
source                      1..10
                            mol_type = other DNA
                            organism = synthetic construct
SEQUENCE: 620
aacggcgcag                                                               10

SEQ ID NO: 621              moltype = DNA   length = 10
FEATURE                     Location/Qualifiers
```

```
source                       1..10
                             mol_type = other DNA
                             organism = synthetic construct
SEQUENCE: 621
cgactgacat                                                                    10

SEQ ID NO: 622               moltype = DNA   length = 10
FEATURE                      Location/Qualifiers
source                       1..10
                             mol_type = other DNA
                             organism = synthetic construct
SEQUENCE: 622
atgacagggc                                                                    10

SEQ ID NO: 623               moltype = DNA   length = 10
FEATURE                      Location/Qualifiers
source                       1..10
                             mol_type = other DNA
                             organism = synthetic construct
SEQUENCE: 623
caagttctcc                                                                    10

SEQ ID NO: 624               moltype = DNA   length = 10
FEATURE                      Location/Qualifiers
source                       1..10
                             mol_type = other DNA
                             organism = synthetic construct
SEQUENCE: 624
tcgccgcttt                                                                    10

SEQ ID NO: 625               moltype = DNA   length = 10
FEATURE                      Location/Qualifiers
source                       1..10
                             mol_type = other DNA
                             organism = synthetic construct
SEQUENCE: 625
atgccggaaa                                                                    10

SEQ ID NO: 626               moltype = DNA   length = 10
FEATURE                      Location/Qualifiers
source                       1..10
                             mol_type = other DNA
                             organism = synthetic construct
SEQUENCE: 626
gcggttacta                                                                    10

SEQ ID NO: 627               moltype = DNA   length = 10
FEATURE                      Location/Qualifiers
source                       1..10
                             mol_type = other DNA
                             organism = synthetic construct
SEQUENCE: 627
gacattacaa                                                                    10

SEQ ID NO: 628               moltype = DNA   length = 10
FEATURE                      Location/Qualifiers
source                       1..10
                             mol_type = other DNA
                             organism = synthetic construct
SEQUENCE: 628
cagagagggc                                                                    10

SEQ ID NO: 629               moltype = DNA   length = 10
FEATURE                      Location/Qualifiers
source                       1..10
                             mol_type = other DNA
                             organism = synthetic construct
SEQUENCE: 629
gcaccgcctc                                                                    10

SEQ ID NO: 630               moltype = DNA   length = 10
FEATURE                      Location/Qualifiers
source                       1..10
                             mol_type = other DNA
                             organism = synthetic construct
SEQUENCE: 630
cggtccgagc                                                                    10

SEQ ID NO: 631               moltype = DNA   length = 10
```

```
FEATURE                  Location/Qualifiers
source                   1..10
                         mol_type = other DNA
                         organism = synthetic construct
SEQUENCE: 631
tgtccggtgc                                                                   10

SEQ ID NO: 632           moltype = DNA   length = 10
FEATURE                  Location/Qualifiers
source                   1..10
                         mol_type = other DNA
                         organism = synthetic construct
SEQUENCE: 632
ggtcggttgc                                                                   10

SEQ ID NO: 633           moltype = DNA   length = 10
FEATURE                  Location/Qualifiers
source                   1..10
                         mol_type = other DNA
                         organism = synthetic construct
SEQUENCE: 633
gctcagctaa                                                                   10

SEQ ID NO: 634           moltype = DNA   length = 10
FEATURE                  Location/Qualifiers
source                   1..10
                         mol_type = other DNA
                         organism = synthetic construct
SEQUENCE: 634
agcagttcgt                                                                   10

SEQ ID NO: 635           moltype = DNA   length = 10
FEATURE                  Location/Qualifiers
source                   1..10
                         mol_type = other DNA
                         organism = synthetic construct
SEQUENCE: 635
aaatcgatga                                                                   10

SEQ ID NO: 636           moltype = DNA   length = 10
FEATURE                  Location/Qualifiers
source                   1..10
                         mol_type = other DNA
                         organism = synthetic construct
SEQUENCE: 636
gctcggtatg                                                                   10

SEQ ID NO: 637           moltype = DNA   length = 10
FEATURE                  Location/Qualifiers
source                   1..10
                         mol_type = other DNA
                         organism = synthetic construct
SEQUENCE: 637
cccgccgcgg                                                                   10

SEQ ID NO: 638           moltype = DNA   length = 10
FEATURE                  Location/Qualifiers
source                   1..10
                         mol_type = other DNA
                         organism = synthetic construct
SEQUENCE: 638
gtgtgatagg                                                                   10

SEQ ID NO: 639           moltype = DNA   length = 10
FEATURE                  Location/Qualifiers
source                   1..10
                         mol_type = other DNA
                         organism = synthetic construct
SEQUENCE: 639
ttggactcca                                                                   10

SEQ ID NO: 640           moltype = DNA   length = 10
FEATURE                  Location/Qualifiers
source                   1..10
                         mol_type = other DNA
                         organism = synthetic construct
SEQUENCE: 640
tgcttatcta                                                                   10
```

-continued

| | | |
|---|---|---|
| SEQ ID NO: 641<br>FEATURE<br>source | moltype = DNA   length = 10<br>Location/Qualifiers<br>1..10<br>mol_type = other DNA<br>organism = synthetic construct | |
| SEQUENCE: 641<br>caaaaggcgt | | 10 |
| SEQ ID NO: 642<br>FEATURE<br>source | moltype = DNA   length = 10<br>Location/Qualifiers<br>1..10<br>mol_type = other DNA<br>organism = synthetic construct | |
| SEQUENCE: 642<br>taggggcct | | 10 |
| SEQ ID NO: 643<br>FEATURE<br>source | moltype = DNA   length = 10<br>Location/Qualifiers<br>1..10<br>mol_type = other DNA<br>organism = synthetic construct | |
| SEQUENCE: 643<br>aagtattaat | | 10 |
| SEQ ID NO: 644<br>FEATURE<br>source | moltype = DNA   length = 10<br>Location/Qualifiers<br>1..10<br>mol_type = other DNA<br>organism = synthetic construct | |
| SEQUENCE: 644<br>gtttagcccg | | 10 |
| SEQ ID NO: 645<br>FEATURE<br>source | moltype = DNA   length = 10<br>Location/Qualifiers<br>1..10<br>mol_type = other DNA<br>organism = synthetic construct | |
| SEQUENCE: 645<br>cgctaatatg | | 10 |
| SEQ ID NO: 646<br>FEATURE<br>source | moltype = DNA   length = 10<br>Location/Qualifiers<br>1..10<br>mol_type = other DNA<br>organism = synthetic construct | |
| SEQUENCE: 646<br>acaacacgtt | | 10 |
| SEQ ID NO: 647<br>FEATURE<br>source | moltype = DNA   length = 10<br>Location/Qualifiers<br>1..10<br>mol_type = other DNA<br>organism = synthetic construct | |
| SEQUENCE: 647<br>agagatgctc | | 10 |
| SEQ ID NO: 648<br>FEATURE<br>source | moltype = DNA   length = 10<br>Location/Qualifiers<br>1..10<br>mol_type = other DNA<br>organism = synthetic construct | |
| SEQUENCE: 648<br>tgcctgatat | | 10 |
| SEQ ID NO: 649<br>FEATURE<br>source | moltype = DNA   length = 10<br>Location/Qualifiers<br>1..10<br>mol_type = other DNA<br>organism = synthetic construct | |
| SEQUENCE: 649<br>cttgtaagta | | 10 |
| SEQ ID NO: 650<br>FEATURE<br>source | moltype = DNA   length = 10<br>Location/Qualifiers<br>1..10<br>mol_type = other DNA<br>organism = synthetic construct | |
| SEQUENCE: 650<br>catattgccg | | 10 |

```
SEQ ID NO: 651            moltype = DNA   length = 10
FEATURE                   Location/Qualifiers
source                    1..10
                          mol_type = other DNA
                          organism = synthetic construct SEQUENCE: 651
cttagaaagt                                                                 10

SEQ ID NO: 652            moltype = DNA   length = 10
FEATURE                   Location/Qualifiers
source                    1..10
                          mol_type = other DNA
                          organism = synthetic construct SEQUENCE: 652
atgttgtatt                                                                 10

SEQ ID NO: 653            moltype = DNA   length = 10
FEATURE                   Location/Qualifiers
source                    1..10
                          mol_type = other DNA
                          organism = synthetic construct SEQUENCE: 653
cgcattgaag                                                                 10

SEQ ID NO: 654            moltype = DNA   length = 10
FEATURE                   Location/Qualifiers
source                    1..10
                          mol_type = other DNA
                          organism = synthetic construct SEQUENCE: 654
ttatgttggt                                                                 10

SEQ ID NO: 655            moltype = DNA   length = 10
FEATURE                   Location/Qualifiers
source                    1..10
                          mol_type = other DNA
                          organism = synthetic construct SEQUENCE: 655
tcgcctcaga                                                                 10

SEQ ID NO: 656            moltype = DNA   length = 10
FEATURE                   Location/Qualifiers
source                    1..10
                          mol_type = other DNA
                          organism = synthetic construct SEQUENCE: 656
ttcgttgagg                                                                 10

SEQ ID NO: 657            moltype = DNA   length = 10
FEATURE                   Location/Qualifiers
source                    1..10
                          mol_type = other DNA
                          organism = synthetic construct SEQUENCE: 657
ggtgccgggc                                                                 10

SEQ ID NO: 658            moltype = DNA   length = 10
FEATURE                   Location/Qualifiers
source                    1..10
                          mol_type = other DNA
                          organism = synthetic construct SEQUENCE: 658
accattgtaa                                                                 10

SEQ ID NO: 659            moltype = DNA   length = 10
FEATURE                   Location/Qualifiers
source                    1..10
                          mol_type = other DNA
                          organism = synthetic construct SEQUENCE: 659
ttgattgtca                                                                 10

SEQ ID NO: 660            moltype = DNA   length = 10
FEATURE                   Location/Qualifiers
source                    1..10
                          mol_type = other DNA
                          organism = synthetic construct

SEQUENCE: 660
```
cggctcacct                                                                          10

SEQ ID NO: 661          moltype = DNA   length = 10
FEATURE                 Location/Qualifiers
source                  1..10
                        mol_type = other DNA
                        organism = synthetic construct SEQUENCE: 661
ctatcacatg                                                                          10

SEQ ID NO: 662          moltype = DNA   length = 10
FEATURE                 Location/Qualifiers
source                  1..10
                        mol_type = other DNA
                        organism = synthetic construct SEQUENCE: 662
gtagacagaa                                                                          10

SEQ ID NO: 663          moltype = DNA   length = 10
FEATURE                 Location/Qualifiers
source                  1..10
                        mol_type = other DNA
                        organism = synthetic construct SEQUENCE: 663
cctttaccaa                                                                          10

SEQ ID NO: 664          moltype = DNA   length = 10
FEATURE                 Location/Qualifiers
source                  1..10
                        mol_type = other DNA
                        organism = synthetic construct SEQUENCE: 664
gcacatcgac                                                                          10

SEQ ID NO: 665          moltype = DNA   length = 10
FEATURE                 Location/Qualifiers
source                  1..10
                        mol_type = other DNA
                        organism = synthetic construct SEQUENCE: 665
tctcactttc                                                                          10

SEQ ID NO: 666          moltype = DNA   length = 10
FEATURE                 Location/Qualifiers
source                  1..10
                        mol_type = other DNA
                        organism = synthetic construct SEQUENCE: 666
ttcgagtact                                                                          10

SEQ ID NO: 667          moltype = DNA   length = 10
FEATURE                 Location/Qualifiers
source                  1..10
                        mol_type = other DNA
                        organism = synthetic construct SEQUENCE: 667
tagaagagca                                                                          10

SEQ ID NO: 668          moltype = DNA   length = 10
FEATURE                 Location/Qualifiers
source                  1..10
                        mol_type = other DNA
                        organism = synthetic construct SEQUENCE: 668
aaccccacca                                                                          10

SEQ ID NO: 669          moltype = DNA   length = 10
FEATURE                 Location/Qualifiers
source                  1..10
                        mol_type = other DNA
                        organism = synthetic construct SEQUENCE: 669
ctgtatcagt                                                                          10

SEQ ID NO: 670          moltype = DNA   length = 10
FEATURE                 Location/Qualifiers
source                  1..10
                        mol_type = other DNA
                        organism = synthetic construct

```
SEQUENCE: 670
acataatgag                                                                          10

SEQ ID NO: 671          moltype = DNA   length = 10
FEATURE                 Location/Qualifiers
source                  1..10
                        mol_type = other DNA
                        organism = synthetic construct SEQUENCE: 671
agccttccgc                                                                          10

SEQ ID NO: 672          moltype = DNA   length = 10
FEATURE                 Location/Qualifiers
source                  1..10
                        mol_type = other DNA
                        organism = synthetic construct SEQUENCE: 672
cagtgctttt                                                                          10

SEQ ID NO: 673          moltype = DNA   length = 10
FEATURE                 Location/Qualifiers
source                  1..10
                        mol_type = other DNA
                        organism = synthetic construct SEQUENCE: 673
tagtccgtgt                                                                          10

SEQ ID NO: 674          moltype = DNA   length = 10
FEATURE                 Location/Qualifiers
source                  1..10
                        mol_type = other DNA
                        organism = synthetic construct SEQUENCE: 674
cggaatcggt                                                                          10

SEQ ID NO: 675          moltype = DNA   length = 10
FEATURE                 Location/Qualifiers
source                  1..10
                        mol_type = other DNA
                        organism = synthetic construct SEQUENCE: 675
cttgcggaga                                                                          10

SEQ ID NO: 676          moltype = DNA   length = 10
FEATURE                 Location/Qualifiers
source                  1..10
                        mol_type = other DNA
                        organism = synthetic construct SEQUENCE: 676
aaaaatttgg                                                                          10

SEQ ID NO: 677          moltype = DNA   length = 10
FEATURE                 Location/Qualifiers
source                  1..10
                        mol_type = other DNA
                        organism = synthetic construct SEQUENCE: 677
tgttttccgc                                                                          10

SEQ ID NO: 678          moltype = DNA   length = 10
FEATURE                 Location/Qualifiers
source                  1..10
                        mol_type = other DNA
                        organism = synthetic construct SEQUENCE: 678
atgctaggcg                                                                          10

SEQ ID NO: 679          moltype = DNA   length = 10
FEATURE                 Location/Qualifiers
source                  1..10
                        mol_type = other DNA
                        organism = synthetic construct SEQUENCE: 679
gactaatttc                                                                          10

SEQ ID NO: 680          moltype = DNA   length = 10
FEATURE                 Location/Qualifiers
source                  1..10
                        mol_type = other DNA
```

```
SEQUENCE: 680
ctgtagtaac                                                                          10

SEQ ID NO: 681          moltype = DNA  length = 10
FEATURE                 Location/Qualifiers
source                  1..10
                        mol_type = other DNA
                        organism = synthetic construct
SEQUENCE: 681
cggatgactt                                                                          10

SEQ ID NO: 682          moltype = DNA  length = 10
FEATURE                 Location/Qualifiers
source                  1..10
                        mol_type = other DNA
                        organism = synthetic construct
SEQUENCE: 682
tcagagtgga                                                                          10

SEQ ID NO: 683          moltype = DNA  length = 10
FEATURE                 Location/Qualifiers
source                  1..10
                        mol_type = other DNA
                        organism = synthetic construct
SEQUENCE: 683
caaaatagcg                                                                          10

SEQ ID NO: 684          moltype = DNA  length = 10
FEATURE                 Location/Qualifiers
source                  1..10
                        mol_type = other DNA
                        organism = synthetic construct
SEQUENCE: 684
gaagaagaag                                                                          10

SEQ ID NO: 685          moltype = DNA  length = 10
FEATURE                 Location/Qualifiers
source                  1..10
                        mol_type = other DNA
                        organism = synthetic construct
SEQUENCE: 685
cacccgcacg                                                                          10

SEQ ID NO: 686          moltype = DNA  length = 10
FEATURE                 Location/Qualifiers
source                  1..10
                        mol_type = other DNA
                        organism = synthetic construct
SEQUENCE: 686
acgatgcccg                                                                          10

SEQ ID NO: 687          moltype = DNA  length = 10
FEATURE                 Location/Qualifiers
source                  1..10
                        mol_type = other DNA
                        organism = synthetic construct
SEQUENCE: 687
cctactacac                                                                          10

SEQ ID NO: 688          moltype = DNA  length = 10
FEATURE                 Location/Qualifiers
source                  1..10
                        mol_type = other DNA
                        organism = synthetic construct
SEQUENCE: 688
attgaaacaa                                                                          10

SEQ ID NO: 689          moltype = DNA  length = 10
FEATURE                 Location/Qualifiers
source                  1..10
                        mol_type = other DNA
                        organism = synthetic construct
SEQUENCE: 689
gaccgaagat                                                                          10

SEQ ID NO: 690          moltype = DNA  length = 10
FEATURE                 Location/Qualifiers
source                  1..10
```

```
                         mol_type = other DNA
                         organism = synthetic construct
SEQUENCE: 690
acggcctgaa                                                                    10

SEQ ID NO: 691           moltype = DNA   length = 10
FEATURE                  Location/Qualifiers
source                   1..10
                         mol_type = other DNA
                         organism = synthetic construct
SEQUENCE: 691
aggggaggtc                                                                    10

SEQ ID NO: 692           moltype = DNA   length = 10
FEATURE                  Location/Qualifiers
source                   1..10
                         mol_type = other DNA
                         organism = synthetic construct
SEQUENCE: 692
caatcaactt                                                                    10

SEQ ID NO: 693           moltype = DNA   length = 10
FEATURE                  Location/Qualifiers
source                   1..10
                         mol_type = other DNA
                         organism = synthetic construct
SEQUENCE: 693
ggacaaccga                                                                    10

SEQ ID NO: 694           moltype = DNA   length = 10
FEATURE                  Location/Qualifiers
source                   1..10
                         mol_type = other DNA
                         organism = synthetic construct
SEQUENCE: 694
tccctaaggc                                                                    10

SEQ ID NO: 695           moltype = DNA   length = 10
FEATURE                  Location/Qualifiers
source                   1..10
                         mol_type = other DNA
                         organism = synthetic construct
SEQUENCE: 695
gttctacacg                                                                    10

SEQ ID NO: 696           moltype = DNA   length = 10
FEATURE                  Location/Qualifiers
source                   1..10
                         mol_type = other DNA
                         organism = synthetic construct
SEQUENCE: 696
actaaccagt                                                                    10

SEQ ID NO: 697           moltype = DNA   length = 10
FEATURE                  Location/Qualifiers
source                   1..10
                         mol_type = other DNA
                         organism = synthetic construct
SEQUENCE: 697
gaagctggat                                                                    10

SEQ ID NO: 698           moltype = DNA   length = 10
FEATURE                  Location/Qualifiers
source                   1..10
                         mol_type = other DNA
                         organism = synthetic construct
SEQUENCE: 698
ggaaccatgg                                                                    10

SEQ ID NO: 699           moltype = DNA   length = 10
FEATURE                  Location/Qualifiers
source                   1..10
                         mol_type = other DNA
                         organism = synthetic construct
SEQUENCE: 699
ctctacctgg                                                                    10

SEQ ID NO: 700           moltype = DNA   length = 10
FEATURE                  Location/Qualifiers
```

```
source                   1..10
                         mol_type = other DNA
                         organism = synthetic construct
SEQUENCE: 700
taatgcctgc                                                                    10

SEQ ID NO: 701           moltype = DNA   length = 10
FEATURE                  Location/Qualifiers
source                   1..10
                         mol_type = other DNA
                         organism = synthetic construct
SEQUENCE: 701
taaaggcaat                                                                    10

SEQ ID NO: 702           moltype = DNA   length = 10
FEATURE                  Location/Qualifiers
source                   1..10
                         mol_type = other DNA
                         organism = synthetic construct
SEQUENCE: 702
cgcctgggaa                                                                    10

SEQ ID NO: 703           moltype = DNA   length = 10
FEATURE                  Location/Qualifiers
source                   1..10
                         mol_type = other DNA
                         organism = synthetic construct
SEQUENCE: 703
tcttggggaa                                                                    10

SEQ ID NO: 704           moltype = DNA   length = 10
FEATURE                  Location/Qualifiers
source                   1..10
                         mol_type = other DNA
                         organism = synthetic construct
SEQUENCE: 704
agagagagag                                                                    10

SEQ ID NO: 705           moltype = DNA   length = 10
FEATURE                  Location/Qualifiers
source                   1..10
                         mol_type = other DNA
                         organism = synthetic construct
SEQUENCE: 705
gcgttggcgc                                                                    10

SEQ ID NO: 706           moltype = DNA   length = 10
FEATURE                  Location/Qualifiers
source                   1..10
                         mol_type = other DNA
                         organism = synthetic construct
SEQUENCE: 706
ttacgacaga                                                                    10

SEQ ID NO: 707           moltype = DNA   length = 10
FEATURE                  Location/Qualifiers
source                   1..10
                         mol_type = other DNA
                         organism = synthetic construct
SEQUENCE: 707
ggaactctta                                                                    10

SEQ ID NO: 708           moltype = DNA   length = 10
FEATURE                  Location/Qualifiers
source                   1..10
                         mol_type = other DNA
                         organism = synthetic construct
SEQUENCE: 708
gattgtggag                                                                    10

SEQ ID NO: 709           moltype = DNA   length = 10
FEATURE                  Location/Qualifiers
source                   1..10
                         mol_type = other DNA
                         organism = synthetic construct
SEQUENCE: 709
gggcactgat                                                                    10

SEQ ID NO: 710           moltype = DNA   length = 10
```

```
FEATURE                 Location/Qualifiers
source                  1..10
                        mol_type = other DNA
                        organism = synthetic construct SEQUENCE: 710
agacgcacca                                                                        10

SEQ ID NO: 711          moltype = DNA   length = 10
FEATURE                 Location/Qualifiers
source                  1..10
                        mol_type = other DNA
                        organism = synthetic construct SEQUENCE: 711
ccaattataa                                                                        10

SEQ ID NO: 712          moltype = DNA   length = 10
FEATURE                 Location/Qualifiers
source                  1..10
                        mol_type = other DNA
                        organism = synthetic construct SEQUENCE: 712
tagagacgca                                                                        10

SEQ ID NO: 713          moltype = DNA   length = 10
FEATURE                 Location/Qualifiers
source                  1..10
                        mol_type = other DNA
                        organism = synthetic construct SEQUENCE: 713
cctcttgtcg                                                                        10

SEQ ID NO: 714          moltype = DNA   length = 10
FEATURE                 Location/Qualifiers
source                  1..10
                        mol_type = other DNA
                        organism = synthetic construct SEQUENCE: 714
gaggaagctc                                                                        10

SEQ ID NO: 715          moltype = DNA   length = 10
FEATURE                 Location/Qualifiers
source                  1..10
                        mol_type = other DNA
                        organism = synthetic construct SEQUENCE: 715
agtcccgagt                                                                        10

SEQ ID NO: 716          moltype = DNA   length = 10
FEATURE                 Location/Qualifiers
source                  1..10
                        mol_type = other DNA
                        organism = synthetic construct SEQUENCE: 716
tgcttgcagt                                                                        10

SEQ ID NO: 717          moltype = DNA   length = 10
FEATURE                 Location/Qualifiers
source                  1..10
                        mol_type = other DNA
                        organism = synthetic construct SEQUENCE: 717
cccacttccc                                                                        10

SEQ ID NO: 718          moltype = DNA   length = 10
FEATURE                 Location/Qualifiers
source                  1..10
                        mol_type = other DNA
                        organism = synthetic construct SEQUENCE: 718
cgttgccgcg                                                                        10

SEQ ID NO: 719          moltype = DNA   length = 10
FEATURE                 Location/Qualifiers
source                  1..10
                        mol_type = other DNA
                        organism = synthetic construct SEQUENCE: 719
cccctggttc                                                                        10
```

-continued

| | | |
|---|---|---|
| SEQ ID NO: 720<br>FEATURE<br>source | moltype = DNA length = 10<br>Location/Qualifiers<br>1..10<br>mol_type = other DNA<br>organism = synthetic construct | |
| SEQUENCE: 720<br>acgaccaata | | 10 |
| SEQ ID NO: 721<br>FEATURE<br>source | moltype = DNA length = 10<br>Location/Qualifiers<br>1..10<br>mol_type = other DNA<br>organism = synthetic construct | |
| SEQUENCE: 721<br>cttagggttc | | 10 |
| SEQ ID NO: 722<br>FEATURE<br>source | moltype = DNA length = 10<br>Location/Qualifiers<br>1..10<br>mol_type = other DNA<br>organism = synthetic construct | |
| SEQUENCE: 722<br>aaacatatca | | 10 |
| SEQ ID NO: 723<br>FEATURE<br>source | moltype = DNA length = 10<br>Location/Qualifiers<br>1..10<br>mol_type = other DNA<br>organism = synthetic construct | |
| SEQUENCE: 723<br>gggtcgtaga | | 10 |
| SEQ ID NO: 724<br>FEATURE<br>source | moltype = DNA length = 10<br>Location/Qualifiers<br>1..10<br>mol_type = other DNA<br>organism = synthetic construct | |
| SEQUENCE: 724<br>ctccgtagcg | | 10 |
| SEQ ID NO: 725<br>FEATURE<br>source | moltype = DNA length = 10<br>Location/Qualifiers<br>1..10<br>mol_type = other DNA<br>organism = synthetic construct | |
| SEQUENCE: 725<br>ctggtcataa | | 10 |
| SEQ ID NO: 726<br>FEATURE<br>source | moltype = DNA length = 10<br>Location/Qualifiers<br>1..10<br>mol_type = other DNA<br>organism = synthetic construct | |
| SEQUENCE: 726<br>ttgacagatc | | 10 |
| SEQ ID NO: 727<br>FEATURE<br>source | moltype = DNA length = 10<br>Location/Qualifiers<br>1..10<br>mol_type = other DNA<br>organism = synthetic construct | |
| SEQUENCE: 727<br>gagtaaagtc | | 10 |
| SEQ ID NO: 728<br>FEATURE<br>source | moltype = DNA length = 10<br>Location/Qualifiers<br>1..10<br>mol_type = other DNA<br>organism = synthetic construct | |
| SEQUENCE: 728<br>atatgggctt | | 10 |
| SEQ ID NO: 729<br>FEATURE<br>source | moltype = DNA length = 10<br>Location/Qualifiers<br>1..10<br>mol_type = other DNA<br>organism = synthetic construct | |
| SEQUENCE: 729<br>tacaactact | | 10 |

```
SEQ ID NO: 730           moltype = DNA  length = 10
FEATURE                  Location/Qualifiers
source                   1..10
                         mol_type = other DNA
                         organism = synthetic construct
SEQUENCE: 730
aattcagccg                                                                10

SEQ ID NO: 731           moltype = DNA  length = 10
FEATURE                  Location/Qualifiers
source                   1..10
                         mol_type = other DNA
                         organism = synthetic construct
SEQUENCE: 731
gattgtacta                                                                10

SEQ ID NO: 732           moltype = DNA  length = 10
FEATURE                  Location/Qualifiers
source                   1..10
                         mol_type = other DNA
                         organism = synthetic construct
SEQUENCE: 732
tcgtaatgcg                                                                10

SEQ ID NO: 733           moltype = DNA  length = 10
FEATURE                  Location/Qualifiers
source                   1..10
                         mol_type = other DNA
                         organism = synthetic construct
SEQUENCE: 733
cgataactgc                                                                10

SEQ ID NO: 734           moltype = DNA  length = 10
FEATURE                  Location/Qualifiers
source                   1..10
                         mol_type = other DNA
                         organism = synthetic construct
SEQUENCE: 734
aacttggcgg                                                                10

SEQ ID NO: 735           moltype = DNA  length = 10
FEATURE                  Location/Qualifiers
source                   1..10
                         mol_type = other DNA
                         organism = synthetic construct
SEQUENCE: 735
cgtggatgta                                                                10

SEQ ID NO: 736           moltype = DNA  length = 10
FEATURE                  Location/Qualifiers
source                   1..10
                         mol_type = other DNA
                         organism = synthetic construct
SEQUENCE: 736
ccttcccgaa                                                                10

SEQ ID NO: 737           moltype = DNA  length = 10
FEATURE                  Location/Qualifiers
source                   1..10
                         mol_type = other DNA
                         organism = synthetic construct
SEQUENCE: 737
ctaaacccgt                                                                10

SEQ ID NO: 738           moltype = DNA  length = 10
FEATURE                  Location/Qualifiers
source                   1..10
                         mol_type = other DNA
                         organism = synthetic construct
SEQUENCE: 738
caacattccc                                                                10

SEQ ID NO: 739           moltype = DNA  length = 10
FEATURE                  Location/Qualifiers
source                   1..10
                         mol_type = other DNA
                         organism = synthetic construct
SEQUENCE: 739
```
cttaccctct 10

SEQ ID NO: 740　　　　moltype = DNA　length = 10
FEATURE　　　　　　　　Location/Qualifiers
source　　　　　　　　　1..10
　　　　　　　　　　　　mol_type = other DNA
　　　　　　　　　　　　organism = synthetic construct
SEQUENCE: 740
ggaaagttct 10

SEQ ID NO: 741　　　　moltype = DNA　length = 10
FEATURE　　　　　　　　Location/Qualifiers
source　　　　　　　　　1..10
　　　　　　　　　　　　mol_type = other DNA
　　　　　　　　　　　　organism = synthetic construct
SEQUENCE: 741
cggattggct 10

SEQ ID NO: 742　　　　moltype = DNA　length = 10
FEATURE　　　　　　　　Location/Qualifiers
source　　　　　　　　　1..10
　　　　　　　　　　　　mol_type = other DNA
　　　　　　　　　　　　organism = synthetic construct
SEQUENCE: 742
aatgtagggc 10

SEQ ID NO: 743　　　　moltype = DNA　length = 10
FEATURE　　　　　　　　Location/Qualifiers
source　　　　　　　　　1..10
　　　　　　　　　　　　mol_type = other DNA
　　　　　　　　　　　　organism = synthetic construct
SEQUENCE: 743
aatgaatcgc 10

SEQ ID NO: 744　　　　moltype = DNA　length = 10
FEATURE　　　　　　　　Location/Qualifiers
source　　　　　　　　　1..10
　　　　　　　　　　　　mol_type = other DNA
　　　　　　　　　　　　organism = synthetic construct
SEQUENCE: 744
atcatacacc 10

SEQ ID NO: 745　　　　moltype = DNA　length = 10
FEATURE　　　　　　　　Location/Qualifiers
source　　　　　　　　　1..10
　　　　　　　　　　　　mol_type = other DNA
　　　　　　　　　　　　organism = synthetic construct
SEQUENCE: 745
agttgggcag 10

SEQ ID NO: 746　　　　moltype = DNA　length = 10
FEATURE　　　　　　　　Location/Qualifiers
source　　　　　　　　　1..10
　　　　　　　　　　　　mol_type = other DNA
　　　　　　　　　　　　organism = synthetic construct
SEQUENCE: 746
agaagaaggg 10

SEQ ID NO: 747　　　　moltype = DNA　length = 10
FEATURE　　　　　　　　Location/Qualifiers
source　　　　　　　　　1..10
　　　　　　　　　　　　mol_type = other DNA
　　　　　　　　　　　　organism = synthetic construct
SEQUENCE: 747
gcgtgcgcta 10

SEQ ID NO: 748　　　　moltype = DNA　length = 10
FEATURE　　　　　　　　Location/Qualifiers
source　　　　　　　　　1..10
　　　　　　　　　　　　mol_type = other DNA
　　　　　　　　　　　　organism = synthetic construct
SEQUENCE: 748
ccccgataaa 10

SEQ ID NO: 749　　　　moltype = DNA　length = 10
FEATURE　　　　　　　　Location/Qualifiers
source　　　　　　　　　1..10
　　　　　　　　　　　　mol_type = other DNA
　　　　　　　　　　　　organism = synthetic construct

```
SEQUENCE: 749
taccaagtgc                                                                                    10

SEQ ID NO: 750         moltype = DNA  length = 10
FEATURE                Location/Qualifiers
source                 1..10
                       mol_type = other DNA
                       organism = synthetic construct
SEQUENCE: 750
tgtgttttcg                                                                                    10

SEQ ID NO: 751         moltype = DNA  length = 10
FEATURE                Location/Qualifiers
source                 1..10
                       mol_type = other DNA
                       organism = synthetic construct
SEQUENCE: 751
cccagatgtc                                                                                    10

SEQ ID NO: 752         moltype = DNA  length = 10
FEATURE                Location/Qualifiers
source                 1..10
                       mol_type = other DNA
                       organism = synthetic construct
SEQUENCE: 752
gcgagcttcc                                                                                    10

SEQ ID NO: 753         moltype = DNA  length = 10
FEATURE                Location/Qualifiers
source                 1..10
                       mol_type = other DNA
                       organism = synthetic construct
SEQUENCE: 753
gtgtcacgta                                                                                    10

SEQ ID NO: 754         moltype = DNA  length = 10
FEATURE                Location/Qualifiers
source                 1..10
                       mol_type = other DNA
                       organism = synthetic construct
SEQUENCE: 754
ataggccgag                                                                                    10

SEQ ID NO: 755         moltype = DNA  length = 10
FEATURE                Location/Qualifiers
source                 1..10
                       mol_type = other DNA
                       organism = synthetic construct
SEQUENCE: 755
gagctaccag                                                                                    10

SEQ ID NO: 756         moltype = DNA  length = 10
FEATURE                Location/Qualifiers
source                 1..10
                       mol_type = other DNA
                       organism = synthetic construct
SEQUENCE: 756
cgcggcggag                                                                                    10

SEQ ID NO: 757         moltype = DNA  length = 10
FEATURE                Location/Qualifiers
source                 1..10
                       mol_type = other DNA
                       organism = synthetic construct
SEQUENCE: 757
tcttgcacga                                                                                    10

SEQ ID NO: 758         moltype = DNA  length = 10
FEATURE                Location/Qualifiers
source                 1..10
                       mol_type = other DNA
                       organism = synthetic construct
SEQUENCE: 758
tgccctaaag                                                                                    10

SEQ ID NO: 759         moltype = DNA  length = 10
FEATURE                Location/Qualifiers
source                 1..10
                       mol_type = other DNA
```

```
SEQUENCE: 759
ttgcgctttg                                                                          10

SEQ ID NO: 760            moltype = DNA  length = 10
FEATURE                   Location/Qualifiers
source                    1..10
                          mol_type = other DNA
                          organism = synthetic construct
SEQUENCE: 760
catataaagg                                                                          10

SEQ ID NO: 761            moltype = DNA  length = 10
FEATURE                   Location/Qualifiers
source                    1..10
                          mol_type = other DNA
                          organism = synthetic construct
SEQUENCE: 761
aatagcgaat                                                                          10

SEQ ID NO: 762            moltype = DNA  length = 10
FEATURE                   Location/Qualifiers
source                    1..10
                          mol_type = other DNA
                          organism = synthetic construct
SEQUENCE: 762
tacgctaagg                                                                          10

SEQ ID NO: 763            moltype = DNA  length = 10
FEATURE                   Location/Qualifiers
source                    1..10
                          mol_type = other DNA
                          organism = synthetic construct
SEQUENCE: 763
acttagttcg                                                                          10

SEQ ID NO: 764            moltype = DNA  length = 10
FEATURE                   Location/Qualifiers
source                    1..10
                          mol_type = other DNA
                          organism = synthetic construct
SEQUENCE: 764
cgtgcggaac                                                                          10

SEQ ID NO: 765            moltype = DNA  length = 10
FEATURE                   Location/Qualifiers
source                    1..10
                          mol_type = other DNA
                          organism = synthetic construct
SEQUENCE: 765
acccgattcg                                                                          10

SEQ ID NO: 766            moltype = DNA  length = 10
FEATURE                   Location/Qualifiers
source                    1..10
                          mol_type = other DNA
                          organism = synthetic construct
SEQUENCE: 766
tgcagagttt                                                                          10

SEQ ID NO: 767            moltype = DNA  length = 10
FEATURE                   Location/Qualifiers
source                    1..10
                          mol_type = other DNA
                          organism = synthetic construct
SEQUENCE: 767
gaatcattag                                                                          10

SEQ ID NO: 768            moltype = DNA  length = 10
FEATURE                   Location/Qualifiers
source                    1..10
                          mol_type = other DNA
                          organism = synthetic construct
SEQUENCE: 768
agtacactgg                                                                          10

SEQ ID NO: 769            moltype = DNA  length = 10
FEATURE                   Location/Qualifiers
source                    1..10
```

```
                        mol_type = other DNA
                        organism = synthetic construct
SEQUENCE: 769
ttgtgcggtt                                                                 10

SEQ ID NO: 770          moltype = DNA   length = 10
FEATURE                 Location/Qualifiers
source                  1..10
                        mol_type = other DNA
                        organism = synthetic construct
SEQUENCE: 770
atgacatgca                                                                 10

SEQ ID NO: 771          moltype = DNA   length = 10
FEATURE                 Location/Qualifiers
source                  1..10
                        mol_type = other DNA
                        organism = synthetic construct
SEQUENCE: 771
ttctcggacg                                                                 10

SEQ ID NO: 772          moltype = DNA   length = 10
FEATURE                 Location/Qualifiers
source                  1..10
                        mol_type = other DNA
                        organism = synthetic construct
SEQUENCE: 772
agattgaaga                                                                 10

SEQ ID NO: 773          moltype = DNA   length = 10
FEATURE                 Location/Qualifiers
source                  1..10
                        mol_type = other DNA
                        organism = synthetic construct
SEQUENCE: 773
ggcggactgt                                                                 10

SEQ ID NO: 774          moltype = DNA   length = 10
FEATURE                 Location/Qualifiers
source                  1..10
                        mol_type = other DNA
                        organism = synthetic construct
SEQUENCE: 774
tttatggtaa                                                                 10

SEQ ID NO: 775          moltype = DNA   length = 10
FEATURE                 Location/Qualifiers
source                  1..10
                        mol_type = other DNA
                        organism = synthetic construct
SEQUENCE: 775
cagtagggtg                                                                 10

SEQ ID NO: 776          moltype = DNA   length = 10
FEATURE                 Location/Qualifiers
source                  1..10
                        mol_type = other DNA
                        organism = synthetic construct
SEQUENCE: 776
gacaggcaag                                                                 10

SEQ ID NO: 777          moltype = DNA   length = 10
FEATURE                 Location/Qualifiers
source                  1..10
                        mol_type = other DNA
                        organism = synthetic construct
SEQUENCE: 777
gatgtgtcgt                                                                 10

SEQ ID NO: 778          moltype = DNA   length = 10
FEATURE                 Location/Qualifiers
source                  1..10
                        mol_type = other DNA
                        organism = synthetic construct
SEQUENCE: 778
acttgacgga                                                                 10

SEQ ID NO: 779          moltype = DNA   length = 10
FEATURE                 Location/Qualifiers
```

```
source                    1..10
                          mol_type = other DNA
                          organism = synthetic construct
SEQUENCE: 779
aagtccgaaa                                                                    10

SEQ ID NO: 780            moltype = DNA   length = 10
FEATURE                   Location/Qualifiers
source                    1..10
                          mol_type = other DNA
                          organism = synthetic construct
SEQUENCE: 780
tgggtgtagg                                                                    10

SEQ ID NO: 781            moltype = DNA   length = 10
FEATURE                   Location/Qualifiers
source                    1..10
                          mol_type = other DNA
                          organism = synthetic construct
SEQUENCE: 781
acttaccgcg                                                                    10

SEQ ID NO: 782            moltype = DNA   length = 10
FEATURE                   Location/Qualifiers
source                    1..10
                          mol_type = other DNA
                          organism = synthetic construct
SEQUENCE: 782
ctgtgcaccc                                                                    10

SEQ ID NO: 783            moltype = DNA   length = 10
FEATURE                   Location/Qualifiers
source                    1..10
                          mol_type = other DNA
                          organism = synthetic construct
SEQUENCE: 783
attgctctct                                                                    10

SEQ ID NO: 784            moltype = DNA   length = 10
FEATURE                   Location/Qualifiers
source                    1..10
                          mol_type = other DNA
                          organism = synthetic construct
SEQUENCE: 784
cagaagacaa                                                                    10

SEQ ID NO: 785            moltype = DNA   length = 10
FEATURE                   Location/Qualifiers
source                    1..10
                          mol_type = other DNA
                          organism = synthetic construct
SEQUENCE: 785
ttacgctata                                                                    10

SEQ ID NO: 786            moltype = DNA   length = 10
FEATURE                   Location/Qualifiers
source                    1..10
                          mol_type = other DNA
                          organism = synthetic construct
SEQUENCE: 786
acgtggaaat                                                                    10

SEQ ID NO: 787            moltype = DNA   length = 10
FEATURE                   Location/Qualifiers
source                    1..10
                          mol_type = other DNA
                          organism = synthetic construct
SEQUENCE: 787
tgaggctggt                                                                    10

SEQ ID NO: 788            moltype = DNA   length = 10
FEATURE                   Location/Qualifiers
source                    1..10
                          mol_type = other DNA
                          organism = synthetic construct
SEQUENCE: 788
attatgagat                                                                    10

SEQ ID NO: 789            moltype = DNA   length = 10
```

-continued

| | | |
|---|---|---|
| FEATURE | Location/Qualifiers | |
| source | 1..10<br>mol_type = other DNA<br>organism = synthetic construct | |
| SEQUENCE: 789<br>gacttgtagt | | 10 |
| SEQ ID NO: 790<br>FEATURE<br>source | moltype = DNA   length = 10<br>Location/Qualifiers<br>1..10<br>mol_type = other DNA<br>organism = synthetic construct | |
| SEQUENCE: 790<br>tcgctgagga | | 10 |
| SEQ ID NO: 791<br>FEATURE<br>source | moltype = DNA   length = 10<br>Location/Qualifiers<br>1..10<br>mol_type = other DNA<br>organism = synthetic construct | |
| SEQUENCE: 791<br>cccaactcta | | 10 |
| SEQ ID NO: 792<br>FEATURE<br>source | moltype = DNA   length = 10<br>Location/Qualifiers<br>1..10<br>mol_type = other DNA<br>organism = synthetic construct | |
| SEQUENCE: 792<br>gatagggagg | | 10 |
| SEQ ID NO: 793<br>FEATURE<br>source | moltype = DNA   length = 10<br>Location/Qualifiers<br>1..10<br>mol_type = other DNA<br>organism = synthetic construct | |
| SEQUENCE: 793<br>tagaaatcag | | 10 |
| SEQ ID NO: 794<br>FEATURE<br>source | moltype = DNA   length = 10<br>Location/Qualifiers<br>1..10<br>mol_type = other DNA<br>organism = synthetic construct | |
| SEQUENCE: 794<br>gtcgctagaa | | 10 |
| SEQ ID NO: 795<br>FEATURE<br>source | moltype = DNA   length = 10<br>Location/Qualifiers<br>1..10<br>mol_type = other DNA<br>organism = synthetic construct | |
| SEQUENCE: 795<br>aaaatagaaa | | 10 |
| SEQ ID NO: 796<br>FEATURE<br>source | moltype = DNA   length = 10<br>Location/Qualifiers<br>1..10<br>mol_type = other DNA<br>organism = synthetic construct | |
| SEQUENCE: 796<br>gctcctgggt | | 10 |
| SEQ ID NO: 797<br>FEATURE<br>source | moltype = DNA   length = 10<br>Location/Qualifiers<br>1..10<br>mol_type = other DNA<br>organism = synthetic construct | |
| SEQUENCE: 797<br>cgcgctcgcg | | 10 |
| SEQ ID NO: 798<br>FEATURE<br>source | moltype = DNA   length = 10<br>Location/Qualifiers<br>1..10<br>mol_type = other DNA<br>organism = synthetic construct | |
| SEQUENCE: 798<br>ggcaaacgca | | 10 |

-continued

| | | |
|---|---|---|
| SEQ ID NO: 799<br>FEATURE<br>source | moltype = DNA   length = 10<br>Location/Qualifiers<br>1..10<br>mol_type = other DNA<br>organism = synthetic construct | |
| SEQUENCE: 799<br>tttactacct | | 10 |
| SEQ ID NO: 800<br>FEATURE<br>source | moltype = DNA   length = 10<br>Location/Qualifiers<br>1..10<br>mol_type = other DNA<br>organism = synthetic construct | |
| SEQUENCE: 800<br>atcctaaact | | 10 |
| SEQ ID NO: 801<br>FEATURE<br>source | moltype = DNA   length = 10<br>Location/Qualifiers<br>1..10<br>mol_type = other DNA<br>organism = synthetic construct | |
| SEQUENCE: 801<br>ctccgtatgt | | 10 |
| SEQ ID NO: 802<br>FEATURE<br>source | moltype = DNA   length = 10<br>Location/Qualifiers<br>1..10<br>mol_type = other DNA<br>organism = synthetic construct | |
| SEQUENCE: 802<br>tatcgtccag | | 10 |
| SEQ ID NO: 803<br>FEATURE<br>source | moltype = DNA   length = 10<br>Location/Qualifiers<br>1..10<br>mol_type = other DNA<br>organism = synthetic construct | |
| SEQUENCE: 803<br>gccggcggta | | 10 |
| SEQ ID NO: 804<br>FEATURE<br>source | moltype = DNA   length = 10<br>Location/Qualifiers<br>1..10<br>mol_type = other DNA<br>organism = synthetic construct | |
| SEQUENCE: 804<br>tgctccattt | | 10 |
| SEQ ID NO: 805<br>FEATURE<br>source | moltype = DNA   length = 10<br>Location/Qualifiers<br>1..10<br>mol_type = other DNA<br>organism = synthetic construct | |
| SEQUENCE: 805<br>tggctgttgt | | 10 |
| SEQ ID NO: 806<br>FEATURE<br>source | moltype = DNA   length = 10<br>Location/Qualifiers<br>1..10<br>mol_type = other DNA<br>organism = synthetic construct | |
| SEQUENCE: 806<br>tactgcgcaa | | 10 |
| SEQ ID NO: 807<br>FEATURE<br>source | moltype = DNA   length = 10<br>Location/Qualifiers<br>1..10<br>mol_type = other DNA<br>organism = synthetic construct | |
| SEQUENCE: 807<br>tatacggctt | | 10 |
| SEQ ID NO: 808<br>FEATURE<br>source | moltype = DNA   length = 10<br>Location/Qualifiers<br>1..10<br>mol_type = other DNA<br>organism = synthetic construct | |
| SEQUENCE: 808<br>ggttattacc | | 10 |

```
SEQ ID NO: 809          moltype = DNA  length = 10
FEATURE                 Location/Qualifiers
source                  1..10
                        mol_type = other DNA
                        organism = synthetic construct SEQUENCE: 809
atcaggagga                                                                10

SEQ ID NO: 810          moltype = DNA  length = 10
FEATURE                 Location/Qualifiers
source                  1..10
                        mol_type = other DNA
                        organism = synthetic construct SEQUENCE: 810
ctattgccag                                                                10

SEQ ID NO: 811          moltype = DNA  length = 10
FEATURE                 Location/Qualifiers
source                  1..10
                        mol_type = other DNA
                        organism = synthetic construct SEQUENCE: 811
acgtacacac                                                                10

SEQ ID NO: 812          moltype = DNA  length = 10
FEATURE                 Location/Qualifiers
source                  1..10
                        mol_type = other DNA
                        organism = synthetic construct SEQUENCE: 812
cagcctagct                                                                10

SEQ ID NO: 813          moltype = DNA  length = 10
FEATURE                 Location/Qualifiers
source                  1..10
                        mol_type = other DNA
                        organism = synthetic construct SEQUENCE: 813
gaaaaacaac                                                                10

SEQ ID NO: 814          moltype = DNA  length = 10
FEATURE                 Location/Qualifiers
source                  1..10
                        mol_type = other DNA
                        organism = synthetic construct SEQUENCE: 814
cgttcagtta                                                                10

SEQ ID NO: 815          moltype = DNA  length = 10
FEATURE                 Location/Qualifiers
source                  1..10
                        mol_type = other DNA
                        organism = synthetic construct SEQUENCE: 815
caatcagaat                                                                10

SEQ ID NO: 816          moltype = DNA  length = 10
FEATURE                 Location/Qualifiers
source                  1..10
                        mol_type = other DNA
                        organism = synthetic construct SEQUENCE: 816
gggctactct                                                                10

SEQ ID NO: 817          moltype = DNA  length = 10
FEATURE                 Location/Qualifiers
source                  1..10
                        mol_type = other DNA
                        organism = synthetic construct SEQUENCE: 817
ccccattggg                                                                10

SEQ ID NO: 818          moltype = DNA  length = 10
FEATURE                 Location/Qualifiers
source                  1..10
                        mol_type = other DNA
                        organism = synthetic construct

SEQUENCE: 818
```
tagggaacgg                                                                            10

SEQ ID NO: 819          moltype = DNA   length = 10
FEATURE                 Location/Qualifiers
source                  1..10
                        mol_type = other DNA
                        organism = synthetic construct SEQUENCE: 819
cagctgatac                                                                            10

SEQ ID NO: 820          moltype = DNA   length = 10
FEATURE                 Location/Qualifiers
source                  1..10
                        mol_type = other DNA
                        organism = synthetic construct SEQUENCE: 820
attcctgtga                                                                            10

SEQ ID NO: 821          moltype = DNA   length = 10
FEATURE                 Location/Qualifiers
source                  1..10
                        mol_type = other DNA
                        organism = synthetic construct SEQUENCE: 821
tcagagccgt                                                                            10

SEQ ID NO: 822          moltype = DNA   length = 10
FEATURE                 Location/Qualifiers
source                  1..10
                        mol_type = other DNA
                        organism = synthetic construct SEQUENCE: 822
catgaaaagc                                                                            10

SEQ ID NO: 823          moltype = DNA   length = 10
FEATURE                 Location/Qualifiers
source                  1..10
                        mol_type = other DNA
                        organism = synthetic construct SEQUENCE: 823
tgacctgtga                                                                            10

SEQ ID NO: 824          moltype = DNA   length = 10
FEATURE                 Location/Qualifiers
source                  1..10
                        mol_type = other DNA
                        organism = synthetic construct SEQUENCE: 824
gcattagcag                                                                            10

SEQ ID NO: 825          moltype = DNA   length = 10
FEATURE                 Location/Qualifiers
source                  1..10
                        mol_type = other DNA
                        organism = synthetic construct SEQUENCE: 825
gacagaacca                                                                            10

SEQ ID NO: 826          moltype = DNA   length = 10
FEATURE                 Location/Qualifiers
source                  1..10
                        mol_type = other DNA
                        organism = synthetic construct SEQUENCE: 826
tccagtatat                                                                            10

SEQ ID NO: 827          moltype = DNA   length = 10
FEATURE                 Location/Qualifiers
source                  1..10
                        mol_type = other DNA
                        organism = synthetic construct SEQUENCE: 827
tgttccgcta                                                                            10

SEQ ID NO: 828          moltype = DNA   length = 10
FEATURE                 Location/Qualifiers
source                  1..10
                        mol_type = other DNA
                        organism = synthetic construct

```
SEQUENCE: 828
gatatccatt                                                                        10

SEQ ID NO: 829         moltype = DNA  length = 10
FEATURE                Location/Qualifiers
source                 1..10
                       mol_type = other DNA
                       organism = synthetic construct
SEQUENCE: 829
catatggacc                                                                        10

SEQ ID NO: 830         moltype = DNA  length = 10
FEATURE                Location/Qualifiers
source                 1..10
                       mol_type = other DNA
                       organism = synthetic construct
SEQUENCE: 830
gatatagtaa                                                                        10

SEQ ID NO: 831         moltype = DNA  length = 10
FEATURE                Location/Qualifiers
source                 1..10
                       mol_type = other DNA
                       organism = synthetic construct
SEQUENCE: 831
cacctttttt                                                                        10

SEQ ID NO: 832         moltype = DNA  length = 10
FEATURE                Location/Qualifiers
source                 1..10
                       mol_type = other DNA
                       organism = synthetic construct
SEQUENCE: 832
agcttgcggg                                                                        10

SEQ ID NO: 833         moltype = DNA  length = 10
FEATURE                Location/Qualifiers
source                 1..10
                       mol_type = other DNA
                       organism = synthetic construct
SEQUENCE: 833
cgcacaggga                                                                        10

SEQ ID NO: 834         moltype = DNA  length = 10
FEATURE                Location/Qualifiers
source                 1..10
                       mol_type = other DNA
                       organism = synthetic construct
SEQUENCE: 834
tctgggtgct                                                                        10

SEQ ID NO: 835         moltype = DNA  length = 10
FEATURE                Location/Qualifiers
source                 1..10
                       mol_type = other DNA
                       organism = synthetic construct
SEQUENCE: 835
tgagtcgttt                                                                        10

SEQ ID NO: 836         moltype = DNA  length = 10
FEATURE                Location/Qualifiers
source                 1..10
                       mol_type = other DNA
                       organism = synthetic construct
SEQUENCE: 836
ttacaatgtg                                                                        10

SEQ ID NO: 837         moltype = DNA  length = 10
FEATURE                Location/Qualifiers
source                 1..10
                       mol_type = other DNA
                       organism = synthetic construct
SEQUENCE: 837
cttgcaaaca                                                                        10

SEQ ID NO: 838         moltype = DNA  length = 10
FEATURE                Location/Qualifiers
source                 1..10
                       mol_type = other DNA
```

```
                              organism = synthetic construct
SEQUENCE: 838
tgtcgagctg                                                                           10

SEQ ID NO: 839           moltype = DNA   length = 10
FEATURE                  Location/Qualifiers
source                   1..10
                         mol_type = other DNA
                         organism = synthetic construct
SEQUENCE: 839
actttaacct                                                                           10

SEQ ID NO: 840           moltype = DNA   length = 10
FEATURE                  Location/Qualifiers
source                   1..10
                         mol_type = other DNA
                         organism = synthetic construct
SEQUENCE: 840
atataagtgc                                                                           10

SEQ ID NO: 841           moltype = DNA   length = 10
FEATURE                  Location/Qualifiers
source                   1..10
                         mol_type = other DNA
                         organism = synthetic construct
SEQUENCE: 841
ggaagggcgt                                                                           10

SEQ ID NO: 842           moltype = DNA   length = 10
FEATURE                  Location/Qualifiers
source                   1..10
                         mol_type = other DNA
                         organism = synthetic construct
SEQUENCE: 842
tttgacttga                                                                           10

SEQ ID NO: 843           moltype = DNA   length = 10
FEATURE                  Location/Qualifiers
source                   1..10
                         mol_type = other DNA
                         organism = synthetic construct
SEQUENCE: 843
gtataaacgg                                                                           10

SEQ ID NO: 844           moltype = DNA   length = 10
FEATURE                  Location/Qualifiers
source                   1..10
                         mol_type = other DNA
                         organism = synthetic construct
SEQUENCE: 844
taaccggatg                                                                           10

SEQ ID NO: 845           moltype = DNA   length = 10
FEATURE                  Location/Qualifiers
source                   1..10
                         mol_type = other DNA
                         organism = synthetic construct
SEQUENCE: 845
ttctcatcag                                                                           10

SEQ ID NO: 846           moltype = DNA   length = 10
FEATURE                  Location/Qualifiers
source                   1..10
                         mol_type = other DNA
                         organism = synthetic construct
SEQUENCE: 846
ctcggttacg                                                                           10

SEQ ID NO: 847           moltype = DNA   length = 10
FEATURE                  Location/Qualifiers
source                   1..10
                         mol_type = other DNA
                         organism = synthetic construct
SEQUENCE: 847
atatggttct                                                                           10

SEQ ID NO: 848           moltype = DNA   length = 10
FEATURE                  Location/Qualifiers
source                   1..10
```

```
                        mol_type = other DNA
                        organism = synthetic construct
SEQUENCE: 848
cgcccccgaa                                                                      10

SEQ ID NO: 849          moltype = DNA  length = 10
FEATURE                 Location/Qualifiers
source                  1..10
                        mol_type = other DNA
                        organism = synthetic construct
SEQUENCE: 849
acctcgatcg                                                                      10

SEQ ID NO: 850          moltype = DNA  length = 10
FEATURE                 Location/Qualifiers
source                  1..10
                        mol_type = other DNA
                        organism = synthetic construct
SEQUENCE: 850
ctcgaataat                                                                      10

SEQ ID NO: 851          moltype = DNA  length = 10
FEATURE                 Location/Qualifiers
source                  1..10
                        mol_type = other DNA
                        organism = synthetic construct
SEQUENCE: 851
gcccgagctt                                                                      10

SEQ ID NO: 852          moltype = DNA  length = 10
FEATURE                 Location/Qualifiers
source                  1..10
                        mol_type = other DNA
                        organism = synthetic construct
SEQUENCE: 852
aacagtcaac                                                                      10

SEQ ID NO: 853          moltype = DNA  length = 10
FEATURE                 Location/Qualifiers
source                  1..10
                        mol_type = other DNA
                        organism = synthetic construct
SEQUENCE: 853
ctggaacctc                                                                      10

SEQ ID NO: 854          moltype = DNA  length = 10
FEATURE                 Location/Qualifiers
source                  1..10
                        mol_type = other DNA
                        organism = synthetic construct
SEQUENCE: 854
aataacgggg                                                                      10

SEQ ID NO: 855          moltype = DNA  length = 10
FEATURE                 Location/Qualifiers
source                  1..10
                        mol_type = other DNA
                        organism = synthetic construct
SEQUENCE: 855
acgccccact                                                                      10

SEQ ID NO: 856          moltype = DNA  length = 10
FEATURE                 Location/Qualifiers
source                  1..10
                        mol_type = other DNA
                        organism = synthetic construct
SEQUENCE: 856
ggcaacatga                                                                      10

SEQ ID NO: 857          moltype = DNA  length = 10
FEATURE                 Location/Qualifiers
source                  1..10
                        mol_type = other DNA
                        organism = synthetic construct
SEQUENCE: 857
gctatttcgc                                                                      10

SEQ ID NO: 858          moltype = DNA  length = 10
FEATURE                 Location/Qualifiers
```

```
source                    1..10
                          mol_type = other DNA
                          organism = synthetic construct
SEQUENCE: 858
ttccacttta                                                                          10

SEQ ID NO: 859            moltype = DNA   length = 10
FEATURE                   Location/Qualifiers
source                    1..10
                          mol_type = other DNA
                          organism = synthetic construct
SEQUENCE: 859
gccgatggat                                                                          10

SEQ ID NO: 860            moltype = DNA   length = 10
FEATURE                   Location/Qualifiers
source                    1..10
                          mol_type = other DNA
                          organism = synthetic construct
SEQUENCE: 860
aagttggtaa                                                                          10

SEQ ID NO: 861            moltype = DNA   length = 10
FEATURE                   Location/Qualifiers
source                    1..10
                          mol_type = other DNA
                          organism = synthetic construct
SEQUENCE: 861
cactagctag                                                                          10

SEQ ID NO: 862            moltype = DNA   length = 10
FEATURE                   Location/Qualifiers
source                    1..10
                          mol_type = other DNA
                          organism = synthetic construct
SEQUENCE: 862
acatgcccct                                                                          10

SEQ ID NO: 863            moltype = DNA   length = 10
FEATURE                   Location/Qualifiers
source                    1..10
                          mol_type = other DNA
                          organism = synthetic construct
SEQUENCE: 863
ttcattactc                                                                          10

SEQ ID NO: 864            moltype = DNA   length = 10
FEATURE                   Location/Qualifiers
source                    1..10
                          mol_type = other DNA
                          organism = synthetic construct
SEQUENCE: 864
ggtttaatat                                                                          10

SEQ ID NO: 865            moltype = DNA   length = 10
FEATURE                   Location/Qualifiers
source                    1..10
                          mol_type = other DNA
                          organism = synthetic construct
SEQUENCE: 865
cctgcagtga                                                                          10

SEQ ID NO: 866            moltype = DNA   length = 10
FEATURE                   Location/Qualifiers
source                    1..10
                          mol_type = other DNA
                          organism = synthetic construct
SEQUENCE: 866
tctttaagtt                                                                          10

SEQ ID NO: 867            moltype = DNA   length = 10
FEATURE                   Location/Qualifiers
source                    1..10
                          mol_type = other DNA
                          organism = synthetic construct
SEQUENCE: 867
tggcgatcga                                                                          10

SEQ ID NO: 868            moltype = DNA   length = 10
```

-continued

| | | |
|---|---|---|
| FEATURE | Location/Qualifiers | |
| source | 1..10<br>mol_type = other DNA<br>organism = synthetic construct | |
| SEQUENCE: 868<br>cttttagct | | 10 |
| SEQ ID NO: 869<br>FEATURE<br>source | moltype = DNA   length = 10<br>Location/Qualifiers<br>1..10<br>mol_type = other DNA<br>organism = synthetic construct | |
| SEQUENCE: 869<br>cccagtctct | | 10 |
| SEQ ID NO: 870<br>FEATURE<br>source | moltype = DNA   length = 10<br>Location/Qualifiers<br>1..10<br>mol_type = other DNA<br>organism = synthetic construct | |
| SEQUENCE: 870<br>aaatgtttcg | | 10 |
| SEQ ID NO: 871<br>FEATURE<br>source | moltype = DNA   length = 10<br>Location/Qualifiers<br>1..10<br>mol_type = other DNA<br>organism = synthetic construct | |
| SEQUENCE: 871<br>atataagacg | | 10 |
| SEQ ID NO: 872<br>FEATURE<br>source | moltype = DNA   length = 10<br>Location/Qualifiers<br>1..10<br>mol_type = other DNA<br>organism = synthetic construct | |
| SEQUENCE: 872<br>tcactttaca | | 10 |
| SEQ ID NO: 873<br>FEATURE<br>source | moltype = DNA   length = 10<br>Location/Qualifiers<br>1..10<br>mol_type = other DNA<br>organism = synthetic construct | |
| SEQUENCE: 873<br>cctggcgccc | | 10 |
| SEQ ID NO: 874<br>FEATURE<br>source | moltype = DNA   length = 10<br>Location/Qualifiers<br>1..10<br>mol_type = other DNA<br>organism = synthetic construct | |
| SEQUENCE: 874<br>ggattactgg | | 10 |
| SEQ ID NO: 875<br>FEATURE<br>source | moltype = DNA   length = 10<br>Location/Qualifiers<br>1..10<br>mol_type = other DNA<br>organism = synthetic construct | |
| SEQUENCE: 875<br>gaatgatctt | | 10 |
| SEQ ID NO: 876<br>FEATURE<br>source | moltype = DNA   length = 10<br>Location/Qualifiers<br>1..10<br>mol_type = other DNA<br>organism = synthetic construct | |
| SEQUENCE: 876<br>gctcggatcg | | 10 |
| SEQ ID NO: 877<br>FEATURE<br>source | moltype = DNA   length = 10<br>Location/Qualifiers<br>1..10<br>mol_type = other DNA<br>organism = synthetic construct | |
| SEQUENCE: 877<br>cagctgcgag | | 10 |

```
SEQ ID NO: 878            moltype = DNA   length = 10
FEATURE                   Location/Qualifiers
source                    1..10
                          mol_type = other DNA
                          organism = synthetic construct
SEQUENCE: 878
accecttacta                                                                10

SEQ ID NO: 879            moltype = DNA   length = 10
FEATURE                   Location/Qualifiers
source                    1..10
                          mol_type = other DNA
                          organism = synthetic construct
SEQUENCE: 879
aggtgaaact                                                                 10

SEQ ID NO: 880            moltype = DNA   length = 10
FEATURE                   Location/Qualifiers
source                    1..10
                          mol_type = other DNA
                          organism = synthetic construct
SEQUENCE: 880
cgaatttgat                                                                 10

SEQ ID NO: 881            moltype = DNA   length = 10
FEATURE                   Location/Qualifiers
source                    1..10
                          mol_type = other DNA
                          organism = synthetic construct
SEQUENCE: 881
cgctgtgcgg                                                                 10

SEQ ID NO: 882            moltype = DNA   length = 10
FEATURE                   Location/Qualifiers
source                    1..10
                          mol_type = other DNA
                          organism = synthetic construct
SEQUENCE: 882
ttaccgcacc                                                                 10

SEQ ID NO: 883            moltype = DNA   length = 10
FEATURE                   Location/Qualifiers
source                    1..10
                          mol_type = other DNA
                          organism = synthetic construct
SEQUENCE: 883
ggaatcttaa                                                                 10

SEQ ID NO: 884            moltype = DNA   length = 10
FEATURE                   Location/Qualifiers
source                    1..10
                          mol_type = other DNA
                          organism = synthetic construct
SEQUENCE: 884
ctcaacaccc                                                                 10

SEQ ID NO: 885            moltype = DNA   length = 10
FEATURE                   Location/Qualifiers
source                    1..10
                          mol_type = other DNA
                          organism = synthetic construct
SEQUENCE: 885
cgtgcccttg                                                                 10

SEQ ID NO: 886            moltype = DNA   length = 10
FEATURE                   Location/Qualifiers
source                    1..10
                          mol_type = other DNA
                          organism = synthetic construct
SEQUENCE: 886
gcaggctcga                                                                 10

SEQ ID NO: 887            moltype = DNA   length = 10
FEATURE                   Location/Qualifiers
source                    1..10
                          mol_type = other DNA
                          organism = synthetic construct
SEQUENCE: 887
accaacgaag                                                                 10
```

| | | |
|---|---|---|
| SEQ ID NO: 888<br>FEATURE<br>source | moltype = DNA length = 10<br>Location/Qualifiers<br>1..10<br>mol_type = other DNA<br>organism = synthetic construct | |
| SEQUENCE: 888<br>cctgtaattt | | 10 |
| SEQ ID NO: 889<br>FEATURE<br>source | moltype = DNA length = 10<br>Location/Qualifiers<br>1..10<br>mol_type = other DNA<br>organism = synthetic construct | |
| SEQUENCE: 889<br>gggtgggatg | | 10 |
| SEQ ID NO: 890<br>FEATURE<br>source | moltype = DNA length = 10<br>Location/Qualifiers<br>1..10<br>mol_type = other DNA<br>organism = synthetic construct | |
| SEQUENCE: 890<br>ttgctcaccg | | 10 |
| SEQ ID NO: 891<br>FEATURE<br>source | moltype = DNA length = 10<br>Location/Qualifiers<br>1..10<br>mol_type = other DNA<br>organism = synthetic construct | |
| SEQUENCE: 891<br>ttacgaccac | | 10 |
| SEQ ID NO: 892<br>FEATURE<br>source | moltype = DNA length = 10<br>Location/Qualifiers<br>1..10<br>mol_type = other DNA<br>organism = synthetic construct | |
| SEQUENCE: 892<br>ttttctaacc | | 10 |
| SEQ ID NO: 893<br>FEATURE<br>source | moltype = DNA length = 10<br>Location/Qualifiers<br>1..10<br>mol_type = other DNA<br>organism = synthetic construct | |
| SEQUENCE: 893<br>gctttagata | | 10 |
| SEQ ID NO: 894<br>FEATURE<br>source | moltype = DNA length = 10<br>Location/Qualifiers<br>1..10<br>mol_type = other DNA<br>organism = synthetic construct | |
| SEQUENCE: 894<br>cacgtattgg | | 10 |
| SEQ ID NO: 895<br>FEATURE<br>source | moltype = DNA length = 10<br>Location/Qualifiers<br>1..10<br>mol_type = other DNA<br>organism = synthetic construct | |
| SEQUENCE: 895<br>aaatatctcc | | 10 |
| SEQ ID NO: 896<br>FEATURE<br>source | moltype = DNA length = 10<br>Location/Qualifiers<br>1..10<br>mol_type = other DNA<br>organism = synthetic construct | |
| SEQUENCE: 896<br>gctggaaaac | | 10 |
| SEQ ID NO: 897<br>FEATURE<br>source | moltype = DNA length = 10<br>Location/Qualifiers<br>1..10<br>mol_type = other DNA<br>organism = synthetic construct | |
| SEQUENCE: 897 | | |

```
gagcgcatta                                                                  10

SEQ ID NO: 898          moltype = DNA   length = 10
FEATURE                 Location/Qualifiers
source                  1..10
                        mol_type = other DNA
                        organism = synthetic construct SEQUENCE: 898
gtggaggggt                                                                  10

SEQ ID NO: 899          moltype = DNA   length = 10
FEATURE                 Location/Qualifiers
source                  1..10
                        mol_type = other DNA
                        organism = synthetic construct SEQUENCE: 899
tccactggga                                                                  10

SEQ ID NO: 900          moltype = DNA   length = 10
FEATURE                 Location/Qualifiers
source                  1..10
                        mol_type = other DNA
                        organism = synthetic construct SEQUENCE: 900
caatagcgga                                                                  10

SEQ ID NO: 901          moltype = DNA   length = 10
FEATURE                 Location/Qualifiers
source                  1..10
                        mol_type = other DNA
                        organism = synthetic construct SEQUENCE: 901
catctagttt                                                                  10

SEQ ID NO: 902          moltype = DNA   length = 10
FEATURE                 Location/Qualifiers
source                  1..10
                        mol_type = other DNA
                        organism = synthetic construct SEQUENCE: 902
gaagttccgg                                                                  10

SEQ ID NO: 903          moltype = DNA   length = 10
FEATURE                 Location/Qualifiers
source                  1..10
                        mol_type = other DNA
                        organism = synthetic construct SEQUENCE: 903
agcgagattc                                                                  10

SEQ ID NO: 904          moltype = DNA   length = 10
FEATURE                 Location/Qualifiers
source                  1..10
                        mol_type = other DNA
                        organism = synthetic construct SEQUENCE: 904
ttaaggtcgg                                                                  10

SEQ ID NO: 905          moltype = DNA   length = 10
FEATURE                 Location/Qualifiers
source                  1..10
                        mol_type = other DNA
                        organism = synthetic construct SEQUENCE: 905
aatggttagg                                                                  10

SEQ ID NO: 906          moltype = DNA   length = 10
FEATURE                 Location/Qualifiers
source                  1..10
                        mol_type = other DNA
                        organism = synthetic construct SEQUENCE: 906
cgttattata                                                                  10

SEQ ID NO: 907          moltype = DNA   length = 10
FEATURE                 Location/Qualifiers
source                  1..10
                        mol_type = other DNA
                        organism = synthetic construct
```

```
SEQUENCE: 907
acggaaagga                                                                                10

SEQ ID NO: 908         moltype = DNA  length = 10
FEATURE                Location/Qualifiers
source                 1..10
                       mol_type = other DNA
                       organism = synthetic construct SEQUENCE: 908
ccttgtcccg                                                                                10

SEQ ID NO: 909         moltype = DNA  length = 10
FEATURE                Location/Qualifiers
source                 1..10
                       mol_type = other DNA
                       organism = synthetic construct SEQUENCE: 909
atactttttt                                                                                10

SEQ ID NO: 910         moltype = DNA  length = 10
FEATURE                Location/Qualifiers
source                 1..10
                       mol_type = other DNA
                       organism = synthetic construct SEQUENCE: 910
ctgggtctgg                                                                                10

SEQ ID NO: 911         moltype = DNA  length = 10
FEATURE                Location/Qualifiers
source                 1..10
                       mol_type = other DNA
                       organism = synthetic construct SEQUENCE: 911
aaccattgcg                                                                                10

SEQ ID NO: 912         moltype = DNA  length = 10
FEATURE                Location/Qualifiers
source                 1..10
                       mol_type = other DNA
                       organism = synthetic construct SEQUENCE: 912
agaccgggcc                                                                                10

SEQ ID NO: 913         moltype = DNA  length = 10
FEATURE                Location/Qualifiers
source                 1..10
                       mol_type = other DNA
                       organism = synthetic construct SEQUENCE: 913
tgggacacac                                                                                10

SEQ ID NO: 914         moltype = DNA  length = 10
FEATURE                Location/Qualifiers
source                 1..10
                       mol_type = other DNA
                       organism = synthetic construct SEQUENCE: 914
tgcgcagttg                                                                                10

SEQ ID NO: 915         moltype = DNA  length = 10
FEATURE                Location/Qualifiers
source                 1..10
                       mol_type = other DNA
                       organism = synthetic construct SEQUENCE: 915
cgttcgcctt                                                                                10

SEQ ID NO: 916         moltype = DNA  length = 10
FEATURE                Location/Qualifiers
source                 1..10
                       mol_type = other DNA
                       organism = synthetic construct SEQUENCE: 916
tctcactcgt                                                                                10

SEQ ID NO: 917         moltype = DNA  length = 10
FEATURE                Location/Qualifiers
source                 1..10
                       mol_type = other DNA
```

-continued

```
SEQUENCE: 917
acaccgacgt                                                                          10

SEQ ID NO: 918           moltype = DNA   length = 10
FEATURE                  Location/Qualifiers
source                   1..10
                         mol_type = other DNA
                         organism = synthetic construct
SEQUENCE: 918
ttcagcccct                                                                          10

SEQ ID NO: 919           moltype = DNA   length = 10
FEATURE                  Location/Qualifiers
source                   1..10
                         mol_type = other DNA
                         organism = synthetic construct
SEQUENCE: 919
aggcgactaa                                                                          10

SEQ ID NO: 920           moltype = DNA   length = 10
FEATURE                  Location/Qualifiers
source                   1..10
                         mol_type = other DNA
                         organism = synthetic construct
SEQUENCE: 920
tgctatcaag                                                                          10

SEQ ID NO: 921           moltype = DNA   length = 10
FEATURE                  Location/Qualifiers
source                   1..10
                         mol_type = other DNA
                         organism = synthetic construct
SEQUENCE: 921
gtccagtagc                                                                          10

SEQ ID NO: 922           moltype = DNA   length = 10
FEATURE                  Location/Qualifiers
source                   1..10
                         mol_type = other DNA
                         organism = synthetic construct
SEQUENCE: 922
cgtgtgggcg                                                                          10

SEQ ID NO: 923           moltype = DNA   length = 10
FEATURE                  Location/Qualifiers
source                   1..10
                         mol_type = other DNA
                         organism = synthetic construct
SEQUENCE: 923
gtggttctcc                                                                          10

SEQ ID NO: 924           moltype = DNA   length = 10
FEATURE                  Location/Qualifiers
source                   1..10
                         mol_type = other DNA
                         organism = synthetic construct
SEQUENCE: 924
gcagccgacg                                                                          10

SEQ ID NO: 925           moltype = DNA   length = 10
FEATURE                  Location/Qualifiers
source                   1..10
                         mol_type = other DNA
                         organism = synthetic construct
SEQUENCE: 925
gctgtccacg                                                                          10

SEQ ID NO: 926           moltype = DNA   length = 10
FEATURE                  Location/Qualifiers
source                   1..10
                         mol_type = other DNA
                         organism = synthetic construct
SEQUENCE: 926
cgacactcat                                                                          10

SEQ ID NO: 927           moltype = DNA   length = 10
FEATURE                  Location/Qualifiers
source                   1..10
```

```
                        mol_type = other DNA
                        organism = synthetic construct
SEQUENCE: 927
catggcacct                                                              10

SEQ ID NO: 928          moltype = DNA  length = 10
FEATURE                 Location/Qualifiers
source                  1..10
                        mol_type = other DNA
                        organism = synthetic construct
SEQUENCE: 928
tgtgacgtgt                                                              10

SEQ ID NO: 929          moltype = DNA  length = 10
FEATURE                 Location/Qualifiers
source                  1..10
                        mol_type = other DNA
                        organism = synthetic construct
SEQUENCE: 929
tttggactaa                                                              10

SEQ ID NO: 930          moltype = DNA  length = 10
FEATURE                 Location/Qualifiers
source                  1..10
                        mol_type = other DNA
                        organism = synthetic construct
SEQUENCE: 930
ttcatgcccg                                                              10

SEQ ID NO: 931          moltype = DNA  length = 10
FEATURE                 Location/Qualifiers
source                  1..10
                        mol_type = other DNA
                        organism = synthetic construct
SEQUENCE: 931
ttgatcgtgg                                                              10

SEQ ID NO: 932          moltype = DNA  length = 10
FEATURE                 Location/Qualifiers
source                  1..10
                        mol_type = other DNA
                        organism = synthetic construct
SEQUENCE: 932
tagcatagga                                                              10

SEQ ID NO: 933          moltype = DNA  length = 10
FEATURE                 Location/Qualifiers
source                  1..10
                        mol_type = other DNA
                        organism = synthetic construct
SEQUENCE: 933
gtagttgcaa                                                              10

SEQ ID NO: 934          moltype = DNA  length = 10
FEATURE                 Location/Qualifiers
source                  1..10
                        mol_type = other DNA
                        organism = synthetic construct
SEQUENCE: 934
gggacagcta                                                              10

SEQ ID NO: 935          moltype = DNA  length = 10
FEATURE                 Location/Qualifiers
source                  1..10
                        mol_type = other DNA
                        organism = synthetic construct
SEQUENCE: 935
aaaccccaa                                                               10

SEQ ID NO: 936          moltype = DNA  length = 10
FEATURE                 Location/Qualifiers
source                  1..10
                        mol_type = other DNA
                        organism = synthetic construct
SEQUENCE: 936
actctcacaa                                                              10

SEQ ID NO: 937          moltype = DNA  length = 10
FEATURE                 Location/Qualifiers
```

| | | |
|---|---|---|
| source | 1..10<br>mol_type = other DNA<br>organism = synthetic construct | |
| SEQUENCE: 937<br>atcattgcca | | 10 |
| SEQ ID NO: 938<br>FEATURE<br>source | moltype = DNA  length = 10<br>Location/Qualifiers<br>1..10<br>mol_type = other DNA<br>organism = synthetic construct | |
| SEQUENCE: 938<br>ccagtttgcg | | 10 |
| SEQ ID NO: 939<br>FEATURE<br>source | moltype = DNA  length = 10<br>Location/Qualifiers<br>1..10<br>mol_type = other DNA<br>organism = synthetic construct | |
| SEQUENCE: 939<br>acattagtca | | 10 |
| SEQ ID NO: 940<br>FEATURE<br>source | moltype = DNA  length = 10<br>Location/Qualifiers<br>1..10<br>mol_type = other DNA<br>organism = synthetic construct | |
| SEQUENCE: 940<br>ctccagggta | | 10 |
| SEQ ID NO: 941<br>FEATURE<br>source | moltype = DNA  length = 10<br>Location/Qualifiers<br>1..10<br>mol_type = other DNA<br>organism = synthetic construct | |
| SEQUENCE: 941<br>gaagggccaa | | 10 |
| SEQ ID NO: 942<br>FEATURE<br>source | moltype = DNA  length = 10<br>Location/Qualifiers<br>1..10<br>mol_type = other DNA<br>organism = synthetic construct | |
| SEQUENCE: 942<br>cagtctcccc | | 10 |
| SEQ ID NO: 943<br>FEATURE<br>source | moltype = DNA  length = 10<br>Location/Qualifiers<br>1..10<br>mol_type = other DNA<br>organism = synthetic construct | |
| SEQUENCE: 943<br>gagacattcc | | 10 |
| SEQ ID NO: 944<br>FEATURE<br>source | moltype = DNA  length = 10<br>Location/Qualifiers<br>1..10<br>mol_type = other DNA<br>organism = synthetic construct | |
| SEQUENCE: 944<br>aacggtgttg | | 10 |
| SEQ ID NO: 945<br>FEATURE<br>source | moltype = DNA  length = 10<br>Location/Qualifiers<br>1..10<br>mol_type = other DNA<br>organism = synthetic construct | |
| SEQUENCE: 945<br>agcattatca | | 10 |
| SEQ ID NO: 946<br>FEATURE<br>source | moltype = DNA  length = 10<br>Location/Qualifiers<br>1..10<br>mol_type = other DNA<br>organism = synthetic construct | |
| SEQUENCE: 946<br>ctataccgag | | 10 |
| SEQ ID NO: 947 | moltype = DNA  length = 10 | |

| | | |
|---|---|---|
| FEATURE | Location/Qualifiers | |
| source | 1..10<br>mol_type = other DNA<br>organism = synthetic construct | |
| SEQUENCE: 947<br>aactggatca | | 10 |
| SEQ ID NO: 948<br>FEATURE<br>source | moltype = DNA length = 10<br>Location/Qualifiers<br>1..10<br>mol_type = other DNA<br>organism = synthetic construct | |
| SEQUENCE: 948<br>gtcttgtcgg | | 10 |
| SEQ ID NO: 949<br>FEATURE<br>source | moltype = DNA length = 10<br>Location/Qualifiers<br>1..10<br>mol_type = other DNA<br>organism = synthetic construct | |
| SEQUENCE: 949<br>gacgagccgc | | 10 |
| SEQ ID NO: 950<br>FEATURE<br>source | moltype = DNA length = 10<br>Location/Qualifiers<br>1..10<br>mol_type = other DNA<br>organism = synthetic construct | |
| SEQUENCE: 950<br>ggaacactgt | | 10 |
| SEQ ID NO: 951<br>FEATURE<br>source | moltype = DNA length = 10<br>Location/Qualifiers<br>1..10<br>mol_type = other DNA<br>organism = synthetic construct | |
| SEQUENCE: 951<br>taaatgcgtt | | 10 |
| SEQ ID NO: 952<br>FEATURE<br>source | moltype = DNA length = 10<br>Location/Qualifiers<br>1..10<br>mol_type = other DNA<br>organism = synthetic construct | |
| SEQUENCE: 952<br>gcgaacacag | | 10 |
| SEQ ID NO: 953<br>FEATURE<br>source | moltype = DNA length = 10<br>Location/Qualifiers<br>1..10<br>mol_type = other DNA<br>organism = synthetic construct | |
| SEQUENCE: 953<br>ttctctcaac | | 10 |
| SEQ ID NO: 954<br>FEATURE<br>source | moltype = DNA length = 10<br>Location/Qualifiers<br>1..10<br>mol_type = other DNA<br>organism = synthetic construct | |
| SEQUENCE: 954<br>gtcgtactga | | 10 |
| SEQ ID NO: 955<br>FEATURE<br>source | moltype = DNA length = 10<br>Location/Qualifiers<br>1..10<br>mol_type = other DNA<br>organism = synthetic construct | |
| SEQUENCE: 955<br>tgtggcgtaa | | 10 |
| SEQ ID NO: 956<br>FEATURE<br>source | moltype = DNA length = 10<br>Location/Qualifiers<br>1..10<br>mol_type = other DNA<br>organism = synthetic construct | |
| SEQUENCE: 956<br>tgagcggcgt | | 10 |

| | | |
|---|---|---|
| SEQ ID NO: 957<br>FEATURE<br>source | moltype = DNA   length = 10<br>Location/Qualifiers<br>1..10<br>mol_type = other DNA<br>organism = synthetic construct | |
| SEQUENCE: 957<br>cctcgtgaac | | 10 |
| SEQ ID NO: 958<br>FEATURE<br>source | moltype = DNA   length = 10<br>Location/Qualifiers<br>1..10<br>mol_type = other DNA<br>organism = synthetic construct | |
| SEQUENCE: 958<br>gagcaatgaa | | 10 |
| SEQ ID NO: 959<br>FEATURE<br>source | moltype = DNA   length = 10<br>Location/Qualifiers<br>1..10<br>mol_type = other DNA<br>organism = synthetic construct | |
| SEQUENCE: 959<br>cgagacctaa | | 10 |
| SEQ ID NO: 960<br>FEATURE<br>source | moltype = DNA   length = 10<br>Location/Qualifiers<br>1..10<br>mol_type = other DNA<br>organism = synthetic construct | |
| SEQUENCE: 960<br>aactgagcgc | | 10 |
| SEQ ID NO: 961<br>FEATURE<br>source | moltype = DNA   length = 10<br>Location/Qualifiers<br>1..10<br>mol_type = other DNA<br>organism = synthetic construct | |
| SEQUENCE: 961<br>taaagctcgt | | 10 |
| SEQ ID NO: 962<br>FEATURE<br>source | moltype = DNA   length = 10<br>Location/Qualifiers<br>1..10<br>mol_type = other DNA<br>organism = synthetic construct | |
| SEQUENCE: 962<br>ctctttacgt | | 10 |
| SEQ ID NO: 963<br>FEATURE<br>source | moltype = DNA   length = 10<br>Location/Qualifiers<br>1..10<br>mol_type = other DNA<br>organism = synthetic construct | |
| SEQUENCE: 963<br>ccccgtggaa | | 10 |
| SEQ ID NO: 964<br>FEATURE<br>source | moltype = DNA   length = 10<br>Location/Qualifiers<br>1..10<br>mol_type = other DNA<br>organism = synthetic construct | |
| SEQUENCE: 964<br>tcggttcgtc | | 10 |
| SEQ ID NO: 965<br>FEATURE<br>source | moltype = DNA   length = 10<br>Location/Qualifiers<br>1..10<br>mol_type = other DNA<br>organism = synthetic construct | |
| SEQUENCE: 965<br>ctgcttacac | | 10 |
| SEQ ID NO: 966<br>FEATURE<br>source | moltype = DNA   length = 10<br>Location/Qualifiers<br>1..10<br>mol_type = other DNA<br>organism = synthetic construct | |
| SEQUENCE: 966<br>acaccgtaat | | 10 |

```
SEQ ID NO: 967         moltype = DNA  length = 10
FEATURE                Location/Qualifiers
source                 1..10
                       mol_type = other DNA
                       organism = synthetic construct SEQUENCE: 967
cctggtcggc                                                              10

SEQ ID NO: 968         moltype = DNA  length = 10
FEATURE                Location/Qualifiers
source                 1..10
                       mol_type = other DNA
                       organism = synthetic construct SEQUENCE: 968
ggttatttgg                                                              10

SEQ ID NO: 969         moltype = DNA  length = 10
FEATURE                Location/Qualifiers
source                 1..10
                       mol_type = other DNA
                       organism = synthetic construct SEQUENCE: 969
gcaactgagt                                                              10

SEQ ID NO: 970         moltype = DNA  length = 10
FEATURE                Location/Qualifiers
source                 1..10
                       mol_type = other DNA
                       organism = synthetic construct SEQUENCE: 970
ataaggcctc                                                              10

SEQ ID NO: 971         moltype = DNA  length = 10
FEATURE                Location/Qualifiers
source                 1..10
                       mol_type = other DNA
                       organism = synthetic construct SEQUENCE: 971
cgtgcgaagg                                                              10

SEQ ID NO: 972         moltype = DNA  length = 10
FEATURE                Location/Qualifiers
source                 1..10
                       mol_type = other DNA
                       organism = synthetic construct SEQUENCE: 972
gtcacacact                                                              10

SEQ ID NO: 973         moltype = DNA  length = 10
FEATURE                Location/Qualifiers
source                 1..10
                       mol_type = other DNA
                       organism = synthetic construct SEQUENCE: 973
catacggcaa                                                              10

SEQ ID NO: 974         moltype = DNA  length = 10
FEATURE                Location/Qualifiers
source                 1..10
                       mol_type = other DNA
                       organism = synthetic construct SEQUENCE: 974
gaactgccca                                                              10

SEQ ID NO: 975         moltype = DNA  length = 10
FEATURE                Location/Qualifiers
source                 1..10
                       mol_type = other DNA
                       organism = synthetic construct SEQUENCE: 975
aatatgtgaa                                                              10

SEQ ID NO: 976         moltype = DNA  length = 10
FEATURE                Location/Qualifiers
source                 1..10
                       mol_type = other DNA
                       organism = synthetic construct

SEQUENCE: 976
```

-continued ccgatcctgt                                                          10

SEQ ID NO: 977         moltype = DNA   length = 10
FEATURE                Location/Qualifiers
source                 1..10
                       mol_type = other DNA
                       organism = synthetic construct SEQUENCE: 977
caaagagcct                                                          10

SEQ ID NO: 978         moltype = DNA   length = 10
FEATURE                Location/Qualifiers
source                 1..10
                       mol_type = other DNA
                       organism = synthetic construct SEQUENCE: 978
taacttagag                                                          10

SEQ ID NO: 979         moltype = DNA   length = 10
FEATURE                Location/Qualifiers
source                 1..10
                       mol_type = other DNA
                       organism = synthetic construct SEQUENCE: 979
cagcatgtag                                                          10

SEQ ID NO: 980         moltype = DNA   length = 10
FEATURE                Location/Qualifiers
source                 1..10
                       mol_type = other DNA
                       organism = synthetic construct SEQUENCE: 980
ccccatgcag                                                          10

SEQ ID NO: 981         moltype = DNA   length = 10
FEATURE                Location/Qualifiers
source                 1..10
                       mol_type = other DNA
                       organism = synthetic construct SEQUENCE: 981
tctgaaccac                                                          10

SEQ ID NO: 982         moltype = DNA   length = 10
FEATURE                Location/Qualifiers
source                 1..10
                       mol_type = other DNA
                       organism = synthetic construct SEQUENCE: 982
gcgtgcaaaa                                                          10

SEQ ID NO: 983         moltype = DNA   length = 10
FEATURE                Location/Qualifiers
source                 1..10
                       mol_type = other DNA
                       organism = synthetic construct SEQUENCE: 983
gctagtaccg                                                          10

SEQ ID NO: 984         moltype = DNA   length = 10
FEATURE                Location/Qualifiers
source                 1..10
                       mol_type = other DNA
                       organism = synthetic construct SEQUENCE: 984
tttcccgcgc                                                          10

SEQ ID NO: 985         moltype = DNA   length = 10
FEATURE                Location/Qualifiers
source                 1..10
                       mol_type = other DNA
                       organism = synthetic construct SEQUENCE: 985
ccttagtagg                                                          10

SEQ ID NO: 986         moltype = DNA   length = 10
FEATURE                Location/Qualifiers
source                 1..10
                       mol_type = other DNA
                       organism = synthetic construct

| | | |
|---|---|---|
| SEQUENCE: 986 ttgtgtcttg | | 10 |
| SEQ ID NO: 987 FEATURE source  SEQUENCE: 987 gcaacgaagc | moltype = DNA   length = 10 Location/Qualifiers 1..10 mol_type = other DNA organism = synthetic construct | 10 |
| SEQ ID NO: 988 FEATURE source  SEQUENCE: 988 tgaaacccctt | moltype = DNA   length = 10 Location/Qualifiers 1..10 mol_type = other DNA organism = synthetic construct | 10 |
| SEQ ID NO: 989 FEATURE source  SEQUENCE: 989 ttctacgatc | moltype = DNA   length = 10 Location/Qualifiers 1..10 mol_type = other DNA organism = synthetic construct | 10 |
| SEQ ID NO: 990 FEATURE source  SEQUENCE: 990 attaaaggtg | moltype = DNA   length = 10 Location/Qualifiers 1..10 mol_type = other DNA organism = synthetic construct | 10 |
| SEQ ID NO: 991 FEATURE source  SEQUENCE: 991 tatctaacgg | moltype = DNA   length = 10 Location/Qualifiers 1..10 mol_type = other DNA organism = synthetic construct | 10 |
| SEQ ID NO: 992 FEATURE source  SEQUENCE: 992 agtgctcctg | moltype = DNA   length = 10 Location/Qualifiers 1..10 mol_type = other DNA organism = synthetic construct | 10 |
| SEQ ID NO: 993 FEATURE source  SEQUENCE: 993 ccgtccctct | moltype = DNA   length = 10 Location/Qualifiers 1..10 mol_type = other DNA organism = synthetic construct | 10 |
| SEQ ID NO: 994 FEATURE source  SEQUENCE: 994 ctaacgagcg | moltype = DNA   length = 10 Location/Qualifiers 1..10 mol_type = other DNA organism = synthetic construct | 10 |
| SEQ ID NO: 995 FEATURE source  SEQUENCE: 995 aagtccggct | moltype = DNA   length = 10 Location/Qualifiers 1..10 mol_type = other DNA organism = synthetic construct | 10 |
| SEQ ID NO: 996 FEATURE source | moltype = DNA   length = 10 Location/Qualifiers 1..10 mol_type = other DNA | |

```
                         organism = synthetic construct
SEQUENCE: 996
ggcgtataag                                                              10

SEQ ID NO: 997           moltype = DNA  length = 10
FEATURE                  Location/Qualifiers
source                   1..10
                         mol_type = other DNA
                         organism = synthetic construct
SEQUENCE: 997
agatattagg                                                              10

SEQ ID NO: 998           moltype = DNA  length = 10
FEATURE                  Location/Qualifiers
source                   1..10
                         mol_type = other DNA
                         organism = synthetic construct
SEQUENCE: 998
tcctaacagc                                                              10

SEQ ID NO: 999           moltype = DNA  length = 10
FEATURE                  Location/Qualifiers
source                   1..10
                         mol_type = other DNA
                         organism = synthetic construct
SEQUENCE: 999
gaggatacgc                                                              10

SEQ ID NO: 1000          moltype = DNA  length = 10
FEATURE                  Location/Qualifiers
source                   1..10
                         mol_type = other DNA
                         organism = synthetic construct
SEQUENCE: 1000
cgctctttaa                                                              10

SEQ ID NO: 1001          moltype = DNA  length = 21
FEATURE                  Location/Qualifiers
source                   1..21
                         mol_type = other DNA
                         organism = synthetic construct
modified_base            1
                         mod_base = OTHER
                         note = Nucleotide with phosphorothioate linkage
modified_base            2
                         mod_base = OTHER
                         note = Nucleotide with phosphorothioate linkage
modified_base            3
                         mod_base = OTHER
                         note = Nucleotide with phosphorothioate linkage
SEQUENCE: 1001
agacgtgtgc tcttccgatc t                                                 21

SEQ ID NO: 1002          moltype = DNA  length = 20
FEATURE                  Location/Qualifiers
source                   1..20
                         mol_type = other DNA
                         organism = synthetic construct
modified_base            17
                         mod_base = OTHER
                         note = Nucleotide with phosphorothioate linkage
modified_base            18
                         mod_base = OTHER
                         note = Nucleotide with phosphorothioate linkage
modified_base            19
                         mod_base = OTHER
                         note = Nucleotide with phosphorothioate linkage
SEQUENCE: 1002
agatcggaag agcgtcgtgt                                                   20

SEQ ID NO: 1003          moltype = DNA  length = 61
FEATURE                  Location/Qualifiers
source                   1..61
                         mol_type = other DNA
                         organism = synthetic construct
modified_base            1
                         mod_base = OTHER
                         note = 5' Amino Modifier C6 modified nucleotide with
                          phosphorothioate linkage
```

```
modified_base         2
                      mod_base = OTHER
                      note = Nucleotide with phosphorothioate linkage
modified_base         3
                      mod_base = OTHER
                      note = Nucleotide with phosphorothioate linkage
misc_difference       32
                      note = a, c, t, g, unknown or other
misc_difference       33
                      note = a, c, t, g, unknown or other
misc_difference       34
                      note = a, c, t, g, unknown or other
misc_difference       35
                      note = a, c, t, g, unknown or other
misc_difference       36
                      note = a, c, t, g, unknown or other
misc_difference       37
                      note = a, c, t, g, unknown or other
misc_difference       38
                      note = a, c, t, g, unknown or other
misc_difference       39
                      note = a, c, t, g, unknown or other
misc_difference       40
                      note = a, c, t, g, unknown or other
misc_difference       41
                      note = a, c, t, g, unknown or other
modified_base         58
                      mod_base = OTHER
                      note = Nucleotide with phosphorothioate linkage
modified_base         59
                      mod_base = OTHER
                      note = Nucleotide with phosphorothioate linkage
modified_base         60
                      mod_base = OTHER
                      note = Nucleotide with phosphorothioate linkage
SEQUENCE: 1003
agacgtgtgc tcttccgatc tgctacataa tnnnnnnnnn nagatcggaa gagcgtcgtg    60
t                                                                    61
```

USE OF DNA ORIGAMI NANOSTRUCTURES FOR MOLECULAR INFORMATION BASED DATA STORAGE SYSTEMS

CROSS REFERENCE TO RELATED APPLICATIONS

This non-provisional application claims the benefit and priority, under 35 U.S.C. § 119(e) and any other applicable laws and statutes, to U.S. Provisional Application Ser. No. 63/607,741 filed on Dec. 8, 2023, the entire disclosure of which is incorporated herein by reference.

INCORPORATION BY REFERENCES OF MATERIAL SUBMITTED ELECTRONICALLY

Incorporated by reference in its entirety is a computer-readable nucleotide/amino acid sequence listing submitted concurrently herewith and identified as an 865 kilobytes xml file named "416751.xml," created on Dec. 2, 2024.

BACKGROUND

The shift to digital systems for the creation, transmission and storage of information has led to increasing complexity in archiving data, requiring active, ongoing maintenance of the digital media. DNA is an attractive medium for information storage because of its capacity for high density information encoding, longevity under easily-achieved conditions and proven track record as an information bearer. Thus, relative to the solid state storage media, DNA provides superior data density and durability. For example, data stored in the DNA sequence is significantly more dense than the most compact solid-state hard drive and significantly more durable than the most stable magnetic tapes. In addition, DNA's four-letter nucleotide code offers a suitable coding environment that can be leveraged like the binary digital code used by computers and other electronic devices to represent any letter, digit, or other character. Furthermore, studies show that DNA properly encapsulated with a salt remains stable for decades at room temperature and should last much longer in the controlled environs of a data center. In addition, DNA doesn't require maintenance, and files stored in DNA are easily copied for negligible cost.

Current molecular data archival systems suffer from one or more deficiencies including the failure to efficiently allow selective access to specific data sets (random access), and/or the failure to allow repeated information access without loss in information fidelity. More particularly, current approaches for achieving random access, which avoid sequencing of the entire pool include:

(1) polymerase chain reaction (PCR) based amplification to selectively enrich a sub-pool over the background by added address-specific primers; and (2) physical separation of the desired sub-pool through the use of magnetic beads or fluorescent based sorting (FACS). While the PCR method of random access scales well to a pool capacity of 17 exabytes/gram, it necessitates a rigorous design of the primers or the use of a hierarchical addressing system to achieve the specificity at scale. Moreover, these primer-based addressing systems irreversibly remove oligonucleotides from the pool and are incompatible with common storage approaches, necessitating the removal and re-embedding of the encoding DNA into the storage pool for each random-access operation.

In accordance with one embodiment of the present invention a storage system is provided that solves these challenges by using DNA Origami (DNAO) techniques to package the data encoded DNA strands. This approach will act both as a filing and addressing system for storing DNA molecules and will allow for a straightforward single-step method for random access without the need for removing the data containing oligonucleotides from the storage pool.

SUMMARY

In accordance with one embodiment, the present disclosure is directed to compositions and methods that allow for selective physical data access and retrieval from a molecular pool. Current data molecular data archival data systems do not allow for selective access to specific data sets (random access), high storage density and/or repeated information access without loss in information fidelity. One aspect of the present disclosure is directed to a method for DNA data archiving that uses the principles of DNA origami to package and archive data stored in multiple indexed DNA oligonucleotides into individual DNA origami (DNAO) nanostructures (named "DNAFiles" herein) for precise organization, greater stability, and ease of data retrieval.

Current strategies for data retrieval that employ polymerase chain reaction (PCR) based random access, rely on additional separation steps which introduces complexity and an irreversible loss of the retrieved data. The presently disclosed methods use a DNAFile system, wherein a single-step retrieval is used to address the gap in traditional molecular information archival systems, and thus accelerates the potential access time and increases the stability of DNA data storage.

In accordance with one embodiment of the present disclosure, a library of DNAFiles is provided wherein the library comprises a plurality of origami folded DNAFiles, where each of the DNAFiles comprises a single stranded DNA scaffold and a plurality of single stranded DNA staple oligonucleotides that bind through complementary base pairing with two non-contiguous segments of the DNA scaffold, wherein said staple oligonucleotides cause the DNA scaffold to reversibly fold into a two or three dimensional shape. The DNAFiles further comprised a plurality of data oligonucleotides that comprise a nucleic acid sequence complementary to the DNA scaffold and a nucleic acid sequence that is non-complementary to the DNA scaffold wherein the non-complementary nucleic acid sequence encodes digital information. In one embodiment the nucleic acid sequences that encodes digital information further comprise a first and second primer binding sequence located at the respective 5' and 3' ends of each nucleic acid sequence encoding digital information to allow PCR amplification of the nucleic acid sequence encoding digital information. In one embodiment the first and second primer binding sequences located at the respective 5' and 3' ends of each data oligonucleotide, wherein both the 5' end of the data oligonucleotide and the 3' end of the data oligonucleotide are non-complementary to the DNA scaffold. In one embodiment each of the individual DNAFiles differ from one another based on the nucleic acid sequence of the staple oligonucleotides and/or the data oligonucleotides bound to the DNA scaffold of each DNAFile.

In a further embodiment Applicant has discovered that libraries of DNAFiles comprising data oligonucleotides projecting away from the scaffold strand induces a degree of aggregation correlated to the % occupancy (see FIG. 2). However, one-sided occupancy substantially reduced multi-order structures. Accordingly, in one embodiment DNAFiles are prepared comprising a plurality of data oligonucleotides bound to the DNA scaffold and projecting away from only one side of the DNA scaffold, and generally in only one direction, optionally all overhang regions projecting away from only one side of the DNA scaffold within an angle about 80 to 90 degrees relative to the DNA scaffold surface.

Use of the the first and second primer binding sequences located at the respective 5' and 3' ends of each data oligonucleotide allows for amplification of the entire data oligonucleotide and reconstitution of the original DNAFile and sequence analysis of the generated amplicons to retrieve the data encoded by the data oligonucleotide. This process provides a check for encoding fidelity/corruption data based on the 2D/3D structure of the origami DNA (if there is an error in the base sequence, the structure will not fold properly); provides an option of labelling individual DNAFiles with unique DNA barcodes for identifying single DNAFiles and separate them from other DNAFiles of the library for accessing the data of specific portions of a library of stored data; and allows for rapid recovery of the original DNA File after accessing the data, through reannealing the nucleic acid sequences to reconstitute the DNAFile and isolating the DNAFile by size separation (i.e. gel electrophoresis, or size exclusion chromatography).

Advantages of the present system of using DNAFiles include:
a) Data can be stored at multiple levels: in the multiple smaller oligonucleotide staple strands, in the data oligonucleotides, in the longer scaffold strand or in the 3D folded structure itself allowing for greater storage flexibility and hierarchical organization.
b) Physical encryption keys will lock or unlock targeted DNAFiles for storage, readout, or tamper-prevention.
c) Data exists in a closed-packed configuration that has higher stability than regular duplex DNA.
d) Data are easily addressable by inclusion of staple overhangs/bar codes that can be base-paired to externally added functionalized oligonucleotides for physical separation if needed.

In accordance with one embodiment a library comprising a plurality of origami folded DNA files (DNAFile) is provided, wherein each DNAFile comprises a single stranded scaffold DNA, a plurality of staple oligonucleotides, and a plurality of data oligonucleotides, wherein a unique set of data is stored within the sequences of the scaffold DNA, the data oligonucleotides and/or staple oligonucleotides of the DNAFiles. In one embodiment the data is stored solely within the sequence of the data oligonucleotides. In one embodiment the individual DNAFiles differ from one another based on the nucleic acid sequence of the data oligonucleotides bound to the DNA scaffold of each DNAFile, and optionally also differ from one another based on the nucleotide sequence of the respective DNA scaffold and staple oligonucleotides of each DNAFile. Each DNAFile comprises a single stranded DNA scaffold; and a plurality of single stranded DNA staple oligonucleotides, wherein the staple oligonucleotides have a length less than 10%, 5% or 1% of the DNA scaffold and bind through complementary base pairing with non-contiguous nucleic acid sequences of the DNA scaffold, further wherein said staple oligonucleotides cause the DNA scaffold to reversibly fold into a two or three dimensional shape. In one embodiment the nucleic acids of the DNA scaffold, the data oligonucleotides and/or one or more of said staple oligonucleotides comprise nucleic acid sequences that encode digital information, optionally wherein only the data oligonucleotides comprise nucleic acid sequences that encode digital information. In one embodiment the data oligonucleotides comprise: 1) a nucleic acid sequence complementary to a nucleic acid sequence of the single stranded DNA scaffold, 2) a nucleic acid sequence that encodes digital information, and 3) a first and second primer binding sequence, wherein the first primer binding sequence is 5' to the digital information encoding nucleic acid sequence, and the second primer binding sequence is 3' to the digital information encoding nucleic acid sequence.

In one embodiment the staple oligonucleotides and the data oligonucleotides of the individual DNAFiles have a length of about 30 to about 200 or about 50 to about 150 nucleotides or about 30 to about 100 nucleotides or about 80 or 100 nucleotides in length. The staple oligonucleotides comprise a first and second sequence that are complementary to non-contiguous sequences present on the scaffold, such that upon binding of the staple oligonucleotide to the DNA scaffold, the DNA scaffold is folded. The data oligonucleotides comprise a sequence that is complementary to the DNA scaffold DNA and a sequence that is non-complementary to said DNA scaffold (i.e., an "overhang"), wherein the non-complementary region comprises nucleic acid sequences that encode digital information. In one embodiment the overhang region of the data oligonucleotide is at least 50 nucleotides in length and up to 180 nucleotides in length. In one embodiment the data oligonucleotides further comprise primer binding sequences and optionally barcoding sequences. In accordance with one embodiment each data oligonucleotide is provided with a primer binding sequence at the 5' and the 3' end of the data oligonucleotide to allow for PCR amplification of the entire data oligonucleotides upon release from the DNA scaffold of the DNAFile. In one embodiment the two primer binding sequence flank the non-complementary nucleic acid sequences that encode digital information, wherein a first primer binding sequence is located at the 5' terminus of the non-complementary nucleic acid sequence and a second primer binding sequence is located at the 3' terminus of the non-complementary nucleic acid sequence, and said sequence complementary to the DNA scaffold is located 5' to the first primer binding sequence or 3' to the second primer binding sequence. In one embodiment each data oligonucleotide of a DNAFile is provided with the same pair of primer binding sequence located at the respective 3' and 5' ends of 1) each data oligonucleotide or 2) the non-complementary nucleic acid sequence of each data oligonucleotide. In one embodiment the primer binding sequences are 10 to 20 nucleotides in length and the non-complementary nucleic acid sequence is about 10 to 60 nucleotides in length. In one embodiment the primer binding sequences are 10 to 20 nucleotides in length and the non-complementary nucleic acid sequence is about 40 to 160 nucleotides in length. In one embodiment the primer binder sequences differ between the data oligonucleotides of one DNAFile relative to the primer binding sequence of the data oligonucleotides of other DNAFiles of the library of DNAFiles. In one embodiment a subset of the data oligonucleotides of an individual DNAFile can comprises different primer binding sequence relative to one another. In one embodiment the 3' end of the non-complementary region/overhang of said data oligonucleotide comprises a poly A or poly T extension. In one embodiment, at least a portion of the non-complementary region of said data oligonucleotides is designed to form a hairpin structure.

In one embodiment the DNAFiles of the present invention are folded by the staple oligonucleotides into a predetermined two dimensional or three dimensional shape having a plurality of exterior surfaces. In one embodiment the data oligonucleotides are bound to only one exterior surface of the two dimensional or three dimensional shaped DNA scaffold, wherein the non-complementary sequences of the data oligonucleotides (overhang) project away from the DNA scaffold in approximately the same direction. In one embodiment the staple oligonucleotides fold the DNA scaffold into the shape of a multi-layered sheet. In one embodiment the multi-layered sheet comprises two sheets of origami folded DNA layered on top of each other in either a parallel or anti-parallel orientation, wherein the multilayered sheet has a top surface and a bottom surface. In one embodiment the data oligonucleotides are bound only to the top surface, wherein the non-complementary sequences of the data oligonucleotides (overhang) project away from the DNA scaffold in approximately the same direction (each projecting away at an angle within 70 to 90 degrees or within 80 to 90 degrees). In one embodiment the density of the data oligonucleotides can be varied from a low density (approximately 20% of maximal occupancy) to high density (approximately 100% of maximal occupancy) and any amount in between (i.e., 30, 40, 50, 60, 70, 80, or 90 percent maximal occupancy), or at a density of less than 500, 300, 200, 100, 80, 50, 40, 20 or 10 data oligonucleotides per 100 $nm^2$. Applicant has discovered that increasing the percentage of data oligonucleotide occupancy is correlated with increased aggregation of the DNAFiles. However high occupancy can still be achieved with minimal aggregation if the data oligonucleotides are attached to only one surface of a multi-sheet conformation of the DNAFiles. In one embodiment the data oligonucleotides are uniformly distributed over only one surface of the DNAFile.

In accordance with one embodiment the DNAFiles each have the shape of a multi-layered sheet, optionally a rectangular or square sheet, having only the top surface populated with data oligonucleotides at 40, 60, 80 or 100% occupancy. In one embodiment modifications are made to stabilize the DNAFiles sheet shape as a planar shape (i.e. holding the multi-layered sheet conformation in a more of a two-dimensional shape than a twisted three-dimensional), and these modifications include one or more of the following:

a) adding a sequence of six or more thymidine resides (poly(T)) to the end of the noncomplementary sequence of the data oligonucleotides;
  b) decreasing staple length around sheet corners to less than 100 nucleotides, or less than 50 nucleotides, to allow for flexibility during folding process;
  c) adding additional crossover staples that bind to non-contiguous sequences of the DAN scaffold to improve stability and shape of the origami folded construct;
  d) introducing intentional gaps or missing base pairs within the scaffold DNA strand/staple folded structure (i.e. "skips") near the center-line of the folded multi-layered sheet to decrease twist.

In one embodiment the data oligonucleotides share base pair complementarity with the DNA scaffold but do not participate in the folding of the DNA scaffold. Such single stranded DNA non-staple oligonucleotides comprise a region complementary to said DNA scaffold and a region non-complementary to said DNA scaffold, wherein the non-complementary region comprises nucleic acid sequences that encodes digital information, optionally wherein the non-complementary region of the non-staple oligonucleotides further comprises primer binding sequence and optionally bar coding sequences.

In one embodiment a method of retrieving digital data stored in DNA is provided. The method comprises providing a library of origami folded DNA files (DNAFile), wherein each DNAFile comprises a single stranded scaffold DNA, a plurality of staple oligonucleotides and a plurality of data oligonucleotides, with a unique set of data stored within the sequences of the scaffold DNA and/or staple oligonucleotides of the DNAFiles. In one embodiment the the data is stored only in the noncomplementary sequence of the data oligonucleotides. The library of DNAFiles is subjected to denaturing conditions to at least partially disrupt the hybridized duplex between the single stranded staple oligonucleotides and the DNA scaffold and between the single stranded data oligonucleotides and the DAN scaffold, followed by PCR amplification of the nucleic acid sequences containing the primer binding sequences to produce amplicons. The staple oligonucleotides and data oligonucleotides are then reannealed with the DNA scaffold to reconstitute the folded origami DNAFiles and the synthesized amplicons are separated the from the reconstituted folded origami DNAFiles. The separated reconstituted folded origami DNA file(s) (DNAFiles) are then returned to storage and the separated and recovered amplicons are sequenced to retrieve digital data encoded by the DNAFile. In accordance with one embodiment individual DNAFiles are selected from the original library, and only the selected DNAFiles are subject to the denaturing and amplification steps, wherein the reconstituted folded origami DNA file(s) (DNAFiles) are returned to the non-selected members of the original library to reconstitute the original full library, prior to returning the reconstituted library to storage.

The library of DNAFiles can be stored in ambient temperatures in a lyophilized state. Other means of stabilizing DNA origami structures are known those skilled in the art.

BRIEF DESCRIPTION OF DRAWINGS

FIG. 3A is a schematic drawing of origami folded sheet configuration, having a single folded origami layer, a double layered sheet where the two sheet are in an anti-parallel relationship, and a double layered sheet where the two sheet are in an anti-parallel relationship. FIG. 3B is a computer generated modeling of the origami folded sheet configuration in the absence of stabilizing modifications and with stabilizing modifications (introducing intentional gaps or missing base pairs within the scaffold DNA strand/staple folded structure near the center-line of the folded bilayer sheet).

FIG. 4A provides an example wherein the length of the sequence encoding digital information can be varied while retaining an overall length of about 80 to 100 nucleotides. In this embodiment the sequence that shares complementarity with the single stranded scaffold DNA is located at one end of the data oligonucleotide. In FIG. 4B, the data oligonucleotide has two noncomplementary overhangs, wherein a first primer binding sequence is located at one end of the data oligonucleotide and a second primer binding sequence is located at the other end of the data oligonucleotide with the sequence that shares complementarity with the single stranded scaffold DNA and the data encoding sequence being located between the first and second primer binding sequences.

DETAILED DESCRIPTION

Definitions

Figure 1:
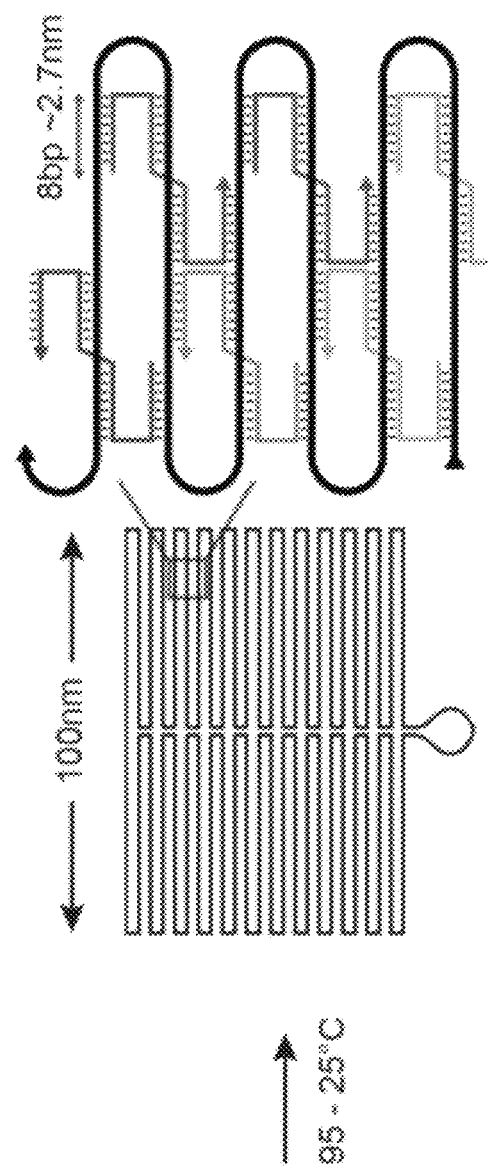
FIG. 1 is a schematic drawing showing how DNA origami leverages the complementary base pairing property of DNA to "fold" a large single stranded "scaffold" DNA, with the help of a plurality of short oligonucleotide "staples", into pre designed two or three dimensional structures. Using this strategy it is possible to pack several thousand bases (wherein the bases are selected to code for bits) into a nanostructure having nanometer dimensions. Advantageously, using DNA origami structures allows data to be directly encoded into the nucleotide bases of the staple oligonucleotides, data oligonucleotides, and/or scaffold DNA (providing high density compaction of the data).
Figure 1:
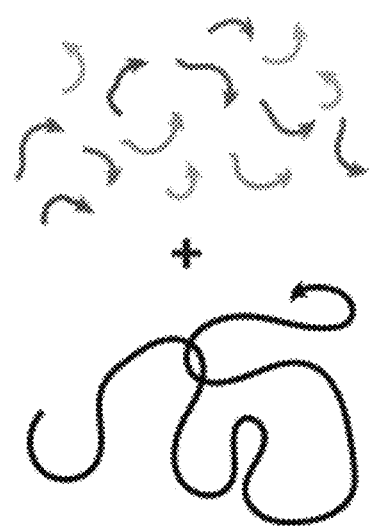

As used herein, the term "complementary base pairing" refers to the ability of purine and pyrimidine nucleotide sequences to associate through hydrogen bonding to form double-stranded nucleic acid molecules. Guanine and cytosine, adenine and thymine, and adenine and uracil are complementary and can associate through hydrogen bonding resulting in the formation of double-stranded nucleic acid molecules when two nucleic acid molecules have "complementary" sequences. The complementary sequences can be DNA or RNA sequences. The complementary DNA or RNA sequences are referred to as a "complement." As used herein the term "complementarity" when used in the context of a nucleic acid sequence, defines a level of sequence identity between two nucleic acid sequences that allows for specific hybridization between the two respective sequences.

As used herein the term "DNA scaffold" defines a large single stranded DNA of approximately 500 to about 31,000 bases which is folded by a plurality of preselected complementary DNA staple oligonucleotides.

As used herein the term "single stranded DNA staple oligonucleotide" or "staple oligonucleotide" defines a nucleic acid sequence that will self-assemble with a single stranded DNA scaffold to reversibly fold the single stranded DNA scaffold into a compacted 2-D and 3-D structure. Staple oligonucleotides typically comprise two or more nucleic acid sequences that are complementary, optionally having at least 80%, 90%, 95% or 99% sequence identity, to non-contiguous sequences present in a DNA scaffold, wherein the staple oligonucleotide sequences sharing complementarity with the DNA scaffold are linked to one another via a linking nucleic sequence, optionally wherein the linking nucleic acid sequence that lacks complementarity with the DNA scaffold.

As used herein the term "data oligonucleotide" defines a nucleic acid sequence comprising a sequence sharing at least 80%, 90%, 95% or 99% sequence identity with a corresponding scaffold DNA sequence, a data encoding sequence, and a first and second primer binding sequence flanking the data encoding sequence, i.e., where the first primer binding sequence is 5' to the data encoding sequence and the second primer binding sequence is 3' to the data encoding sequence.

As used herein the term "DNAFile" defines an origami folded construct comprising a single stranded DNA scaffold that is hybridized to a plurality of smaller DNA staple oligonucleotides, and a plurality of data oligonucleotides, wherein the hybridization of the plurality of staple oligonucleotides to the single stranded DNA scaffold cause the DNA scaffold to fold into a three dimensional shape, wherein the shape is reversible upon dissociation of the staples with the scaffold DNA.

As used herein the phrase "nucleic acid sequences that encodes digital information" or "data encoding sequence" defines a synthetic nucleic acid sequence wherein the sequence of the nucleotides has been selected to represent binary data. Several methods for encoding text are known to those skilled in the art. Most of these involve translating each letter into a corresponding "codon", consisting of a unique small sequence of nucleotides in a lookup table. Some examples of these encoding schemes include Huffman codes, comma codes, and alternating codes (see Smith G C, Fiddes C C, Hawkins J P, Cox J P (July 2003). "Some possible codes for encrypting data in DNA". Biotechnology Letters. 25 (14): 1125-1130).

Embodiments

The present disclosure is directed to compositions and methods for overcoming the challenges associated with archival and random access of data stored in DNA. More particularly, the present disclosure describes the use of DNA Origami (DNAO) techniques to package and retrieve data encoding DNA strands. DNA origami structures are described in U.S. Pat. No. 9,765,341, the disclosure of which is incorporated herein by reference. In the present approach libraries of DNAO structures (DNAFiles) are provided that will act both as a filing and addressing system for storing data encoding DNA molecules and will allow for a straight-forward single step method for random access without the need for permanently removing the nucleic acids encoding the data from the storage pool.

In accordance with one embodiment compositions and methods are provided for packaging and archiving data stored in indexed DNA into individual DNAFiles. DNAFiles, in addition to providing organization and compartmentalization, offer the unique advantage of PCR retrieval of data without loss in organization or material consumption. Current strategies that employ PCR based data retrieval rely on additional steps to physically separate subsets from a complex pool before amplification which increase system complexity and lead to an irreversible loss of the retrieved data. The approach disclosed herein provides a single-step approach to enable reversible, high-fidelity multiplexed PCR by creating a library of physically isolated files that can be retrieved on demand. In one embodiment of this method, information is encoded and written in indexed DNA oligonucleotides (data oligonucleotides), and the data oligonucleotides in combination with staple oligonucleotides are mixed with scaffold DNA and folded via thermal annealing using DNA origami techniques (see FIG. 1) and stored as libraries of DNAFiles.

Random access via PCR amplification provides data retrieval upon denaturing the DNAFiles, and data restoration is accomplished via re-annealing of the denatured DNAFiles to reconstitute the original library of DNAFile. More particularly, in one embodiment retrieval of digital data stored in DNA is achieved by obtaining one or more DNAFiles of a library of origami folded DNAFiles and at least partially separating the single chain scaffold from the staple to allow PCR amplification of the staple oligonucleotides. In one embodiment only a subset of the bound staple oligonucleotides and data oligonucleotides are released from the single chain scaffold DNA. There is a large toolbox of methods to selectively open and close specific DNAO structures to access only a sub selection of data bearing oligonucleotides. For example, the use of "toe-holds", where staple oligonucleotides are displaced by addition of other oligonucleotides with higher affinity, or the use of changes in Ionic strength or pH, enzymatic or UV cleavage techniques can be used to selectively open and close specific DNAO structures. Combining 2 or more of these features can provide a wide array of strategies for random access of small subsets of DNAO based data files from a pool of many DNAO files. Switchable actuation in DNA Origami allows any DNAFile to be selectively opened for reading and then closed again for storage.

Once a DNAFile has been unfolded, by denaturing a folded origami DNAFile of the library to release the single stranded staple oligonucleotides and the data oligonucleotides from the DNA scaffold, PCR amplification can be conducted on select nucleic acid sequences of said denatured DNA scaffold, the data oligonucleotides and staple oligonucleotides to produce amplicons, wherein the amplicons comprise the encoded data. Once the amplification step is completed, the original DNAFiles are reconstituted by altering the conditions to allow the staple oligonucleotides to reanneal to the single strand scaffold DNA to refold the scaffold DNA and reconstitute the original DNAFile. The remaining amplicons can then be analyzed to retrieve digital data encoded by the DNAFile. Advantageously, the reconstituted DNAFiles can be used to confirm the accuracy of the amplification step. Failure to faithfully copy the template during the PCR amplification will result in a failure to reconstitute the DNAFile as detected by an alteration in the shape or size of the DNAFile. Once the reconstituted DNAFiles have been confirmed as having the correct size and shape, they are returned to the library from which they were isolated. The PCR produced amplicons are separated from the reconstituted folded origami DNAFile and sequenced to retrieve digital data encoded by the DNAFile.

In one embodiment the digital data is only located within the sequences of the data oligonucleotides of the DNAFiles. Upon release of the single stranded data oligonucleotides from the DNA scaffold, the data encoding sequence of the data oligonucleotides can be amplified by standard PCR methods using PCR primers that specifically bind to the first and second primer binding sequences that are located on either side of the data encoding sequence. In accordance with one embodiment the first and second primer binding sequences are located at the 5' terminus and 3' terminus, respectively, of the data oligonucleotide, so PCR amplification produces an amplicon comprising the entire data oligonucleotide, including the data encoding sequence and the sequence having at least 80%, 85%, 90%, 95% or 99% sequence identity with a sequence located in the DNA scaffold. In one embodiment the nucleic acid sequences of the staple oligonucleotides and the data oligonucleotides that have complementarity with the DNA scaffold share 100% sequence identity with the corresponding DNA scaffold DNA nucleic acid sequences.

In one embodiment the reconstituted DNAFiles and PCR produced oligonucleotide amplicons are separated by electrophoresis or other techniques such as size exclusion chromatography or affinity binding, after which the reconstituted DNAFiles are returned to information storage and the generated oligonucleotide amplicons are read via sequencing to retrieve the data stored on the data oligonucleotides.

In one embodiment, the single strand scaffold DNA has a size of at least 500 bases, and more particularly a size selected from the range of about 500 bases to about 31 kb, about 1 kB to about 25 kb or about 2 kB to about 15 kb. In one embodiment the single strand scaffold DNA has a size selected from group consisting of 0.5 kB, 1 kB, 2 kB, 4 kB, 5 kB, 8 kB, 10 kB, 15 kB, 20 kB, and 25 kB. In one embodiment each DNAFile of the library disclosed herein comprises 100 to 300 staple oligonucleotides that each comprise distinct nucleic acid sequences that share complementarity with 2, 3, 4 or more corresponding non-contiguous nucleic acid sequences present in the single strand scaffold DNA of the DNAFile. The individual staple oligonucleotides of each DNAFile can vary in length and have sizes independently selected from a range of about 25 to about 200 nucleotides.

Data oligonucleotides have sizes independently selected from a range of about 50 to about 200 nucleotides, wherein the first and second primer binding sequences range in size from about 10 to about 20 nucleotides, the nucleic acid sequence having complementarity with its corresponding DNA scaffold sequence ranging in size from about 10 to 20 nucleotides, and the data encoding sequence comprising the remaining nucleotides of the data oligonucleotide (i.e., ranging from about 10 nucleotide to about 170 nucleotides). In one embodiment the data oligonucleotides comprise a sequence noncomplementary to the scaffold DNA (i.e., an overhang region) of at least 50 nucleotides, optionally ranging from about 60 to about 180 nucleotides.

Each library represents a mixture of large number of individual DNAFiles, including for example $10^3$, $10^4$, $10^5$, $10^6$ or more individual DNAFiles. The libraries can be stored using standard techniques to enhance the stability of nucleic acids including maintaining DNA origami structure integrity. In one embodiment the libraries can be stored in aqueous form by freezing the samples and maintaining the samples in ultra-low freezers, typically at or below −80° C. or in liquid nitrogen. Cryoprotectants can be added to protect DNA Origami structure for up to 1000 freeze/thaw cycles. See Xin, Y. et al. Cryopreservation of DNA Origami Nanostructures. Small, vol. 16 (13) (2020). In addition encapsulation in polymer or organosilica structures can provide increased stability. Koch, J. et al. Preserving DNA in Biodegradable Organosilica Encapsulates. Langmuir 38, 11191 11198 (2022).

In one embodiment the DNA libraries are stored in a dry form. For example lyophilization at ambient temperatures keeps DNAO intact after being treated to a 10 day accelerated aging test, equivalent to ~100 days at room temperature. In one embodiment the DNA libraries are stored by desiccation in the presence of an adjuvant such as polyvinyl alcohol (PVA) or the disaccharide sugar trehalose, present at a final concentration of around 1.5 percent.

In accordance with one embodiment the individual DNA-Files are each provided with their own unique bar coding sequences that allow for the selection of a single DNAFile. Alternatively, subsets of DNAFiles from all the DNAFiles present in a particular library can be provided with different unique barcoding sequences to allow the selection of one or more preselected subgroups of DNAFiles from all the DNA-Files present in a particular library. DNA barcodes are linked to moieties (e.g., nucleic acid sequences) that are capable of binding to the surface of each DNAFile while presenting the bar code for interaction with other moieties. In one embodiment, the barcode is a unique nucleic acid sequence relative to other the nucleic acid sequences of the DNAFile, wherein said nucleic acid sequence further comprises a sequence having complementarity (optionally having at least 90%, 95%, or 99% sequence identity, or 100% sequence identity) with a nucleic acid sequence of the DNA scaffold of a DNAFile.

In one embodiment, a library of DNAFiles is provided wherein each DNAFile, or certain subsets of DNAFiles of the library, are provided with their own unique nucleic acid barcode construct. In embodiments where the DNAFiles are barcoded, the nucleic acid barcode construct can be associated with the DNAFile via base-pairing. In this embodiment, the base-pairing can occur between a sequence of a single-stranded overhang on the DNAFile and a complementary sequence appended to the nucleic acid barcode construct.

In other embodiments, the nucleic acid barcode construct can be associated with the DNAFiles by a high affinity, non-covalent bond interaction between a biotin molecule on the 5' and/or the 3' end of the nucleic acid barcode construct and a molecule that binds to biotin present on the DNAFile. In this embodiment, the molecule that binds to biotin can be bound to the DNAFile by a covalent phosphoramidate bond formed via an EDC-NHS coupling reaction between a terminal phosphate group of a 5' end of an overhang on the DNAFile and an amine group on the molecule that binds to biotin. In this embodiment, the biotin can be bound to the nucleic acid barcode construct by a covalent bond.

In one illustrative embodiment, the nucleic acid barcode construct can be bound to the DNAFile by a covalent bond. In this embodiment, the covalent bond can be formed via an EDC-NHS coupling reaction between a terminal phosphate group of the 5' end of an overhang on the DNAFile and an amine group on an amino terminal nucleotide of the nucleic acid barcode construct. In another embodiment, the covalent bond can be formed via a click chemistry coupling reaction between an azide group on the DNAFile and an alkyne group on the nucleic acid barcode construct. In yet another embodiment, the covalent bond can be formed via a click chemistry coupling reaction between an azide group on the nucleic acid barcode construct and an alkyne group on the DNAFile. In still another embodiment, the nucleic acid barcode construct can be associated with the DNAFile by a covalent bond between a carboxy terminated molecule on the DNAFile and a primary amine on the nucleic acid barcode construct at the 5' and/or the 3' end.

In one aspect, the nucleic acid barcode construct can comprise a polynucleotide barcode and the barcode comprises a unique sequence not present in any known genome for identification of the polynucleotide barcode. In another embodiment, a set of different nucleic acid barcode constructs with different polynucleotide barcodes (e.g., 88 or 96 different polynucleotide barcodes) can be used to allow for multiplexing of multiple data bearing oligonucleotides on one sequencing run of a DNAFile, wherein subsets of staple oligonucleotides of a given DNAFile are associated with distinct barcodes.

In various embodiments, the barcodes can be from about 5 to about 100 bases in length, from about 5 to about 90 bases in length, from about 5 to about 80 bases in length, from about 5 to about 70 bases in length, from about 5 to about 60 bases in length, from about 5 to about 50 bases in length, from about 5 to about 40 bases in length, from about 5 to about 35 bases in length, about 5 to about 34 bases in length, about 5 to about 33 bases in length, about 5 to about 32 bases in length, about 5 to about 31 bases in length, about 5 to about 30 bases in length, about 5 to about 29 bases in length, about 5 to about 28 bases in length, about 5 to about 27 bases in length, about 5 to about 26 bases in length, about 5 to about 25 bases in length, about 5 to about 24 bases in length, about 5 to about 23 bases in length, about 5 to about 22 bases in length, about 5 to about 21 bases in length, about 5 to about 20 bases in length, about 5 to about 19 bases in length, about 5 to about 18 bases in length, about 5 to about 17 bases in length, about 5 to about 16 bases in length, about 5 to about 15 bases in length, about 5 to 14 bases in length, about 5 to 13 bases in length, about 5 to 12 bases in length, about 5 to 11 bases in length, about 5 to 10 bases in length, about 5 to 9 bases in length, about 5 to 8 bases in length, about 6 to 10 bases in length, about 7 to 10 bases in length, about 8 to 10 bases in length, or about 6 to about 20 bases in length.

In accordance with one embodiment, individual DNA-Files are barcoded and individual DNAFiles or subsets of DNAFiles of the library can be selected and separated from other DNAFiles of the library by selectively binding the desired DNAFiles to a complementary oligonucleotide immobilized on a surface, or oligonucleotides bound to magnetic or fluorescently labelled nanoparticle. This step allows for retrieval of data from a targeted subset of a library of data storing DNAs while leaving the remaining members of the library unperturbed. In another embodiment subsets of staple oligonucleotides of a single DNAFile can be provided with different primer binding sequences to allow for data retrieval from a select group of staple oligonucleotides of a DNAFile selected from the library of DNAFiles by barcoding.

Various embodiments of barcodes are shown below in Table 1 (labeled "Polynucleotide Barcodes"). These barcodes can be used in the nucleic acid barcode constructs alone or in combinations of, for example, two or more barcodes, three or more barcodes, four or more barcodes, etc. In the embodiment where more than one barcode is used, the hamming distance between the barcodes can be about 2 to about 6 nucleotides, or any suitable number of nucleotides can form a hamming distance, or no nucleotides are present between the polynucleotide barcodes.

TABLE 1

| Polynucleotide Barcodes | SEQ ID NO: |
|---|---|
| GCTACATAAT | 1 |
| ATGTTACACA | 2 |
| TGGGGCCCAA | 3 |

TABLE 1-continued

| Polynucleotide Barcodes | SEQ ID NO: |
| --- | --- |
| TAGTTTATCC | 4 |
| ACCCCGTCTT | 5 |
| CCGGCCATCA | 6 |
| GAGCTTGCTC | 7 |
| ACGTTCTATA | 8 |
| TACAGCAAAA | 9 |
| GTTAGGTGGT | 10 |
| GGAGACCGAC | 11 |
| TGGCCCCTTG | 12 |
| TGGCCGTAAG | 13 |
| CGTTCGTCAA | 14 |
| CGGACGTGGA | 15 |
| AGAGGGGGCA | 16 |
| GTTCAGGTCG | 17 |
| CTCGCAAGAG | 18 |
| GCAACGACTT | 19 |
| GCCATCCATC | 20 |
| TTCCGAGCAG | 21 |
| CTTCTGGACA | 22 |
| AACATTAGAC | 23 |
| AAGCAATAGT | 24 |
| AGGGTAAGAC | 25 |
| CGTTGTCTTG | 26 |
| TTTCCCCGCC | 27 |
| CGAATGGATC | 28 |
| CATCACTTGC | 29 |
| CTCTCGCACT | 30 |
| GTTCACGTGC | 31 |
| AATAAGCCTG | 32 |
| GTTAACAATT | 33 |
| ATTCAGATCC | 34 |
| CCTGCTGATT | 35 |
| CTTGGTCATA | 36 |
| TCTTCCTGTT | 37 |
| ACTGCCATGG | 38 |
| CATGTATAGT | 39 |
| GGTAGCGGCA | 40 |
| TCACTCTAAC | 41 |

TABLE 1-continued

| Polynucleotide Barcodes | SEQ ID NO: |
| --- | --- |
| AAGGTGCACC | 42 |
| AATGCTCGTT | 43 |
| TGTCTAGAAA | 44 |
| CTGCCTGCCT | 45 |
| ACTATAAAAG | 46 |
| TAGTATCGAG | 47 |
| ATCGCAGTCC | 48 |
| TCATCAGAAC | 49 |
| TCCTAGACGC | 50 |
| GCCGGGCGGG | 51 |
| GCCCAGAAGA | 52 |
| CTTAGAGCTG | 53 |
| GTCTGCGCTT | 54 |
| CGCCGTCCTT | 55 |
| TTTATCTGCT | 56 |
| TGCTTCGGAG | 57 |
| GGGGAGAATG | 58 |
| GTGGTAAGTG | 59 |
| GAAATTAGTA | 60 |
| GCTATCCTAA | 61 |
| ATCTGTACGA | 62 |
| AGTTCGGGGC | 63 |
| CGAGTCTGTC | 64 |
| ATCCTACGCA | 65 |
| ATGGTGGATA | 66 |
| CCTCTAACTA | 67 |
| ATAGCTGCAC | 68 |
| GACAGAATTT | 69 |
| CAATTGGCAT | 70 |
| TCTAGTAGAC | 71 |
| TTATTCATGG | 72 |
| TTGGCAACCG | 73 |
| CATAATACAT | 74 |
| ACAGACTCAC | 75 |
| GCGATGCTGC | 76 |
| CATCTTTGCC | 77 |
| GTGACTCCAG | 78 |
| GGACGAGTCT | 79 |

TABLE 1-continued

| Polynucleotide Barcodes | SEQ ID NO: |
|---|---|
| TAGTGGCGTG | 80 |
| AACGCAGCTT | 81 |
| AGAACAGGTG | 82 |
| AGGCTATGTT | 83 |
| CCTGGATCTT | 84 |
| CTAGCCGGCC | 85 |
| ACCAGTTATC | 86 |
| ACGTTATAGC | 87 |
| TCGAGTTTGA | 88 |
| TGAAGCGAGC | 89 |
| GACTGGCGAA | 90 |
| GATGGACCTA | 91 |
| GTCCACAACG | 92 |
| CCTCCCCAGA | 93 |
| TTATGACGCC | 94 |
| CTTGATCCGT | 95 |
| AATGCGCAAT | 96 |
| GTACCCCTCA | 97 |
| CGACAGCTCG | 98 |
| TGACCTGGCT | 99 |
| TTCATAGCCC | 100 |
| CCCAAGAGAA | 101 |
| AAACGAAGTA | 102 |
| GACGTTTACA | 103 |
| GATCGATTTG | 104 |
| CACTGTCACC | 105 |
| TGTGAGAGTT | 106 |
| GACGTAACCT | 107 |
| CAGACTCTGC | 108 |
| TATGCCAATA | 109 |
| ACAGGTGATG | 110 |
| GTCATCGCGT | 111 |
| TCTTATAAAC | 112 |
| GTGTAGACTG | 113 |
| AAACAACCGG | 114 |
| ATCCTGTACC | 115 |
| TTATAAGAAT | 116 |
| ATAAGTAGGC | 117 |

TABLE 1-continued

| Polynucleotide Barcodes | SEQ ID NO: |
|---|---|
| TCTCGTAAGG | 118 |
| GATCCGCCGC | 119 |
| TGTCAGGTTT | 120 |
| TCCGAAGCCC | 121 |
| TCCATGTCCA | 122 |
| GTGATGGTAC | 123 |
| CTCCACATAC | 124 |
| TTCGGATGAG | 125 |
| ACGACATCGC | 126 |
| GAGATGCACA | 127 |
| TTTGTATGGC | 128 |
| CTTTTCTAGA | 129 |
| AGTCTAATCA | 130 |
| GACTTAGCCA | 131 |
| TATCACAGTA | 132 |
| AAGCTCGAGT | 133 |
| TGTTACGACA | 134 |
| AAGGATAGTC | 135 |
| GCACTTAGCC | 136 |
| GAGGGATCCG | 137 |
| ATTCTAGAAG | 138 |
| GATAACTGAT | 139 |
| ATCTGACTGT | 140 |
| CAAAGCGAAC | 141 |
| GAAATTGCGA | 142 |
| GGGTCCAGTC | 143 |
| ATCAGGTAGC | 144 |
| GAAAGGTCCT | 145 |
| GGCTACCACA | 146 |
| TTATTGCTGA | 147 |
| CGCCGCGTTT | 148 |
| TTTTCAAAAG | 149 |
| CTGGGCTAAA | 150 |
| CCCGATGAGA | 151 |
| TGGGAAATAT | 152 |
| GTACGAGCGG | 153 |
| GCGTGCAGCT | 154 |
| AGTCTGCGGA | 155 |

TABLE 1-continued

| Polynucleotide Barcodes | SEQ ID NO: |
|---|---|
| TAACTATTTA | 156 |
| GAGTTGCCGG | 157 |
| CAGCCCGGCG | 158 |
| TCACCTACAT | 159 |
| AGTGGCTAAC | 160 |
| AGAATGTGAG | 161 |
| TAGTTTCGCA | 162 |
| CTTCATTTCT | 163 |
| GCCATGATAT | 164 |
| ACGGCAAATC | 165 |
| ATCGATAGTA | 166 |
| CCTAAAGGCA | 167 |
| TACGAGCGGT | 168 |
| TTTGTCGTCG | 169 |
| TACAAGCTTG | 170 |
| GACCAACACG | 171 |
| GAACGACGAA | 172 |
| TCGGAACGCA | 173 |
| ATCCGGTGGT | 174 |
| TAAAACGTAG | 175 |
| TATGTGAGCC | 176 |
| GAGGCATCGA | 177 |
| GAATGGGTGG | 178 |
| AACGACACAA | 179 |
| GTACGATGCA | 180 |
| AGAAGGCGCC | 181 |
| CCGCAATGGA | 182 |
| TACGGATTTT | 183 |
| GTCGTTAGCT | 184 |
| GGACTAGGGC | 185 |
| ATTGGTATTC | 186 |
| ATCCCAGAGA | 187 |
| GTCCCAGCTC | 188 |
| CACGAGGAAT | 189 |
| TACAATTGCA | 190 |
| ATTCCTGAAT | 191 |
| TAGCGAGGCG | 192 |
| CTGGATGGGC | 193 |

TABLE 1-continued

| Polynucleotide Barcodes | SEQ ID NO: |
|---|---|
| GCGACGGCCA | 194 |
| ACCTGCACAA | 195 |
| CATGACAGAC | 196 |
| TTACCAACGT | 197 |
| CAGGTGTGTG | 198 |
| CGAGGGACGG | 199 |
| CGTCTCGGTA | 200 |
| TAAGCTATCT | 201 |
| TACTCCCCTA | 202 |
| TTATATTCAT | 203 |
| AGCGATCTGC | 204 |
| TCTTCTGATC | 205 |
| ATAGTTCCCA | 206 |
| TTTACGGGTG | 207 |
| GTGTCCCCTG | 208 |
| GCGGGGGTCG | 209 |
| CATTGATCTA | 210 |
| AGGGACGGTG | 211 |
| CAGTTACTTT | 212 |
| CCATACTTCC | 213 |
| ATCAGAATTA | 214 |
| AAACTAGGCA | 215 |
| AATGTCGTTG | 216 |
| CACATGGGTC | 217 |
| GGTCGCTGGT | 218 |
| ACTGTATTAC | 219 |
| CCGAGACGCG | 220 |
| ACTCCAACCC | 221 |
| ATATTACAAG | 222 |
| CCATGGATAG | 223 |
| CCGTCTCAAT | 224 |
| GATCGTCGGG | 225 |
| TCTTGTTTTG | 226 |
| AATATTGCTC | 227 |
| AACGTCGTCT | 228 |
| AATATTTTTG | 229 |
| CGTAACGTGC | 230 |
| GCGTGGTTAT | 231 |

TABLE 1-continued

| Polynucleotide Barcodes | SEQ ID NO: |
|---|---|
| CAAAACATTA | 232 |
| CGTATCCTGA | 233 |
| TCGCTTACAA | 234 |
| TCCATTGTGT | 235 |
| GCCCCCATTC | 236 |
| TGACGTCTAT | 237 |
| TGGGCCGAGG | 238 |
| AAGTGTCAAG | 239 |
| GACAGTAGAG | 240 |
| CGCAGCCATC | 241 |
| GAGGCAGAAC | 242 |
| GTTGAAATTG | 243 |
| ATCTGATAAA | 244 |
| AGCTGTCTCT | 245 |
| TTTTAGGTTA | 246 |
| TATCTGTCCG | 247 |
| AAAACATATG | 248 |
| GTAAAGAAGA | 249 |
| TCGACGTGCA | 250 |
| TAGATCTTAA | 251 |
| CACTGGTCAC | 252 |
| ATTCTGATGT | 253 |
| ATGGCCCTGA | 254 |
| GGTGATGAGA | 255 |
| CACCGTGGGG | 256 |
| GCTTGCTCGG | 257 |
| CCAGTTGAAC | 258 |
| CGTCTGTACC | 259 |
| CCAACGCGGC | 260 |
| ACGTGATCGA | 261 |
| CCATCGAATC | 262 |
| CGGTGTCTGC | 263 |
| AAACCACCTC | 264 |
| TCAATGTTCC | 265 |
| TTCGACATGT | 266 |
| AGGCACGATA | 267 |
| CACGAGATCA | 268 |
| CATGCTGGGG | 269 |

TABLE 1-continued

| Polynucleotide Barcodes | SEQ ID NO: |
|---|---|
| TACCATGGTT | 270 |
| TTGCCCATAT | 271 |
| TGCACATTCG | 272 |
| GTTATGTTGG | 273 |
| TGAGTTATGA | 274 |
| GATGGCCCCC | 275 |
| GATGGGTTAC | 276 |
| AGCTACGTTG | 277 |
| ACCCCATGCA | 278 |
| TACTACCGTT | 279 |
| TCGCTTCTAC | 280 |
| CTGGCAGTGC | 281 |
| TCTATATATA | 282 |
| GGATTAGTTC | 283 |
| GTGTTACGCT | 284 |
| TCGACTCCGT | 285 |
| GGTAGCAGGC | 286 |
| TATTGGATTC | 287 |
| GTTCGATCGA | 288 |
| ATATTAATAT | 289 |
| AGAACGATTG | 290 |
| GTAAAGTGTA | 291 |
| CCCATGTGCC | 292 |
| GTGGCCTCGC | 293 |
| GACACTAGGA | 294 |
| ATATTCTGAC | 295 |
| TAAGTAGACG | 296 |
| TAACGGTCTA | 297 |
| TAGTTTCATT | 298 |
| TTGGATCCGA | 299 |
| CGTGACAACC | 300 |
| CGCGCTCAGA | 301 |
| CGTTCTTAAT | 302 |
| ACAAGAGTTT | 303 |
| AGGGTTATAG | 304 |
| ACCACGACTC | 305 |
| GTACTCGGGG | 306 |
| ACAAATATCT | 307 |

TABLE 1-continued

| Polynucleotide Barcodes | SEQ ID NO: |
|---|---|
| GATCGGGTG | 308 |
| ATGTAACTCC | 309 |
| ATGAAGAAGC | 310 |
| ATGTATTGTC | 311 |
| TGCATTGGAA | 312 |
| GCGGACGATC | 313 |
| CCGTACTTGA | 314 |
| TTTGCCCCCG | 315 |
| ACCTCACGCG | 316 |
| ATTAAGGGGC | 317 |
| CGTGGACATG | 318 |
| TTAGCCCTTC | 319 |
| CGAGAGTTTG | 320 |
| TGCATCCTCT | 321 |
| TGCGATTCCG | 322 |
| TTATTACGTT | 323 |
| TGATGTGGTT | 324 |
| GGGCGTCAAT | 325 |
| CCCTTGAAAT | 326 |
| TCTTTGGGGC | 327 |
| ACCGGCAGGC | 328 |
| GCTAAAATCT | 329 |
| GCCGTTGACG | 330 |
| GGAGTTGTTG | 331 |
| TACTTGAGAA | 332 |
| CGGGTGCGCT | 333 |
| AAAAGCGTCT | 334 |
| GTAAAGATAG | 335 |
| GCCTGGTCAG | 336 |
| GGCAAAAAGG | 337 |
| ACCCTTCTCT | 338 |
| TCACATAGTG | 339 |
| TCGTCTGTGC | 340 |
| TGCTCGGATC | 341 |
| AGCAGTCCCG | 342 |
| TTTGGGCTGT | 343 |
| CTCACGATCT | 344 |
| TGGCGCATAC | 345 |

TABLE 1-continued

| Polynucleotide Barcodes | SEQ ID NO: |
|---|---|
| GCAATTGAAA | 346 |
| TCGGGAGACG | 347 |
| CCCGGCGAAA | 348 |
| TGATGCGGAA | 349 |
| AACTGAGGCG | 350 |
| CATATTATTT | 351 |
| AAAAGTCATT | 352 |
| AAGCGGTGAG | 353 |
| AAGGTAATCA | 354 |
| CTGACACTTA | 355 |
| CTGTTTTCTA | 356 |
| CACATGGCAG | 357 |
| TTCAATCCGG | 358 |
| TGTCCGGCAT | 359 |
| TGGTACCGTG | 360 |
| AAGAGATATT | 361 |
| GATGTACTAC | 362 |
| GAAATGGAAT | 363 |
| TTAAAATACT | 364 |
| TGACCGGAAC | 365 |
| GTCGCCGCAA | 366 |
| TAGGATACCG | 367 |
| AGTCCAATTG | 368 |
| GGGGGCTATA | 369 |
| ACCTTCAGTT | 370 |
| ATGGCAAGTA | 371 |
| AGAATGTTTT | 372 |
| AGTTCGTTTG | 373 |
| CACTACTGAC | 374 |
| GATCAAGAGC | 375 |
| ATTTATCGAG | 376 |
| CCTTTTTCCA | 377 |
| GCACAGAGGT | 378 |
| TGATCTGAAT | 379 |
| GTTGGAGGGA | 380 |
| TTTTGAAGGT | 381 |
| TAAGTCCTAA | 382 |
| GGTGTTAGGG | 383 |

TABLE 1-continued

| Polynucleotide Barcodes | SEQ ID NO: |
| --- | --- |
| TGTATGCACC | 384 |
| CCGTGCCATT | 385 |
| GAAATCACCC | 386 |
| TTTGCACGTG | 387 |
| CGTCTGTTTT | 388 |
| CTACACCACA | 389 |
| TGCTACAGGG | 390 |
| GGGAATATAT | 391 |
| TCATGTATTT | 392 |
| TCTCCGTTTA | 393 |
| TACCTCTCGC | 394 |
| GCTTCAACCG | 395 |
| ATGAAGCTAC | 396 |
| CGGTACAACT | 397 |
| GTGTGGTCGT | 398 |
| GGGGTCATGT | 399 |
| AGGCAGCCCA | 400 |
| CAAGCACGAT | 401 |
| TCAAATGGAT | 402 |
| GGACTGAATA | 403 |
| CCGTAGACGT | 404 |
| CGGCGTACCG | 405 |
| GGCGGCGCCC | 406 |
| AGACTTGATC | 407 |
| ACCTTGCACA | 408 |
| TAAGGTGAGT | 409 |
| TTGTTGTTTC | 410 |
| GAGGGAATAC | 411 |
| CTCGTACGCG | 412 |
| CCGCGGTTTA | 413 |
| TTAAAGTTAA | 414 |
| GCATATGGGT | 415 |
| AGTCTGAGCC | 416 |
| TGTCGGTTCG | 417 |
| GGTCTCAACC | 418 |
| GTAACGGCAT | 419 |
| ACACTGAGAA | 420 |
| CCCAACGTCG | 421 |

TABLE 1-continued

| Polynucleotide Barcodes | SEQ ID NO: |
| --- | --- |
| AAGAAACTGC | 422 |
| ACCAGCCCAC | 423 |
| TGTAGTTACT | 424 |
| GGCTAGAGGC | 425 |
| GTTCGGCAGA | 426 |
| CCAAAATAGA | 427 |
| CCCATATAAC | 428 |
| GTCACTACCG | 429 |
| GTAGTGTGGC | 430 |
| CAATCTCATA | 431 |
| CCATGTTATA | 432 |
| TAAGCAGTGG | 433 |
| TCGGCGGCTA | 434 |
| TATTAAATGC | 435 |
| GTCGCCATTA | 436 |
| GGCGTCGTTC | 437 |
| CTAGTAGATA | 438 |
| TCGTCAGTAT | 439 |
| GGGGTATCGG | 440 |
| TGCTCTGCCA | 441 |
| TGCCGTAACT | 442 |
| CGGTACAGGC | 443 |
| TCCTAATTTG | 444 |
| TCTTTCTGGA | 445 |
| CCGCGACTTG | 446 |
| ACCTATAGCG | 447 |
| GCCGGCACCT | 448 |
| TTTGATAGGC | 449 |
| ACTGTGAGCT | 450 |
| TTATCGTTCA | 451 |
| ACTAGTGGCC | 452 |
| CCTCCGTGGT | 453 |
| TTAGGGTATG | 454 |
| GAATCAGGCG | 455 |
| GGCTGACCAA | 456 |
| TGCCAGACCG | 457 |
| TCCCTACGCG | 458 |
| TCCGCTGGAG | 459 |

TABLE 1-continued

| Polynucleotide Barcodes | SEQ ID NO: |
|---|---|
| GGATCAAAAC | 460 |
| TTCACCTCAC | 461 |
| GACACACGGC | 462 |
| TGGGCGATTA | 463 |
| TAAGATCTTC | 464 |
| CTCCGACTAC | 465 |
| GGGCCATCAT | 466 |
| TCAGGCCAGA | 467 |
| CTTGTGGGGC | 468 |
| AGATAGTCTG | 469 |
| GCGTCAAAGT | 470 |
| ACGAAAATTT | 471 |
| GAGTCTGGTG | 472 |
| ATCGAGCGAC | 473 |
| GGTCCTCAGA | 474 |
| TGATTTTGTC | 475 |
| GCATTTCTCA | 476 |
| GCATGCCAGT | 477 |
| ATTAGACGAC | 478 |
| AAAGCCCATA | 479 |
| CACTACATTC | 480 |
| CACGGTTTCT | 481 |
| CCCACCAGTG | 482 |
| CTCACTTGTC | 483 |
| GATAGACTCT | 484 |
| ATTTCCATTT | 485 |
| ATATGTGGCC | 486 |
| CGGGACGAAC | 487 |
| AGAACCGTGA | 488 |
| TAGTGTACTG | 489 |
| AACTAATCGA | 490 |
| CGAAGTGACG | 491 |
| CGGAGCCTCG | 492 |
| ATCACACGAG | 493 |
| CGACGAGTTC | 494 |
| GCTTCCCGTG | 495 |
| GATTCATACC | 496 |
| GAGAGAAGCG | 497 |

TABLE 1-continued

| Polynucleotide Barcodes | SEQ ID NO: |
|---|---|
| GAAGTGGCCT | 498 |
| GGACGACGCC | 499 |
| TAGGGTCTCA | 500 |
| AACTACAGGT | 501 |
| GTGGCCTGTG | 502 |
| CTTTACCAGC | 503 |
| CGCGTTACTG | 504 |
| TTGCTCCCGT | 505 |
| CATCAAACAA | 506 |
| GCTTTATGAT | 507 |
| CTGCATACTG | 508 |
| GGTGGCTCAG | 509 |
| GGACGATCAA | 510 |
| CCGACTGGTG | 511 |
| GGAACAACCG | 512 |
| GAACGAGACC | 513 |
| CACCAAGAAA | 514 |
| ATGCATTACC | 515 |
| GTATCATGCC | 516 |
| AGTAGATGTT | 517 |
| CTCTAGATGT | 518 |
| GCTACTTGTG | 519 |
| TATGAAACGT | 520 |
| CCTCGTTGAT | 521 |
| CTAGAGCCAT | 522 |
| TAGAGTTATA | 523 |
| AACGAGAGGC | 524 |
| GGTCTACCGT | 525 |
| GCCCCCTCAC | 526 |
| CATAGGAATT | 527 |
| TCCGGCTCGT | 528 |
| TGAGAGTCGG | 529 |
| CGTAGAAATA | 530 |
| CTTTACATGA | 531 |
| GAGCGCCGTC | 532 |
| GGCTCTCGGC | 533 |
| AGAGCTTGTT | 534 |
| AATCAGCCAC | 535 |

TABLE 1-continued

| Polynucleotide Barcodes | SEQ ID NO: |
|---|---|
| AGAAGAGCCA | 536 |
| TCGTATGAGT | 537 |
| TTCTTCCTCG | 538 |
| ACACAAAAGC | 539 |
| CGCGGGACCC | 540 |
| GTCGCGACAC | 541 |
| CCGGAGGAAA | 542 |
| CGGCGTATGA | 543 |
| TAGGCATTCT | 544 |
| AAAGGAGGGA | 545 |
| ACCTTTACGG | 546 |
| CTACCGTTAA | 547 |
| GAGCTTCGCC | 548 |
| GCCATAGAAG | 549 |
| TTTAGCGTAT | 550 |
| GCAAACAGAT | 551 |
| TAGGTCATGG | 552 |
| CTCTAACAGA | 553 |
| GGCTCATGAA | 554 |
| CAATGTCTCA | 555 |
| TGATCGTATT | 556 |
| GCGCTTTTCA | 557 |
| AAGATTATAT | 558 |
| ACTAGCTGAC | 559 |
| GGTGAGCTCA | 560 |
| CGCTTTCGCT | 561 |
| TGATTCAAAA | 562 |
| ACTGAACAGG | 563 |
| ATTCGAGCTA | 564 |
| TGTAGGCTAA | 565 |
| ACAAAGCTTT | 566 |
| GCCCGAGGGA | 567 |
| GCCCGCTGGG | 568 |
| ACCCCGCTGA | 569 |
| CTTATGCCCT | 570 |
| CCGCCATAGC | 571 |
| CTTAATGATT | 572 |
| CAGTCCACAA | 573 |

TABLE 1-continued

| Polynucleotide Barcodes | SEQ ID NO: |
|---|---|
| ATGGACGGAC | 574 |
| CGGCCTCTCG | 575 |
| TAGTCGCCAT | 576 |
| GTTGATCTTC | 577 |
| ACTTGCCAAG | 578 |
| ATGACTGGTT | 579 |
| TGTCGTAGGA | 580 |
| AGCAAACACG | 581 |
| TACTGATGAA | 582 |
| GTATCCCATA | 583 |
| TAGCCAGGTT | 584 |
| CGTGTGGCGA | 585 |
| ATCGAATTGC | 586 |
| CCCCAATATT | 587 |
| CCCGTTTCTC | 588 |
| TCCGCATCTA | 589 |
| CAAGCCTCAT | 590 |
| TTTCAATCCC | 591 |
| CCTTCCCATC | 592 |
| AGGTACAAGA | 593 |
| GTGTAATGGA | 594 |
| AAACTGAGCT | 595 |
| ATCTCTGCCC | 596 |
| CGACATTTGC | 597 |
| TGTGAACCCG | 598 |
| TGACACCCCA | 599 |
| TAGGCCAAAG | 600 |
| GAAATTGTAG | 601 |
| GCGTCTGATT | 602 |
| TCTCATTGTT | 603 |
| CTGACATCTC | 604 |
| GTATCCAGTG | 605 |
| GATGGCCGTT | 606 |
| TCACCCTCTC | 607 |
| GGCACTATTC | 608 |
| AAATAACTGT | 609 |
| CAGCTCCATT | 610 |
| CTCTTGACTC | 611 |

TABLE 1-continued

| Polynucleotide Barcodes | SEQ ID NO: |
|---|---|
| TTTCCTATAC | 612 |
| CCATACCCGA | 613 |
| TCGCCGAGCG | 614 |
| CGCTGAAGCC | 615 |
| TCTGGCCCCA | 616 |
| GCTACATTGA | 617 |
| CGCATCATAA | 618 |
| GCAAAGGGCC | 619 |
| AACGGCGCAG | 620 |
| CGACTGACAT | 621 |
| ATGACAGGGC | 622 |
| CAAGTTCTCC | 623 |
| TCGCCGCTTT | 624 |
| ATGCCGGAAA | 625 |
| GCGGTTACTA | 626 |
| GACATTACAA | 627 |
| CAGAGAGGGC | 628 |
| GCACCGCCTC | 629 |
| CGGTCCGAGC | 630 |
| TGTCCGGTGC | 631 |
| GGTCGGTTGC | 632 |
| GCTCAGCTAA | 633 |
| AGCAGTTCGT | 634 |
| AAATCGATGA | 635 |
| GCTCGGTATG | 636 |
| CCCGCCGCGG | 637 |
| GTGTGATAGG | 638 |
| TTGGACTCCA | 639 |
| TGCTTATCTA | 640 |
| CAAAAGGCGT | 641 |
| TAGGGGGCCT | 642 |
| AAGTATTAAT | 643 |
| GTTTAGCCCG | 644 |
| CGCTAATATG | 645 |
| ACAACACGTT | 646 |
| AGAGATGCTC | 647 |
| TGCCTGATAT | 648 |
| CTTGTAAGTA | 649 |

TABLE 1-continued

| Polynucleotide Barcodes | SEQ ID NO: |
|---|---|
| CATATTGCCG | 650 |
| CTTAGAAAGT | 651 |
| ATGTTGTATT | 652 |
| CGCATTGAAG | 653 |
| TTATGTTGGT | 654 |
| TCGCCTCAGA | 655 |
| TTCGTTGAGG | 656 |
| GGTGCCGGGC | 657 |
| ACCATTGTAA | 658 |
| TTGATTGTCA | 659 |
| CGGCTCACCT | 660 |
| CTATCACATG | 661 |
| GTAGACAGAA | 662 |
| CCTTTACCAA | 663 |
| GCACATCGAC | 664 |
| TCTCACTTTC | 665 |
| TTCGAGTACT | 666 |
| TAGAAGAGCA | 667 |
| AACCCCACCA | 668 |
| CTGTATCAGT | 669 |
| ACATAATGAG | 670 |
| AGCCTTCCGC | 671 |
| CAGTGCTTTT | 672 |
| TAGTCCGTGT | 673 |
| CGGAATCGGT | 674 |
| CTTGCGGAGA | 675 |
| AAAAATTTGG | 676 |
| TGTTTTCCGC | 677 |
| ATGCTAGGCG | 678 |
| GACTAATTTC | 679 |
| CTGTAGTAAC | 680 |
| CGGATGACTT | 681 |
| TCAGAGTGGA | 682 |
| CAAAATAGCG | 683 |
| GAAGAAGAAG | 684 |
| CACCCGCACG | 685 |
| ACGATGCCCG | 686 |
| CCTACTACAC | 687 |

TABLE 1-continued

| Polynucleotide Barcodes | SEQ ID NO: |
|---|---|
| ATTGAAACAA | 688 |
| GACCGAAGAT | 689 |
| ACGGCCTGAA | 690 |
| AGGGGAGGTC | 691 |
| CAATCAACTT | 692 |
| GGACAACCGA | 693 |
| TCCCTAAGGC | 694 |
| GTTCTACACG | 695 |
| ACTAACCAGT | 696 |
| GAAGCTGGAT | 697 |
| GGAACCATGG | 698 |
| CTCTACCTGG | 699 |
| TAATGCCTGC | 700 |
| TAAAGGCAAT | 701 |
| CGCCTGGGAA | 702 |
| TCTTGGGAA | 703 |
| AGAGAGAGAG | 704 |
| GCGTTGGCGC | 705 |
| TTACGACAGA | 706 |
| GGAACTCTTA | 707 |
| GATTGTGGAG | 708 |
| GGGCACTGAT | 709 |
| AGACGCACCA | 710 |
| CCAATTATAA | 711 |
| TAGAGACGCA | 712 |
| CCTCTTGTCG | 713 |
| GAGGAAGCTC | 714 |
| AGTCCCGAGT | 715 |
| TGCTTGCAGT | 716 |
| CCCACTTCCC | 717 |
| CGTTGCCGCG | 718 |
| CCCCTGGTTC | 719 |
| ACGACCAATA | 720 |
| CTTAGGGTTC | 721 |
| AAACATATCA | 722 |
| GGGTCGTAGA | 723 |
| CTCCGTAGCG | 724 |
| CTGGTCATAA | 725 |

TABLE 1-continued

| Polynucleotide Barcodes | SEQ ID NO: |
|---|---|
| TTGACAGATC | 726 |
| GAGTAAAGTC | 727 |
| ATATGGCTT | 728 |
| TACAACTACT | 729 |
| AATTCAGCCG | 730 |
| GATTGTACTA | 731 |
| TCGTAATGCG | 732 |
| CGATAACTGC | 733 |
| AACTTGGCGG | 734 |
| CGTGGATGTA | 735 |
| CCTTCCCGAA | 736 |
| CTAAACCCGT | 737 |
| CAACATTCCC | 738 |
| CTTACCCTCT | 739 |
| GGAAAGTTCT | 740 |
| CGGATTGGCT | 741 |
| AATGTAGGGC | 742 |
| AATGAATCGC | 743 |
| ATCATACACC | 744 |
| AGTTGGGCAG | 745 |
| AGAAGAAGGG | 746 |
| GCGTGCGCTA | 747 |
| CCCCGATAAA | 748 |
| TACCAAGTGC | 749 |
| TGTGTTTTCG | 750 |
| CCCAGATGTC | 751 |
| GCGAGCTTCC | 752 |
| GTGTCACGTA | 753 |
| ATAGGCCGAG | 754 |
| GAGCTACCAG | 755 |
| CGCGGCGGAG | 756 |
| TCTTGCACGA | 757 |
| TGCCCTAAAG | 758 |
| TTGCGCTTTG | 759 |
| CATATAAAGG | 760 |
| AATAGCGAAT | 761 |
| TACGCTAAGG | 762 |
| ACTTAGTTCG | 763 |

TABLE 1-continued

| Polynucleotide Barcodes | SEQ ID NO: |
| --- | --- |
| CGTGCGGAAC | 764 |
| ACCCGATTCG | 765 |
| TGCAGAGTTT | 766 |
| GAATCATTAG | 767 |
| AGTACACTGG | 768 |
| TTGTGCGGTT | 769 |
| ATGACATGCA | 770 |
| TTCTCGGACG | 771 |
| AGATTGAAGA | 772 |
| GGCGGACTGT | 773 |
| TTTATGGTAA | 774 |
| CAGTAGGGTG | 775 |
| GACAGGCAAG | 776 |
| GATGTGTCGT | 777 |
| ACTTGACGGA | 778 |
| AAGTCCGAAA | 779 |
| TGGGTGTAGG | 780 |
| ACTTACCGCG | 781 |
| CTGTGCACCC | 782 |
| ATTGCTCTCT | 783 |
| CAGAAGACAA | 784 |
| TTACGCTATA | 785 |
| ACGTGGAAAT | 786 |
| TGAGGCTGGT | 787 |
| ATTATGAGAT | 788 |
| GACTTGTAGT | 789 |
| TCGCTGAGGA | 790 |
| CCCAACTCTA | 791 |
| GATAGGGAGG | 792 |
| TAGAAATCAG | 793 |
| GTCGCTAGAA | 794 |
| AAAATAGAAA | 795 |
| GCTCCTGGGT | 796 |
| CGCGCTCGCG | 797 |
| GGCAAACGCA | 798 |
| TTTACTACCT | 799 |
| ATCCTAAACT | 800 |
| CTCCGTATGT | 801 |

TABLE 1-continued

| Polynucleotide Barcodes | SEQ ID NO: |
| --- | --- |
| TATCGTCCAG | 802 |
| GCCGGCGGTA | 803 |
| TGCTCCATTT | 804 |
| TGGCTGTTGT | 805 |
| TACTGCGCAA | 806 |
| TATACGGCTT | 807 |
| GGTTATTACC | 808 |
| ATCAGGAGGA | 809 |
| CTATTGCCAG | 810 |
| ACGTACACAC | 811 |
| CAGCCTAGCT | 812 |
| GAAAACAAC | 813 |
| CGTTCAGTTA | 814 |
| CAATCAGAAT | 815 |
| GGGCTACTCT | 816 |
| CCCCATTGGG | 817 |
| TAGGGAACGG | 818 |
| CAGCTGATAC | 819 |
| ATTCCTGTGA | 820 |
| TCAGAGCCGT | 821 |
| CATGAAAAGC | 822 |
| TGACCTGTGA | 823 |
| GCATTAGCAG | 824 |
| GACAGAACCA | 825 |
| TCCAGTATAT | 826 |
| TGTTCCGCTA | 827 |
| GATATCCATT | 828 |
| CATATGGACC | 829 |
| GATATAGTAA | 830 |
| CACCTTTTTT | 831 |
| AGCTTGCGGG | 832 |
| CGCACAGGGA | 833 |
| TCTGGGTGCT | 834 |
| TGAGTCGTTT | 835 |
| TTACAATGTG | 836 |
| CTTGCAAACA | 837 |
| TGTCGAGCTG | 838 |
| ACTTTAACCT | 839 |

TABLE 1-continued

| Polynucleotide Barcodes | SEQ ID NO: |
|---|---|
| ATATAAGTGC | 840 |
| GGAAGGGCGT | 841 |
| TTTGACTTGA | 842 |
| GTATAAACGG | 843 |
| TAACCGGATG | 844 |
| TTCTCATCAG | 845 |
| CTCGGTTACG | 846 |
| ATATGGTTCT | 847 |
| CGCCCCCGAA | 848 |
| ACCTCGATCG | 849 |
| CTCGAATAAT | 850 |
| GCCCGAGCTT | 851 |
| AACAGTCAAC | 852 |
| CTGGAACCTC | 853 |
| AATAACGGGG | 854 |
| ACGCCCCACT | 855 |
| GGCAACATGA | 856 |
| GCTATTTCGC | 857 |
| TTCCACTTTA | 858 |
| GCCGATGGAT | 859 |
| AAGTTGGTAA | 860 |
| CACTAGCTAG | 861 |
| ACATGCCCCT | 862 |
| TTCATTACTC | 863 |
| GGTTTAATAT | 864 |
| CCTGCAGTGA | 865 |
| TCTTTAAGTT | 866 |
| TGGCGATCGA | 867 |
| CTTTTTAGCT | 868 |
| CCCAGTCTCT | 869 |
| AAATGTTTCG | 870 |
| ATATAAGACG | 871 |
| TCACTTTACA | 872 |
| CCTGGCGCCC | 873 |
| GGATTACTGG | 874 |
| GAATGATCTT | 875 |
| GCTCGGATCG | 876 |
| CAGCTGCGAG | 877 |

TABLE 1-continued

| Polynucleotide Barcodes | SEQ ID NO: |
|---|---|
| ACCCTTACTA | 878 |
| AGGTGAAACT | 879 |
| CGAATTTGAT | 880 |
| CGCTGTGCGG | 881 |
| TTACCGCACC | 882 |
| GGAATCTTAA | 883 |
| CTCAACACCC | 884 |
| CGTGCCCTTG | 885 |
| GCAGGCTCGA | 886 |
| ACCAACGAAG | 887 |
| CCTGTAATTT | 888 |
| GGGTGGGATG | 889 |
| TTGCTCACCG | 890 |
| TTACGACCAC | 891 |
| TTTTCTAACC | 892 |
| GCTTTAGATA | 893 |
| CACGTATTGG | 894 |
| AAATATCTCC | 895 |
| GCTGGAAAAC | 896 |
| GAGCGCATTA | 897 |
| GTGGAGGGGT | 898 |
| TCCACTGGGA | 899 |
| CAATAGCGGA | 900 |
| CATCTAGTTT | 901 |
| GAAGTTCCGG | 902 |
| AGCGAGATTC | 903 |
| TTAAGGTCGG | 904 |
| AATGGTTAGG | 905 |
| CGTTATTATA | 906 |
| ACGGAAAGGA | 907 |
| CCTTGTCCCG | 908 |
| ATACTTTTTT | 909 |
| CTGGGTCTGG | 910 |
| AACCATTGCG | 911 |
| AGACCGGGCC | 912 |
| TGGGACACAC | 913 |
| TGCGCAGTTG | 914 |
| CGTTCGCCTT | 915 |

TABLE 1-continued

| Polynucleotide Barcodes | SEQ ID NO: |
| --- | --- |
| TCTCACTCGT | 916 |
| ACACCGACGT | 917 |
| TTCAGCCCCT | 918 |
| AGGCGACTAA | 919 |
| TGCTATCAAG | 920 |
| GTCCAGTAGC | 921 |
| CGTGTGGGCG | 922 |
| GTGGTTCTCC | 923 |
| GCAGCCGACG | 924 |
| GCTGTCCACG | 925 |
| CGACACTCAT | 926 |
| CATGGCACCT | 927 |
| TGTGACGTGT | 928 |
| TTTGGACTAA | 929 |
| TTCATGCCCG | 930 |
| TTGATCGTGG | 931 |
| TAGCATAGGA | 932 |
| GTAGTTGCAA | 933 |
| GGGACAGCTA | 934 |
| AAACCCCAA | 935 |
| ACTCTCACAA | 936 |
| ATCATTGCCA | 937 |
| CCAGTTTGCG | 938 |
| ACATTAGTCA | 939 |
| CTCCAGGGTA | 940 |
| GAAGGGCCAA | 941 |
| CAGTCTCCCC | 942 |
| GAGACATTCC | 943 |
| AACGGTGTTG | 944 |
| AGCATTATCA | 945 |
| CTATACCGAG | 946 |
| AACTGGATCA | 947 |
| GTCTTGTCGG | 948 |
| GACGAGCCGC | 949 |
| GGAACACTGT | 950 |
| TAAATGCGTT | 951 |
| GCGAACACAG | 952 |
| TTCTCTCAAC | 953 |

TABLE 1-continued

| Polynucleotide Barcodes | SEQ ID NO: |
| --- | --- |
| GTCGTACTGA | 954 |
| TGTGGCGTAA | 955 |
| TGAGCGGCGT | 956 |
| CCTCGTGAAC | 957 |
| GAGCAATGAA | 958 |
| CGAGACCTAA | 959 |
| AACTGAGCGC | 960 |
| TAAAGCTCGT | 961 |
| CTCTTTACGT | 962 |
| CCCCGTGGAA | 963 |
| TCGGTTCGTC | 964 |
| CTGCTTACAC | 965 |
| ACACCGTAAT | 966 |
| CCTGGTCGGC | 967 |
| GGTTATTTGG | 968 |
| GCAACTGAGT | 969 |
| ATAAGGCCTC | 970 |
| CGTGCGAAGG | 971 |
| GTCACACACT | 972 |
| CATACGGCAA | 973 |
| GAACTGCCCA | 974 |
| AATATGTGAA | 975 |
| CCGATCCTGT | 976 |
| CAAAGAGCCT | 977 |
| TAACTTAGAG | 978 |
| CAGCATGTAG | 979 |
| CCCCATGCAG | 980 |
| TCTGAACCAC | 981 |
| GCGTGCAAAA | 982 |
| GCTAGTACCG | 983 |
| TTTCCCGCGC | 984 |
| CCTTAGTAGG | 985 |
| TTGTGTCTTG | 986 |
| GCAACGAAGC | 987 |
| TGAAACCCTT | 988 |
| TTCTACGATC | 989 |
| ATTAAAGGTG | 990 |
| TATCTAACGG | 991 |

TABLE 1-continued

| Polynucleotide Barcodes | SEQ ID NO: |
|---|---|
| AGTGCTCCTG | 992 |
| CCGTCCCTCT | 993 |
| CTAACGAGCG | 994 |
| AAGTCCGGCT | 995 |
| GGCGTATAAG | 996 |
| AGATATTAGG | 997 |
| TCCTAACAGC | 998 |
| GAGGATACGC | 999 |
| CGCTCTTTAA | 1000 |
| ACCGGCAGGC | 328 |
| GCTAAAATCT | 329 |
| GCCGTTGACG | 330 |
| GGAGTTGTTG | 331 |
| TACTTGAGAA | 332 |
| CGGGTGCGCT | 333 |
| AAAAGCGTCT | 334 |
| GTAAAGATAG | 335 |
| GCCTGGTCAG | 336 |
| GGCAAAAAGG | 337 |
| ACCCTTCTCT | 338 |
| TCACATAGTG | 339 |
| TCGTCTGTGC | 340 |
| TGCTCGGATC | 341 |
| GGCGTATAAG | 996 |
| AGATATTAGG | 997 |
| TCCTAACAGC | 998 |
| GAGGATACGC | 999 |
| CGCTCTTTAA | 1000 |

In another embodiment, a random sequence fragment can be linked to the 5' and/or the 3' end of the barcode and the random sequence fragment can, for example, be used for bioinformatic removal of PCR duplicates. The random sequence fragment can also be used to add length to the nucleic acid construct and can serve as a marker for bioinformatic analysis to identify the beginning or the end of the barcode after sequencing. In another embodiment, the nucleic acid barcode construct comprises at least a first and a second random sequence fragment, and the first random sequence fragment can be linked to the 5' end of the barcode and the second random sequence fragment can be linked to the 3' end of the barcode. In another embodiment, one or at least one random sequence fragment is linked to the 5' and/or the 3' end of the barcode. In one aspect, the random sequence fragments can be extended as needed to make the nucleic acid barcode construct longer for different applications such as whole genome sequencing where short inserts may be lost.

In various embodiments, the random sequence fragments can be from about 5 to about 20 bases in length, about 5 to about 19 bases in length, about 5 to about 18 bases in length, about 5 to about 17 bases in length, about 5 to about 16 bases in length, about 5 to about 15 bases in length, about 5 to about 14 bases in length, about 5 to about 13 bases in length, about 5 to about 12 bases in length, about 5 to about 11 bases in length, about 5 to about 10 bases in length, about 5 to about 9 bases in length, about 5 to about 8 bases in length, about 6 to about 10 bases in length, about 7 to about 10 bases in length, or about 8 to about 10 bases in length.

In another illustrative aspect, the barcode may be flanked by primer binding sequences (i.e., directly or indirectly linked to the barcode) so that the nucleic acid barcode construct comprising the barcode, and any attached random sequence, can be amplified during a polymerase chain reaction (PCR) and/or sequencing protocol. In one aspect, the primer binding sequences can be useful for binding to one or more universal primers or a universal primer set. In one illustrative embodiment, the universal primers can contain overhang sequences that enable attachment of index adapters for sequencing. In one embodiment, the adapters can be NGS adapters (e.g. Illumina) positioned internally but towards the end of either the 5' or the 3' primer, not as the terminating structure, to avoid the formation of primer dimers. In this aspect, the primers can be any primers of interest. In this embodiment, the first primer binding sequence can be linked at its 3' end to the 5' end of a first random sequence fragment and the second primer binding sequence can be linked at its 5' end to the 3' end of a second random sequence fragment with the barcode between the random sequence fragments. In another embodiment, the first primer binding sequence can be linked at its 3' end to the 5' end of the barcode and the second primer binding sequence can be linked at its 5' end to the 3' end of a random sequence fragment linked to the 3' end of the barcode. In another embodiment, the first primer binding sequence can be linked at its 3' end to the 5' end of a random sequence fragment and the second primer binding sequence can be linked at its 5' end to the 3' end of the barcode where the barcode is linked at its 5' end to the 3' end of the random sequence fragment. In yet another embodiment, the first primer binding sequence can be linked at its 3' end to the 5' end of the barcode and the second primer binding sequence can be linked at its 5' end to the 3' end of the barcode.

Primer binding sequences used in accordance with the present invention can range in length from about 15 bases to about 30, from about 15 bases to about 29 bases, from about 15 bases to about 28 bases, from about 15 bases to about 26 bases, from about 15 bases to about 24 bases, from about 15 bases to about 22 bases, from about 15 bases to about 20 bases, 16 bases to about 28 bases, from about 16 bases to about 26 bases, from about 16 bases to about 24 bases, from about 16 bases to about 22 bases, from about 16 bases to about 20 bases, 17 bases to about 28 bases, from about 17 bases to about 26 bases, from about 17 bases to about 24 bases, from about 17 bases to about 22 bases, from about 17 bases to about 20 bases, 18 bases to about 28 bases, from about 18 bases to about 26 bases, from about 18 bases to about 24 bases, from about 18 bases to about 22 bases, or from about 18 bases to about 20 bases.

An exemplary sequence of a nucleic acid barcode construct is shown below. The /5AmMC6/ is a 5' amine modification for attachment to the DNAFile. The *'s are phosphorothioate bond modifications for stability. The A*G*A*CGTGTGCTCTTCCGATCT sequence (SEQ ID NO: 1001) is the 5' primer binding sequence. The GCTACATAAT (SEQ ID NO: 1) is an exemplary barcode sequence. The N's represent the random sequence fragment. The AGATCGGAAGAGCGTCG*T*G*T (SEQ ID NO: 1002) is the 3' primer binding sequence.

(SEQ ID NO: 1003)
/5AmMC6/A*G*A*CGTGTGCTCTTCCGATCTGCTACATAATNNN

NNNNNNNAGATCGGAAGAGCGTCG*T*G*T

In all of the various embodiments described above, the entire nucleic acid barcode construct can range in length from about 30 bases to about 350 bases, from about 30 bases to about 300 bases, from about 30 bases to about 270 bases, about 30 bases to about 240 bases, about 30 bases to about 230 bases, about 30 bases to about 220 bases, about 30 bases to about 210 bases, about 30 bases to about 200 bases, about 30 bases to about 190 bases, about 30 bases to about 180 bases, about 30 bases to about 170 bases, about 30 bases to about 160 bases, about 30 bases to about 150 bases, about 30 bases to about 140 bases, about 30 bases to about 130 bases, about 30 bases to about 120 bases, from about 30 bases to about 110 bases, from about 30 bases to about 100 bases, from about 30 bases to about 90 bases, from about 30 bases to about 80 bases, from about 30 bases to about 70 bases, from about 30 bases to about 60 bases, from about 30 bases to about 50 bases, from about 30 bases to about 40 bases, 40 bases to about 120 bases, from about 40 bases to about 110 bases, from about 40 bases to about 100 bases, from about 40 bases to about 90 bases, from about 40 bases to about 80 bases, from about 40 bases to about 70 bases, from about 40 bases to about 60 bases, from about 40 bases to about 50 bases, 50 bases to about 120 bases, from about 50 bases to about 110 bases, from about 50 bases to about 100 bases, from about 50 bases to about 90 bases, from about 50 bases to about 80 bases, from about 50 bases to about 70 bases, from about 50 bases to about 60 bases, or about 42 bases to about 210 bases.

EXEMPLARY EMBODIMENTS

In accordance with embodiment 1, a library comprising a plurality of origami folded DNA data storage files is provided wherein each of said DNAFiles comprises
  a single stranded DNA scaffold; and
  a plurality of single stranded DNA staple oligonucleotides that bind through complementary base pairing with a segment of the DNA scaffold, wherein said staple oligonucleotides cause the DNA scaffold to reversibly fold into a two or three dimensional shape, and said DNA scaffold and/or one or more of said staple oligonucleotides comprise nucleic acid sequences that encode digital information, wherein the individual DNAFiles differ from one another based on the nucleic acid sequence of the staple oligonucleotides bound to the DNA scaffold of each DNAFile.

In accordance with embodiment 2 the library of embodiment 1 is provided wherein one or more of said staple oligonucleotides comprise nucleic acid sequences that encodes digital information, and the DNA scaffold does not encode digital information.

In accordance with embodiment 3 the library of embodiment 1 or 2 is provided wherein said one or more of said staple oligonucleotides have a length of about 30 to 200 nucleotides and comprise a nucleic acid sequence non-complementary to said DNA scaffold, wherein the non-complementary nucleic acid sequence comprises a nucleic acid sequence that encodes digital information.

In accordance with embodiment 4 the library of embodiment 3 is provided wherein said nucleic acid sequences that encode digital information comprise two primer binding sequences that flank the non-complementary nucleic acid sequences that encode digital information, wherein a first primer binding sequence is located at the 5' terminus of the non-complementary nucleic acid sequence and a second primer binding sequence is located at the 3' terminus of the non-complementary nucleic acid sequence.

In accordance with embodiment 5 the library of any one of embodiments 1-4 is provided wherein the 3' end of the staple oligonucleotides are modified to stabilized and prevent undesirable interactions, optionally wherein the modification comprises the addition of a poly A or poly T extension or modification of the 3' terminal nucleic acids of the staple oligonucleotides.

In accordance with embodiment 6 a library comprising a plurality of origami folded DNA data storage files (DNA-Files) is provided wherein, each of said DNAFiles comprises
  a single stranded DNA scaffold; and
  a plurality of single stranded DNA staple oligonucleotides, each of said staple oligonucleotides comprising nucleic acid sequences that bind through complementary base pairing with two non-contiguous segments of the DNA scaffold, wherein said staple oligonucleotides cause the DNA scaffold to fold into a two or three dimensional shape having a first surface;
  a plurality of data oligonucleotides, said data oligonucleotides comprising a sequence complementary to a nucleic acid sequence of the single stranded DNA scaffold, a nucleic acid sequence that encodes digital information, and a first and second primer binding sequence, wherein the first primer binding sequence is locate 5' to the digital information encoding nucleic acid sequence, the second primer binding sequence is locate 3' to the digital information encoding nucleic acid sequence, and said plurality of data oligonucleotides are localized to said first surface, and the individual DNAFiles differ from one another based on the nucleic acid sequence of the data oligonucleotides bound to the DNA scaffold of each DNAFile.

In accordance with embodiment 7 the library of embodiment 6 is provided wherein said staple oligonucleotides cause the DNA scaffold to reversibly fold into a multi-layered sheet conformation having a top surface and a bottom surface, wherein said plurality of data oligonucleotides are only linked to, and project away from, the top surface, optionally wherein the data oligonucleotides are uniformly distributed over said top surface.

In accordance with embodiment 8 the library of embodiment 6 or 7 is provided wherein each DNAFiles comprises a scaffold DNA folded into a bilayer sheet conformation comprising two symmetrical layers of origami DNA, optionally wherein the data oligonucleotides are linked to the folded DNA scaffold in a manner that the non-complementary single strands of the data oligonucleotides are uniformly distributed over said top surface at a density selected from the range of 20% to 100% of total occupancy, optionally wherein the the data oligonucleotides are are uniformly distributed over said first surface at a density of 20%, 40%, 60%, 80%, or 100 of total occupancy, optionally at a density of less than 500, 300, 200, 100, 50, 40, 20 or 10 data oligonucleotides per 100 nm², optionally wherein the non-complementary single strands of the data oligonucleotides, at the point where they project from the exterior surface of the folded DNA scaffold, are separated from one another by an average minimum distance of about 3 nm to about 18 nm, about 6 nm to about 18 nm, about 6 nm to about 12 nm, about 9 nm to about 12 nm, or about 7 nm to about 11 nm.

In accordance with embodiment 9 the library of any one of embodiments 6-8 is provided wherein the shape of each DNAFile is stabilized by
a) adding a sequence of six or more thymidine resides (poly(T)) to the end of the noncomplementary sequence of the data oligonucleotides;
b) decreasing the length of the staple oligonucleotides that are located near sheet corners to less than 100 nucleotides, or less than 50 nucleotides, to allow for flexibility during fold process;
c) adding additional crossover staple oligonucleotides that bind to noncontiguous sequences of the DNA scaffold to improve stability and shape of the origami folded construct;
d) introducing intentional gaps or missing base pairs within the scaffold DNA strand/staple folded structure (i.e. "skips") near the center-line of the folded multi-layered sheet to decrease twist;
e) any combination of a) through d).

In accordance with embodiment 10 the library of any one of embodiments 1-9 is provided wherein each DNAFiles comprises about 200-300 staple oligonucleotides.

In accordance with embodiment 11 the library of any one of embodiments 1-10 is provided wherein the data oligonucleotides have a length of about 100 to 200 nucleotides and comprise a nucleic acid sequence complementary to said DNA scaffold and a nucleic acid sequence non-complementary to said DNA scaffold, wherein the non-complementary nucleic acid sequence encodes digital information, further wherein said non-complementary nucleic acid sequence does not participate in the folding of the DNA scaffold into a two or three dimensional shape, optionally wherein said non-complementary nucleic acid sequence is flanked by a first primer binding sequence and second primer binding sequence, optionally wherein the non-complementary nucleic acid sequence has a length of at least 50 nucleotides, optionally a length from about 60 nucleotides to about 180 nucleotides.

In accordance with embodiment 12 the library of any one of embodiments 1-10 is provided wherein the staple oligonucleotides have a length of about 100 to 200 nucleotides and comprise a first nucleic acid sequence complementary to said DNA scaffold and a second nucleic acid sequence complementary to said DNA scaffold, wherein the first and second sequences are complementary to non-contiguous sequences of the DNA scaffold, optionally wherein the first and second sequences are linked to one another by a linker nucleic acid sequence that is not complementary with the sequence of the DNA scaffold.

In accordance with embodiment 13 the library of any one of embodiments 1-12 is provided where the nucleic acid sequences having complementarity to said DNA scaffold, present in the staple oligonucleotides and the data oligonucleotides, represent nucleic acid sequences having at least 85%, 90%, 95% or 99% sequence identity to a nucleic acid sequence of the DNA scaffold, optionally wherein the nucleic acid sequences having complementarity to said DNA scaffold have 100% sequence identity to a nucleic acid sequence of the DNA scaffold.

In accordance with embodiment 14 the library of any one of embodiments 1-13 is provided wherein each member of said plurality of origami folded DNAFiles comprises a different single stranded DNA scaffold.

In accordance with embodiment 15 the library of any one of embodiments 1-13 is provided wherein each member of said plurality of origami folded DNAFiles have the same single stranded DNA scaffold but differ from each other based on the sequence of the data oligonucleotides associated with each DNAFile.

In accordance with embodiment 16 the library of any one of embodiments 1-14 is provided wherein each member of said plurality of origami folded DNAFiles has a unique shape.

In accordance with embodiment 17 the library of any one of embodiments 1-16 is provided wherein each origami folded DNAFile further comprises a linked unique nucleic acid barcode construct.

In accordance with embodiment 18 the library of any one of embodiments 1-16 is provided wherein subsets of the origami folded DNAFiles of the library are linked to a nucleic acid barcode construct unique to each subset, but different between the subsets.

In accordance with embodiment 19 the library of any one of embodiments 17-18 is provided wherein the nucleic acid barcode construct is associated with the origami DNAFile via base-pairing.

In accordance with embodiment 20 the library of embodiment 19 is provided wherein the base-pairing occurs between
i) a sequence of a single-stranded non-complementary region of one or more of said staple oligonucleotides and a complementary sequence linked to the nucleic acid barcode construct; or
ii) a sequence of the single stranded DNA scaffold, optionally a single-stranded non-complementary region extending from the 5' or 3' end of the DNA scaffold, and a complementary sequence linked to the nucleic acid barcode construct.

In accordance with embodiment 21 the library of any one of embodiments 1-20 is provided wherein the nucleic acid barcode construct is associated with the DNAFile by a high affinity, non-covalent bond interaction between a biotin molecule linked to the 5' and/or the 3' end of the nucleic acid barcode construct and a molecule that binds to biotin, said molecule being linked to the DNAFile.

In accordance with embodiment 22 the library of any one of embodiments 1-21 is provided wherein the data oligonucleotides of each individual origami folded DNAFile of said library comprises an identical set of PCR binding sequences for preselected PCR primers, where the PCR binding sequences differ between the data oligonucleotides of each respective DNAFile file of the library.

In accordance with embodiment 23 the library of any one of embodiments 1-21 is provided wherein the data oligonucleotides of each origami folded DNAFile of said library comprises a unique set of PCR binding sequences for preselected PCR primers.

In accordance with embodiment 24 the library of any one of embodiments 1-23 is provided wherein said data oligonucleotides comprise a first and second primer binding sequence located at the respective 5' and 3' ends of the nucleic acid sequence encoding said digital information and said sequence complementary to a nucleic acid sequence of the single stranded DNA scaffold is linked 5' to the first primer binding sequence or 3' to the second primer binding sequence.

In accordance with embodiment 25 the library of any one of embodiments 1-23 is provided wherein said data oligonucleotides comprise a first and second primer binding sequence located at the respective 5' and 3' ends of each data oligonucleotide, wherein both the 5' end of the data oligonucleotide and the 3' end of the data oligonucleotide are non-complementary to the DNA scaffold, optionally wherein the percent occupancy of the data oligonucleotides on the DNA scaffold is less than 100% and optionally less than 50%.

In accordance with embodiment 26 the library of any one of embodiments 7-25 is provided wherein the data oligonucleotides are bound only to the top surface, and the non-complementary sequences of the data oligonucleotides (overhang) project away from the DNA scaffold in approximately the same direction optionally at an angle within 70 to 90 degrees or within 80 to 90 degrees of the planar surface of the top surface.

In accordance with embodiment 27, the library of any one of embodiments 7-26 is provided wherein the density of the data oligonucleotides on the top surface is about 30, 40, 50, 60, 70, 80, or 90 percent maximal occupancy, or at a density of less than 500, 300, 200, 100, 80, 50, 40, 20 or 10 data oligonucleotides per 100 nm$^2$, optionally at a density of 50, 40, 20 or 10 data oligonucleotides per 100 nm$^2$.

In accordance with embodiment 28 a method of retrieving digital data stored in DNA is provided wherein the method comprises
    providing a library of origami folded DNAFiles of any one of embodiments 1-27;
    denaturing a folded origami DNAFile of said library to at least partially disrupt the hybridized duplex between the single stranded staple oligonucleotides, the data oligonucleotides and the DNA scaffold;
    conducting PCR amplification on nucleic acid sequences of said denatured DNA scaffold, data oligonucleotides and staple oligonucleotides to produce amplicons;
    reannealing the staple oligonucleotides and the data oligonucleotides with the DNA scaffold to reconstitute the folded origami DNAFile;
    separating the amplicons from the reconstituted folded origami DNAFile;
    returning the reconstituted folded origami DNAFile to the library; and
    sequencing the amplicons to retrieve digital data encoded by the DNAFile.

In accordance with embodiment 29 the method of embodiment 28 is provided wherein said denaturing step completely releases all staple oligonucleotides and all data oligonucleotides as free single stranded nucleic acids.

In accordance with embodiment 30 the method of any one of embodiments 28-29 is provided wherein the amplicons are separated from the reconstituted folded origami DNA-Files via gel electrophoresis.

In accordance with embodiment 31 the method of any one of embodiments 28-29 is provided wherein the amplicons are separated from the reconstituted folded origami DNA-Files via size exclusion chromatography.

In accordance with embodiment 32 the method of any one of embodiments 28-31 is provided further comprising the step of confirming the correct size and shape of the reconstituted folded origami DNA scaffold prior to returning the reconstituted folded origami DNA scaffold to the library.

In accordance with embodiment 33 the method of any one of embodiments 28-32 is provided further comprising the step of selecting one or more individual origami folded DNAFiles from the other origami folded DNAFiles of said library and conducting the denaturing step only on the selected origami folded DNAFiles.

In accordance with embodiment 34 the method of any one of embodiments 28-33 is provided wherein the one or more individual origami folded DNAFiles are selected based on selective binding of individual origami folded DNAFiles to a complementary oligonucleotide immobilized on a solid surface, or to a complementary oligonucleotide bound to a magnetic or fluorescently labelled nanoparticle.

In accordance with embodiment 35 a method of storing digital information using DNA as the storage medium is provided wherein the method comprising the steps:
    providing a single stranded DNA scaffold;
    providing a plurality of single stranded staple oligonucleotides and data oligonucleotides that bind through complementary base pairing with a segment of the DNA scaffold, wherein the staple oligonucleotides cause the DNA scaffold to fold into a two or three dimensional shape, wherein the data oligonucleotides comprise nucleic acid sequences that encode digital information;
    mixing said DNA scaffold and said staple oligonucleotides and data oligonucleotides under conditions that allow sequence specific hybridization of the staple oligonucleotides and data oligonucleotides to the DNA scaffold and folding of the DNA scaffold.

In accordance with embodiment 36 the method of embodiment 35 is provided wherein said data oligonucleotide comprises two primer binding sequences that flank the non-complementary nucleic acid sequences that encode digital information, wherein a first primer binding sequence is at the 5' terminus of the nucleic acid sequence that encodes digital information and a second primer binding sequence is at the 3' terminus of the nucleic acid sequence that encodes digital information.

Example 1

Fold 2D/Wireframe Structure with Overhangs Coding for Data

DNA scaffolds were designed and folded into planar parallel 2D bilayer sheets to maximize data incorporation surface area, stability and overhang positions. The parallel design showed twisting upon simulating, and new elements were introduce to decrease twist, particularly by introducing intentional gaps or missing base pairs within the scaffold DNA strand/staple folded structure (i.e. "skips") near the center-line of the folded multi-layered sheet. The sheets were folded using standard techniques with 10:1 staple:scaffold ratio, 12.5 mM salt MgCl$_2$ concentration and a 14 hr thermal ramp.

The DNA scaffolds were designed to accommodate 80 data oligonucleotides with the oligonucleotides attached to both the top and bottom surface of the folded 2D bilayer sheets. The data oligonucleotides were prepared having a total length of 80 nucleotides, with a 20 nucleotide sequence having complementarity with a corresponding sequence of the DNA scaffold, two primer binding sequences of 20 nucleotides each that flank a 9 nucleotide sequence encoding data. Folded sheets were prepared having different combinations of data strand occupancy to test most stable configuration. Specifically, embodiments were prepared where the folded sheet had 20%, 40%, 60%, 100% occupancy on both the top and bottom, or alternatively the folded sheet had 20% or 100% occupancy on the top sheet only (see FIG. 2). The 100% double sided occupancy embodiment comprises a total of 720 data bases (80 data oligonucleotides×9 nucleotides) and the 100% single sided occupancy embodiment comprises a total of 360 data bases (40 data oligonucleotides×9 nucleotides).

Accordingly, a 100 ul volume of 20 nM solution of DNAFiles containing 100% single sided occupancy provides $4.35 \times 10^{14}$ data bases or $1.45 \times 10^{14}$ bits of data.

Figure 2:
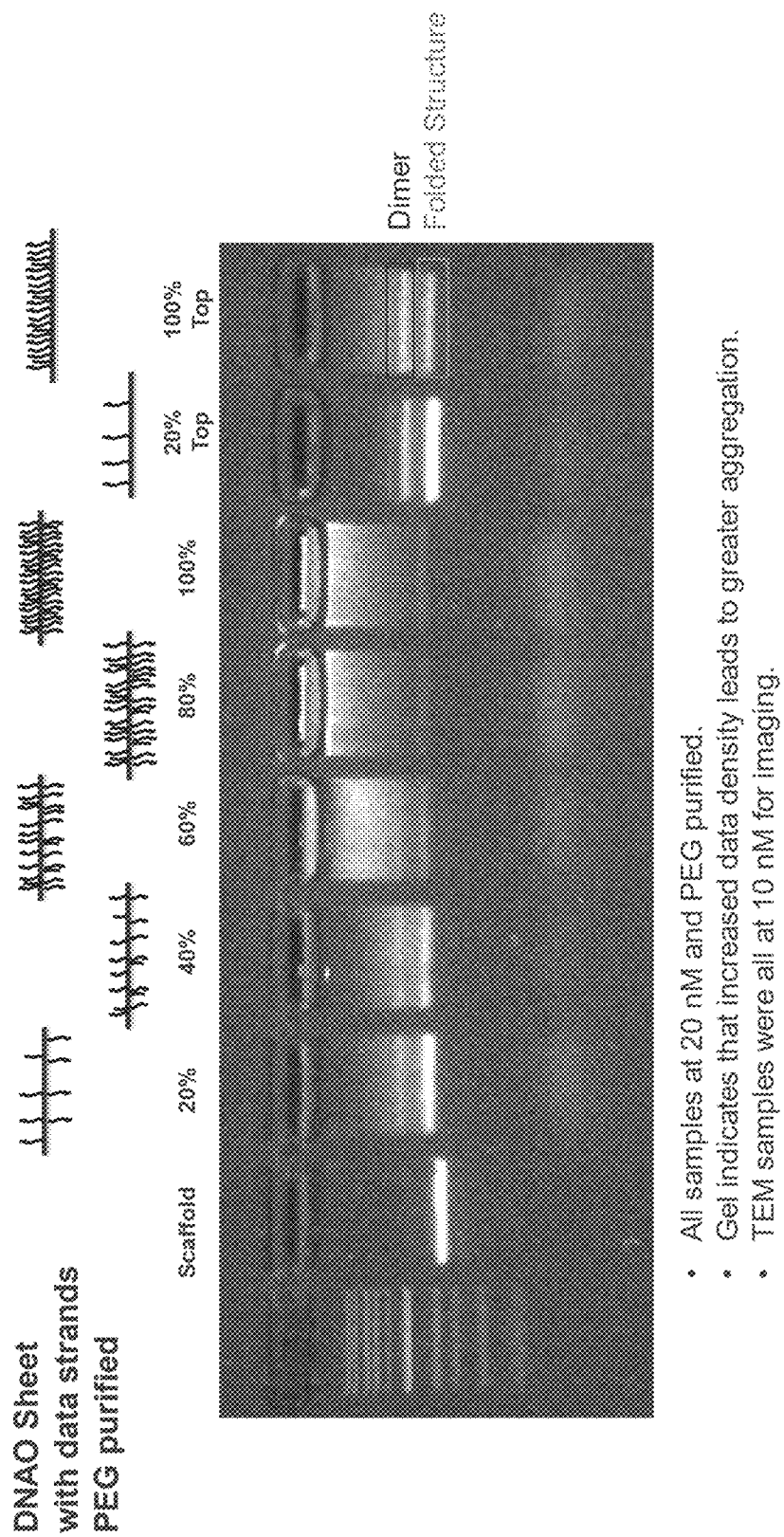
FIG. 2 is a photograph of a gel comparing the electrophoretic mobility of origami folded sheets that differ from each other based solely on differing combinations of data oligonucleotide occupancy. More particularly, lane 1 represents a set of molecular markers, lane 2 represents the folded scaffold absent any data oligonucleotides, lanes 3-7 represent folded scaffolds with both sides of the scaffold populated with data oligonucleotides at 20%, 40%, 60%, and 100% occupancy, respectively, and lanes 8-9 represent folded scaffolds with only one side of the scaffold populated with data oligonucleotides at 20% and 100% occupancy, respectively. The data demonstrate that increased density of data oligonucleotides on the DNA scaffold results in greater aggregation. However, populating data oligonucleotides only on the top surface of an origami DNA scaffold folded into a sheet conformation greatly diminishes the formation of aggregates.
Figure 3A:
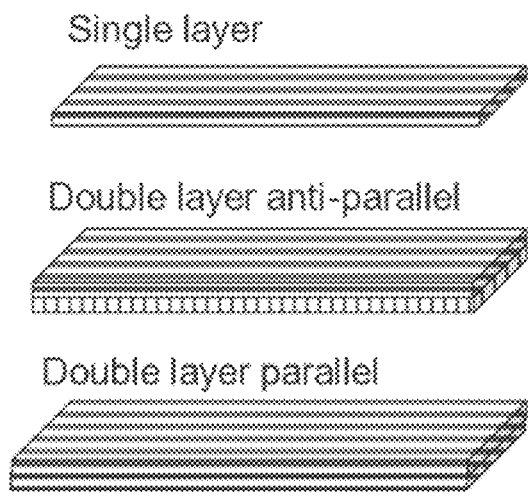
FIGS. 3A and 3B are representations of origami DNA folded into the sheet conformation.
Figure 3B:
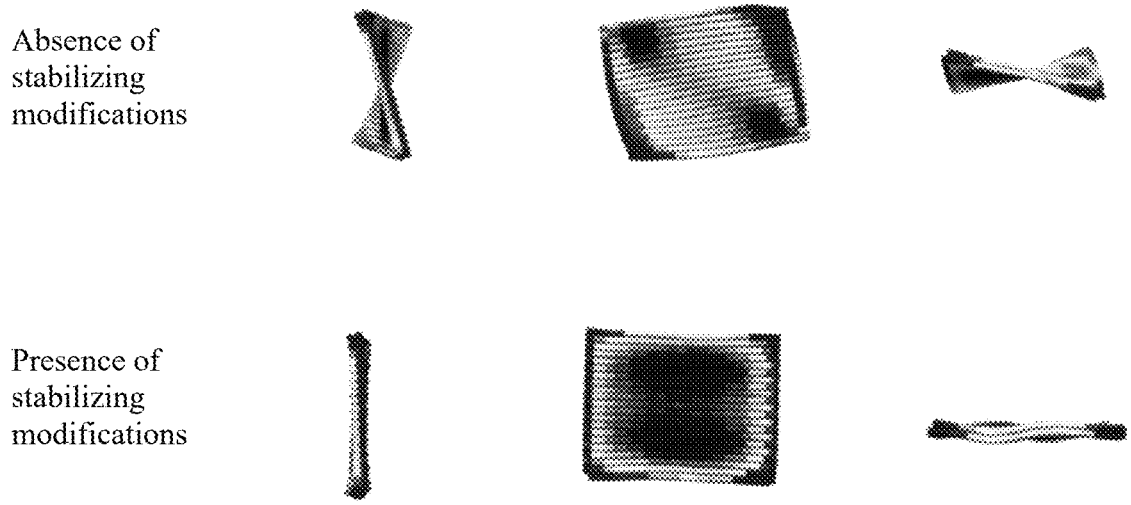
Figure 4A:
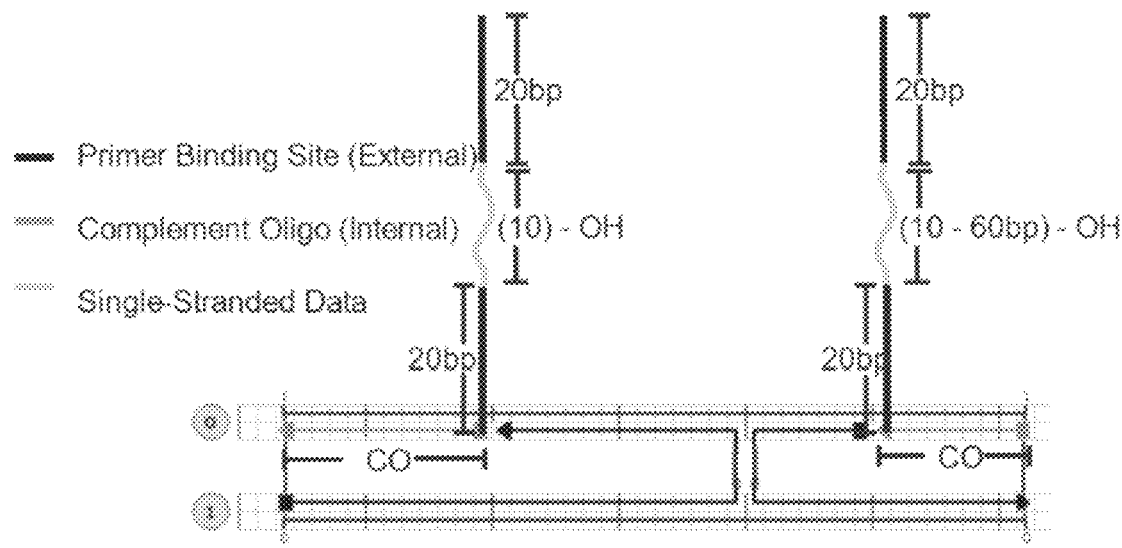
FIGS. 4A and 4B provide schematic representations of a DNAFile. The exemplified DNAFile comprises two single stranded scaffold DNA sequences ("0" and "1") joined to one other by staple oligonucleotides, wherein the staple oligonucleotides comprise a nucleic acid sequence that is complementary to a sequence on scaffold DNA strand "0" and a sequence that is complementary to sequence on strand "1". The DNAFile is further provided with data oligonucleotides that have complementarity with a sequence of scaffold DNA sequence "0". The data oligonucleotides comprise four components: a sequence that shares complementarity with the single stranded scaffold DNA, a sequence that encodes digital information, and a pair of primer binding sequence that flank the sequence that encodes digital information.
Figure 4B:
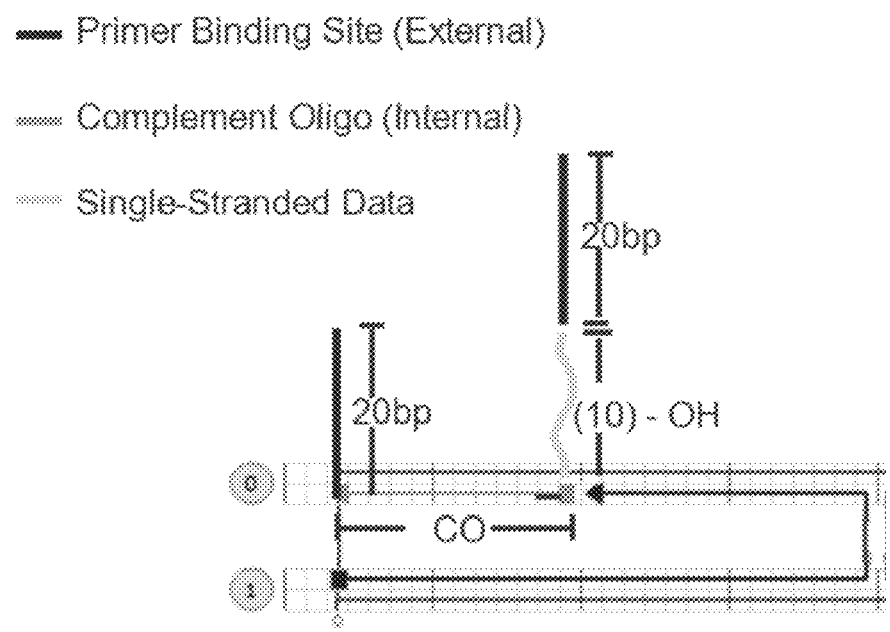

The results provided in FIG. 2 demonstrate that the presence of data strands induces a degree of aggregation correlated to the % occupancy. One sided occupancy resulted in substantially less multi-order structures. PCR and sequencing was performed to assess error in occupancy dependent errors in data incorporation or reading. All data strands had 1:1 incorporation in the designed location (i.e., no mis-matched incorporation was detected). Lower occupancy was associated with higher sequence reads from occupied locations (presumably due to less steric hindrance). The 100% single sided occupancy embodiment had a 2.4× higher total sequence read count than the 100% double sided occupancy embodiment DS.

The invention claimed is:

1. A library comprising a plurality of origami folded DNA data storage files (DNAFiles), each of said DNAFiles comprising
  a single stranded DNA scaffold; and
  a plurality of single stranded DNA staple oligonucleotides that each bind through complementary base pairing with two non-contiguous nucleic acid sequences of the DNA scaffold, wherein said staple oligonucleotides cause the DNA scaffold to fold into a two or three dimensional shape having a first surface;
  a plurality of data oligonucleotides, said data oligonucleotides comprising a sequence complementary to a nucleic acid sequence of said single stranded DNA scaffold, a nucleic acid sequence that encodes digital information, a first primer binding sequence and a second primer binding sequence, wherein the first primer binding sequence is 5' to the digital information encoding nucleic acid sequence, and the second primer binding sequence is 3' to the digital information encoding nucleic acid sequence, wherein said plurality of data oligonucleotides are localized to said first surface, wherein the individual DNAFiles differ from one another based on the nucleic acid sequences of the plurality of data oligonucleotides bound to the DNA scaffold of each DNAFile.

2. The library of claim 1 wherein said staple oligonucleotides cause the DNA scaffold to fold into a multi-layered sheet conformation having a top surface and a bottom surface wherein said plurality of data oligonucleotides are only linked to, and project away from, the top surface.

3. The library of claim 2 wherein each DNAFile has a bilayer sheet conformation comprising two symmetrical layers of origami DNA,
  wherein the shape of each DNAFile is stabilized by
    a) adding a sequence of six or more thymidine resides (poly(T)) to one end of the the data oligonucleotides;
    b) decreasing the length of staple oligonucleotides located near sheet corners to less than 100 nucleotides, or less than 50 nucleotides, to allow for flexibility during the folding process;
    c) introducing intentional gaps or missing base pairs within the scaffold DNA strand/staple folded structure (i.e. "skips") near the center-line of the folded multi-layered sheet; or
    d) any combination of a) through c).

4. The library of claim 3 wherein said data oligonucleotides have a length of about 30 to 200 nucleotides, and the first and second primer binding sequences, and the sequence complementary to a nucleic acid sequence of said single stranded DNA scaffold, are each independently 10 to 20 nucleotides in length.

5. The library of claim 1 wherein
  i) said first primer binding sequence is located at the 5' terminus of said data oligonucleotides and said second primer binding sequence is located at the 3' terminus of said data oligonucleotides; or
  ii) said nucleic acid sequence of the data oligonucleotide that is complementary to said single stranded DNA scaffold is 5' to said first primer binding sequence, or 3' to said second primer binding sequence.

6. The library of claim 1 wherein each member of said plurality of origami folded DNAFiles comprises a different single stranded DNA scaffold.

7. The library of claim 1 wherein
  i) each member of said plurality of origami folded DNA-Files has a unique shape; or
  ii) each origami folded DNAFile further comprises a linked unique nucleic acid barcode construct; or
  iii) both i) and ii).

8. The library of claim 1 wherein each origami folded DNAFile further comprises a unique nucleic acid barcode construct linked to the origami DNAFile via base-pairing, wherein said base-pairing that links the nucleic acid barcode construct with the origami DNAFile occurs between
  i) a single-stranded non-complementary nucleic acid sequence of one or more of said staple oligonucleotides and a complementary sequence linked to the nucleic acid barcode construct; or
  ii) a single-stranded non-complementary nucleic acid sequence extending from the 5' or 3' end of the single-stranded DNA scaffold and a complementary sequence linked to the nucleic acid barcode construct.

9. The library of claim 8, wherein the nucleic acid barcode construct is linked to the DNAFile by a high affinity, non-covalent bond interaction between a biotin molecule linked to the 5' and/or the 3' end of the nucleic acid barcode construct and a molecule that binds to biotin, said molecule being linked to the DNAFile.

10. A library comprising a plurality of origami folded DNA data storage files (DNAFiles), each of said DNAFiles comprising
  a single stranded DNA scaffold; and
  a plurality of single stranded DNA staple oligonucleotides that each bind through complementary base pairing with two non-contiguous nucleic acid sequences of the DNA scaffold, wherein said staple oligonucleotides cause the DNA scaffold to fold into a two or three dimensional shape having a first surface;
  a plurality of data oligonucleotides, said data oligonucleotides comprising a sequence complementary to a nucleic acid sequence of said single stranded DNA scaffold, a nucleic acid sequence that encodes digital information, and a first primer binding sequence and a second primer binding sequence, wherein the first primer binding sequence is 5' to the digital information encoding nucleic acid sequence, the second primer binding sequence is 3' to the digital information encoding nucleic acid sequence, wherein said plurality of data oligonucleotides are localized to said first surface, wherein the individual DNAFiles differ from one another based on the nucleic acid sequences of the plurality of data oligonucleotides bound to the DNA scaffold of each DNAFile wherein the data oligonucleotides of each individual origami folded DNAFile of said library further comprise an identical set of PCR binding sequences for preselected PCR primers, where the PCR binding sequences differ between the data oligonucleotides of each respective DNAFile of the library.

11. A method of retrieving digital data stored in DNA, said method comprising
  providing the library of origami folded DNAFiles according to claim 1;
  denaturing a folded origami DNAFile of said library to at least partially disrupt the hybridized duplex between the single stranded staple oligonucleotides, data oligonucleotides and the DNA scaffold;
  conducting PCR amplification on select nucleic acid sequences of said denatured DNA scaffold and data oligonucleotides to produce amplicons;
  reannealing the staple oligonucleotides and data oligonucleotides with the DNA scaffold to reconstitute the folded origami DNAFile;
  separating the amplicons from the reconstituted folded origami DNAFile;
  returning the reconstituted folded origami DNAFile to the library; and
  sequencing the amplicons to retrieve digital data encoded by the DNAFile.

12. The method of claim 11 wherein said denaturing step completely releases all staple oligonucleotides and data oligonucleotides as free single stranded nucleic acids.

13. The method of claim 11 wherein the amplicons are separated from the reconstituted folded origami DNAFiles
  i) via gel electrophoresis; or
  ii) via size exclusion chromatography.

14. The method of claim 11 further comprising the step of confirming the correct size and shape of the reconstituted folded origami DNA scaffold prior to returning the reconstituted folded origami DNA scaffold to the library.

15. The method of claim 14 further comprising the step of selecting one or more individual origami folded DNAFiles from the other origami folded DNAFiles of said library and conducting the denaturing step only on the selected origami folded DNAFiles.

16. The method of claim 15 wherein the one or more individual origami folded DNAFiles are selected based on selective binding of individual origami folded DNAFiles to a complementary oligonucleotide immobilized on a solid surface, or to a complementary oligonucleotide bound to a magnetic or fluorescently labelled nanoparticle.

17. A method of storing digital information using DNA as the storage medium, said method comprising the steps:
  providing a single stranded DNA scaffold; and
  providing a plurality of single stranded staple oligonucleotides that each bind through complementary base pairing with two non-contiguous nucleic acid sequences of the DNA scaffold, wherein said staple oligonucleotides cause the DNA scaffold to fold into a two or three dimensional shape having a plurality of external surfaces; mixing said DNA scaffold and said staple oligonucleotides under conditions that allow sequence specific hybridization of the staple oligonucleotides to the DNA scaffold and folding of the DNA scaffold; and
  hybridizing a plurality of data oligonucleotides exclusively to one external surface of said plurality of external surfaces to store digital information using said data oligonucletides as the storage medium, wherein said data oligonucleotides comprise a sequence complementary to a segment of said single stranded DNA scaffold, a nucleic acid sequence that encodes digital information, a first primer binding sequence and a second primer binding sequence, wherein the first primer binding sequence is locate 5' to the digital information encoding nucleic acid sequence, and the second primer binding sequence is locate 3' to the digital information encoding nucleic acid sequence.

18. The method of claim 17 wherein said staple oligonucleotides cause the single stranded DNA scaffold to fold into a multi-layered sheet conformation having a top surface and a bottom surface wherein said plurality of data oligonucleotides are only linked to, and project away from, the top surface.

19. A library comprising a plurality of origami folded DNA data storage files (DNAFiles), each of said DNAFiles comprising a single stranded DNA scaffold; and a plurality of single stranded DNA staple oligonucleotides that each bind through complementary base pairing with two non-contiguous nucleic acid sequences of the DNA scaffold, wherein said staple oligonucleotides cause the DNA scaffold to fold into the shape of a multi-layered sheet having a top surface and a bottom surface;

a plurality of data oligonucleotides, said data oligonucleotides comprising a sequence complementary to a nucleic acid sequence of said single stranded DNA scaffold, a nucleic acid sequence that encodes digital information, and a first primer binding sequence and a second primer binding sequence, wherein the first primer binding sequence is 5' to the digital information encoding nucleic acid sequence, the second primer binding sequence is 3' to the digital information encoding nucleic acid sequence, wherein said plurality of data oligonucleotides are bound only to the top surface, further wherein the individual DNAFiles differ from one another based on the nucleic acid sequences of the data oligonucleotides bound to the DNA scaffold of each DNAFile.

20. The library of claim 19 wherein the density of the data oligonucleotides of each DNAFile is limited to less than 100%, or less than 80%, maximum occupancy, optionally wherein the data oligonucleotides are attached to the top surface at a density of less than 100, 80, 50, 40, 20 or 10 data oligonucleotides per 100 nm$^2$ of the DNA scaffold.

\* \* \* \* \*